(12) United States Patent
Abdi

(10) Patent No.: US 7,505,367 B2
(45) Date of Patent: Mar. 17, 2009

(54) SYSTEM AND METHOD FOR USING ACOUSTIC FIELD PARAMETERS FOR COMMUNICATION

(75) Inventor: Ali Abdi, New Milford, NJ (US)

(73) Assignee: New Jersey Institute of Technology, Newark, DE (US)

( * ) Notice: Subject to any disclaimer, the term of this patent is extended or adjusted under 35 U.S.C. 154(b) by 0 days.

(21) Appl. No.: 11/818,635

(22) Filed: Jun. 15, 2007

(65) Prior Publication Data
US 2008/0198695 A1 Aug. 21, 2008

Related U.S. Application Data

(60) Provisional application No. 60/835,408, filed on Aug. 2, 2006.

(51) Int. Cl.
*H04B 11/00* (2006.01)
(52) U.S. Cl. .................................................. 367/134
(58) Field of Classification Search ............. 367/117, 367/131, 134
See application file for complete search history.

(56) References Cited

U.S. PATENT DOCUMENTS

| | | | | |
|---|---|---|---|---|
| 6,697,302 | B1 * | 2/2004 | Cray et al. | 367/141 |
| 7,106,658 | B1 * | 9/2006 | Cray et al. | 367/119 |
| 2008/0198695 | A1 * | 8/2008 | Abdi | 367/134 |

OTHER PUBLICATIONS

Shipps, J., "The Use of Vector Sensors for Underwater Port and Waterway Security", Sensors for Industry Conference, Jan. 27-29, 2004, pp. 41-44.*
L. E. Freitag, M. Grund, J. Partan, K. Ball, S. Singh, and P. Koski, "Multi-band acoustic modem for the communications and navigation aid AUV," in Proc. Oceans, Washington, DC, 2005.
J. Clay Shipps and K. Deng, "A miniature vector sensor for line array applications," in Proc. Oceans, San Diego, CA, 2003, pp. 2367-2370.
B. A. Cray and A. H. Nuttall, "Directivity factors for linear arrays of velocity sensors," J. Acoust. Soc. Am., vol. 110, pp. 324-331, 2001.
D. B. Kilfoyle and A. B. Baggeroer, "The state of the art in underwater acoustic telemetry," IEEE J. Oceanic Eng., vol. 25, pp. 4-27, 2000.
M. Hawkes and A. Nehorai, "Acoustic vector-sensor beamforming and Capon direction estimation," IEEE Trans. Signal Processing, vol. 46, pp. 2291-2304, 1998.
A. Nehorai and E. Paldi, "Acoustic vector-sensor array processing," IEEE Trans. Signal Processing, vol. 42, pp. 2481-2491, 1994.

* cited by examiner

*Primary Examiner*—Dan Pihulic
(74) *Attorney, Agent, or Firm*—Timothy X. Gibson, Esq.; Gibson & Dernier LLP

(57) ABSTRACT

A system and a method for conveying data using the vector components of the acoustic field, in addition to the scalar component is described. Receivers capable of determining the transmitted data values by measuring one or more parameters of an acoustic field are utilized. Measured parameters of the acoustic field may include both the scalar and vector components. The described system and method may optimize the conveyance of communications through a fluid.

22 Claims, 83 Drawing Sheets

SD=25m

SYSTEM AND METHOD FOR USING ACOUSTIC FIELD PARAMETERS FOR COMMUNICATION

CROSS-REFERENCE TO RELATED APPLICATIONS

This application claims the benefit of U.S. Provisional Patent Application Ser. No. 60/835,408, filed Aug. 2, 2006, entitled "System and Method for Using Acoustic Field Parameters in Communication" the entire disclosure of which is hereby incorporated by reference herein.

BACKGROUND OF THE INVENTION

The present invention relates to the field of acoustic communications. More particularly, the invention relates to the measurement of one or more parameters of the acoustic field for information recovery.

Acoustic waves have been used for target localization and SONAR applications for many years, especially in underwater applications. The steady growth of ocean exploration activity in recent years has resulted in a rising need to convey data through underwater channels. Numerous applications of acoustic communications pose an increasing demand on high-speed underwater wireless telemetry and data communication systems. These systems often require a combination of sensors, autonomous underwater vehicles, moored instruments, and/or surface ships to communicate with each other. Examples of such applications include: real-time remote monitoring of underwater tools, construction, and/or environmental factors in the offshore oil industry, continuous observation of ocean phenomena over geographically large areas, observation of fisheries, as well as many naval and security applications, including, but not limited to harbor monitoring systems and tactical surveillance operations.

Underwater communication systems generally use acoustic waves to convey information. In the underwater environment, electromagnetic waves do not propagate, as they attenuate rapidly.

In general, underwater acoustic channels are bandwidth-constrained. For distances from 10 km up to 100 km (long range), the available bandwidth is about a few kHz, whereas in a 1-10 km medium range setup, the available bandwidth is almost a few 10 kHz. Communications over short ranges, smaller than around 100 m, may have an available bandwidth exceeding 100 kHz. Underwater communication may be complicated by the harsh multipath conditions, and/or channel-alone time variations due to water surface fluctuations, internal waves, and/or turbulence. The multipath conditions may result in delay spreads up to several hundreds of symbols for high data rates. Further, channel-alone time variations may result in Doppler spreads up to several 10 Hz. After the first generation of underwater (analog) modems, second generation (digital) modems used non-coherent techniques such as frequency shift keying (FSK) and differentially coherent schemes like differential phase shift keying (DPSK). Due to the need for higher spectral efficiencies over typical channels of interest, coherent systems with phase shift keying (PSK) and quadrature amplitude modulation (QAM) were also developed.

Data rates available from existing systems are much lower than the data rates required for the real-time transmission of data, such as video and telemetry signals, over medium and long distances. For example, a typical commercially available modem provides only up to 2400 b/s at a 2 km depth and 3 km range setup.

Traditionally, underwater acoustic transmission has been limited to the scalar component of the acoustic field, i.e., the pressure. Existing multichannel underwater receivers are, generally, composed of spatially separated pressure-only sensors resulting in large size arrays. Array size is a limitation in modem applications, especially for small autonomous underwater vehicles. For example, the medium frequency (MF) 3 kHz receive array of a modem designed for a 21-inch diameter autonomous underwater vehicle includes four hydrophones and is 1.5 m long. For smaller size autonomous underwater vehicles, the necessary modem array may prove unwieldy.

In the past few decades, a large volume of research has been conducted on theory, performance evaluation, and design of acoustic vector sensors. These acoustic vector sensors have been used for the detection of acoustic signals, for example, underwater target localization and SONAR applications. For example, vector sensors have been studied for use in applications including accurate azimuth and elevation estimation of a source, avoidance of the left-right ambiguity of linear towed arrays of scalar sensors, and acoustic noise reduction due to a highly directive beam pattern.

The presently disclosed novel system and method include all of the same advantages present in traditional techniques but eliminate associated disadvantages.

SUMMARY OF THE INVENTION

According to one aspect, the invention provides a method, that may include providing a communication system having at least one pressure transducer and operating in a fluid medium;

transmitting data through the fluid medium using the at least one pressure transducer; and receiving the data using at least one vector sensor.

According to another aspect, the invention provides a communication system, that may include at least one pressure transducer operating in a fluid medium and operable to transmit the data through the fluid medium; and at least one vector sensor operable to receive the data.

The invention describes a method for measuring scalar and/or vector components of an acoustic field. The acoustic field may travel through any medium. A scalar component of an acoustic field is the pressure. A vector component of an acoustic field includes measurements of particle motion including derivatives of the displacement of particles. This may include a spatial derivative of pressure. The spatial derivative of the pressure may be referred to as a pressure gradient or, in some circumstances, the velocity or acoustic particle velocity. In the following description these terms may be used interchangeably. In addition, vector components used may include spatial derivatives of velocity, velocity gradients, or any higher order gradients. Velocity gradients may be referred to as acceleration in the following disclosure and are to be considered equivalent.

Systems utilizing parameters of an acoustic field to identify data may use any combination of scalar and vector components. For example, the three orthogonal components of velocity and the scalar pressure at a single point can be used to recover information from an acoustic field. Receivers, such as vector sensors, can be efficiently manufactured today and enable the use of the unexplored degrees of freedom of the channel. Utilizing vector components of the acoustic field reduces the array size needed to recover data transmitted, when compared with systems measuring the scalar component alone.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE INVENTION

Figure 1:
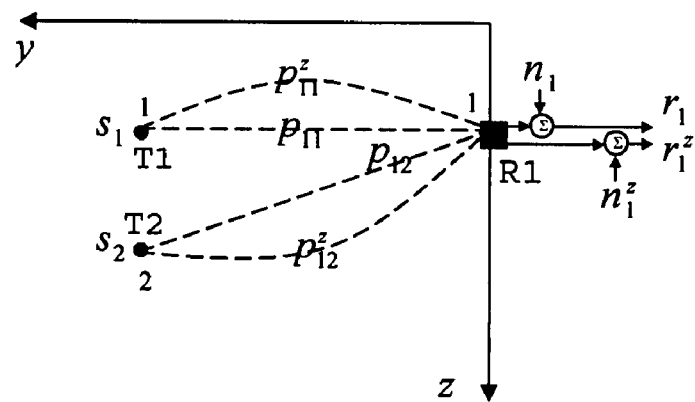
FIG. 1 is a schematic representation of an acoustic communication system, having two pressure transmitters and one vector sensor receiver.

Acoustic fields may be used to convey data. A source may be used to encode a package of data in an acoustic field. Sources may include any device, system, or method capable of converting a data package into an acoustic field, such as a transmitter. A receiver may be used to receive the acoustic field. Receivers may include any device, system, or method capable of receiving an acoustic field. Receiving the acoustic field may include measuring one or more parameters of the acoustic field, such as one or more vector components and/or a scalar component. The values of the measured parameters may be used to recover the data package conveyed. Some embodiments utilize measurements of one or more parameters of the acoustic field to recover the conveyed information.

Acoustic fields may be used to convey data in any environment including liquids, gases, solids and/or any combinations thereof. Herein, "fluid" may include liquid and/or gas. For example, acoustic fields may be used to transmit data in underwater channels. Data capable of being conveyed include, but are not limited to, any information, which may be encoded in an acoustic field. For example, a transducer may be used to convert a data package (e.g., electrical signal) into a pressure field, and a receiver may reconvert the pressure signals back into electrical waveforms.

An embodiment includes measuring any quantifiable parameter of an acoustic field to determine the data conveyed. In an embodiment, one or more vector components of an acoustic field, in addition to the scalar component (i.e., pressure), may be measured to determine values for the data transmitted. Vector components of an acoustic field include, but are not limited to, the three components of the acoustic particle velocity (i.e., the pressure gradients or the spatial derivatives of the particle displacement), any of the nine components of the spatial derivative of the acoustic particle velocity (i.e., the velocity gradients), and any higher-order gradients of the acoustic field. For example, in a three-dimensional underwater channel, x, y, and z components of the acoustic particle velocity may be measured, as well as nine components of the velocity gradient.

In an embodiment, one vector component may be measured to discern values for the conveyed data. Alternately, multiple vector components may be measured to discern values for the conveyed data. For example, an embodiment may include measuring pressure, components of acoustic particle velocity, and components of acoustic particle velocity gradients. In this example, thirteen channels would be available for the conveyance of data. In some embodiments, measurement of multiple acoustic parameters to determine values for conveyed data may decrease the error probability of data recovery while utilizing a small array. In other words, use of both scalar and vector components of the acoustic field increases the number of channels available for conveyance of data, and thereby decreases the error probability.

Vector components of an acoustic field may be measured using devices including, but not limited to, transducers, receivers, receivers, vector sensors (e.g., inertial sensors, gradient sensors, uniaxial vector sensors, biaxial vector sensors, and/or triaxial vector sensors), multi-axial vector sensors, higher order sensors (e.g., dyadic or tensor sensors), accelerometers (e.g., uniaxial accelerometers), hydrophones, fiber optic-based sensors, or any other devices known in the art or yet to be developed that achieve the same or similar functionality. Measurements of the scalar components of the acoustic field may be made using devices which include, but are not limited to, pressure sensors, transducers, hydrophones, omnidirectional hydrophones, directional hydrophones and/or any other devices known in the art or yet to be developed that achieve the same or similar functionality. Recovering information from the vector components of the acoustic field is not limited to any particular sensor type, any device capable of measuring a vector component of the acoustic field suffices.

In an embodiment, a signal may be processed at a receiver using one or multiple processing methods. Processing methods may include any signal processing methods known in the art or yet to be developed that achieve the same or similar functionality, such as equalization algorithms, diversity techniques, decoding methods, interference cancellation techniques, temporal and frequency processing, etc. For example, any known or yet to be developed digital and/or analog signal processing method may be used in an embodiment. Although a single-user communication system and method is discussed throughout this application, the inventive principles discussed herein are fully applicable to multi-user communication systems and networks.

Algorithms utilized may include, but are not limited to, different types of single and multi-channels equalizers such as zero-forcing equalizer, a minimum mean square equalizer (herein referred to as MMSE), a decision-feedback equalizer, adaptive equalizers and turbo-equalizers with different types of training algorithms, and/or any processing algorithm used in the art or yet to be developed that achieve the same or similar functionality. In addition to these temporal equalization algorithms, space-time and space-frequency techniques may be used as well.

In some embodiments, one or more diversity techniques may be used to combine the measured components including, but not limited to maximal ratio combiner, selection combiner, equal gain combiner, and/or any other techniques known in the art or yet to be developed that achieve the same or similar functionality.

An embodiment includes utilizing a decoding method determined by the code used at the source. The codes used at the source may be source coding (e.g., data compression) channel coding (e.g., temporal codes, space-time codes, space-time-frequency codes), joint source-channel codes and/or any other methods known in the art or yet to be developed that achieve the same or similar functionality. Further, some embodiments include a processing method capable of performing carrier and/or bit synchronization.

Some embodiments include processing methods occurring at the receiver. In alternate embodiments, one or more processing devices may be positioned proximate to the receiving device. For example, with an Orthogonal Frequency Division Multiplexing (herein referred to as OFDM) signal transmitted, fast Fourier transform (herein referred to as FFT) blocks are needed at the receiver. In another example, transmitting a spread spectrum signal (e.g., code division multiple access, direct sequence, or frequency hopping) for low-probability of interception communication and/or multi-user communication may create a need for a dispreading module at the receiver for certain embodiments.

In some embodiments, a combination of receivers may be used to measure the acoustic field. For example, a vector sensor may be used in combination with a hydrophone to measure all the acoustic field components. The acoustic field components are used to determine data values for the conveyed data.

An embodiment may include commercially available vector sensors used as receivers. Alternate embodiments may include using a vector sensor in a transceiver to aid in relaying signals.

In one embodiment, an inertial vector sensor is used to measure the velocity or acceleration by responding to acoustic particle motion. In alternate embodiments, gradient sensors may be used which utilize a finite-difference approximation to estimate gradients of the acoustic field such as velocity and acceleration.

In some embodiments, a vector sensor may have the capacity to measure multiple parameters of the acoustic field. A vector sensor may be designed to measure the scalar component of the acoustic field, as well as multiple vector components of the acoustic field, simultaneously.

Receivers may be arranged and/or designed to eliminate a need for arrays of pressure-only receiving devices. For example, use of a system of vector sensors may eliminate a need for large-size pressure-only arrays. In some embodiments, vector sensors may be used as compact multi-channel receivers, measuring both the scalar and vector components in a single point in space. In contrast are the conventional systems such as pressure-only sensors spatially separated and arranged in large size arrays. Thus, the volume of space required for the receivers and/or decoding devices may be greatly reduced. The decreased size of the receivers and/or decoding devices make the technology available for a wider variety of applications which were previously prohibited. Some of examples of this include, but are not limited to, small autonomous underwater vehicles, divers communicating with each other and a submarine, etc.

In some embodiments, devices used to measure acoustic wave parameters may be neutrally buoyant in the fluid through which the acoustic field is traveling. For example, vector sensors may be neutrally buoyant in a fluid such as water.

An acoustic field communication system may include single input single output systems (herein referred to as SISOs), single input multiple output systems (herein referred to as SIMOs), multiple input single output systems (herein referred to as MISOs), and multiple input multiple output systems (herein referred to as MIMOs).

Conveyed data may include voice, video, text, numbers, characters, images, control and command signals, telemetry signals, and/or other outputs from devices used to convert physical quantities into data communication symbols.

Signals transmitted via the acoustic field communication system may be modulated. In some embodiments, modulation may include, but is not limited to, angular modulation, phase modulation (herein referred to as PM), frequency modulation (herein referred to as FM), amplitude modulation (herein referred to as AM), single-sideband modulation (herein referred to as SSB), single-sideband suppressed carrier modulation (herein referred to as SSB-SC), vestigial-sideband modulation (herein referred to as VSB), sigma-delta modulation, phase-shift keying (herein referred to as PSK), frequency-shift keying (herein referred to as FSK), audio frequency-shift keying (herein referred to as AFSK), minimum-shift keying (herein referred to as MSK), Gaussian minimum-shift keying (herein referred to as GMSK), very minimum-shift keying (herein referred to as VMSK), binary phase-shift keying (herein referred to as BPSK), quadrature phase-shift keying (herein referred to as QPSK), offset or staggered phase-shift keying (herein referred to as SQPSK), $\pi/4$ quadrature phase-shift keying (herein referred to as $\pi/4$ QPSK), differential phase-shift keying (herein referred to as DPSK), amplitude-shift keying (herein referred to as ASK), on-off keying (herein referred to as OOK), quadrature amplitude modulation (herein referred to as QAM), continuous phase modulation (herein referred to as CPM), trellis coded modulation (herein referred to as TCM), polar modulation, pulse-code modulation, pulse-width modulation, pulse-amplitude modulation, pulse-position modulation, pulse-density modulation, space-time modulations (e.g., unitary, rotated constellation), multi-carrier methods such as OFDM, and any other modulation systems known in the art or yet to be developed that achieve the same or similar functionality.

An embodiment of the system increases the number of channels for data communication by utilizing vector components of an underwater acoustic field. Further, the system optimizes the use of the bandwidth available. For example, bandwidth available for use in underwater environments may be a limiting factor. In an embodiment, a volume of space required for an acoustic field communication system may be reduced by utilizing receivers using vector components of the acoustic field to determine the content of conveyed data.

Use of receivers capable of determining vector components of an acoustic field may, in some embodiments, increase a rate of data transfer and increase the reliability of the communication system.

In an embodiment, a basic set of equations for data detection utilizing vector sensors is derived. A simple set of equations is used to demonstrate the fundamental idea of how both the vector and scalar components of the acoustic field can be-utilized for data reception. In an embodiment, two pressure sources transmit the data, and a receiver, here a vector sensor, measures the pressure and one component of the particle velocity. This is basically a 2×2 multiple-input multiple-output (MIMO) system. In some embodiments, a vector sensor capable of measuring more components of the acoustic particle velocity may be used. Certain embodiments may include arrays of spatially separated vector sensors. A vector sensor embodiment may work as a receiver with only one pressure sensor. In some embodiments, there may be one or multiple pressure sources transmitting data. An embodiment using two or more pressure sources, and at least one vector sensor receiver, may realize the numerous advantages of MIMO communication systems.

As shown in FIG. 1, one embodiment includes two pressure sources $S_1$ and $S_2$ and one vector sensor $R_1$ that measures the pressure and the z-component of the acoustic particle velocity. The black dots at the transmitting device represent two pressure sources (transmitters), $S_1$ and $S_2$, whereas the single black square at the receiver $R_1$ represents a vector sensor. In an embodiment, the vector sensor may include an inertial or a gradient sensor. For example, a PMN-PT (lead magnesium niobate-lead titanate)-based accelerometer may be used. In alternate embodiments, the black square in FIG. 1 represents a device having the capability to measure the pressure and the z-component of the acoustic particle velocity at a single point in space, either by truly measuring the acoustic particle velocity or approximating it using a finite-difference operation. In other embodiments, receiver R1 may measure one or more of pressure, velocity in plurality of directions, such as orthogonal X, Y, and Z directions, and/or velocity gradients in any of three directions for any of the plurality of direction-specific velocity components (i.e. Vx, Vy, and/or Vz) of the fluid in the vicinity of receiver R1. Thus, in some cases, up to thirteen quantities may be available for measurement (one pressure quantity, three velocity quantities, and/or nine velocity gradient measurements).

Equations to define the operation of the communication system are described below. Equations derived may apply to both gradient and inertial sensors. FIG. 1 depicts two pressure sources (T1, and T2) used to transmit symbols $s_1$ and $s_2$. The pressure sources T1 and T2 are located at the depths $z_1$ and $z_2$, respectively, such that $z_2 > z_1 \geq 0$. The vector sensor receiver, R1, is located at the depth $z_1$, at a distance from the two pressure sources. In some embodiments, one or more sources and one or more receivers may be positioned at the same depth. Alternately, sources and receivers may be positioned at varying depths.

A channel between the pressure sources and the receiver includes two pressure channel coefficients $p_{11}$ and $p_{12}$, represented by straight dashed lines in FIG. 1. There are also two pressure-equivalent velocity channel coefficients $p_{11}^z$ and $p_{12}^z$ in FIG. 1, represented by curved dashed lines. To define $p_{11}^z$ and $p_{12}^z$, we define the two velocity channel coefficients $v_{11}^z$ and $v_{12}^z$. According to the linearized momentum equation or Euler's equation, the z-component of the velocity at location $z_1$ of the receive side and at the frequency $f_0$, due to the pressure sensor at $z_1$ of the transmit side is given by:

$$v_{11}^z = -\frac{1}{j\rho_0\omega_0}\frac{\partial p_{11}}{\partial z}. \tag{1}$$

In the above equation, $\rho_0$ is defined as the density of the fluid, $j^2=-1$, and the frequency having units of rad/sec is defined as $\omega_0=2\pi f_0$. Eq. (1) simply states that the velocity in a certain direction is proportional to the spatial pressure gradient in that direction. In this example, the z-component of the acoustic particle velocity is discussed, however, in a three-dimensional underwater channel, x and y components of the acoustic particle velocity can be measured, as well as nine components of the velocity gradient, etc.

To simplify the notation, multiply the velocity channel coefficient in Eq. (1) by $-\rho_0 c$, the negative of the acoustic impedance of the fluid, where c is the speed of sound. This gives the associated pressure-equivalent velocity channel coefficient as $p_{11}^z = -\rho_0 c v_{11}^z$. Defining the wavelength as $\lambda$ and the wave number as $k=2\pi/\lambda=\omega_0/c$ the following equation is obtained:

$$p_{11}^z = \frac{1}{jk}\frac{\partial p_{11}}{\partial z}. \tag{2}$$

Similarly, $v_{12}^z = -(j\rho_0\omega_0)^{-1}\partial p_{12}/\partial z$ and $p_{12}^z = -\rho_0 c v_{12}^z = (jk)^{-1}\partial p_{12}/\partial z$ are derived. In a time-invariant environment with no multipath, all the four channel coefficients $p_{11}$, $p_{12}$, $p_{11}^z$ and $p_{12}^z$ are constant complex numbers.

In FIG. 1 additive ambient noise pressure on the receiver side at $z_1$, is represented by $n_1$. At the same location, the z-component of the additive ambient noise velocity sensed by the vector sensor is given by $\eta_1^z = -(j\rho_0\omega_0)^{-1}\partial n_1/\partial z$, derived in the same manner as Eq. (1). This is the vertical spatial gradient of the noise pressure at $z_1$ on the receiver side. In FIG. 1, the associated vertical pressure-equivalent additive ambient noise velocity on the receiver side, at location $z_1$, is given by $n_1^z = -\rho_0 c\eta_1^z = (jk)^{-1}\partial n_1/\partial z$.

According to FIG. 1, the received pressure signal at $z_1$ can be written as $r_1 = p_{11}s_1 + p_{12}s_2 + n_1$. The z-component of the pressure-equivalent received velocity signal at $z_1$ is defined as $r_1^z = (jk)^{-1}\partial r_1/\partial z$. By taking the spatial gradient of $r_1$ with respect to z and according to Eq. (2), as well as $p_{12}^z = (jk)^{-1}\partial p_{12}/\partial z$ and $n_1^z = (jk)^{-1}\partial n_1/\partial z$, results in the following equation $r_1^z = p_{11}^z s_1 + p_{12}^z s_2 + n_1^z$. Therefore, the two key equations for the proposed MIMO system in FIG. 1, having two inputs and two outputs, can be summarized as:

$$r_1 = p_{11}s_1 + p_{12}s_2 + n_1,$$

$$r_1^z = p_{11}^z s_1 + p_{12}^z s_2 + n_1^z. \tag{3}$$

In this embodiment, the two output signals $r_1$ and $r_1^z$ are measured at a single point in space. This illustrates the possibility of having a two channel compact receiver, without two spatially separated receive pressure sensors.

In what follows, Eq. (3) is used to demonstrate how the two basic gains of a MIMO system (i.e., diversity and multiplexing gains) can be achieved in the proposed vector sensor system.

In an embodiment having one source, data may be transmitted sequentially, over 2T sec., where T is the symbol duration. Thus, there is no multiplexing gain. Embodiments using multiple sources as shown in FIG. 1, allow the symbols to be transmitted simultaneously, which takes only T sec. This results in a multiplexing gain on the order of two.

To recover $s_1$ and $s_2$ at the receiver, one can solve the set of linear equations in Eq. (3), using well-known standard methods such as zero forcing (herein referred to as ZF), minimum mean square error (herein referred to as MMSE), maximum likelihood (herein referred to as ML) symbol detectors, or any other method known in the art or yet to be developed that achieves the same or similar functionality. Sending training symbols prior to data transmission, allows accurate estimates of the channel components in Eq. (3), (i.e., $p_{11}$, $p_{12}$, $p_{11}^z$ and $p_{12}^z$) to be obtained at the receiver. Overall, by using two pressure sources, T1 and T2, and a small size vector sensor receiver, R1, measuring the pressure and the z-component of the acoustic velocity, the transmission rate is doubled.

In an embodiment, diversity decreases the symbol error probability. Diversity is defined as symbol reception utilizing more than one channel. Thus, if one channel is in deep fade such that the transmitted symbol is destroyed, the transmitted symbol may be recovered from other channels which are still in good condition. This feature may also be referred to as "redundancy", which may be achieved by receiving the same transmission at multiple, such as four, reception channels. If one channel fails, the other three channels may still recover the transmitted data. In general, an increase in the number of available channels, increases the likelihood of transmitted data being successfully received, even under adverse conditions in which one or more channels are inoperative.

In some embodiments, a diversity gain of second order may be obtained via the vector sensor receiver R1 in FIG. 1. Suppose $s_1$ is transmitted from the first pressure source T1 and $s_2=0$, i.e., no transmission from the second pressure source. This is basically a 1×2 single-input multiple-output (SIMO) system. According to Eq. (3), the system equations can be written as $$r_1 = p_{11}s_1 + n_1,$$

$$r_1^z = p_{11}^z s_1 + n_1^z. \quad (4)$$

Clearly, Eq. (4) shows the transmitted symbol $s_1$ is received via two different channels $p_{11}$ and $p_{11}^z$. If the two channels are uncorrelated, then this simply means a receiver diversity gain of second order, obtained by taking advantage of the z-component of the acoustic velocity, as well as pressure, with a small size vector sensor. In some embodiments, certain conditions (e.g., estimates of the channel coefficients) may influence the choice of the optimal receiver. In an embodiment, the optimal receiver may be the maximal ratio combiner (MRC) i.e., $p^*_{11}r_1 + \{p_{11}^z\}^* r_1^z$, where * is the complex conjugate. In some embodiments, the pressure/velocity receiver diversity scheme with a vector sensor differs from the pressure spatial diversity, obtained by widely-spaced pressure sensors arranged in large arrays.

For some embodiments, the correlation among the pressure and acoustic particle velocity components plays a key role in achieving multiplexing and diversity gains in the vector sensor system shown in FIG. 1. On one hand, the rank of the 2×2 channel matrix in Eq. (3), which is related to the correlation between the pressure and velocity components, directly affects the performance of the 2×2 MIMO system that offered a multiplexing gain. On the other hand, the correlation between $p_{11}$ and $p_{11}^z$ in Eq. (4) determines the performance of the 1×2 SIMO system, which had a diversity gain.

In an embodiment, $n_1$ and $n_1^z$ are uncorrelated in cases of practical interest, i.e., $E[n_1\{n_1^z\}^*]=0$. Furthermore, they have different powers in general, which means $E[|n_1|^2] \ne E[|n_1^z|^2]$. To calculate $E[n_1\{n_1^z\}^*]$, let us define $n(z)$ as the ambient noise pressure at the receiver side and a depth, z. Similarly, $n'(z)$ is the vertical spatial derivative of $n(z)$ at the same location, i.e., $n'(z)=\partial n(z)/\partial z$. Therefore the noise components in Eq. (3) can be written as $n_1=n(z_1)$ and $n_1^z=(jk)^{-1}n'(z_1)$. In some embodiments, $n(z)$ is defined as a complex zero-mean unit-power noise, i.e., $E[n(z)]=0$ and $E[|n(z)|^2]=1$, where E is the expectation operator. Further, for some embodiments the following two identities are obtained:

$$E[n(z+l)\{n'(z)\}'] = -\frac{\partial q_n(l)}{\partial l}, \quad (5)$$

$$E[n'(z+l)\{n'(z)\}^*] = -\frac{\partial^2 q_n(l)}{\partial l^2}. \quad (6)$$

For Eqs. (5) and (6), $q_n(l)$ is the vertical spatial correlation of the ambient noise pressure, defined by $q_n(l)=E[n(z+l)n^*(z)]$.

For some embodiments, the correlation of interest between the noise components in Eq. (3) is written as $E[n_1\{n_1^z\}^*]= (-jk)^{-1}E[n(z_1)\{n'(z_1)\}^*]$. When $z=z_1$ and $l=0$ in Eq. (5) the following relationship is obtained $E[n_1\{n_1^z\}^*]=(jk)^{-1}\partial q_n(l)/\partial l|_{l=0}$. If $q_n(l)$ is real, its Fourier transform has even symmetry. Then using the Fourier transform of the derivative of $q_n(l)$, it is easy to verify that $\partial q_n(l)/\partial l|_{l=0}=0$. For embodiments under rather general conditions $E[n_1\{n_1^z\}^*]=0$, i.e., the two noise components in Eq. (3) are uncorrelated.

There are several commonly-used ambient noise models for which $\partial q_n(l)/\partial l|_{l=0}=0$. Utilized noise models may include, but are not limited to, a three-dimensional (3D) isotropic noise model, a two-dimensional (2D) isotropic noise model, also known as the impulsive noise model, and the surface generated noise model. In the first model the angular noise distribution at the receiver is isotropic in the 3D volume, whereas in the second one the isotropic angular distribution of the noise at the receiver is restricted to the 2D y-z plane in FIG. 1. In an embodiment of the 3D model $q_n(l)=\sin(kl)/(kl)$. An alternate embodiment using the 2D model defines $q_n(l)= J_0(kl)$, and $J_0(.)$ as a zero-order Bessel function of the first kind. Some embodiments include a vertical spatial correlation for the surface generated noise defined as $q_n(l)=2J_1(kl)/(kl)$, where $J_1(.)$ is the first-order Bessel function of the first kind. Note that $q_n(l)$ in all these models is real. So, as explained before, $\partial q_n(l)/\partial l$ is zero at $l=0$. This makes the two noise components in the proposed vector sensor receiver in FIG. 1 uncorrelated.

In some embodiments, $E[|n_1^z|^2]$, is calculated assuming $E[|n_1|^2]=1$. Using $n_1^z=(jk)^{-1}n'(z_1)$ the following expression is obtained $E[|n_1^z|^2]=k^{-2}E[|n'(z_1)|^2]=-k^{-2}\partial^2 q_n(l)/\partial l^2|_{l=0}$, where the last identity is derived from equation (6) when $l=0$.

In some embodiments, where $q_n(l)=\sin(kl)/(kl)$, $J_0(kl)$ and $2J_1(kl)/(kl)$, respectively, it can be shown that $E[|n_1^z|^2]=\frac{1}{3}$, $\frac{1}{2}$, and $\frac{1}{4}$, respectively. Some embodiments of the noise models represent unit-power pressure noises because $E[|n_1|^2]= q_n(0)=1$. Thus, in some embodiments, noise components of the vector sensor receiver in FIG. 1 have different powers. An embodiment includes a vector sensor that measures the acoustic particle velocity has a directional pattern, compared to the omni-directional pressure meter in that vector sensor.

In some embodiments, large-size pressure-only array receivers may be replaced by compact vector sensors, while providing the same level of system performance, in terms of symbol error rate (herein referred to as SER) and channel capacity.

In an acoustic communication system embodiment, a coherent binary phase shift keying (BPSK) system may be used in an underwater flat Rayleigh fading channel. In some embodiments having one pressure sensor at the source and one pressure sensor at the receiver, the SER may have a value of about 0.02 at a signal-to-noise ratio (herein referred to as SNR) of about 10 dB. This SER value may reduce to a value of about 0.006 at the same SNR, if two vertically well-separated pressure sensors are used at the receiver. Depending on the spatial coherence of the field and the carrier frequency, the element spacing at the receiver might be large. For example, in an embodiment with carrier frequency equal to about 1.2 kHz, the vertical spatial correlation is negligible if the two pressure sensors are spaced by at least 5 m.

Some embodiments include one pressure sensor at the transmitter and one vector sensor at the receiver measuring both the pressure and the vertical component of the velocity. In a receiver embodiment, the same low SER is achievable by the vector sensor as a pressure sensor array. The size of the vector sensor receiver, which senses the pressure and particle velocity in a single point in space could be much smaller than a pressure-only array.

Embodiments utilizing higher order sensors (e.g., dyadic or tensor sensors) measure additional components of the field such as velocity gradients (e.g., second-order spatial gradients of the pressure). Using such sensors, one might be able to obtain higher order diversity gains with a small receiver. For example, acceleration (i.e., the spatial gradient of the velocity) has nine components, whereas the velocity (i.e., spatial gradient of pressure) has three components.

In some embodiments, employing multiple transmitters and receivers in multipath channels, allows for several separate spatial channels between the transmitter and receiver. This results in much higher channel capacities.

In an embodiment having one pressure sensor as the transmitter and another pressure sensor as the receiver, a channel capacity in a Rayleigh fading channel approximately equals B $\log_2(1+\text{SNR})$ bits/sec, where B is the channel bandwidth in Hz and $\log_2(.)$ is the base-2 logarithm. In some embodiments, this channel capacity may represent the maximum data rate that one can send through the channel. At data rates higher than this limit, a rate of errors in the transmission increases. For example, with a channel bandwidth of 5 kHz (i.e., B=5 kHz), the channel capacity is approximately 30 kbits/sec, when SNR=20 dB. In an alternate embodiment, a system has two pressure sensors at the source and two pressure sensors at the receiver in a multipath channel. If the element spacing in both transmit and receive arrays is large enough, then the capacity is almost two times larger, i.e., $2\times B \log_2(1+\text{SNR})$, which results in a 60 kbits/sec capacity in our numerical example.

An embodiment of an acoustic communication system including vector sensors at the receiver may have a channel capacity similar to a system having a pressure-sensor array at the receiver. Based on the system equations derived herein for a system having two pressure sensors at the source and one vector sensor at the receiver, the channel capacity is almost the same as 60 kbits/sec, but with a more compact receiver.

A simulation was used to predict the behavior of a multichannel underwater communication receiver with a vector sensor. Additional simulations utilizing alternative underwater channels are included in Appendix A. In the simulation, a shallow-water channel was simulated at $f_c$=300 Hz. The channel depth was set to 58 m and the distance between the source and the receiver was set to 10 km. Using narrowband phase-shift keying BPSK transmission from a single pressure sensor, the model simulated the bit error probability of three systems: (A) a pressure-only system with one receive sensor, (B) a pressure-only system with two widely-spaced receive sensors, vertically separated by 1.2λ=6 m to be uncorrelated, and (C) the new vector-sensor communication system with a single transmitter and a receive dipole, to measure the vertical component of the velocity (element spacing=0.2λ=1 m). From the results of the simulation, system B had a reduced bit error probability when compared to system A. This may have been due to the spatial diversity. According to the simulation, system C showed nearly the same performance as B. For example, to reduce the bit error probability to a value of about $10^{-2}$, the required signal to noise ratio value (herein referred to as SNR) for systems B and C was 8 and 9 dB, respectively. Thus, use of acoustic particle velocity can be beneficial to communication. As shown, the compact vector sensor provided a pressure/velocity diversity gain, similar to the pressure spatial diversity of a large array (1 m versus 6 m in this example). The difference between systems B and C may be due to dissimilar noise characteristics.

Channel Modeling Issues for Vector Sensors

One benefit for successful deployment a vector-sensor-based communication system is a good understanding of the propagation characteristics of the vector components of the field. When compared with modeling a channel in which scalar sensors are used, channel characterization for vector sensors confronts different problems. For example, consider a vector sensor which measures the field pressure, as well as the three components of the particle velocity, all at a single point. In this situation, we theoretically have four orthogonal channels. However, the extent of correlation between these four co-located channels, especially in the complex multi-path shallow water medium, which has extensive boundary interactions, needs to be understood. It is also important to relate these correlations to some key channel parameters such as delay and angle spreads.

The shallow water acoustic channel is basically a waveguide, bounded from bottom and the top. The sea floor is a rough surface which introduces scattering, reflection loss, and attenuation by sediments, whereas the sea surface is a rough surface that generates scattering and reflection loss, attenuation by turbidity and bubbles, and noise due to surface weather. When compared with deep water acoustic transmission, shallow water acoustic transmission is more complex, due to the many interactions of acoustic waves with boundaries, which result in a significant amount of multi-path propagation. The harsh multi-path propagation, with delay spreads up to several hundreds of symbols for high data rates make shallow waters very hard to cope with. High spatial variability and strong signal fading further complicate the communication in such channels.

In this section, first we review the existing techniques for random underwater modeling. Then we develop a ray-based statistical channel modeling approach, suitable for the analysis and design of vector sensor receivers.

Statistical Representations of Pressure and Velocity in Multipath Shallow Waters The available methodologies for studying wave propagation in random media (WPRM) generally attempt to understand the channel physics and focus on in-depth analysis of the complex phenomena involved. This approach becomes more involved when applied to shallow waters. Application of WPRM methods to the proposed vector sensor systems appear to yield more complex field representations and correlation expressions. From a communication engineering point of view, however, such a detailed analytic WPRM perspective and the resulting complex solutions exceed what is required by a system designer. For a proper communication system design, one needs relatively simple yet accurate system-level channel models, which provide those key pieces of information that directly affect the system performance.

Here we develop a new statistical approach, which concentrates on channel characterization using simple probabilistic models for the random components of the propagation environment. In this way, the statistical behavior of the channel can be accurately imitated, and compact expressions for the correlation functions of interest can be easily derived, without solving stochastic wave equations. These vector sensor parametric correlation expressions allow engineers to design, simulate, and assess a variety of communication schemes under different channel conditions.

Figure 2:
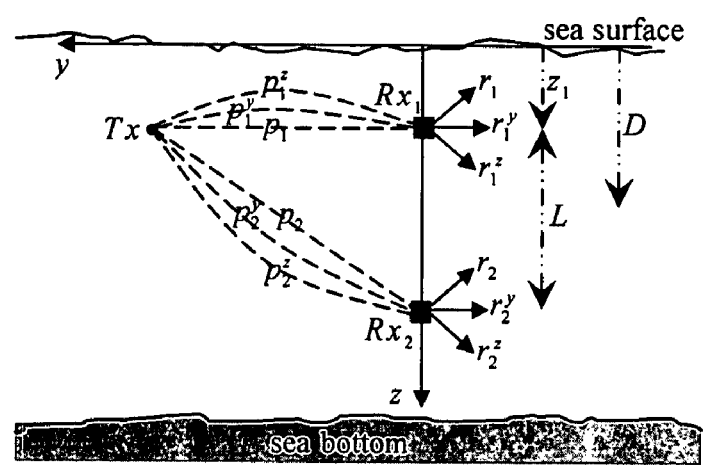
FIG. 2 shows a 1×6 SIMO (single-input multiple-output) vector sensor communication system, with one pressure transmitter and two vector sensor receivers.

Consider the Single-Input-Multiple-Output (SIMO) vector sensor system implemented in a shallow water channel, as shown in FIG. 2. In the Two-Dimensional (2D) y-z (range-depth) plane, there is one pressure transmitter at the left of the y field, labeled Tx. There are also two receive vector sensors at y=0, sensor Rx1 and sensor Rx2, at the depths z=$z_1$ and $z_1$+L, respectively, with the distance L corresponding to the spacing between the sensors in the receive vector sensor array. The center of the array of sensors, Rx1 and Rx2, is considered to be located at depth z=D.

Each vector sensor measures the pressure, as well as the y and z components of the particle velocity, all at a single point. This means that there are two pressure channel coefficients $p_1$ and $p_2$, as well as four pressure-equivalent velocity channel coefficients $p_1^y$, $p_1^z$, $p_2^y$ and $p_2^z$, as shown in FIG. 2. Each vector sensor can provide three output signals. For example, $Rx_1$ generates one pressure signal $r_1$ and two pressure-equivalent velocity signals $r_1^y$ and $r_1^z$, measured in the y and z directions, respectively. The noises at the receivers are not shown, for the sake of simplicity. As can be seen, this is a 1×6 SIMO system. The goal of this subsection is to provide proper statistical representations for all these pressure and velocity channels in shallow waters. These channel representations will be used later in other subsections, to calculate different types of channel correlations that affect the system performance. Extension of the above concept to three or more vector sensors is straightforward. Furthermore, A SIMO system is considered here to specifically focus on channel modeling issues for vector sensors at the receiver. Generalization of the results to a Multiple-Input-Multiple-Output (MIMO) setup, where there are multiple pressure transmitters, can be done in a similar way, when the SIMO configuration is well understood.

Pressure-Related Channel Functions

In this subsection we define and focus on the three pressure channel functions $\chi(\gamma,\tau)$, $p(\tau)$ and $P(f)$, over the angle-delay, delay-space and frequency-space domains, respectively.

Figure 3:
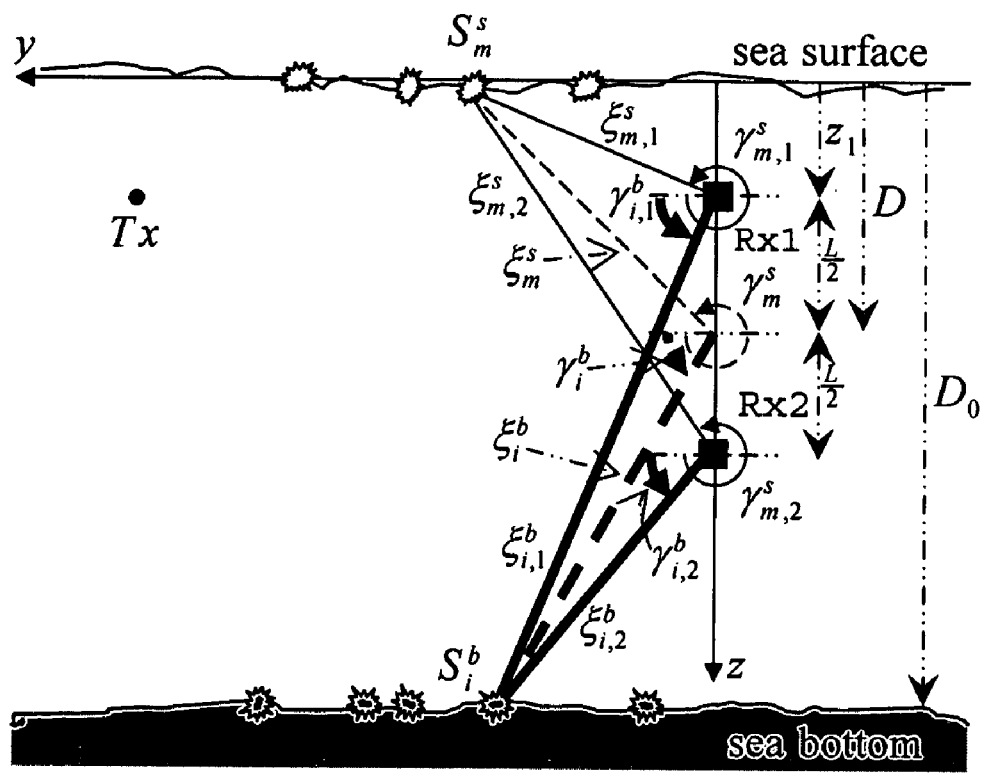
FIG. 3 is a geometric representation of the rays received at the two vector sensor receivers of FIG. 2, in a shallow water channel.

FIG. 3 shows the SIMO system of FIG. 2, as well as the geometrical details of the received rays in a shallow water channel, with two vector sensor receivers Rx1 and Rx2 (represented by solid black squares in FIG. 3). Two-dimensional propagation of plane waves in the y-z (range-depth) plane is assumed, in a time-invariant frozen ocean with $D_0$ as the water depth. All the angles are measured in the counterclockwise direction with respect to the positive direction of "y". We model the rough sea bottom and its surface as collections of $N^b$ and $N^s$ scatterers, respectively, such that $N^b \gg 1$ and $N^s \gg 1$. The i-th bottom scatterer is represented by $S_i^b$, i=1, 2, . . . , $N^b$, whereas $S_m^s$ denotes the m-th surface scatterer, m=1, 2, . . . , $N^s$. Rays scattered from the bottom and the surface are shown by solid thick and solid thin lines, respectively. The rays scattered from $S_i^b$ hit $Rx_1$ and $Rx_2$ at the angle-of-arrivals (AOAs) $\gamma_{i,1}^b$ and $\gamma_{i,2}^b$, respectively. The traveled distances are labeled by $\xi_{i,1}^b$ and $\xi_{i,2}^b$, respectively. Similarly, the scattered rays from $S_m^s$ impinge on $Rx_1$ and $Rx_2$ at the AOAs $\gamma_{m,1}^s$ and $\gamma_{m,2}^s$, respectively, with $\xi_{m,1}^s$ and $\xi_{m,2}^s$ as the traveled distances shown in FIG. 3.

Let $\tau$ and $\gamma$ represent the delay (travel time) and the AOA (measured with respect to the positive direction of y, counterclockwise). Then in the angle-delay domain, the impulse responses of the pressure subchannels $Tx-Rx_1$ and $Tx-Rx_2$, represented by $\chi_1(\gamma,\tau)$ and $\chi_2(\gamma,\tau)$, respectively, can be written as:

$$\chi_1(\gamma,\tau) = (\Lambda^b/N^b)^{1/2} \sum_{i=1}^{N^b} a_i^b \exp(j\psi_i^b) \delta(\gamma - \gamma_{i,1}^b) \delta(\tau - \tau_{i,1}^b) + \quad (7)$$
$$((1-\Lambda^b)/N^s)^{1/2} \sum_{m=1}^{N^s} a_m^s \exp(j\psi_m^s) \delta(\gamma - \gamma_{m,1}^s) \delta(\tau - \tau_{m,1}^s),$$

$$\chi_2(\gamma,\tau) = (\Lambda^b/N^b)^{1/2} \sum_{i=1}^{N^b} a_i^b \exp(j\psi_i^b) \delta(\gamma - \gamma_{i,2}^b) \delta(\tau - \tau_{i,2}^b) + \quad (8)$$
$$((1-\Lambda^b)/N^s)^{1/2} \sum_{m=1}^{N^s} a_m^s \exp(j\psi_m^s) \delta(\gamma - \gamma_{m,2}^s) \delta(\tau - \tau_{m,2}^s).$$

In eqs. (7) and (8), $\delta(.)$ is the Dirac delta, $a_i^b > 0$ and $a_m^s > 0$ represent the amplitudes of the rays scattered from $S_i^b$ and $S_m^s$, respectively, whereas $\psi_i^b \in [0, 2\pi)$ and $\psi_m^s \in [0, 2\pi)$ stand for the associated phases. The four delay symbols in (7) and (8) represent the travel times from the bottom and surface scatterers to the two receivers. For example, $\tau_{i,1}^b$ denotes the travel time from $S_i^b$ to $Rx_1$, and so on. As becomes clear in Appendix I, the factors $(N^b)^{-1/2}$ and $(N^s)^{-1/2}$ are included in (7) and (8), and the subsequent channel functions, for power normalization. Also $0 \leq \Lambda^b \leq 1$ represents the amount of the contribution of the bottom scatterers. A close-to-one value for $\Lambda^b$ indicates that most of the received rays are being received from the sea bottom. In this situation, the contribution of the surface scatterers is given by $1-\Lambda^b$.

A Dirac delta in the angle domain such as $\delta(\gamma-\bar{\gamma})$ corresponds to a plane wave with the AOA of $\bar{\gamma}$, whose equation at an arbitrary point $(y,z)=(\tilde{y},\tilde{z})$ is $\exp(jk[\tilde{y} \cos(\bar{\gamma})+\tilde{z} \sin(\bar{\gamma})])$. For example, $\delta(\gamma-\gamma_{i,1}^b)$ in Eq. (7) represents $\exp(jk[y \cos(\gamma_{i,1}^b)+z \sin(\gamma_{i,1}^b)])|_{y=0,z=z_1} = \exp(jk z_1 \sin(\gamma_{i,1}^b))$. This is a plane wave emitted from the scatter $S_i^b$ that impinges $Rx_1$, located at y=0 and z=$z_1$, through the AOA of $\gamma_{i,1}^b$. Using similar plane wave equations for the other angular delta functions in Equations (7) and (8), the impulse responses of the pressure sub-channels $Tx-Rx_1$ and $Tx-Rx_2$ in the delay-space domain can be respectively written as:

$$p_1(\tau) = (\Lambda^b/N^b)^{\frac{1}{2}} \sum_{i=1}^{N^b} a_i^b \exp(j\psi_i^b) \quad (9)$$
$$\exp(jk[y\cos(\gamma_{i,1}^b) + z\sin(\gamma_{i,1}^b)])\delta(\tau - \tau_{i,1}^b)|_{y=0,z=z_1} +$$
$$((1-\Lambda^b)/N^s)^{\frac{1}{2}} \sum_{m=1}^{N^s} a_m^s \exp(j\psi_m^s) \exp(jk[y\cos(\gamma_{m,1}^s) + z\sin(\gamma_{m,1}^s)])$$
$$\delta(\tau - \tau_{m,1}^s)|_{y=0,z=z_1},$$

$$p_2(\tau) = (\Lambda^b/N^b)^{\frac{1}{2}} \sum_{i=1}^{N^b} a_i^b \exp(j\psi_i^b) \quad (10)$$
$$\exp(jk[y\cos(\gamma_{i,2}^b) + z\sin(\gamma_{i,2}^b)])\delta(\tau - \tau_{i,2}^b)|_{y=0,z=z_1+L} +$$
$$((1-\Lambda^b)/N^s)^{\frac{1}{2}} \sum_{m=1}^{N^s} a_m^s \exp(j\psi_m^s) \exp(jk[y\cos(\gamma_{m,2}^s) + z\sin(\gamma_{m,2}^s)])$$
$$\delta(\tau - \tau_{m,2}^s)|_{y=0,z=z_1 L}.$$

The terms y and z in equations (9) and (10) are intentionally preserved, as in the sequel we need to calculate the spatial gradients of the pressure, to obtain the velocities. Note that based on the definition of the spatial Fourier transform, $p_1(\tau)$ and $p_2(\tau)$ can be considered as the spatial Fourier transforms of $\chi_1(\gamma,\tau)$ and $\chi_2(\gamma,\tau)$, respectively, with respect to $\gamma$. Here we have assumed a constant sound speed throughout the channel, which in turns make k fixed as well.

By taking the Fourier transform of equations (9) and (10) with respect to $\tau$, we respectively obtain the transfer functions of the pressure subchannels Tx-Rx$_1$ and Tx-Rx$_2$ in the frequency-space domain $$P_1(f) = (\Lambda^b/N^b)^{\frac{1}{2}} \sum_{i=1}^{N^b} a_i^b \exp(j\psi_i^b) \quad (11)$$

$$\exp(jk[y\cos(\gamma_{i,1}^b) + z\sin(\gamma_{i,1}^b)])\exp(-j\omega\tau_{i,1}^b)|_{y=0,z=z_1} +$$

$$((1-\Lambda^b)/N^s)^{\frac{1}{2}} \sum_{m=1}^{N^s} a_m^s \exp(j\psi_m^s)\exp(jk[y\cos(\gamma_{m,1}^s) + z\sin(\gamma_{m,1}^s)])$$

$$\exp(-j\omega\tau_{m,1}^s)|_{y=0,z=z_1},$$

$$P_2(f) = (\Lambda^b/N^b)^{\frac{1}{2}} \sum_{i=1}^{N^b} a_i^b \exp(j\psi_i^b) \quad (12)$$

$$\exp(jk[y\cos(\gamma_{i,2}^b) + z\sin(\gamma_{i,2}^b)])\exp(-j\omega\tau_{i,2}^b)|_{y=0,z_1+L} +$$

$$((1-\Lambda^b)/N^s)^{\frac{1}{2}} \sum_{m=1}^{N^s} a_m^s \exp(j\psi_m^s)\exp(jk[y\cos(\gamma_{m,2}^s) + z\sin(\gamma_{m,2}^s)])$$

$$\exp(-j\omega\tau_{m,2}^s)|_{y=0,z_1=L},$$

where $\omega=2\pi f$ is used to simplify the notation.

Velocity-Related Channel Functions

Following the definition of the pressure-equivalent velocity in (2), the velocity channels of interest in the delay-space and frequency-space domains can be written as $$p_l^y(\tau)=(jk)^{-1}\dot{p}_l(\tau), p_l^z(\tau)=(jk)^{-1}p'_l(\tau), l=1,2, \quad (13)$$

$$P_l^y(f)=(jk)^{-1}\dot{P}_l(f), P_l^z(f)=(jk)^{-1}P'_l(f), l=1,2, \quad (14)$$

where $p_l(\tau)$ and $P_l(f)$, $l=1,2$, are given in Equations (9)-(12). Furthermore, dot and prime denote the partial spatial derivatives $\partial/\partial y$ and $\partial/\partial z$, respectively. Clearly for $l=1,2$, $p_l^y(\tau)$ and $p_l^z(\tau)$ are the pressure-equivalent impulse responses of the velocity subchannels in the y and z directions, respectively. Furthermore, $P_l^y(f)$ and $P_l^z(f)$ represent the pressure-equivalent transfer functions of the velocity subchannels in the y and z directions, respectively, with $l=1,2$.

A General Framework for Calculating the Correlations in Multipath Shallow Waters In a given shallow water channel, the numerical values of all the amplitudes, phases, AOAs and delays in equations (9)-(12) are complicated functions of many environmental characteristics such as the irregular shape of the sea bottom and its layers/losses, volume microstructures, etc. Due to the uncertainty/complexity in exact determination of all these variables, we model them herein as random variables. More specifically, we assume all the amplitudes $\{a_i^b\}_i$ and $\{a_m^s\}_m$ are positive uncorrelated random variables, uncorrelated with the phases $\{\psi_i^b\}_i$ and $\{\psi_m^s\}_m$. In addition, all the phases $\{\psi_i^b\}_i$ and $\{\psi_m^s\}_m$ are uncorrelated, and uniformly distributed over $(0, 2\pi)$. The statistical properties of the AOAs and delays will be discussed later. Overall, all the pressure and velocity channel functions in equations (9)-(14) are random processes in space, frequency and delay domains. In the following, we first derive a closed-form expression for the pressure frequency-space correlation. Then we show how other correlations of interest, which determine the performance of a vector sensor receive array, can be calculated from the pressure frequency-space correlation.

The Pressure Frequency-Space Correlation: We define this correlation as $C_P(\Delta f, L)=E[P_2(f+\Delta f)P_1^*(f)]$. The correlation is expressed as follows:

$$C_P(\Delta f, L) = \Lambda^b \int_{\gamma^b=0}^{\pi} w_{bottom}(\gamma^b) \quad (15)$$

$$\exp(jk[\varepsilon_y\cos(\gamma^b) + L\sin(\gamma^b)])\exp(-jT^b\Delta\omega\sin^{-1}(\gamma^b))d\gamma^b +$$

$$(1-\Lambda^b)\int_{\gamma^s=-\pi}^{2\pi} w_{surface}(\gamma^s)\exp(jk[\varepsilon_y\cos(\gamma^s) + L\sin(\gamma^s)])$$

$$\exp(jT^s\Delta\omega\sin^{-1}(\gamma^s))d\gamma^s, \text{ as } \varepsilon_y \to 0.$$

This is a general pressure frequency-space correlation model that holds for any AOA PDFs (Probability Density Functions) that may be chosen for $w_{bottom}(\gamma^b)$ and $w_{surface}(\gamma^s)$. In what follows, first we use equation (15) to derive expressions for some important spatial and frequency correlations, which hold for any AOA PDF. These formulas provide useful intuition under rather general conditions. Thereafter, we use a flexible parametric angular PDF for the AOA, to obtain easy-to-use and closed-form expressions for correlations of practical interest.

Spatial Correlations

The Pressure Correlation: At a fixed frequency with $\Delta f=0$, the spatial pressure correlation can be obtained from equation (15) as:

$$C_P(0, L) = \int_{\gamma=0}^{2\pi} w(\gamma)\exp(jk[\varepsilon_y\cos(\gamma) + L\sin(\gamma)])d\gamma, \text{ as } \varepsilon_y \to 0, \quad (16)$$

where the overall AOA PDF $w(\gamma)$ is defined as follows, to include both the bottom and surface AOAs $$w(\gamma)=\Lambda^b w_{bottom}(\gamma)+(1-\Lambda^b)w_{surface}(\gamma). \quad (17)$$

Of course, $w_{bottom}(\gamma)=0$ for $\pi<\gamma<2\pi$, whereas $w_{surface}(\gamma)=0$ for $0<\gamma<\pi$. We keep equation (16) as it is, without replacing $\varepsilon_y$ by zero, since, later on, we will take the derivative of $C_P(0,L)$ with respect to $\varepsilon_y$ first.

The Pressure-Velocity Correlations: First we look at the z-component of the velocity. Here we are interested in $E[P_2(f)\{P_1^z(f)\}^*]=(-jk)^{-1} E[P_2(f)\{P'_1(f)\}^*]$, where $P_1^z(f)$ is replaced according to equation (14). On the other hand, similar to equation (5) one has $E[P_2(f)\{P'_1(f)\}^*]=-\partial E[P_2(f)P_1^*(f)]/\partial L=-\partial C_P(0,L)/\partial L$. Therefore:

$$E[P_2(f)\{P_1^z(f)\}^*] = (jk)^{-1}\partial C_P(0, L)/\partial L \quad (18)$$

$$= \int_{\gamma=0}^{2\pi} w(\gamma)\sin(\gamma)\exp(jk[\varepsilon_y\cos(\gamma) + L\sin(\gamma)])d\gamma, \text{ as } \varepsilon_y \to 0,$$

where the integral in equation (18) comes from equation (16). An interesting observation can be made when $w(\gamma)$ is even-symmetric with respect to $\gamma=\pi$ or (symmetry of the AOAs from the bottom and the surface with respect to the horizontal axis y). Then with L=0 in equation (18) we obtain $E[P_1(f)\{P_1^z(f)\}^*]=0$, i.e., the co-located pressure and the z-component of the velocity are uncorrelated.

Now we focus on the y-component of the velocity. The correlation of interest is $E[P_2(f)\{P_1^y(f)\}^*]=(-jk)^{-1}E[P_2(f)\{\dot{P}_1(f)\}^*]$, where $P_1^y(f)$ is replaced according to equation (14). Note that according to the representations for $P_2(f)$ and $P_1(f)$ in equations (27) and (28), respectively, the location of the second sensor can be thought of as $(y,z)=(\epsilon_y,z_1+L)$, as $\epsilon_y \to 0$, whereas the first sensor is located at $(y,z)=(0,z_1)$. So, by considering the analogy of equation (5) in the y direction we obtain $E[P_2(f)\{\dot{P}_1(f)\}^*]=-\partial E[P_2(f)P_1^*(f)]/\partial \epsilon_y$ as $\epsilon_y \to 0=-\partial C_P(0,L)/\partial \epsilon_y$ as $\epsilon_y \to 0$. Differentiation of equation (16) with respect to $\epsilon_y$ results in $$E[P_2(f)\{P_1^y(f)\}^*] = (jk)^{-1}\partial C_P(0,L)/\partial \varepsilon_y \text{ as } \varepsilon_y \to 0 \quad (19)$$

$$= \int_{\gamma=0}^{2\pi} w(\gamma)\cos(\gamma)\exp(jk[\varepsilon_y\cos(\gamma)+L\sin(\gamma)])d\gamma, \text{ as } \varepsilon_y \to 0.$$

If $w(\gamma)$ is even-symmetric around $\gamma=\pi/2$ and also $\gamma=3\pi/2$, then with L=0 in equation (19) we obtain $E[P_1(f)\{P_1^y(f)\}^*]=0$, i.e., the co-located pressure and the y-component of the velocity become uncorrelated.

The Velocity Correlations: Here we start with the z-component of the velocity. We are going to calculate $E[P_2^z(f)\{P_1^z(f)\}^*]=k^{-2}E[P'_2(f)\{P'_1(f)\}^*]$, where $P_2^z(f)$ and $P_1^z(f)$ are replaced according to equation (14). On the other hand, similar to (6) one can write $E[P'_2(f)\{P'_1(f)\}^*]=-\partial^2 E[P_2(f)P_1^*(f)]/\partial L^2=-\partial^2 C_P(0,L)/\partial L^2$. Hence $$E[P_2^z(f)\{P_1^z(f)\}^*] = -k^{-2}\partial^2 C_P(0,L)/\partial L^2 \quad (20)$$

$$= \int_{\gamma=0}^{2\pi} w(\gamma)\sin^2(\gamma)\exp(jk[\varepsilon_y\cos(\gamma)+L\sin(\gamma)])d\gamma, \text{ as } \varepsilon_y \to 0,$$

where equation (16) is used to write the integral in equation (20).

Attention is now directed to the y-component of the velocity. In this case, the correlation is $E[P_2^y(f)\{P_1^y(f)\}^*]=k^{-2}E[\dot{P}_2(f)\{\dot{P}_1(f)\}^*]$, in which $P_2^y(f)$ and $P_1^y(f)$ are replaced using equation (14). As discussed above, the second and the first sensors are located at $(y,z)=(\epsilon_y,z_1+L)$, as $\epsilon_y \to 0$, and $(y,z)=(0,z_1)$, respectively. Thus, by using the equivalent of equation (6) in the y direction, we get $E[\dot{P}_2(f)\{\dot{P}_1(f)\}^*]=-\partial^2 E[P_2(f)P_1^*(f)]/\partial \epsilon_y^2$ as $\epsilon_y \to 0=-\partial^2 C_P(0,L)/\partial \epsilon_y^2$ as $\epsilon_y \to 0$. By taking the second derivative of equation (16), with respect to $\epsilon_y$ we obtain $$E[P_2^y(f)\{P_1^y(f)\}^*] = -k^{-2}\partial^2 C_P(0,L)/\partial \varepsilon_y^2 \text{ as } \varepsilon_y \to 0 \quad (21)$$

$$= \int_{\gamma=0}^{2\pi} w(\gamma)\cos^2(\gamma)\exp(jk[\varepsilon_y\cos(\gamma)+L\sin(\gamma)])d\gamma, \text{ as } \varepsilon_y \to 0.$$

The (average) received powers via the pressure-equivalent velocity signals in the z and y directions are $E[|P_1^z(f)|^2]$ and $E[|P_1^y(f)|^2]$, respectively. Using equations (20) and (21) with L=0, and since $\sin^2(\gamma)<1$ and $\cos^2(\gamma)<1$, one can easily show $$E[|P_1^z(f)|^2]<1, E[|P_1^y(f)|^2]<1, E[|P_1^z(f)|^2]+E[|P_1^y(f)|^2]=1. \quad (22)$$

Therefore, the received powers via the two velocity channels are not equal. However, via both of them together we receive the same total power that a pressure sensor collects, as shown in equation (22). Note that in this paper, the power received by a pressure sensor is $E[|P_1(f)|^2]=C_P(0,0)=1$, obtained from equation (16).

Closed-Form Correlations Using the Von Mises PDF

Here we propose to use two Von Mises PDFs for the bottom and surface AOAs, as shown below $$w(\lambda) = \Lambda^b \frac{\exp[\kappa^b\cos(\lambda-\mu^b)]}{2\pi I_0(\kappa^b)} + (1-\Lambda^b)\frac{\exp[\kappa^s\cos(\lambda-\mu^s)]}{2\pi I_0(\kappa^s)}. \quad (23)$$

Each Von Mises PDF has two parameters: $\kappa^b$ and $\mu^b$ that control the angle spread and the mean AOA from the bottom, respectively, whereas $\kappa^s$ and $\mu^s$ represent the angle spread and the mean AOA from the surface, respectively. In eq. (23), $I_0$ stands for the zero-order modified Bessel function of the first kind. The von Mises PDF has proven to be useful in modeling the AOA and calculating a variety of correlation functions in wireless multipath channels. By substituting equation (23) into equation (16), and using the following integral, $$\int_{\pi}^{\pi} \exp(\alpha\sin\phi+\beta\cos\phi)d\phi = 2\pi I_0(\sqrt{\alpha^2+\beta^2}), \quad (24)$$

the integral in equation (16) can be easily solved, which results in $$C_P(0,L)=[\Lambda^b/I_0(\kappa^b)]I_0(\{(\kappa^b)^2-k^2(\epsilon_y^2+L^2)+j2\kappa^b k[\epsilon_y\cos(\mu^b)+L\sin(\mu^b)]\}^{1/2})+[(1-\Lambda^b)/I_0(\kappa^s)]I_0(\{(\kappa^s)^2-k^2(\epsilon_y^2+L^2)+j2\kappa^s k[\epsilon_y\cos(\mu^s)+L\sin(\mu^s)]\}^{1/2}), \text{ as } \epsilon_y \to 0. \quad (25)$$

According to equation (25), it is easy to verify that $C_P(0,0)=1$, consistent with the simplifying convention of unit (total average) received pressure power. By taking the derivatives of equation (25) with respect to L and $\epsilon_y$, the closed-form expression for a variety of correlations in vector sensor receivers can be obtained.

Below, equations (26) and (27), referred to above, are provided:

$$\tau_i^b = T^b\sin^{-1}(\gamma_i^b), 0 < \gamma_i^b < \pi, \quad (26)$$

$$\tau_m^s = -T^s\sin^{-1}(\gamma_m^s), \pi < \gamma_m^s < 2\pi,$$

$$P_1(f) = \quad (27)$$

$$(\Lambda^b/N^b)^{1/2}\sum_{i=1}^{N^b} a_i^b\exp(j\psi_i^b)\exp(jkz_1\sin(\gamma_i^b))\exp(-jT^b\omega\sin^{-1}(\gamma_i^b)) +$$

$$((1-\Lambda^b)/N^s)^{1/2}$$

$$\sum_{m=1}^{N^s} a_m^s\exp(j\psi_m^s)\exp(jkz_1\sin(\gamma_m^s))\exp(jT^s\omega\sin^{-1}(\gamma_m^s)),$$

System Equations in a Vector Sensor Receiver

In general, there are two types of vector sensors: inertial and gradient. Inertial sensors truly measure the velocity by responding to the acoustic particle motion, whereas gradient sensors employ a finite-difference approximation to estimate the gradients of the acoustic field such as the velocity. Each sensor type has its own advantages and disadvantages. Depending on the application, system cost, and required precision, one can choose the proper sensor type.

Figure 4:
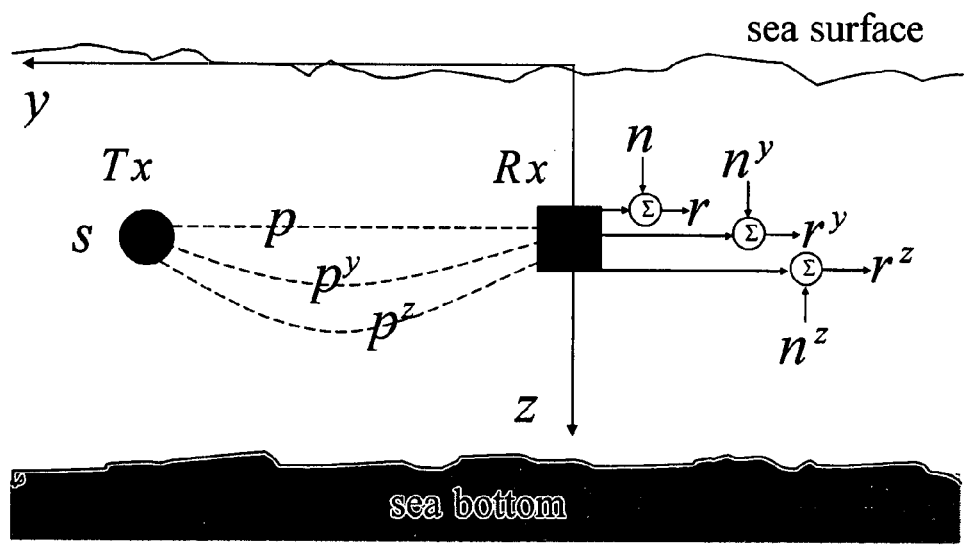
FIG. 4 is a 1×3 vector sensor communication system, with one pressure transmitter and one vector sensor receiver.

In this section we derive basic system equations for data detection via a vector sensor. To demonstrate the basic concepts of how both the vector and scalar components of the acoustic field can be utilized for data reception, we consider a simple system in a two-dimensional (2D) depth-range underwater channel. As shown in FIG. 4, there is one transmit pressure sensor, Tx, shown by a black dot, whereas for reception we use a vector sensor, Rx, shown by a black square, which measures the pressure and the y and z components of the particle velocity. This is basically a 1×3 SIMO system. With more pressure transmitters, one can have a multiple-input multiple-output (MIMO) system, the discussion of which is not provided in this section.

Pressure and Velocity Channels and Noises

Three channels are used in FIG. 4: the pressure channel p, represented by a straight dashed line, and two pressure-equivalent velocity channels $p^z$ and $p^y$, shown by curved dashed lines. To define $p^z$ and $p^y$, we need to define the two velocity channels $v^z$ and $v^y$, the vertical and horizontal components of the particle velocity, respectively. According to the linearized momentum equation, the z and y component of the velocity at the frequency $f_0$ are given by $$v^z = -(j\rho_0\omega_0)^{-1}\partial p/\partial z,\ v^y = -(j\rho_0\omega_0)^{-1}\partial p/\partial y. \quad (28)$$

In the above equations, $\rho_0$ is the density of the fluid, $j^2=-1$ and $\omega_0=2\pi f_0$. Eq. (28) simply states that the velocity in a certain direction is proportional to the spatial pressure gradient in that direction. To simplify the notation, the velocity channels in equation (28) are multiplied by $-\rho_0 c$, the negative of the acoustic impedance of the fluid, where c is the speed of sound. This gives the associated pressure-equivalent velocity channels as $p^z = -\rho_0 c v^z$ and $p_y = -\rho_0 c v^y$. With $\lambda$ as the wavelength, and $k=2\pi/\lambda=\omega_0/c$ as the wave number we finally obtain $$p^z = (jk)^{-1}\partial p/\partial z,\ p^y = (jk)^{-1}\partial p/\partial p. \quad (29)$$

The additive ambient noise pressure at the receiver is shown by n in FIG. 4. At the same location, the z and y components of the ambient noise velocity, sensed by the vector sensor are $\eta^z = -(j\rho_0\omega_0)^{-1}\partial n/\partial z$ and $\eta^y = -(j\rho_0\omega_0)^{-1}\partial n/\partial y$, respectively, derived as shown in equation (28). So, the vertical and horizontal pressure-equivalent ambient noise velocities are $n^z = -\rho_0 c \eta^z = (jk)^{-1}\partial n/\partial z$ and $n^y = -\rho_0 c \eta^y = (jk)^{-1}\partial n/\partial y$, respectively, which resemble equation (29).

Input-Output System Equations

According to FIG. 4, the received pressure signal at Rx in response to the signal s transmitted from Tx can be written as $r = p \oplus s + n$, where $\oplus$ stands for convolution in time. We also define the z and y components of the pressure-equivalent received velocity signals as $r^z = (jk)^{-1}\partial r/\partial z$ and $r^y = (jk)^{-1}\partial r/\partial y$, respectively. Based on equation (29), and by taking the spatial gradient of r with respect to z and y, we easily obtain the key system equations:

$$r = p \oplus s + n,\ r^y = p^y \oplus s + n^y,\ r^z = p^z \oplus s + n^z. \quad (30)$$

It is noteworthy that the three output signals r, $r^y$ and $r^z$ are measured at a single point in space.

Pressure and Velocity Noise Correlations

We define the spatial pressure noise correlation between the two locations $(y+l_y, z+l_z)$ and $(y,z)$ as $q_n(l_y,l_z)=E[n(y+l_y,z+l_z)n^*(y,z)]$, where the "*" operator corresponds to a complex conjugate operation, and where $l_y$ and $l_z$ are real numbers. Using the correlation properties of a differentiator at the location (y,z) one can show $E[n\{n^y\}^*]=(jk)^{-1}\partial q_n/\partial l_y$, $E[n\{n^z\}^*]=(jk)^{-1}\partial q_n/\partial l_z$ and $E[n^z\{n^y\}^*]=-k^{-2}\partial^2 q_n/\partial l_z \partial l_y$, all calculated for $(l_y,l_z)=(0,0)$. For an isotropic noise field in the y-z plane, we have $q_n(l_y,l_z)=J_0(k(l_y^2+l_z^2)^{1/2})$, with $J_m(.)$ as the m-order Bessel function of the first kind. Using the properties of the Bessel functions and their derivatives, it is easy to verify that $E[n\{n^y\}^*]=E[n\{n^z\}^*]=E[n^z\{n^y\}^*]=0$; i.e., all the noise terms in equation (30) are uncorrelated.

Below, the above noise correlations are derived, to demonstrate under what conditions the noise terms in equation (30) are uncorrelated.

Pressure and Velocity Average Powers

Noise Powers: Using the statistical properties of a differentiator, the powers of the y and z components of the pressure-equivalent noise velocity at (y,z) can be obtained as $\Omega_n^y = E[|n^y|^2]=-k^{-2}\partial^2 q_n/\partial l_y^2$ and $\Omega_n^z = E[|n^z|^2]=-k^{-2}\partial^2 q_n/\partial l_z^2$, respectively, both calculated at $(l_y,l_z)=(0,0)$. Based on the $q_n$ of the 2D isotropic noise model described previously, one can show that $\Omega_n^y = \Omega_n^z = \frac{1}{2}$. Note that the noise pressure power in this model is $\Omega_n = E[|n|^2]=q_n(0,0)=1$. This means that $\Omega_n = \Omega_n^y + \Omega_n^z$.

Channel Powers: The ambient noise is a superposition of several components coming from different angle of arrivals (AOAs). In multipath environments such as shallow water, the channel is also a superposition of multiple subchannels. Based on this analogy between n and p, as well as their spatial gradients, one can obtain $\Omega_p = \Omega_p^y + \Omega_p^z$, where $\Omega_p = E[|p|^2]$, $\Omega_p^y = E[|p^y|^2]$ and $\Omega p^z = E[|p^z|^2]$. Note that in the 2D isotropic noise model the distribution of AOA is uniform over the range $(0, 2\pi)$, which results in $\Omega_n^y = \Omega_n^z = \Omega_n/2$. However, this is not necessarily the case in multipath channels such shallow waters, which means $\Omega_p^y$ and $\Omega_p^z$ are not equal in general.

Multichannel Equalization with a Vector Sensor

In this section we use the basic zero forcing equalizer, to demonstrate the feasibility of multichannel equalization with a compact vector sensor receiver. Of course there are different types of equalizers and we are not suggesting the zero forcing algorithm is the only possible equalization method. However, since here the emphasis is not on equalizer design, we have just used a simple equalizer to verify the concept. Thus, this approach demonstrates the feasibility of multichannel inter-symbol-interference (ISI) removal with a compact vector sensor receiver. The system equation is $$R = HS + N,\ \text{such that}\ R = \begin{bmatrix} R_1 \\ R_2 \\ R_3 \end{bmatrix},\ H = \begin{bmatrix} H_1 \\ H_2 \\ H_3 \end{bmatrix},\ \text{and}\ N = \begin{bmatrix} N_1 \\ N_2 \\ N_3 \end{bmatrix}. \quad (31)$$

In equation (31), $S=[s_0 \ldots s_{k-1}]^T$ includes K transmitted symbols, and the symbol $^T$ refers to the transpose operation. With M as the number of channel taps, the same for all l, l=1,2,3, $R_1=[r_1(0) \ldots r_1(K+M-2)]^T$ and $N_1=[n_1(0) \ldots n_1(K+M-2)]^T$ are the 1-th $(K+M-1)\times 1$ received signal and noise vectors, respectively. Also the 1-th $(K+M-1)\times K$ banded channel matrix is:

$$H_l = \begin{bmatrix} h_l(0) & & \\ \vdots & \ddots & h_l(0) \\ h_l(M-1) & \ddots & \vdots \\ & & h_l(M-1) \end{bmatrix} \quad (32)$$

Note that for a vector sensor receiver, the channel indices 1, 2 and 3 in equation (31) represent the pressure, pressure-equivalent horizontal velocity and pressure-equivalent vertical velocity, respectively. So, based on equation (30), for an arbitrary discrete time index t, we have $r_1(t)=r(t)$, $r_2(t)=r^y(t)$, $r_3(t)=r^z(t)$, $h_1(t)=p(t)$, $h_2(t)=p^y(t)$, $h_3(t)=p^z(t)$, $n_1(t)=n(t)$, $n_2(t)=n^y(t)$ and $n_3(t)=n^z(t)$. Assuming perfect channel knowledge at the receiver, the zero forcing equalizer is $$\hat{S}=(H^\dagger H)^{-1}H^\dagger R, \quad (33)$$

with $\hat{S}$ as the estimate of S and $\dagger$ as the transpose conjugate (when H is not known at the receiver, one can use many different methods to estimate H). The simulations of the following section show the performance of equation (33).

Simulation Set up and Performance Comparison

Here we compare the performance of the vector sensor equalizer in equation (33) with a vertical three-element pressure-only uniform linear array (ULA) that performs the zero forcing equalization. The ULA equations and equalizer are the same as in equations (31) and (33), respectively, where the three channels represent three vertically separated pressure channels. The noise vectors $N_1$, $N_2$ and $N_3$ in both receivers are considered to be complex Gaussians with white temporal auto- and cross-correlations. For the isotropic noise model discussed in subsection II-C, the noise vectors $N_1$, $N_2$ and $N_3$ are uncorrelated in the vector sensor receiver. For the pressure-only ULA with the element spacing of $\lambda$, there are some small pressure correlations of $J_0(k\lambda)=0.22$ and $J_0(2k\lambda)=0.15$ for the separations of $\lambda$ and $2\lambda$, respectively, that are not included in the simulations. To calculate the velocity channel impulse responses (IRs) $p^y$ and $p^z$ in simulations using the p channel IR generated by Bellhop, each spatial gradient in equation (29) is approximated by a finite difference. Therefore at location (y,z) we have $\partial p(y,z)/\partial z \approx [p(y,z+0.2\lambda)-p(y,z)]/(0.2\lambda)$ and $\partial p(y,z)/\partial y \approx [p(y+0.2\lambda,z)-p(y,z)]/(0.2\lambda)$. Certainly one may devise other methods, to estimate the velocity channel impulse responses. Here a simple technique was employed to demonstrate the concept.

Figure 5:
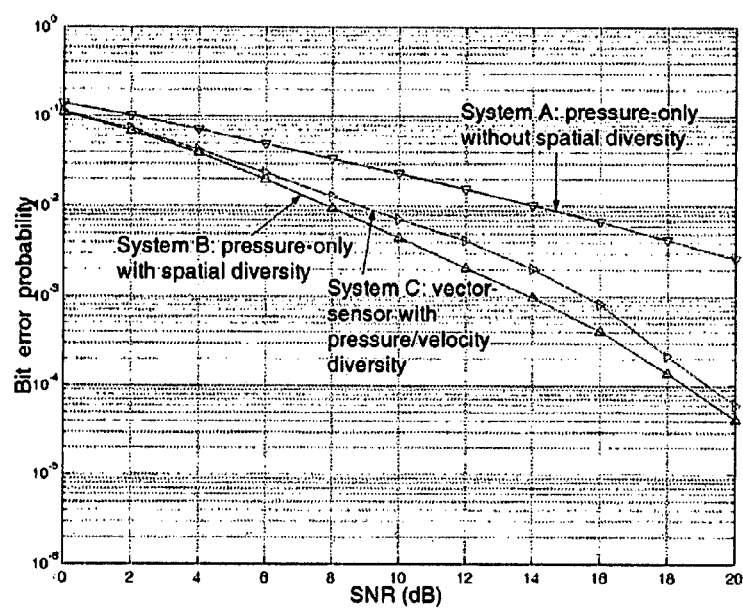
FIG. 5 is graphical depiction of a performance comparison between a single vector sensor receiver, a single pressure sensor receiver, and a receive array with two pressure sensors, all in a frequency-flat channel.
Figure 6:
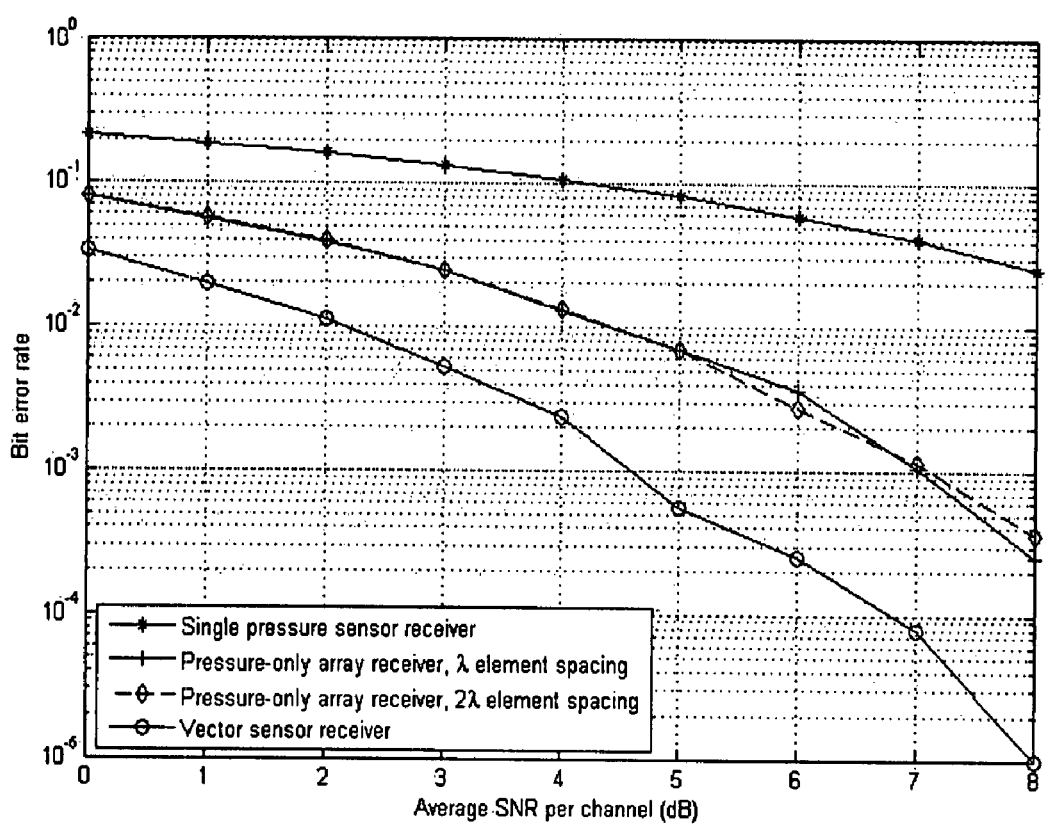
FIG. 6 is graphical depiction of a performance comparison between a vector sensor receiver, a single pressure sensor receiver, and a linear receiver array with three pressure sensors, all in a frequency-selective channel.

With an S vector that includes K=200 equi-probable ±1 symbols, and the noise vector and channel matrix N and H generated as described above, the received vector R is calculated using equation (31). Then S is estimated using equation (33), and the bit error rate is shown in FIG. 6. (FIG. 5 shows the bit error rate for various sensor types in a different embodiment, in a frequency-flat channel). The water depth for the shallow channel of FIG. 6 is 81.1 meters (m), where the Tx and Rx are 5 kilometers (km) apart. For this simulation, The Tx and Rx are 25 m and 63 m below the water surface, respectively. A coarse silt bottom is considered, with $f_0=12$ kHz and a bit rate of 2400 bits/sec. More detailed information about the channel, the measured sound speed profile and the results of other channels are presented later in this document.

To define the average signal-to-noise ratio (SNR) per channel in FIG. 6, let $p=[p(0) \ldots p(M-1)]^T$, $p^y=[p^y(0) \ldots p^y(M-1)]^T$ and $p^z=[p^z(0) \ldots p^z(M-1)]^T$ be the taps of the pressure, y- and z-velocity IRs, respectively. Then the pressure, y- and z-velocity SNRs are $\zeta_p=\Omega_p/\Omega_n$, $\zeta_p^y=\Omega_p^y/\Omega_n^y$ and $\zeta_p^z=\Omega_p^z/\Omega_n^z$, respectively, such that $\Omega_p=p^\dagger p$, $\Omega_p^y=(p^y)^\dagger p^y$ and $\Omega_p^z=(p^z)^\dagger p^z$. The average SNR per channel for the vector sensor receiver is $\bar{\zeta}=(\zeta_p+\zeta_p^y+\zeta_p^z)/3$ by definition. Also p is normalized such that $\Omega_p=1$. This implies that $\Omega_p^y+\Omega_p^z=1$ in our simulations. Since $\Omega_n^y=\Omega_n^z=\Omega_n/2$ in a 2D isotropic noise model, we finally obtain $\bar{\zeta}=1/\Omega_n$, which is the same as the SNR of a unit-power pressure channel $\zeta_p$.

Discussion of Results

The performance of an embodiment of the compact vector sensor receiver in comparison with prior art sensors is shown in FIG. 6. It may be readily observed that the bit error rate (shown using a logarithmic scale on the vertical axis) of the vector sensor is significantly lower than the bit error rates of the single pressure sensor and of the pressure sensor arrays over the entire range of signal to noise ratio (SNR) per channel (as shown along the horizontal axis). Moreover, at higher SNR levels, such as at 6-7 dB, the vector sensor bit-error rate is about an order of magnitude lower than those of the various pressure sensor approaches. Therefore, a considerable performance improvement is obtained employing the vector sensor system and method disclosed herein.

Performance of two three-element pressure-only arrays with element spacings of $\lambda$ and $2\lambda$ are also shown, which in this simulation, are slightly worse than a vector sensor receiver. By changing the simulation scenario, for example the sea-bottom type, one may observe a better performance for the pressure-only array. However, even in such cases, both the vector sensor and pressure-only array receivers exhibit better performance than a single pressure sensor receiver. Moreover, the vector sensor exhibits better performance than the pressure-only array receiver embodiments (whether using $\lambda$ or $2\lambda$ spacing) and offers the further benefit of providing this superior bit error rate performance within a smaller physical package.

Detailed Simulation Study

Introduction to Simulation Discussion

The underwater communications channel is characterized as a multipath channel. The ensemble average channel impulse responses of the underwater communications channels were determined using Acoustic Toolbox.

The first part of the project modified the acoustic toolbox to be able to plot an impulse response of an underwater channel at a given location and to save the numerical details of the impulse responses from the resulting arrival file. Next, using the information of the channel impulse responses from the first part, Monte Carlo Simulations were performed which transmitted Binary Phase Shift Keying (herein referred to as BPSK) signals through underwater communication channels. The signals were the received using an SISO ZF (zero forcing) receiver. An improvement in the performance of the system was observed when SIMO ZF receivers were used. Further, alternative ways to receive the signal are outlined, including using one pressure sensor and one vector sensor to detect the signals.

Acoustic Toolbox Modifications

Introduction to ACT

Matlab Acoustic Toolbox, or "ACT", was used for the simulations described herein. ACT is a menu-based user interface for running a number of underwater acoustic propagation models and plotting the results. An initial deficiency of ACT was that information about channel impulse response at given locations could not be directly obtained. Channel impulse response information was found by using the Bellhop underwater acoustic propagation model on amplitude-delay mode. The resulting arrival file (*.arr) was used to plot an impulse response at a given location and to save the numerical data of the channel impulse responses of all locations in the arrival file ("arr" file). From the "arr" file, the information on the impulse response provided the ensemble average impulse response.

Geographic Representation in ACT

Figure 7:
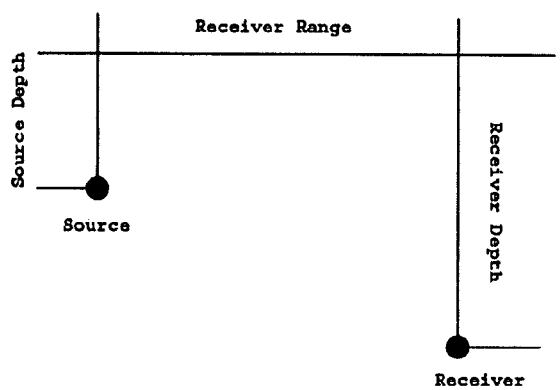
FIG. 7 is a geographic representation of the underwater acoustic propagation model in the Matlab acoustic Toolbox (ACT)
Figure 8:
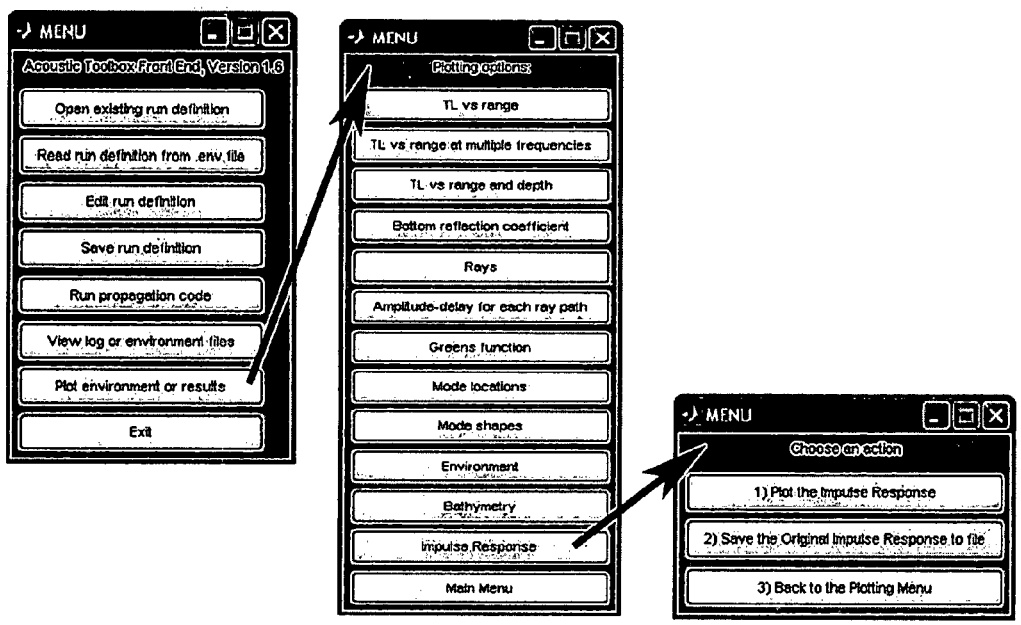
FIG. 8 depicts screenshots of some exemplary Acoustic toolbox menus.

Throughout this report, the geographic representations as shown in FIG. 7 are referred to. FIG. 8 below shows the menus of the ACT toolbox. An additional menu tap (button or bar) for "Impulse Response" has been added in the "Plotting Options" menu. Once the Impulse Response tap was pressed, another submenu popped up, providing three options which were 1) Plot the impulse Response, 2) Save the Original Impulse Response to file, and 3) Back to the Plotting Menu.

Plotting the Impulse Response

Figure 9:
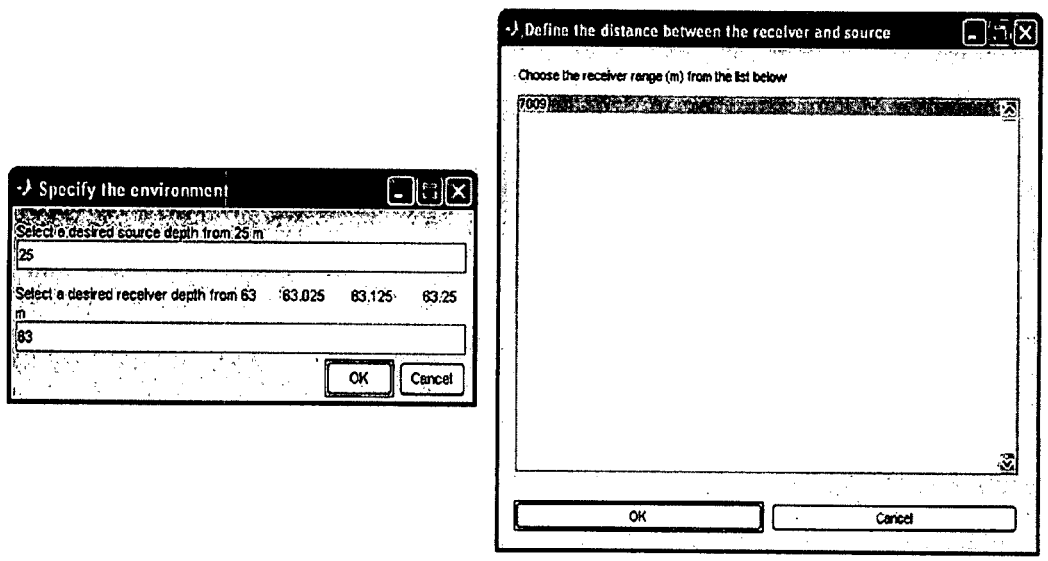
FIG. 9 depicts screenshots of menus or specifying the locations of the transmitter and the receiver, when conducting a simulation in accordance with an embodiment of the invention.

If option 1 (of the above three options) is chosen, an "arr" file needed to be selected, and then the geographical details of a transmitter and a receiver needed to be specified on the menus in FIG. 9.

Figure 10:
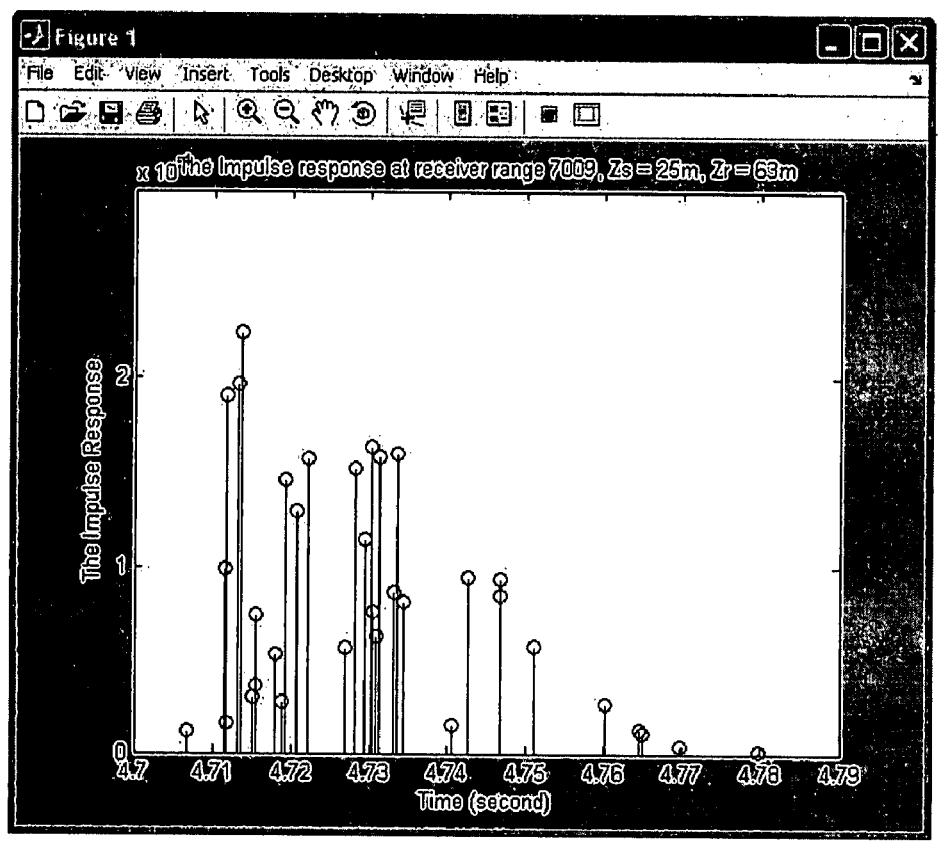
FIG. 10 includes screenshots of a graph of a receiver impulse response as a function of time at a given location and of a popup screen query, in accordance with an embodiment of the invention.

After inputting all the details, the figure of the channel impulse response at the particular location was displayed, along with the choice to save the detail information of the impulse response into a text-formatted file having a ".mat" extension, as shown in FIG. 10. A root name for the file was entered to save the information associated with each impulse response. The information below is a shortened version of the information contained in the resulting saved file with impulse response information. In the following, some of the multipath component information has been removed.

The first, second, and third columns below represent the delay time, the magnitude of the impulse response and its phase delays in radians, respectively:

| Delay Time (seconds) | Impulse Response Magnitude | Phase delay (radians) |
| --- | --- | --- |
| 4.706701e+000 | 1.144163e−005 | −7.473480e−001 |
| 4.711451e+000 | 9.875208e−005 | 1.937270e+000 |
| 4.711642e+000 | 1.907769e−004 | 2.642090e−001 |
| 4.711687e+000 | 1.657836e−005 | −7.473464e−001 |
| 4.713257e+000 | 1.968532e−004 | −2.281524e+000 |
| 4.713532e+000 | 2.242203e−004 | 2.179476e+000 |
| 4.714973e+000 | 2.994360e−005 | 6.463705e−001 |
| 4.715496e+000 | 7.429333e−005 | 6.688156e−002 |
| 4.715504e+000 | 3.681046e−005 | −1.371121e+000 |
| 4.717925e+000 | 5.283457e−005 | 6.148435e−001 |
| 4.718831e+000 | 2.729738e−005 | 1.549012e+000 |
| 4.719240e+000 | 1.462593e−004 | 1.936434e+000 |
| 4.720605e+000 | 1.294984e−004 | 2.215370e+000 |
| 4.722048e+000 | 1.572037e−004 | −3.000991e+000 |

Saving the Original Impulse Response to File

Applying option 2 described above, the information of impulse responses in the selected arr file was separately saved in text-formatted files with mat extension according to geographic locations. First, the prefix root name of the save file was specified.

The nomenclature of the saved file was based on the information of the prefix root name, source depth, and receiver depth. For example, if the chosen "arr" file contained the impulse response information at a source depth equal to 25 m and receiver depths equal to 60 m and 63 m, and the receiver ranges were 7000 m and 7001 m, the saved files had the following file names given that the prefix root name was xxxx:

xxxx_IRatSD25RD60.mat and xxxx_IRatSD25RD63.mat

The information below is an example of the structure of each resulting saved file.

These data are represented in tri-column groups for the receiver range(s): 7000 7001 m, respectively. Each group has three columns where the first corresponds for the delay in seconds, the second for amplitude, and the third for phases in radians.

In some cases there might be zeros at the bottom of the matrix. These zeros are excluded to the IR data.

| | | | | | |
| --- | --- | --- | --- | --- | --- |
| 4.707669e+000 | 1.884937e−004 | 2.082122e+000 | 4.708338e+000 | 1.884307e−004 | 2.082122e+000 |
| 4.707941e+000 | 1.588607e−004 | −2.630267e+000 | 4.708614e+000 | 1.585844e−004 | −2.630267e+000 |
| 4.710824e+000 | 1.168876e−004 | 2.175467e+000 | 4.711499e+000 | 1.164570e−004 | 2.175467e+000 |
| 4.711696e+000 | 6.913055e−005 | 6.046388e−001 | 4.712363e+000 | 6.912614e−005 | 6.046388e−001 |
| 4.727735e+000 | 1.370599e−004 | 1.367830e+000 | 4.728400e+000 | 1.370260e−004 | 1.367830e+000 |
| 4.740494e+000 | 7.759567e−005 | 8.428521e−001 | 4.741155e+000 | 7.759024e−005 | 8.428521e−001 |
| 4.741233e+000 | 7.626868e−005 | −1.634629e+000 | 4.741896e+000 | 7.627108e−005 | −1.634629e+000 |

The first three columns, in each row above, contain information for the impulse response at a receiver range of 7000 m while the second three columns or columns 4, 5, and 6 provide the information on the impulse response at the receiver range 7001 m.

In other words, the data on the impulse responses were divided into tri-column groups and the number of groups is equal to the number of the receiver ranges. Each group has three columns where the first corresponds for the delay in seconds, the second for amplitude, and the third for phases in radians.

Reading the Information from the Resulting Saved File

The command shown below is an example of a command to read all the numerical detail of the impulse response into a matrix in Matlab.

M=textread('xxxx.mat',' ','commentstyle', 'matlab');

Performance of Multichannel Underwater Communications Receivers

Herein, the performance of transmitting Binary Phase Shift Keying is determined using a Monte Carlo Simulation and a BPSK signal with rectangular pulse shape through underwater communications channels. Acoustic waves were used for this underwater application, unlike in air channels where electromagnetic waves would generally be used. Using a transducer, the transmitter converted the electrical signals into pressure signals and the receiver reconverted the pressure signals back into electrical waveforms.

Assuming knowledge of the channels at the receivers, a SISO ZF receiver and SIMO ZF receivers were used. When using the SIMO ZF receivers, a combination of sensors was used which included: two pressure sensors, (P-P) separated with the distances of $0.2\lambda$, $\lambda$, and $2\lambda$, and a pressure sensor with a velocity vector sensor, (P-V), separated with the distance of $0.2\lambda$ in both the horizontal and vertical directions.

Assumed system parameters included the central frequency of the carrier $f_c$=12 kHz, the sampling frequency of the channel $f_s$=48 kHz, and the data rate $R_b$=2,400 kbps.

Underwater Communications Channel

Figure 11:
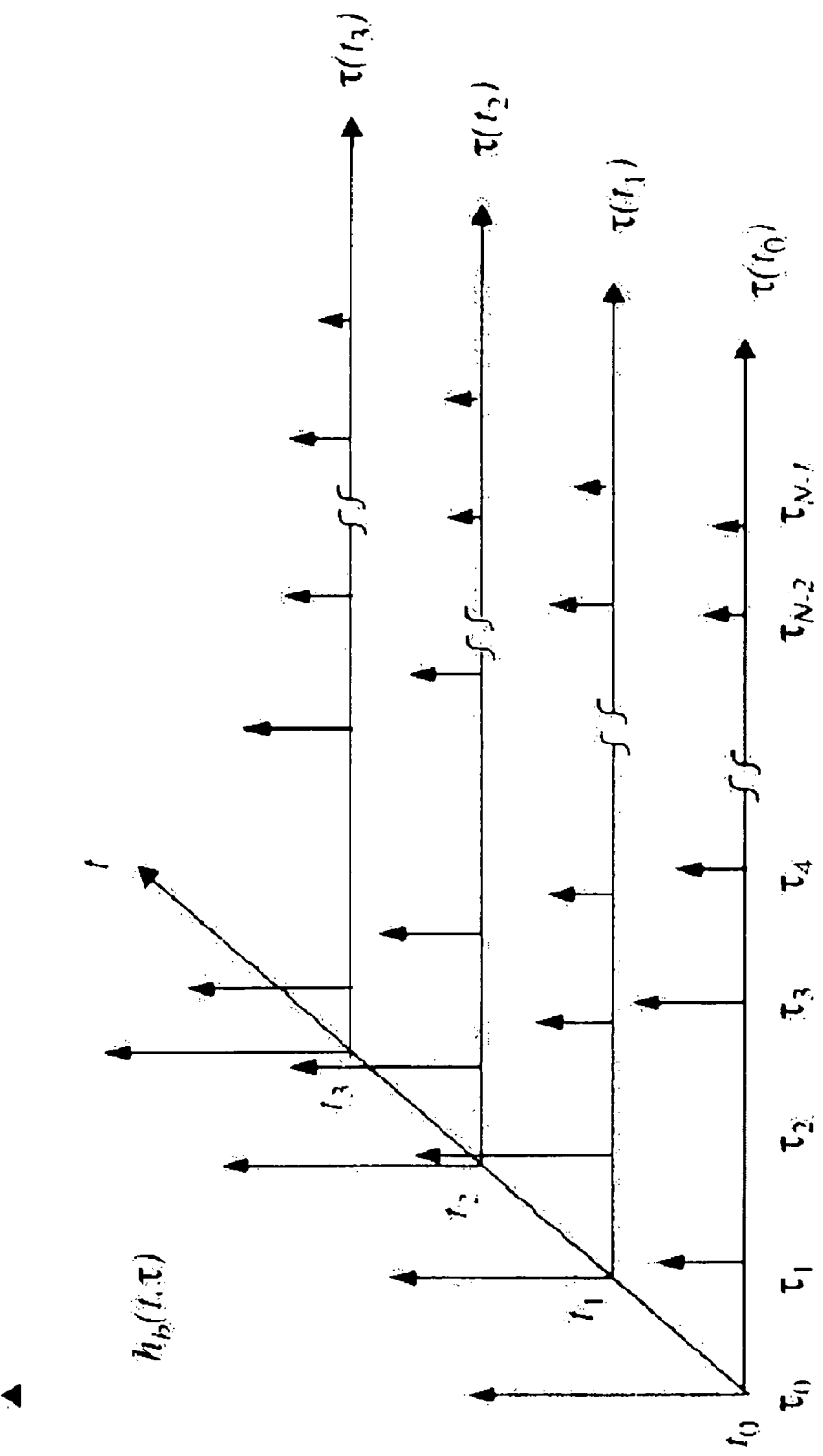
FIG. 11 is a schematic illustration of an example of the time varying discrete-time impulse response for a multipath channel.

An Underwater Communications Channel can be categorized as a multipath channel. Its impulse response has a time-varying property as depicted in FIG. 11. In this paper, the channel impulse response was simulated using ACT toolbox resulting in the ensemble average of the channel.

Time Dispersion Parameters

To compare the differences among multipath channels and to develop some design concepts for wireless systems, parameters that quantify the multipath channel were used. The mean excess delay, rms delay spread, and maximum excess delay spread are multipath channel parameters that can be determined from a power delay profile. The mean excess delay was given by $$\bar{\tau} = \frac{\sum_k P(\tau_k)\tau_k}{\sum_k P(\tau_k)} \quad (34)$$

$$\overline{\tau^2} = \frac{\sum_k P(\tau_k)\tau_k^2}{\sum_k P(\tau_k)} \quad (35)$$

The rms delay spread was given by $$\sigma_\tau = \sqrt{\overline{\tau^2} - (\bar{\tau})^2} \quad (36)$$

The maximum excess delay (XdB) was defined to be the time delay during which multipath energy fell to X dB below the maximum value.

The τ-spaced Model

For computer simulation purposes, it's useful to discretize the multipath delay axis τ into N excess delay bins which have equal delay segments, Δτ, and to shift the first arrival multipath component into $\tau_0$. Depending on the choice of Δτ and physical channel delay properties, there may be two or more multipath components that fall into the same excess delay bin that have to be vectorially combined to yield the instantaneous response. The discretized impulse response is called a τ-spaced impulse response.

The T-spaced Model

Figure 12:
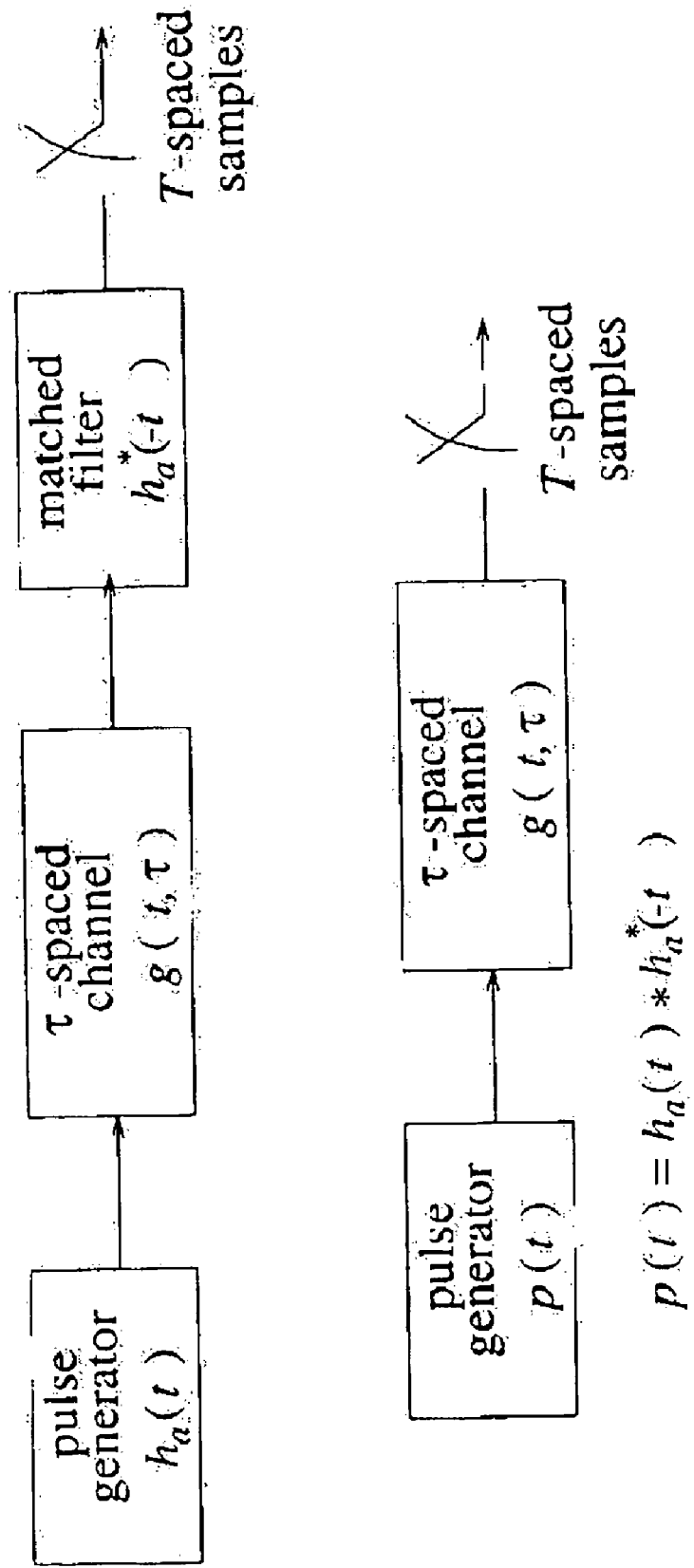
FIG. 12 is a block diagram of a method for generating correlated tap coefficients in a T-spaced model, in accordance with an embodiment of the present invention.

Usually, the baud duration T of a typical digital communication system is longer than delay segment Δτ of τ-spaced channel. We can dramatically reduce the simulation time by setting the simulation step size to the baud duration T. FIG. 12 depicts the method for generating correlated T-spaced tap coefficients from a τ-spaced impulse response.

Velocity Vector Sensor

Figure 13:
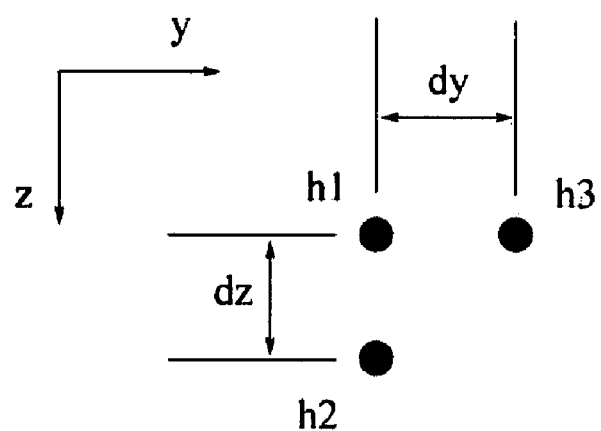
FIG. 13 is a schematic representation of the spatial pressure gradient to be measured in accordance with an embodiment of the present invention.

The velocity of the acoustic wave is defined as the spatial gradient of its pressure. In the following, a method for using velocity vector sensor for data demodulation and equalization is employed. Assuming that $h_1$, $h_2$, and $h_3$ are the pressure impulse responses of the particular locations in FIG. 13, where $h_1$ is the pressure impulse response at the receiver location, the velocity impulse responses are given by:

in the horizontal direction, $$v_y = \frac{h_1 - h_3}{dy} \quad (37)$$

and in vertical direction $$v_z = \frac{h_1 - h_2}{dz} \quad (38)$$

It is noted that in this paper dy=dz=0.22λ.

SISO and SIMO Signal Models

SISO: Single Input Single Output

The input-output relation of a SISO frequency selective channel is represented as follows:

$$Y[k] = \sqrt{E_s}\, HS[k] + N[k] \quad (39)$$

where $E_s$ is defined as the energy per symbol.

Preferably, the impulse response vector h equals 1×L and is expressed as $$h=[h[0] \ldots h[L-1]] \quad (40)$$

To ensure that the channel does not artificially amplify or attenuate the signal, h is normalized so that $\Sigma|h|^2=1$[6]. H is (T+L−1)×T where T is defined as the number of symbols and is written as:

$$H = \begin{bmatrix} h[0] & 0 & \cdots & 0 \\ \vdots & \ddots & \ddots & \vdots \\ h[L-1] & \ddots & \ddots & 0 \\ 0 & \ddots & \ddots & h[0] \\ \vdots & \ddots & \ddots & \vdots \\ 0 & \cdots & 0 & h[L-1] \end{bmatrix} \quad (41)$$

The vectors Y[k] and N[k] are (T+L−1)×1 where T equals the number of symbols, while S[k] is T×1. N[k] is a complex-valued Gaussian noise with zero mean and $N_0$ variance. It should be noted that T=200 in this paper.

SIMO: Single Input Multiple Outputs

Using Eq. (39), for a SISO channel, the SIMO channel was written as $$Y_i[k] = \sqrt{E_s}\, H_i S[k] + N_i[k] \quad (42)$$

where $H_i$ for i=1, ..., $M_R$ was the stacked channel at the $i^{th}$ receiver antenna.

The input-output relation was given by $$Y[k] = \sqrt{E_s}\, HS[k] + N[k] \quad (43)$$

where $$Y[k] = \begin{bmatrix} Y_1[k] \\ \vdots \\ Y_{M_R}[k] \end{bmatrix}, H = \begin{bmatrix} H_1 \\ \vdots \\ H_{M_R} \end{bmatrix}, N[k] = \begin{bmatrix} N_1[k] \\ \vdots \\ N_{M_R}[k] \end{bmatrix} \quad (44)$$

The vectors Y[k] and N[k] had dimension $M_R(T+L-1) \times 1$, whereas H was $M_R(T+L-1) \times T$. It's also noted that for the SIMO in this paper $M_R=2$.

Zero Forcing Receiver

The goal of using the ZF receiver was to invert the channel and eliminate ISI. First, the signal was received using a matched filter and then equalized. The output of the ZF equalizer was given by:

$$R[k] = (H^H H)^{-1} H^H Y[k] \quad (45)$$

where vector R[k] was T×1.

Signal Detection

Figure 14:
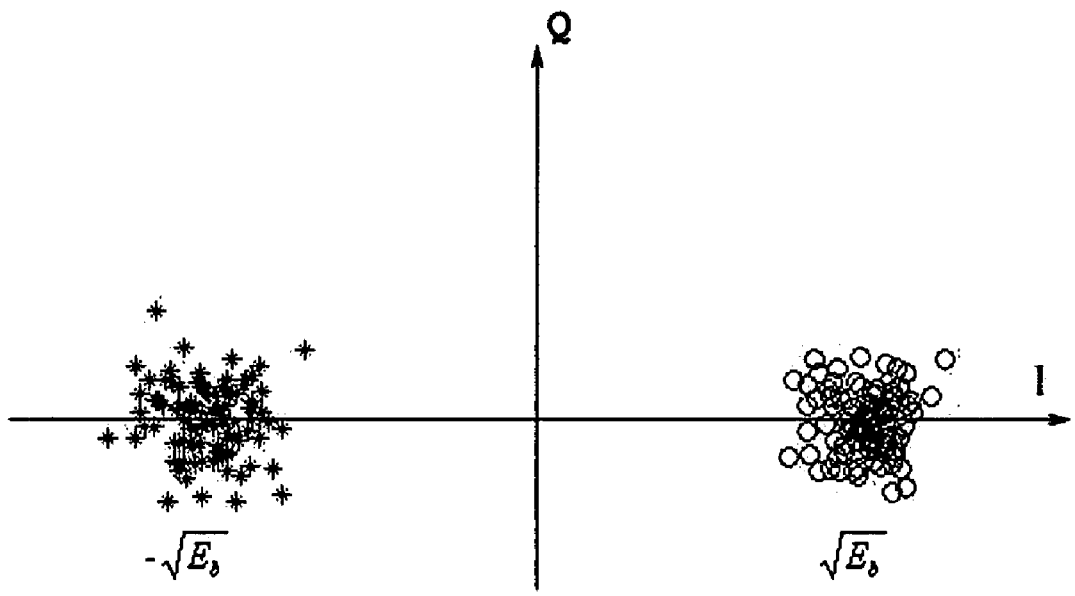
FIG. 14 is a graphical illustration of the signal constellation of the output signal from the Zero Forcing (ZF) equalizer, in accordance with an embodiment of the invention.

An example of the signal constellation of R[k], the output signal of the ZF equalizer when BPSK signal was transmitted, is shown in FIG. 14. Throughout this paper, the BPSK signals were assumed to be equally probable, so the decision rule for the optimum detector was as follows: Deciding that bit 1 was sent if Re(R[k])>0 and that bit 0 was sent if Re(R[k])<0, where Re( . . . ) refers to real part of the complex number.

Performance Analysis of ZF receiver

From Equation (45), the SNR at the output of the equalizer was given by $$SNR_k = \frac{(Eb/N_0)_k}{[H^H H]_{k,k}^{-1}}, \text{ for } k = 1, \ldots, T \quad (46)$$

Channel Simulation Parameters and Notations

Geographic Representations

Throughout the simulations, it was assumed that the transmitter was located at 25 m below the water level while the locations of the receivers varied within a 9-by-9 meter-squared region at the initial receiver ranges of 5 km and 10 km.

Figure 15:
FIG. 15 depicts an exemplary distribution of receiver locations in accordance with an embodiment of the invention.
Figure 15:
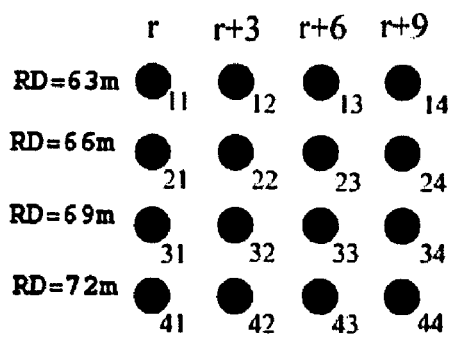

According to FIG. 15, there are 16 receiver locations at a particular receiver range. The receiver locations were assigned a number in the same way as the elements of a 4-by-4 matrix, for example, for a receiver location $r_{ij}$, i=1, . . . , 4, j= 1, . . . , 4. Thus, thus receiver locations in FIG. 15 include rows 1 through 4, with each such row having four locations numbered 1 through 4. Herein, each receiver location is referred to using a two-digit format, with the first digit designating the row, and the second digit designating the "column" of that receiver location in the two-dimensional array shown in FIG. 15. Thus, receiver location "44", for instance, refers to the receiver location at the lower right extreme of the 4×4 receiver-location array.

Sound Speed Profile

The sound speed profile in the simulation represented real channel observations obtained on May 10, 2002 in waters off San Diego, Calif. The properties of the water are shown in the Table 1 and the sound speed profile is shown in Table 2.

TABLE 1

Properties of the Water

| | |
|---|---|
| Water Depth (m) | 81.158 |
| Water Density (kg · m³) | 1024 |
| Shear Sound Speed (m/s) | 0 |
| Shear Wave Absorption (dB/λ) | 0 |
| Compressional Wave Absorption (dB/λ) | 0 |

TABLE 2

Sound Speed Profile of The Water

| Depth (m) | Sound Speed (m/s) |
|---|---|
| 0.000 | 1508.1387 |
| 2.019 | 1507.7033 |
| 4.043 | 1507.5747 |
| 6.230 | 1506.2987 |
| 8.732 | 1500.2919 |
| 10.252 | 1498.2237 |
| 15.021 | 1496.2778 |
| 20.134 | 1493.2498 |
| 30.066 | 1491.0485 |
| 40.024 | 1489.7633 |
| 50.258 | 1489.1346 |
| 60.618 | 1489.1661 |
| 70.253 | 1489.2502 |
| 81.158 | 1489.4627 |

It should be noted that sound speeds vary with depth, thus the wavelength λ was also variable. Using SIMO equalization, the wavelength values were used to determine the distance between receiver antennas. An approximate λ was calculated assuming a constant sound speed of 1,500 m/s, since the sound speeds vary slightly about that value. This variation can be negligible when the center frequency is very large. Therefore, λ was defined by:

$$\lambda = \frac{v}{f_c} = \frac{1500 \text{ m/s}}{12000 \text{ Hz}} = 0.125 \text{ m}. \quad (47)$$

Bottom Profile

Channel impulse responses were simulated using two bottom profiles, coarse silt and very fine sand. Their properties of these bottom profiles are shown in the Tables 4.3 and 4.4, respectively.

TABLE 3

Coarse Silt Properties

| | |
|---|---|
| Density of Coarse Silt (kg · m³) | 1195 |
| Compressional Sound Speed (m/s) | 1516 |
| Compressional Wave Absorption (dB/λ) | 0.02158 |
| Shear Sound Speed (m/s) | 0 |
| Shear Wave Absorption (dB/λ) | 0 |

TABLE 4

Very Fine Sand Properties

| | |
|---|---|
| Density of Very Fine Sand (kg · m³) | 1268 |
| Compressional Sound Speed (m/s) | 1574 |
| Compressional Wave Absorption (dB/λ) | 0.01875 |
| Shear Sound Speed (m/s) | 0 |
| Shear Wave Absorption (dB/λ) | 0 |

Bellhop Simulation Parameters

Figure 16:
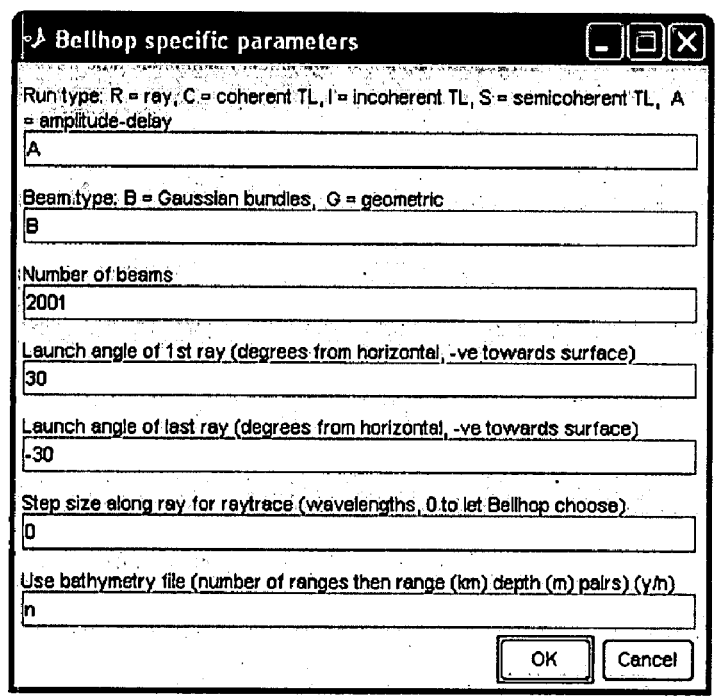
FIG. 16 is an AC T (Acoustic Toolbox) Bellhop model of channel impulse responses, using the illustrated simulation parameters, in accordance with one embodiment of the invention.
Figure 17:
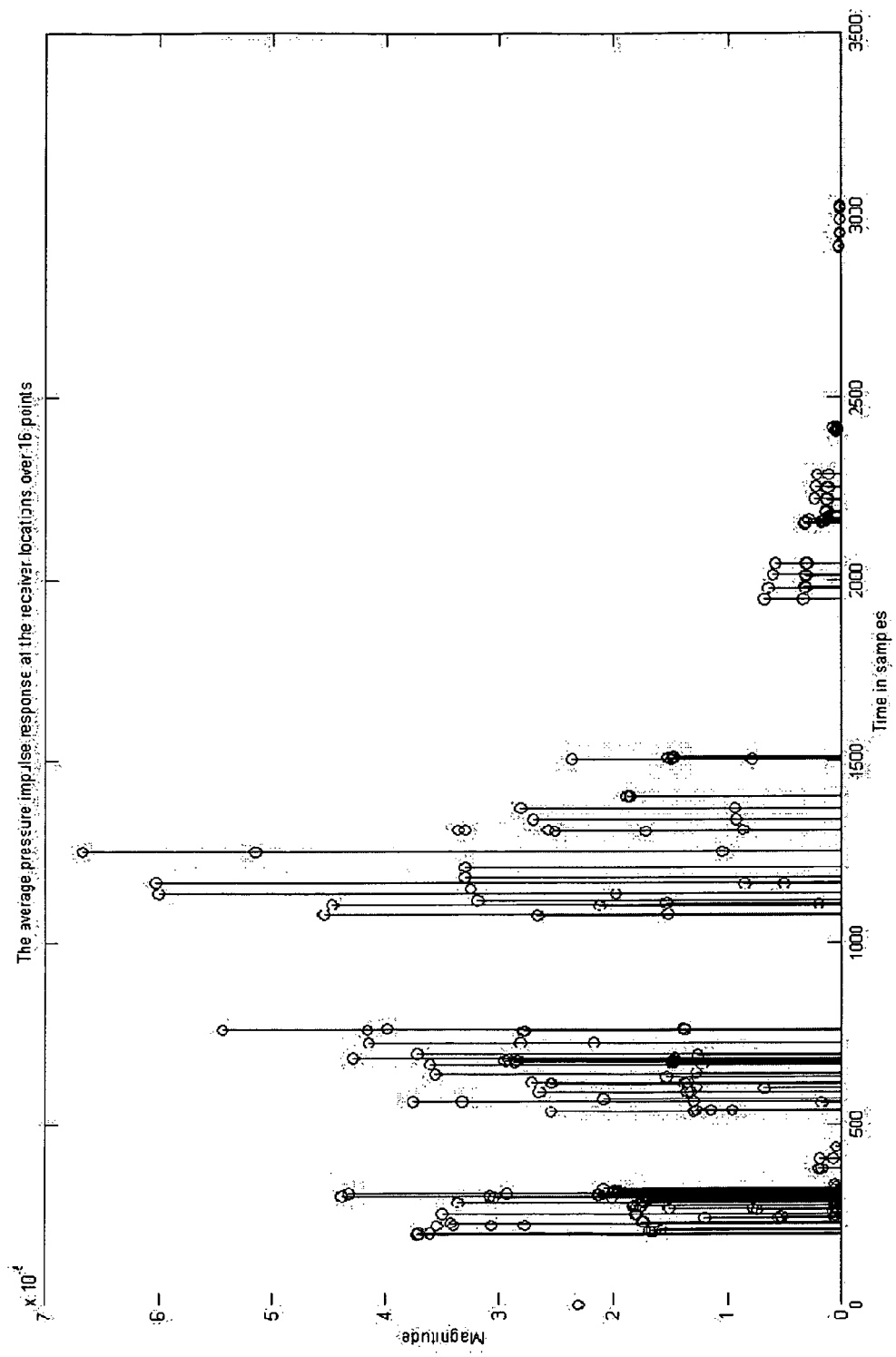
FIG. 17 is a graph of the average pressure impulse response over 16 receiver locations for the initial receiver range of 5 Kilometers (km) and with a coarse split bottom profile.
Figure 18:
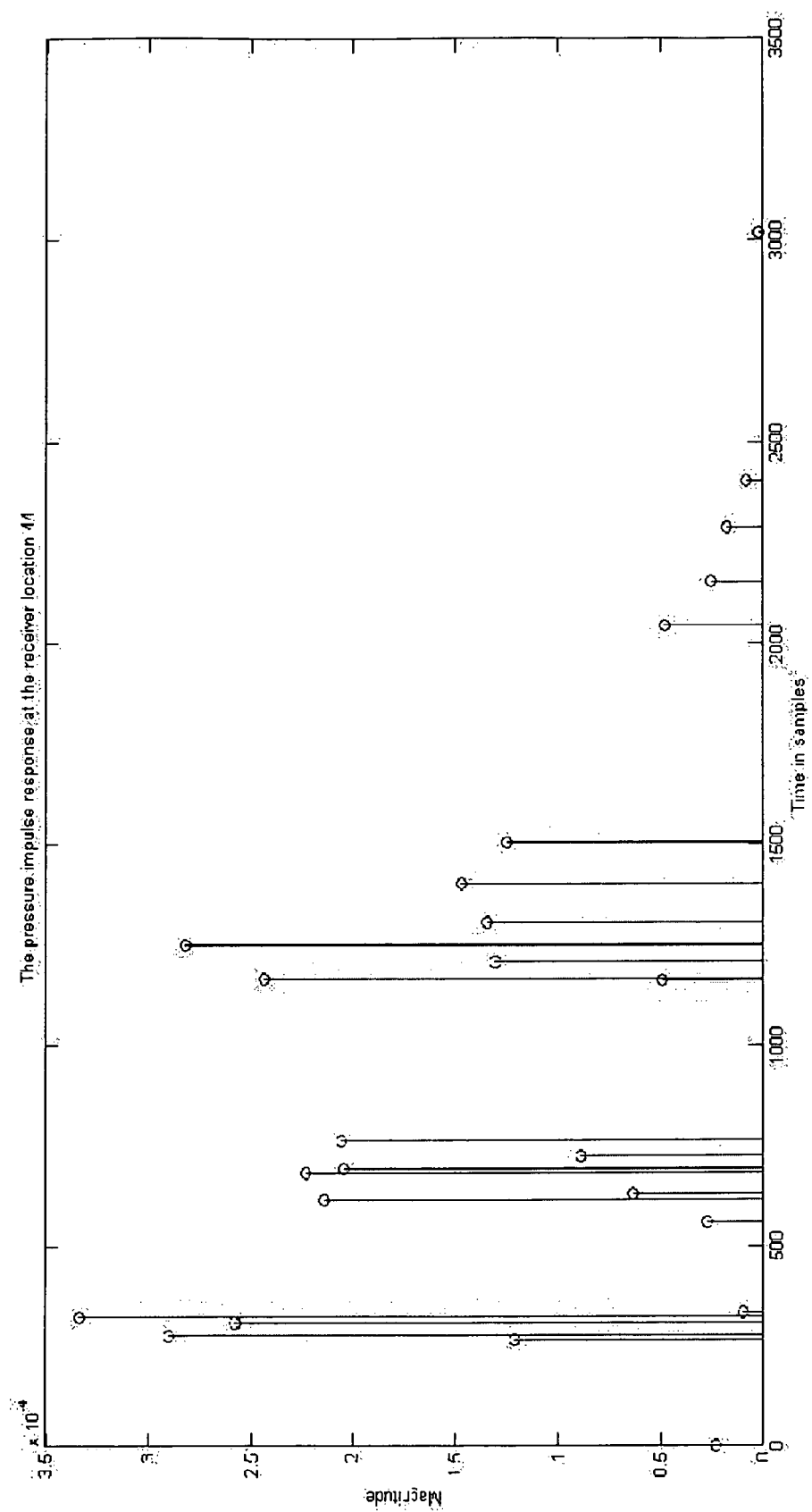
FIG. 18 is a graph of the pressure impulse response at receiver location 44 for the initial receiver range, using a coarse split bottom profile.
Figure 19:
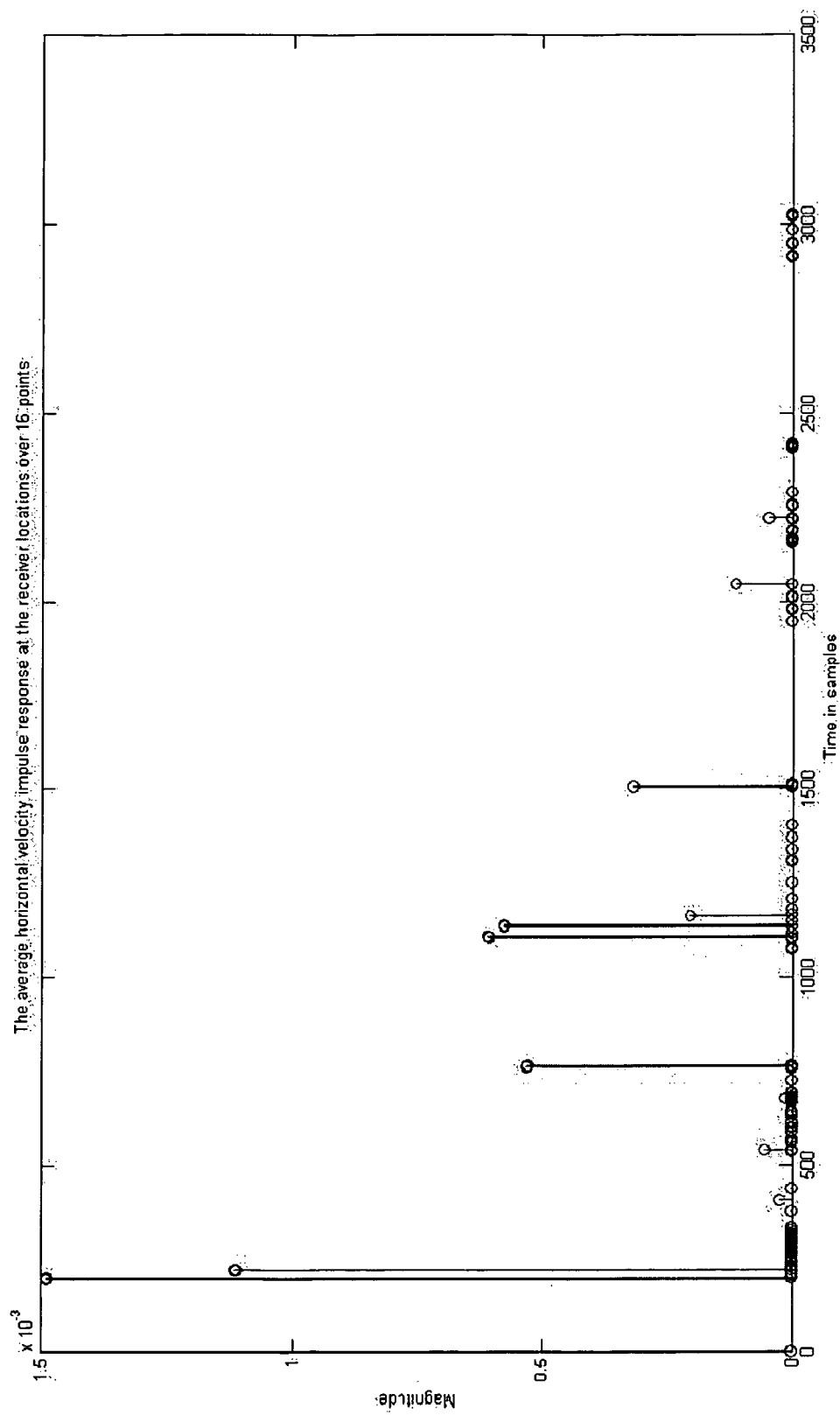
FIG. 19 is a graph of the average horizontal velocity impulse response over 16 receiver locations for the initial receiver range of 5 km and with a coarse silt bottom profile.
Figure 20:
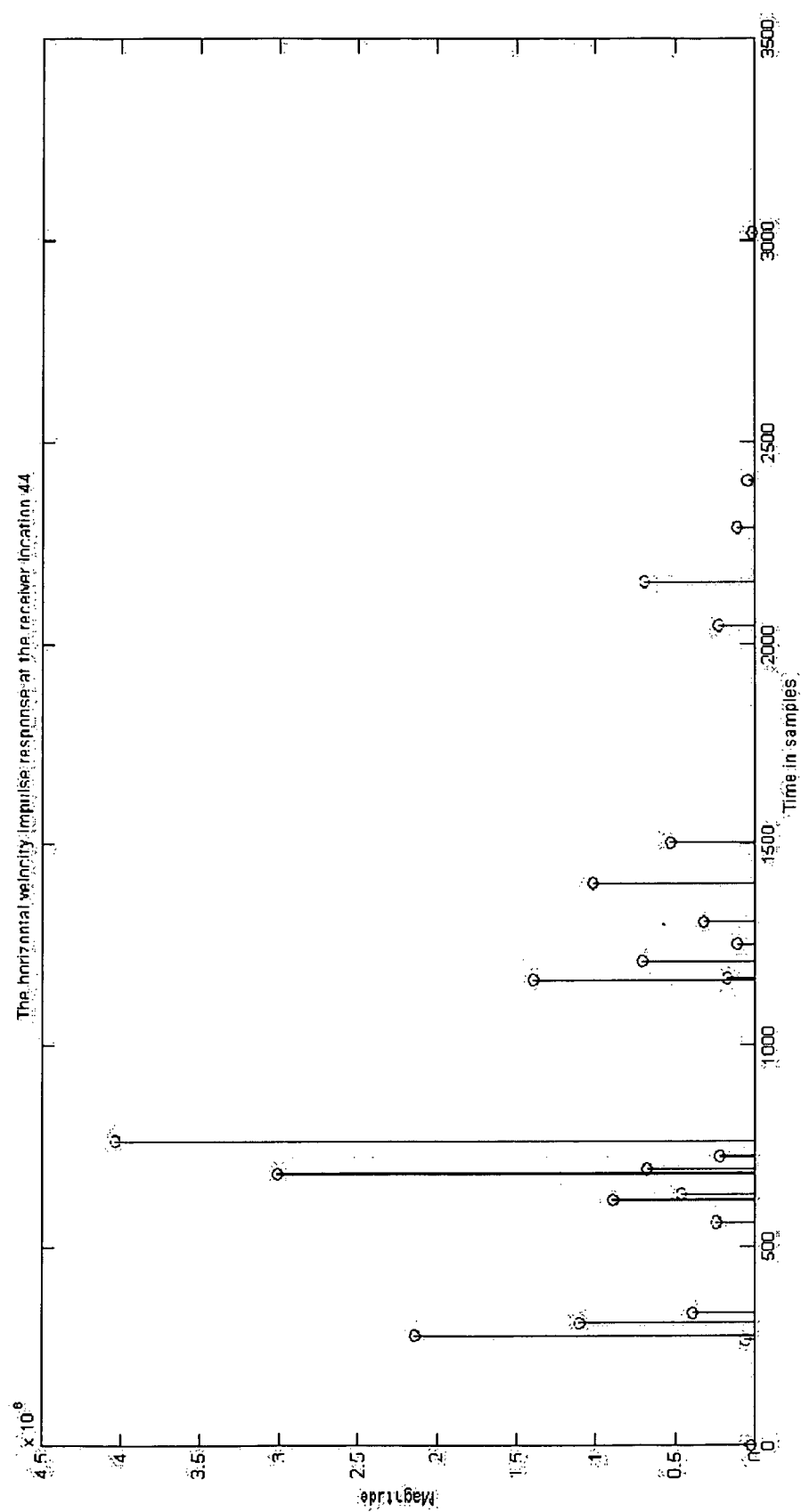
FIG. 20 is a graph of the horizontal velocity impulse response at receiver location 44 for the initial receiver range of 5 km and a coarse silt bottom profile.
Figure 21:
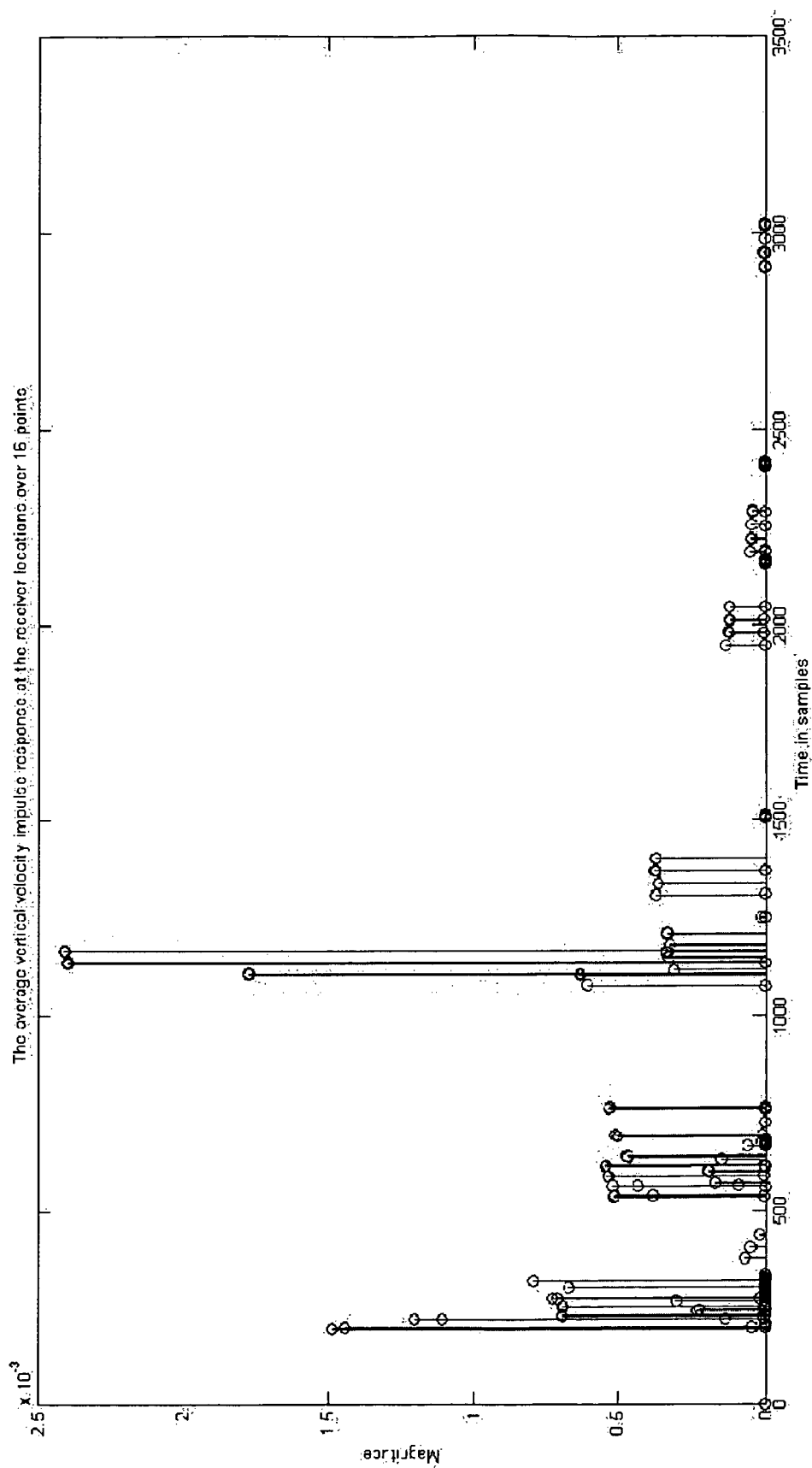
FIG. 21 is a graph of the average vertical velocity impulse response over 16 receiver locations for the initial receiver range of 5 km and coarse silt bottom profile.
Figure 22:
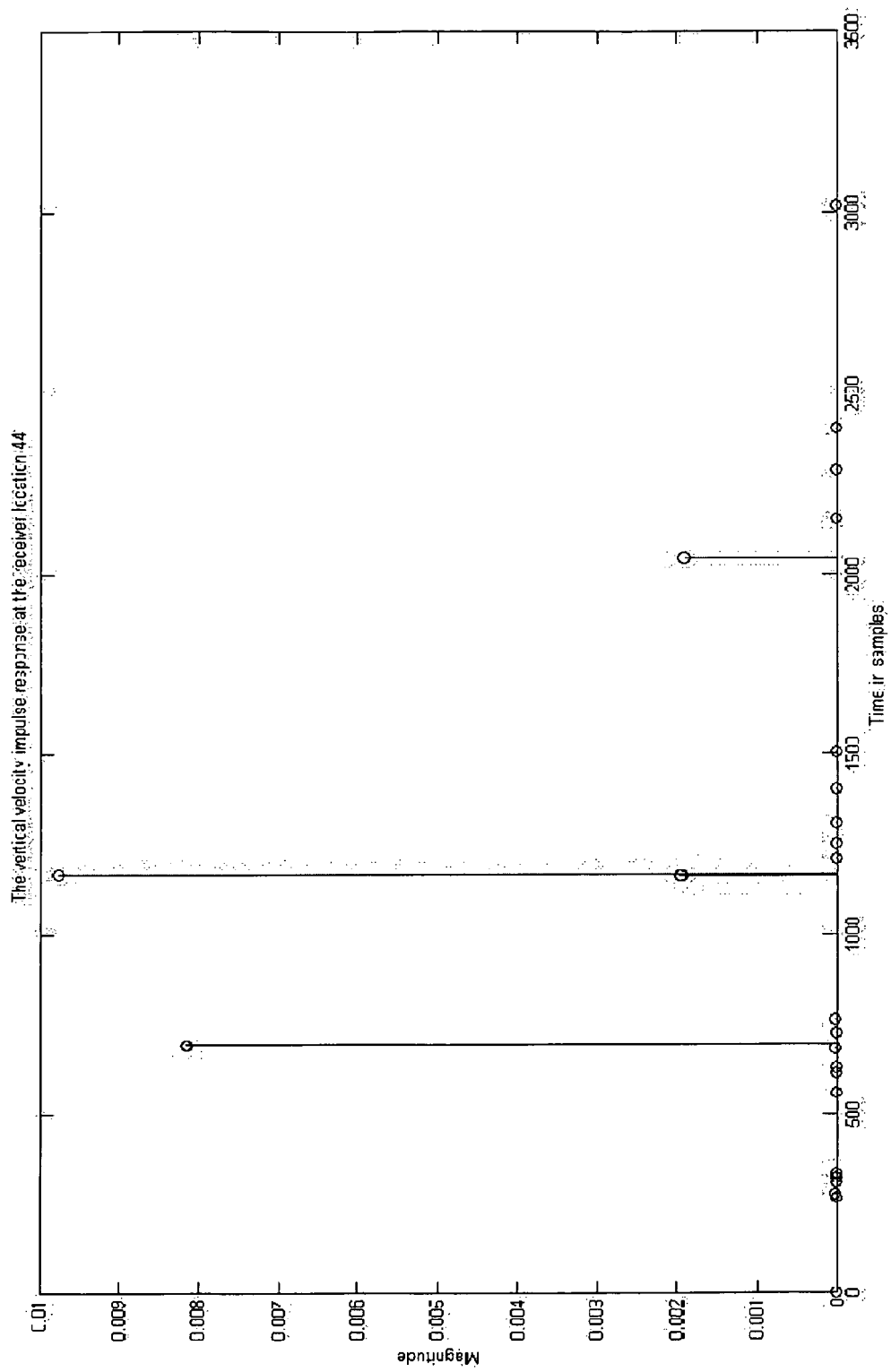
FIG. 22 is a graph of the vertical velocity impulse response at receiver location 44 for the initial receiver range of 5 km and a coarse silt bottom profile.
Figure 23:
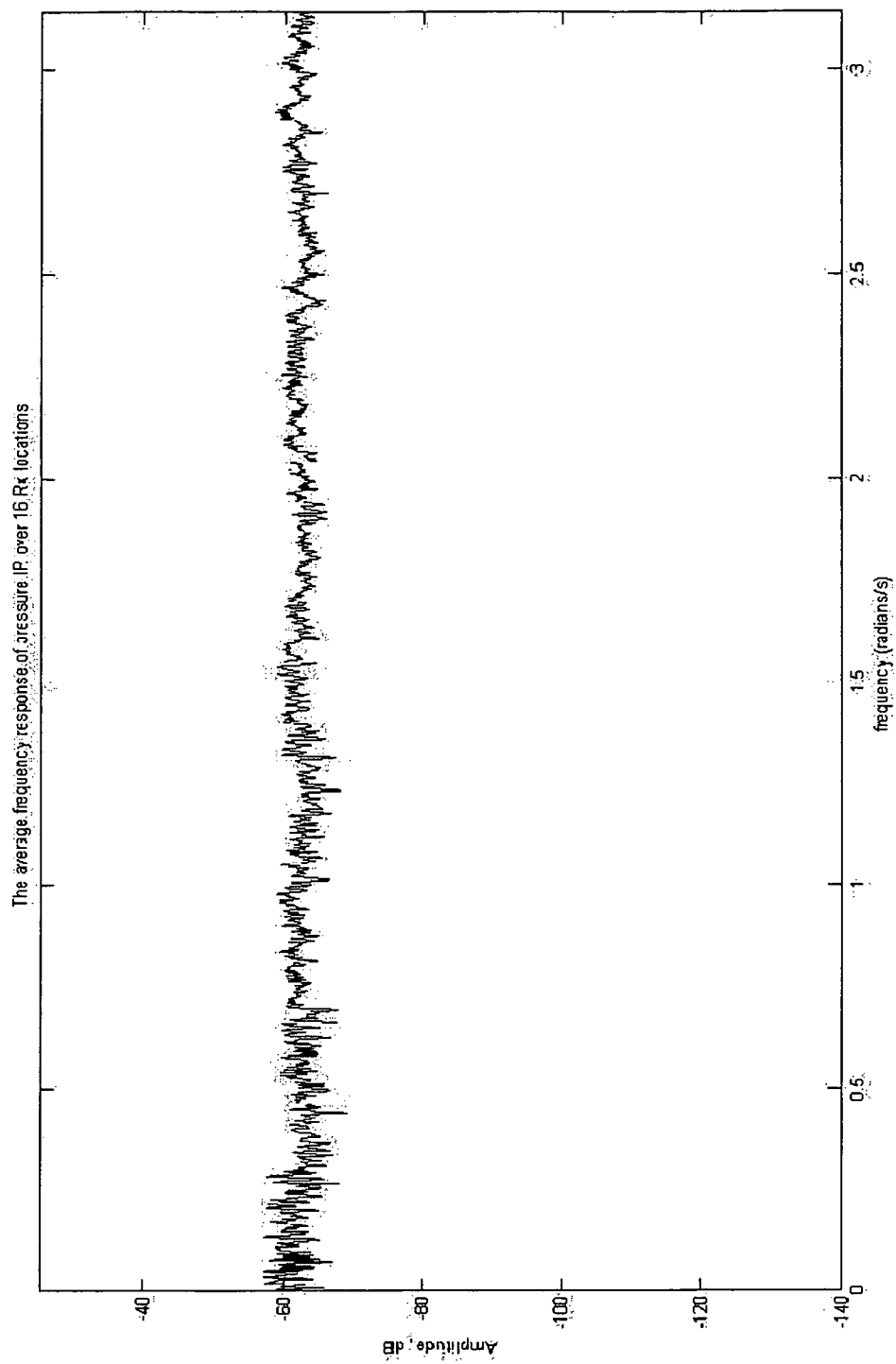
FIG. 23 is a graph of the average frequency response of the pressure impulse response over 16 receiver locations for the initial receiver range of 5 km and a coarse silt bottom profile.
Figure 24:
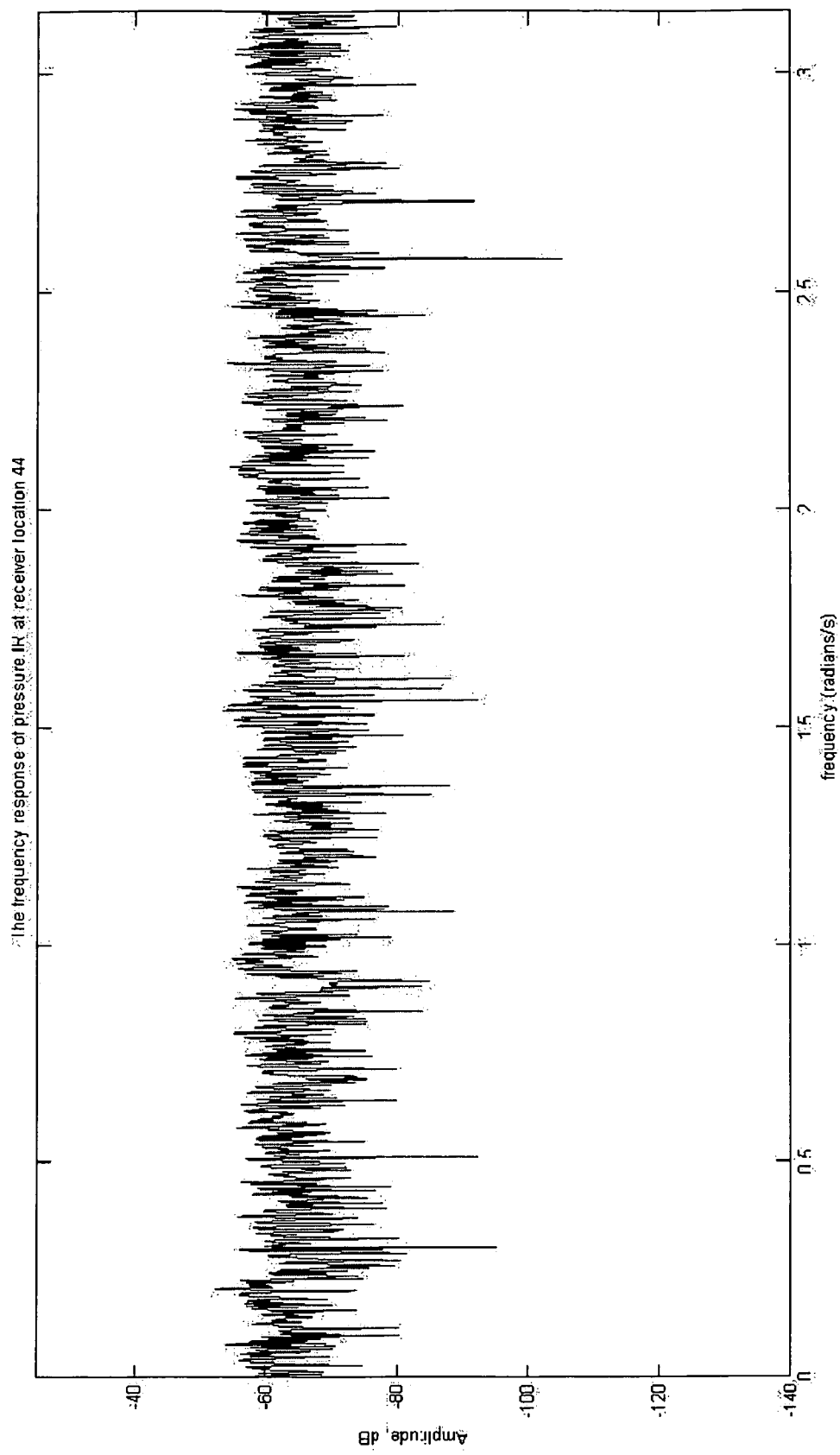
FIG. 24 is a graph of the frequency response of the pressure impulse response at receiver location 44 for the initial receiver range of 5 km and with a coarse silt bottom profile.
Figure 25:
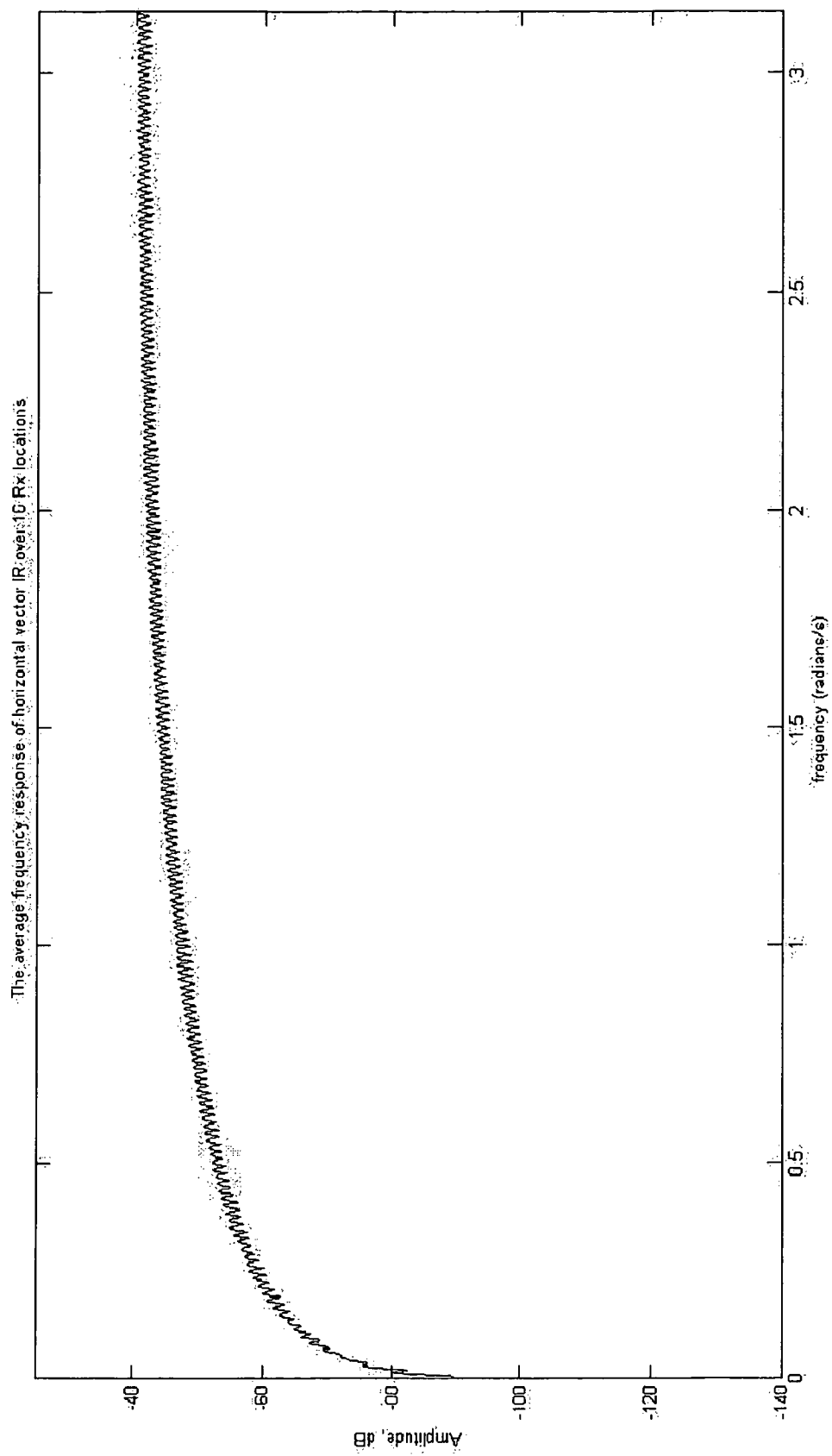
FIG. 25 is a graph of the average frequency response of the horizontal velocity impulse response over 16 receiver locations for the initial receiver range of 5 km and with a coarse silt bottom profile.
Figure 26:
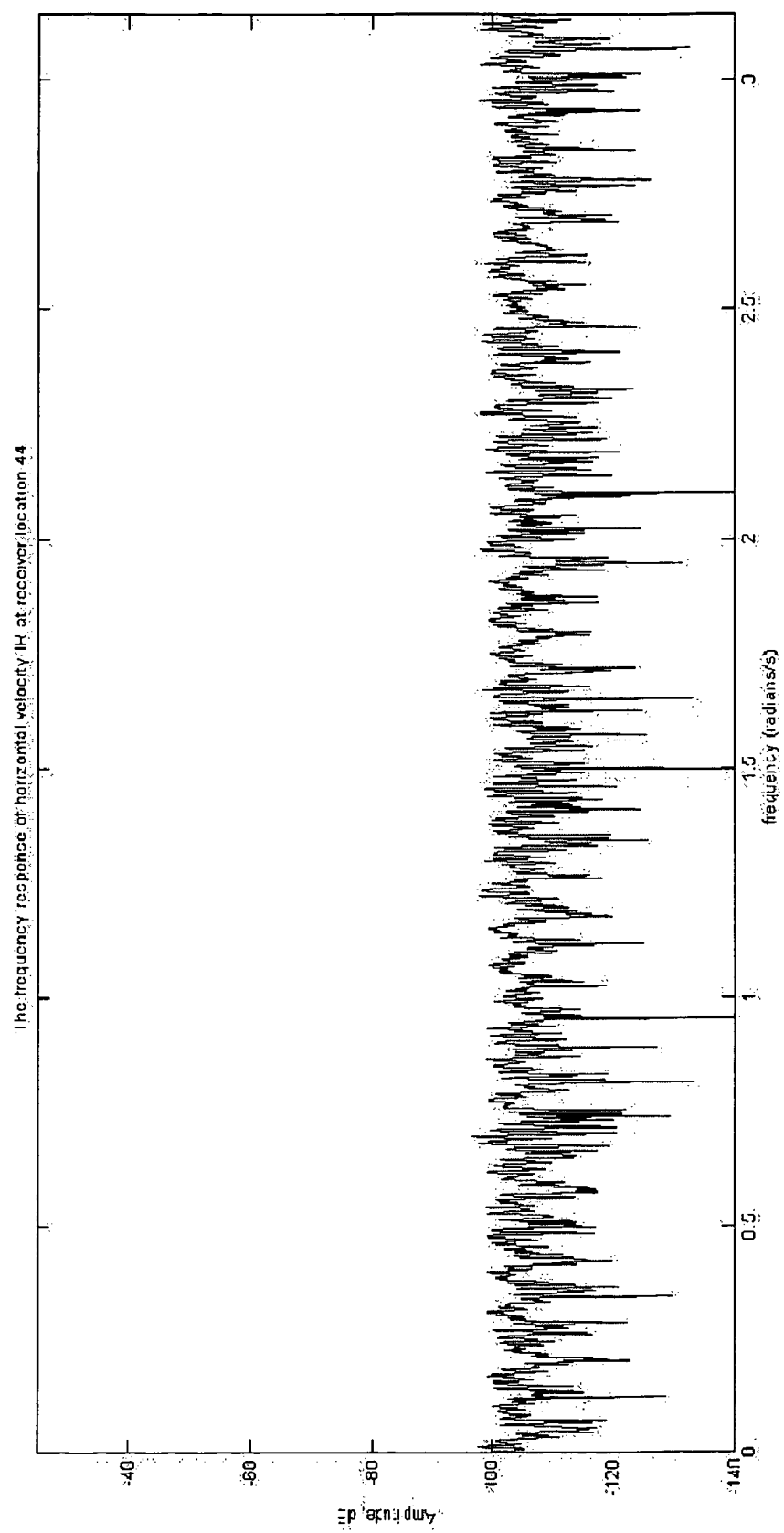
FIG. 26 is a graph of the frequency response of the horizontal velocity impulse response at receiver location 44 for the initial receiver range of 5 km and with a coarse silt bottom profile.
Figure 27:
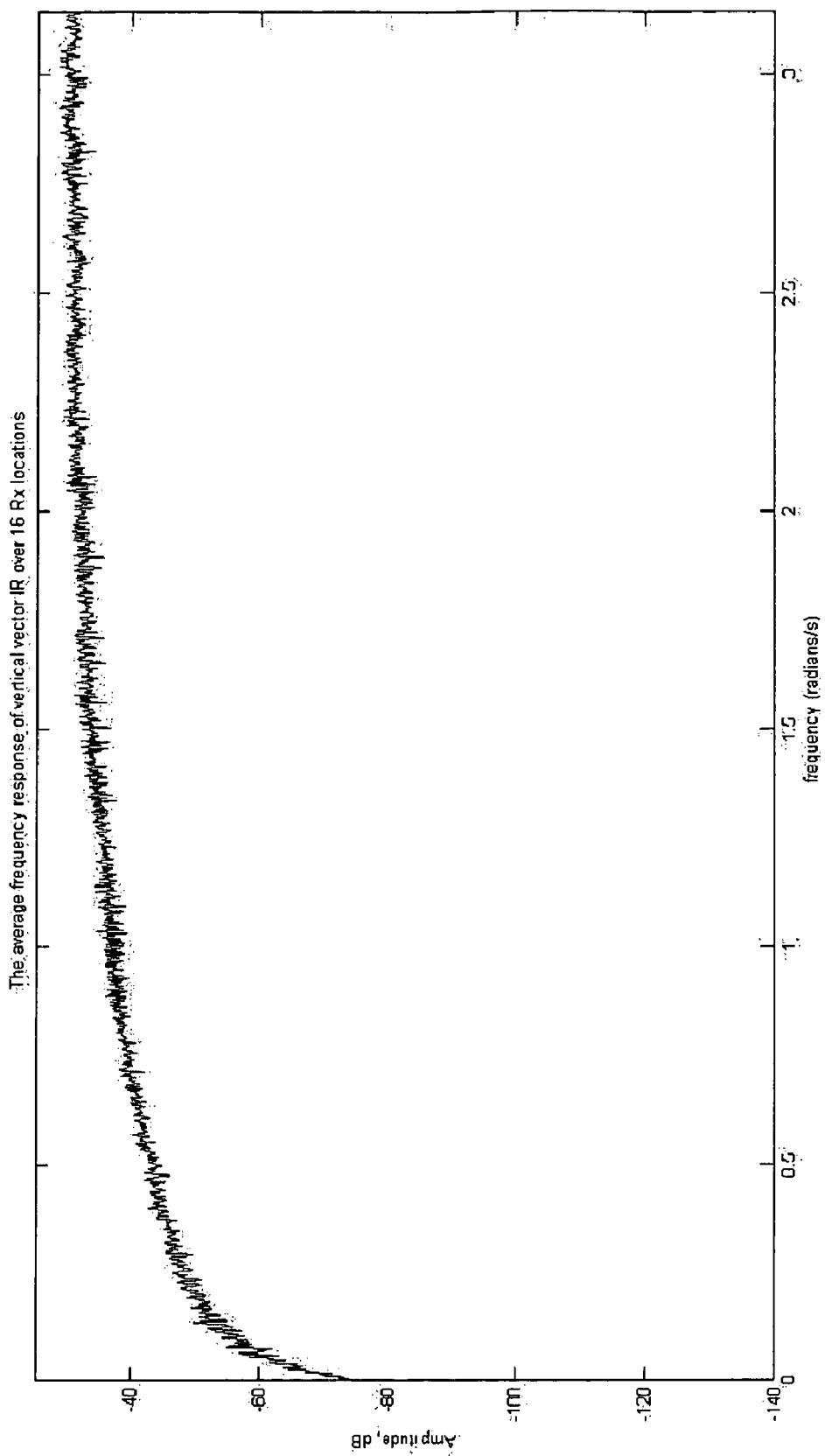
FIG. 27 is a graph of the average frequency response of the vertical velocity impulse response over 16 receiver locations for the initial receiver range of 5 km and with a coarse silt bottom profile.
Figure 28:
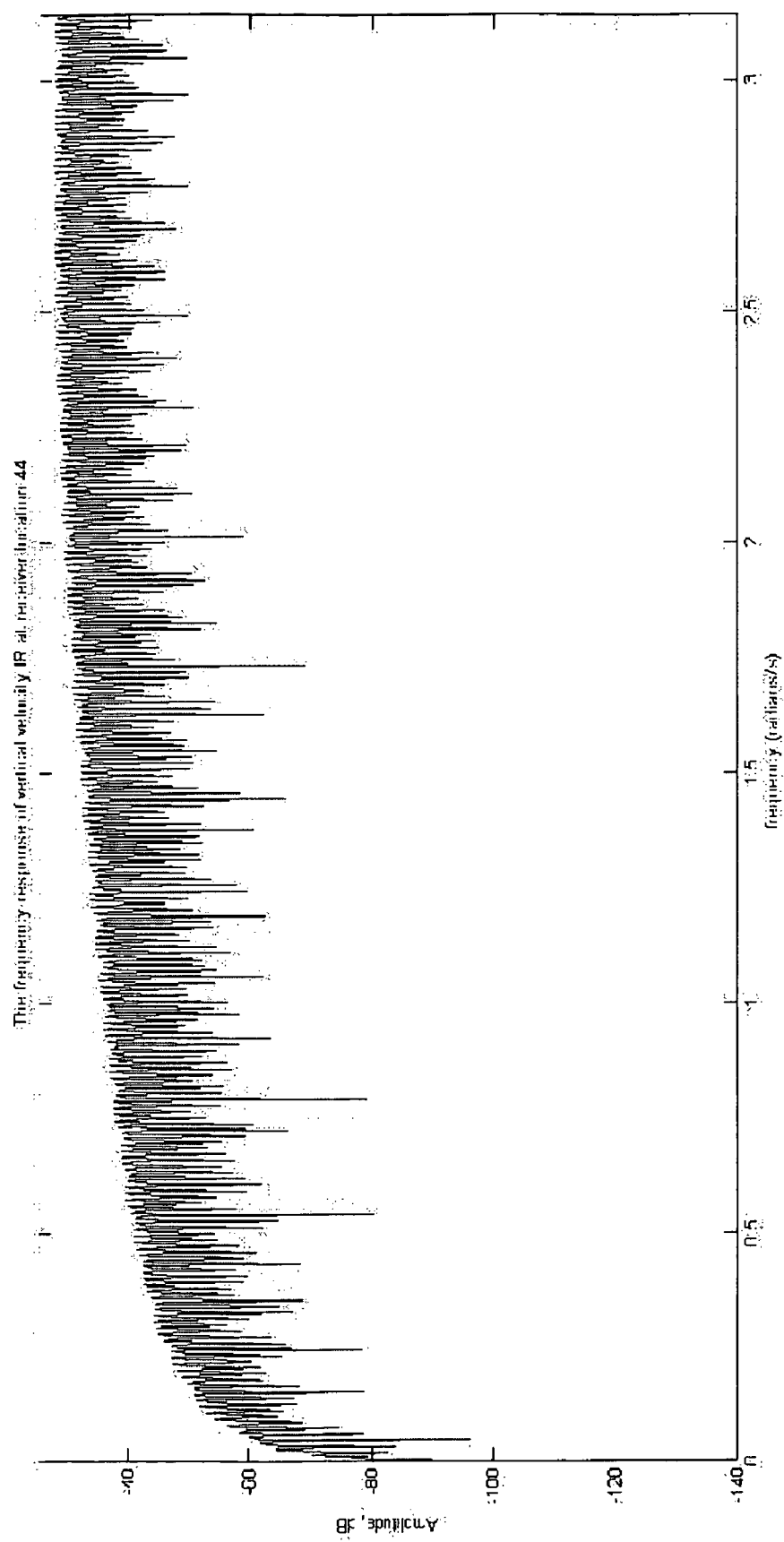
FIG. 28 is a graph of the frequency response of the vertical velocity impulse response at receiver location 44 for the initial receiver range of 5 km and with a coarse silt bottom profile.

The channel impulse responses were simulated using Bellhop model in ACT assuming the parameters shown in FIG. 16.

Simulation Data:

Simulation Results for an Initial Receiver Range of 5 km and a Coarse Silt Bottom Profile Impulse Response The impulse response under various conditions are shown in FIGS. 17-22 of this application, which FIGS. are described in the Brief Description of the Drawings section of this specification. For the sake of brevity, the drawing descriptions provided in the "Brief Description" are not repeated in this section. This practice will be applied to subsequent sections of this application for which the data is fully provided in the drawings and in the Brief Description of the Drawings.

Mean Excess Delay and RMS Delay Spread

Below, data for mean excess delays in seconds of 16 receiver locations are tabulated. In the following tables, the pertinent values for the 16 receiver locations are arranged in the tables in accordance with their distribution in the array shown in FIG. 15. Thus, receiver 11 data is located at the upper left of both the array and of the data tables; and receiver 44 data is located at the lower right of both the array and the data tables, and data for the other receiver locations are distributed throughout the tables in positions corresponding to their respective locations within the array of FIG. 15.

Table 5 tabulates the mean excess delays in seconds of the pressure impulse responses of 16 receiver locations for the initial receiver range 5 km and coarse silt bottom profile, with the mean=1.2369e−002 sec; and the variance=5.1552e−006 $sec^2$.

TABLE 5

| | | | |
|---|---|---|---|
| 9.7211e−003 | 9.7721e−003 | 9.6695e−003 | 9.8717e−003 |
| 1.0960e−002 | 1.0556e−002 | 1.0338e−002 | 1.0231e−002 |
| 1.3808e−002 | 1.4179e−002 | 1.4372e−002 | 1.4812e−002 |
| 1.4510e−002 | 1.5002e−002 | 1.5182e−002 | 1.4913e−002 |

Table 6 tabulates the mean excess delays in seconds of the horizontal impulse responses of 16 receiver locations for the initial receiver range 5 km and coarse silt bottom profile, with the mean=1.7645e−002 sec; and the variance=1.0381e−004 $sec^2$.

TABLE 6

| | | | |
|---|---|---|---|
| 4.1032e−003 | 1.0566e−002 | 1.0709e−002 | 1.0259e−002 |
| 4.6260e−003 | 8.8286e−003 | 2.3025e−002 | 8.0598e−003 |
| 2.3779e−002 | 2.4551e−002 | 2.0334e−002 | 2.0071e−002 |
| 2.4219e−002 | 4.2594e−002 | 3.1323e−002 | 1.5274e−002 |

Table 7 tabulates the mean excess delays in seconds of the vertical impulse responses of 16 receiver locations for the initial receiver range 5 km and coarse silt bottom profile, with the mean=1.5816e−002 sec; and the variance=3.6841e−005 $sec^2$.

TABLE 7

| | | | |
|---|---|---|---|
| 7.6438e−003 | 4.4332e−003 | 1.6554e−002 | 2.0672e−002 |
| 1.0388e−002 | 8.5940e−003 | 1.7272e−002 | 2.8135e−002 |
| 2.0922e−002 | 2.1972e−002 | 1.7721e−002 | 1.3060e−002 |
| 1.1930e−002 | 1.3521e−002 | 1.9444e−002 | 2.0790e−002 |

RMS Delays Spreads in Seconds of 16 Receiver Locations

Table 8 tabulates the RMS delays spreads in seconds of the pressure impulse responses of 16 receiver locations for the initial receiver range 5 km and coarse silt bottom profile, with the mean=8.1630e−003 sec; and the variance=1.8931e−007 $sec^2$.

TABLE 8

| | | | |
|---|---|---|---|
| 7.7124e−003 | 7.6995e−003 | 7.6733e−003 | 7.7314e−003 |
| 7.8456e−003 | 7.7947e−003 | 7.7610e−003 | 7.7057e−003 |
| 8.3050e−003 | 8.4726e−003 | 8.5321e−003 | 8.6686e−003 |
| 8.5693e−003 | 8.6985e−003 | 8.7106e−003 | 8.7272e−003 |

Table 9 tabulates the RMS delays spreads in seconds of the horizontal impulse responses of 16 receiver locations for the initial receiver range 5 km and coarse silt bottom profile, with the Mean=4.3977e−003 sec; and the Variance=1.0859e−005 $sec^2$.

TABLE 9

| | | | |
|---|---|---|---|
| 2.5927e−004 | 6.9921e−003 | 5.8098e−003 | 7.7610e−003 |
| 1.7470e−003 | 7.7778e−003 | 6.2712e−004 | 8.7268e−003 |
| 6.2579e−003 | 5.1888e−003 | 8.8678e−003 | 3.8835e−003 |
| 1.3898e−005 | 7.1327e−005 | 2.7926e−005 | 6.3507e−003 |

Table 10 tabulates the RMS delays spreads in seconds of the vertical impulse responses of 16 receiver locations for the initial receiver range 5 km and coarse silt bottom profile, where the Mean=7.5093e−003 sec; and the Variance=4.7592e−006 $sec^2$.

TABLE 10

| | | | |
|---|---|---|---|
| 6.7665e−003 | 3.3315e−003 | 7.5743e−003 | 1.3942e−002 |
| 7.9761e−003 | 8.2429e−003 | 5.3396e−003 | 8.4403e−003 |
| 6.2468e−003 | 7.1504e−003 | 6.4799e−003 | 8.8529e−003 |
| 7.2283e−003 | 9.1681e−003 | 7.6309e−003 | 5.7781e−003 |

Frequency Response Graphs

Frequency response graphs are shown in FIGS. 23-28 of this application, which FIGS. are described in the Brief Description of the Drawings section of this specification.

DC Average and Variance of Impulse Response

DC Average of 16 Receiver Locations

Table 11 tabulates the DC average of pressure impulse responses of 16 receiver locations for the initial receiver range 5 km and coarse silt bottom profile, the Mean=3.0599e−007−1.9459e−007i volts and the Variance=3.3339e−015 $volts^2$.

TABLE 11

| | | | |
|---|---|---|---|
| 2.9167e−007 − 2.7054e−007i | 2.8836e−007 − 2.5150e−007i | 2.8365e−007 − 2.5809e−007i | 2.8414e−007 − 2.5944e−007i |
| 2.7805e−007 − 2.0936e−007i | 2.7212e−007 − 2.0756e−007i | 2.6753e−007 − 2.3233e−007i | 2.6395e−007 − 2.4467e−007i |
| 3.1800e−007 − 1.2913e−007i | 3.2749e−007 − 1.3762e−007i | 3.3551e−007 − 1.4077e−007i | 3.4980e−007 − 1.4702e−007i |
| 3.3220e−007 − 1.5194e−007i | 3.3445e−007 − 1.5557e−007i | 3.3393e−007 − 1.6178e−007i | 3.3507e−007 − 1.5610e−007i |

Table 12 tabulates the DC average of horizontal velocity impulse responses of 16 receiver locations for the initial receiver range 5 km and coarse silt bottom profile, with the mean=4.7455e−009+2.1994e−009i volts, and the variance=3.6647e−016 volts$^2$.

TABLE 12

| | | | |
|---|---|---|---|
| 6.6057e−010 + 1.5020e−009i | 1.3568e−009 + 5.7642e−010i | −8.4739e−010 − 2.6309e−009i | 1.7076e−009 − 3.7261e−009i |
| 7.5881e−008 + 1.9213e−008i | 1.0032e−009 + 5.6935e−009i | 5.7491e−010 + 2.9016e−009i | 1.2419e−009 + 1.5540e−009i |
| −2.9399e−009 + 1.7107e−009i | −4.3425e−009 + 1.0370e−009i | 7.7737e−010 + 9.2280e−010i | 1.1982e−010 + 4.7719e−009i |
| 2.5603e−009 − 4.2359e−009i | 6.1753e−010 + 5.8366e−010i | −9.2994e−010 + 3.1771e−009i | −1.5129e−009 + 2.1389e−009i |

Table 13 tabulates the DC average of vertical velocity impulse responses of 16 receiver locations for the initial receiver range 5 km and coarse silt bottom profile, with the mean=9.8234e−009+9.9006e−009i volts, and the variance=8.7187e−015 volts$^2$.

TABLE 13

| | | | |
|---|---|---|---|
| −2.1920e−009 + 1.3655e−008i | 5.5496e−009 + 1.1230e−008i | −2.9389e−008 − 1.5795e−008i | −2.0293e−008 − 1.1540e−008i |
| 6.5780e−008 − 7.8851e−008i | −9.3349e−009 − 7.9924e−008i | −6.7198e−009 − 6.4363e−008i | −1.1755e−009 − 2.3301e−008i |
| −1.3287e−008 + 1.6274e−008i | −3.7379e−008 + 2.0155e−008i | 7.9289e−008 + 3.1381e−007i | 9.7886e−008 + 3.0416e−008i |
| 8.7641e−009 + 3.2639e−009i | −1.1505e−008 + 1.4123e−008i | 2.9362e−008 + 1.9363e−009i | 1.8195e−009 + 7.3265e−009i |

Variance of 16 Receiver Locations

Table 14 tabulates the variance of pressure impulse responses of 16 receiver locations for the initial receiver range 5 km and coarse silt bottom profile, with the Mean=2.6326e−010 volts$^2$, and the Variance=2.1769e−021 volts$^4$.

TABLE 14

| | | | |
|---|---|---|---|
| 3.2815e−010 | 3.2197e−010 | 3.2532e−010 | 3.1286e−010 |
| 2.7626e−010 | 2.8637e−010 | 3.0096e−010 | 3.1226e−010 |
| 2.0533e−010 | 2.1380e−010 | 2.1696e−010 | 2.2059e−010 |
| 2.1896e−010 | 2.2403e−010 | 2.2173e−010 | 2.2662e−010 |

Table 15 tabulates the variance of horizontal velocity impulse responses of 16 receiver locations for the initial receiver range 5 km and coarse silt bottom profile, with the Mean=4.9842e−008 volts$^2$, and the Variance=1.0815e−014 volts$^4$.

TABLE 15

| | | | |
|---|---|---|---|
| 3.8951e−007 | 8.3081e−015 | 1.7792e−014 | 2.0790e−014 |
| 2.1401e−007 | 7.8156e−014 | 6.3765e−008 | 1.1605e−014 |
| 1.2107e−013 | 7.8788e−014 | 1.6078e−014 | 1.0430e−007 |
| 6.9255e−009 | 2.1449e−009 | 1.6821e−008 | 1.2319e−014 |

Table 16 tabulates the variance of vertical velocity impulse responses of 16 receiver locations for the initial receiver range 5 km and coarse silt bottom profile, with the mean=2.0924e−007 volts$^2$, and the variance=2.2985e−014 volts$^4$.

TABLE 16

| | | | |
|---|---|---|---|
| 5.1769e−007 | 3.7048e−007 | 7.1930e−008 | 1.1122e−008 |
| 3.5306e−007 | 4.2549e−007 | 1.5616e−007 | 1.0887e−008 |
| 1.5511e−007 | 7.5536e−008 | 1.1903e−007 | 2.9605e−007 |
| 3.7110e−007 | 1.4903e−007 | 1.5333e−007 | 1.1186e−007 |

Figure 29:
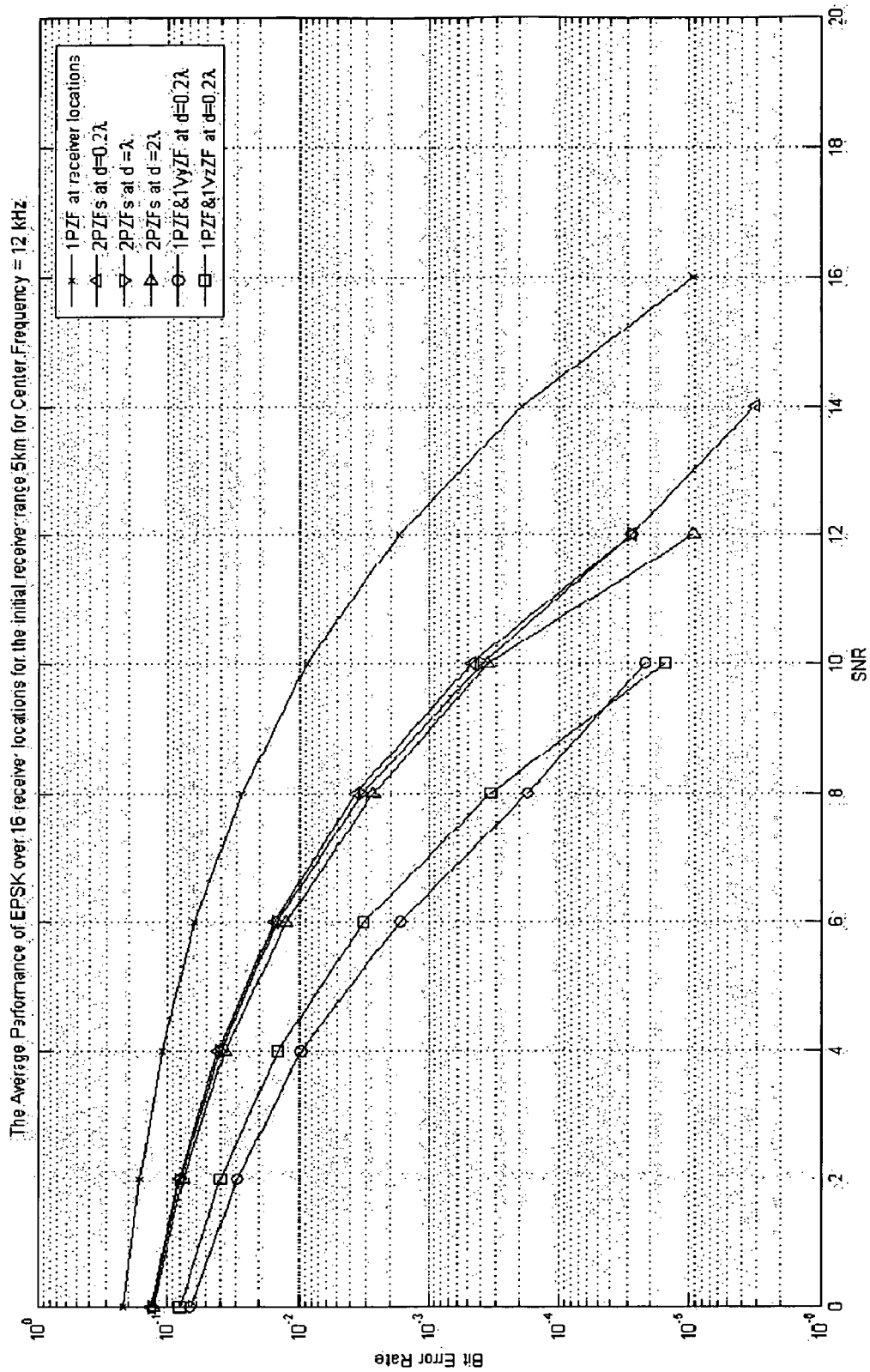
FIG. 29 is a graph of the average bit error rate over 16 receiver locations for the initial receiver range of 5 km and with a coarse silt profile.
Figure 30:
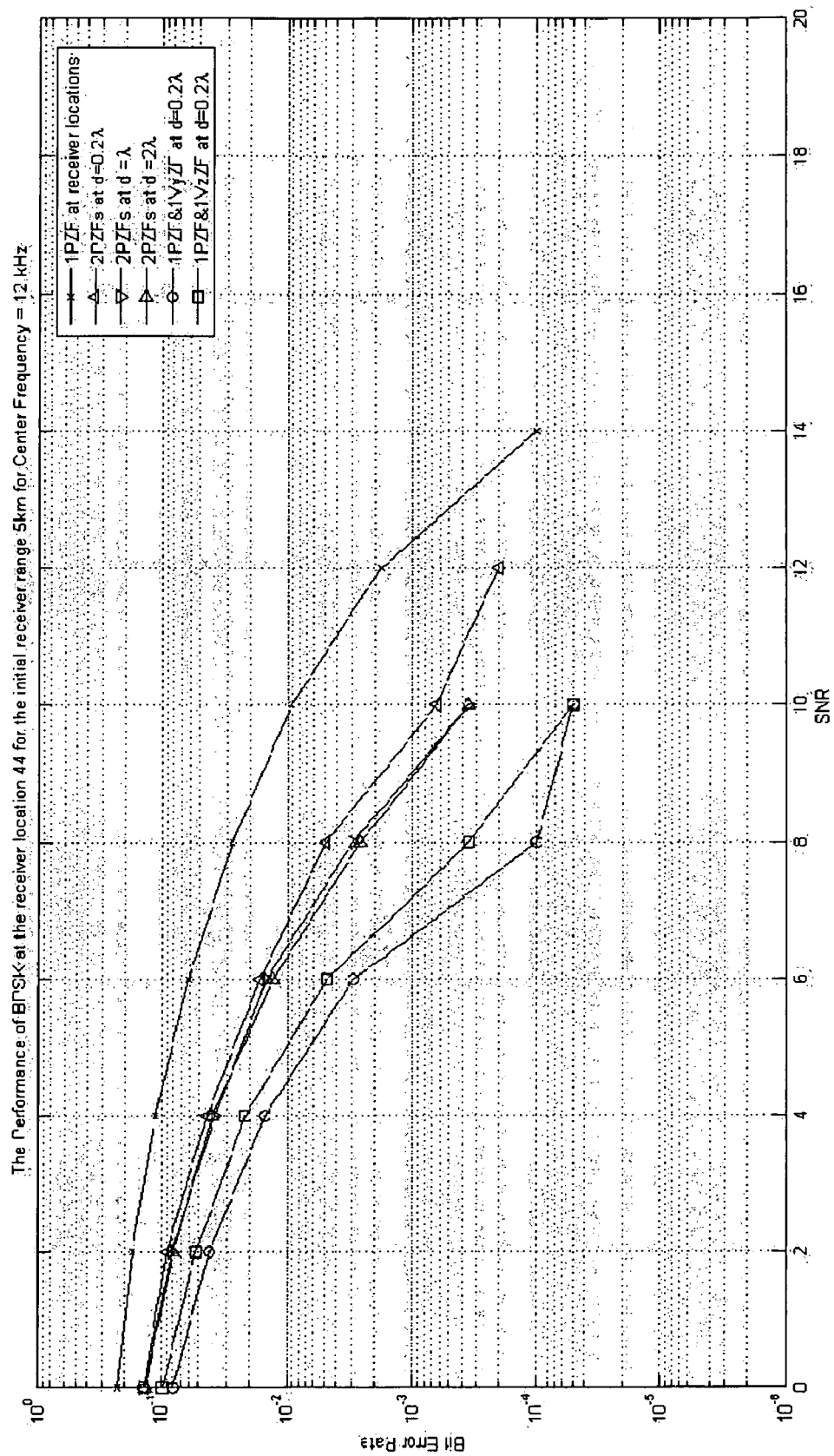
FIG. 30 is a graph of the bit error rate at the receiver location 44 for the initial receiver range of 5 km and with a coarse silt profile.
Figure 31:
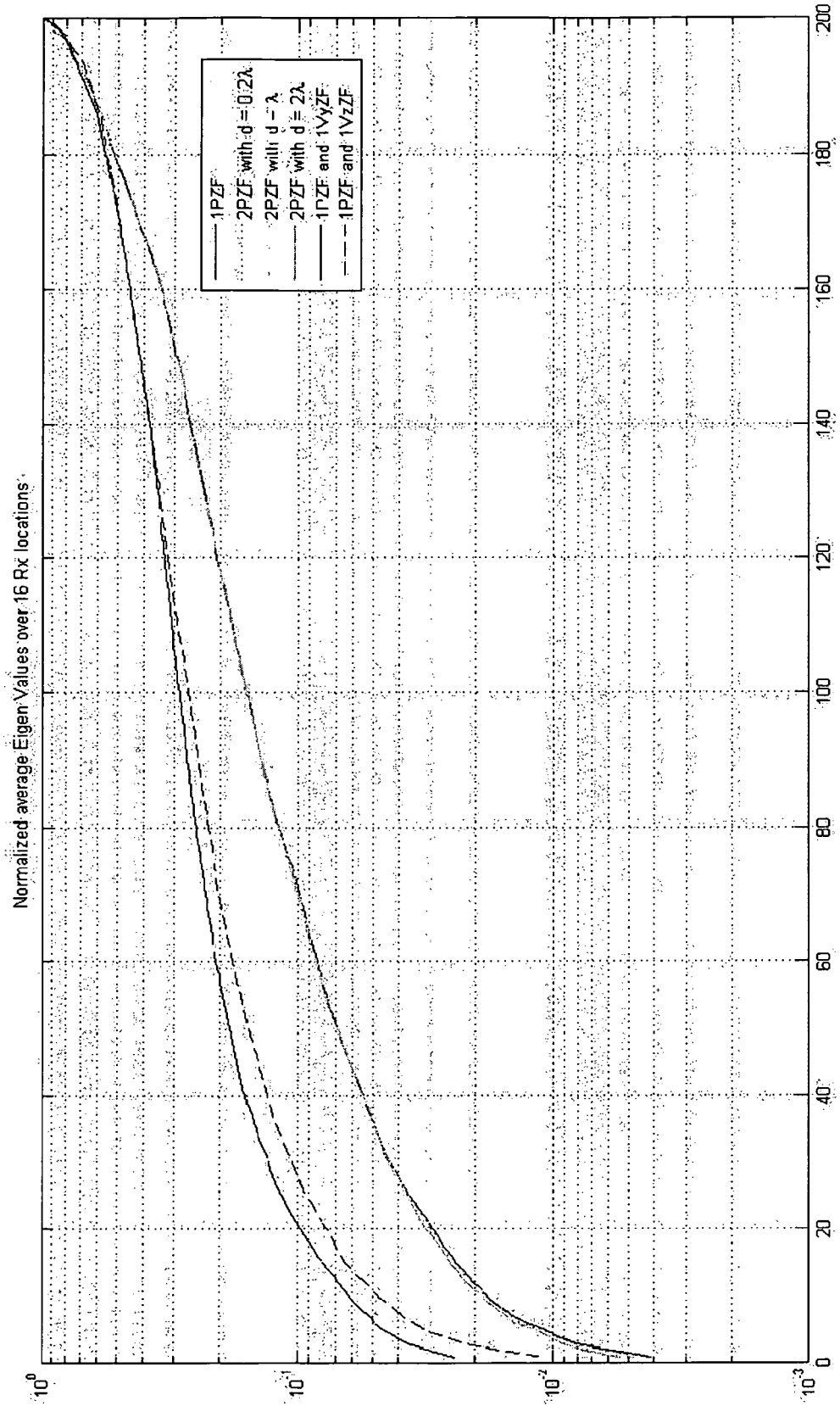
FIG. 31 is a graph of the normalized average eigen-values over 16 receiver locations for the initial receiver range of 5 km and with a coarse silt profile.
Figure 32:
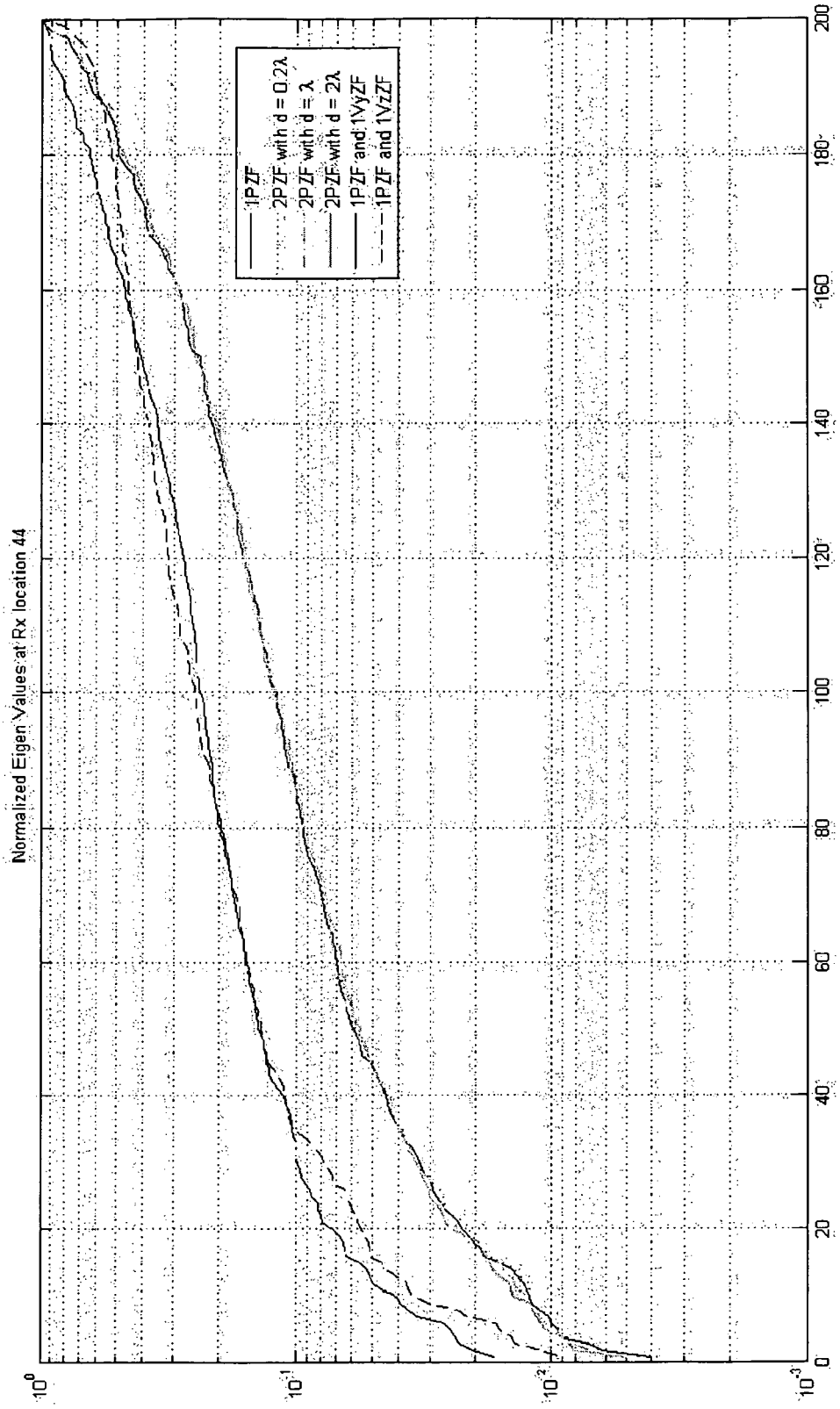
FIG. 32 is a graph of the normalized eigen-values at receiver location 44 for the initial receiver range of 5 km and with a coarse silt profile.
Figure 33:
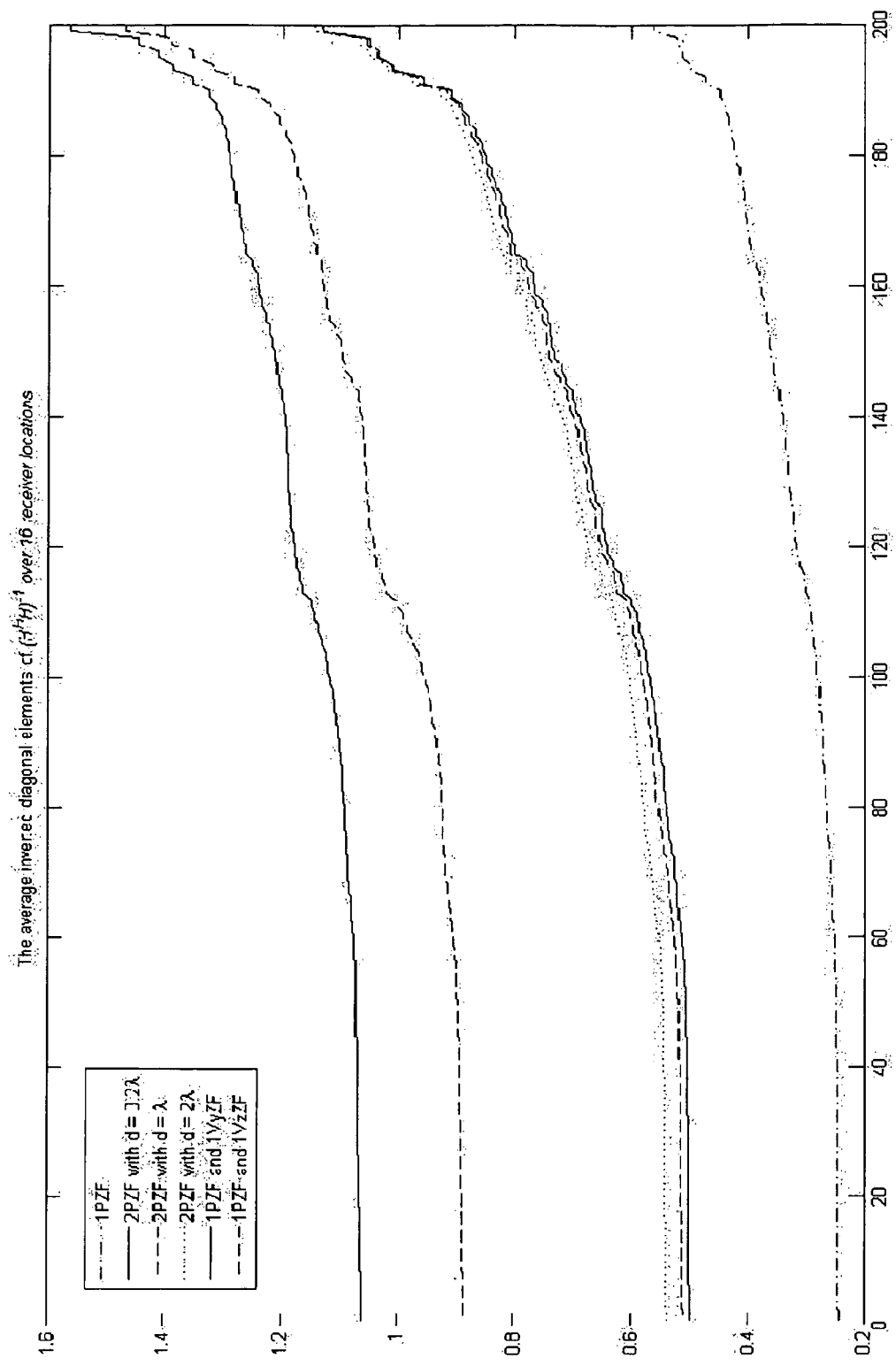
FIG. 33 is a graph of the average of inverted diagonal elements of $(H^H H)^{-1}$ over 16 receiver locations for the initial receiver range of 5 km and with a coarse silt profile.
Figure 34:
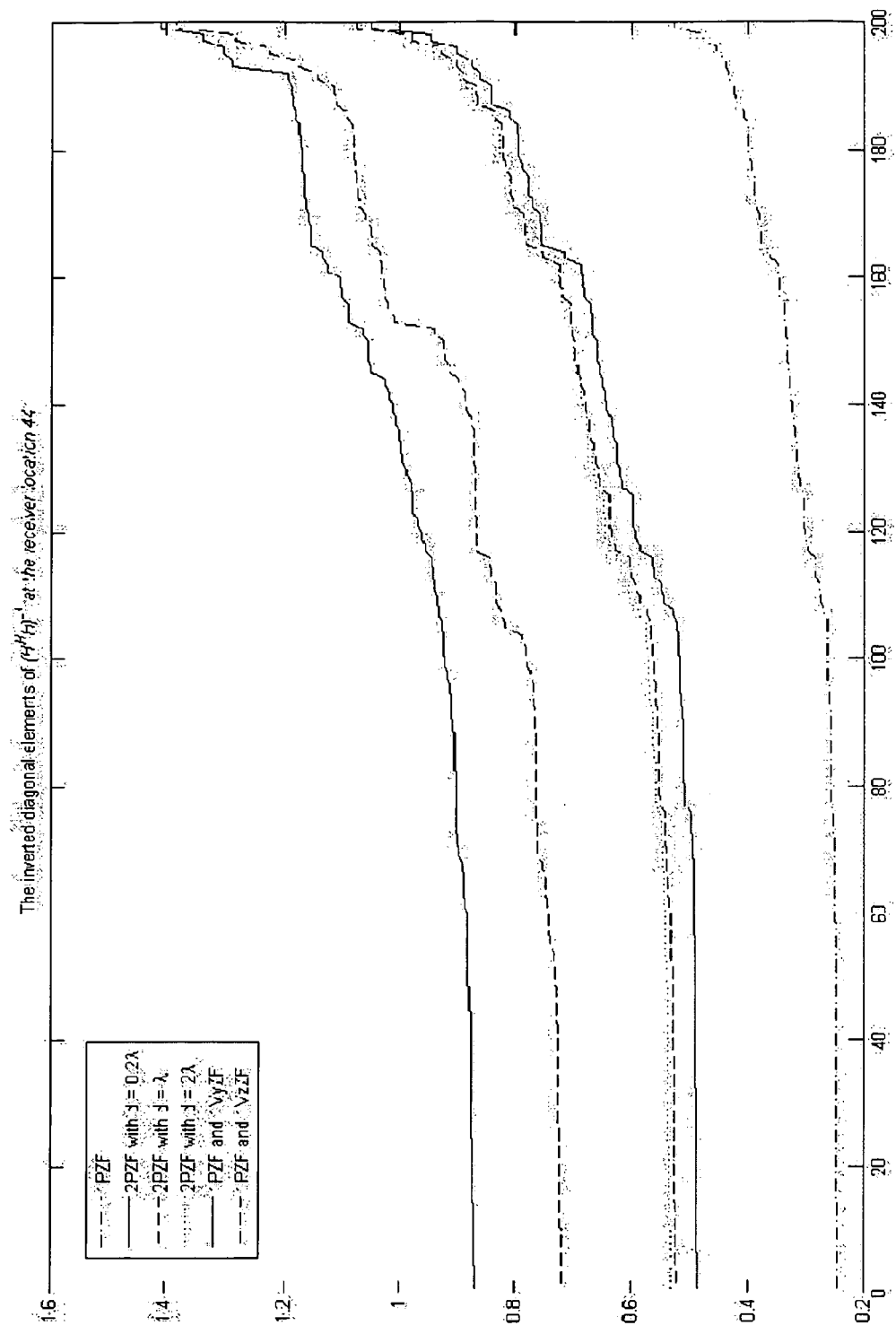
FIG. 34 is a graph of the inverted diagonal elements of $(H^H H)^{-1}$ at receiver location 44 for the initial receiver range of 5 km and with a coarse silt profile.
Figure 35:
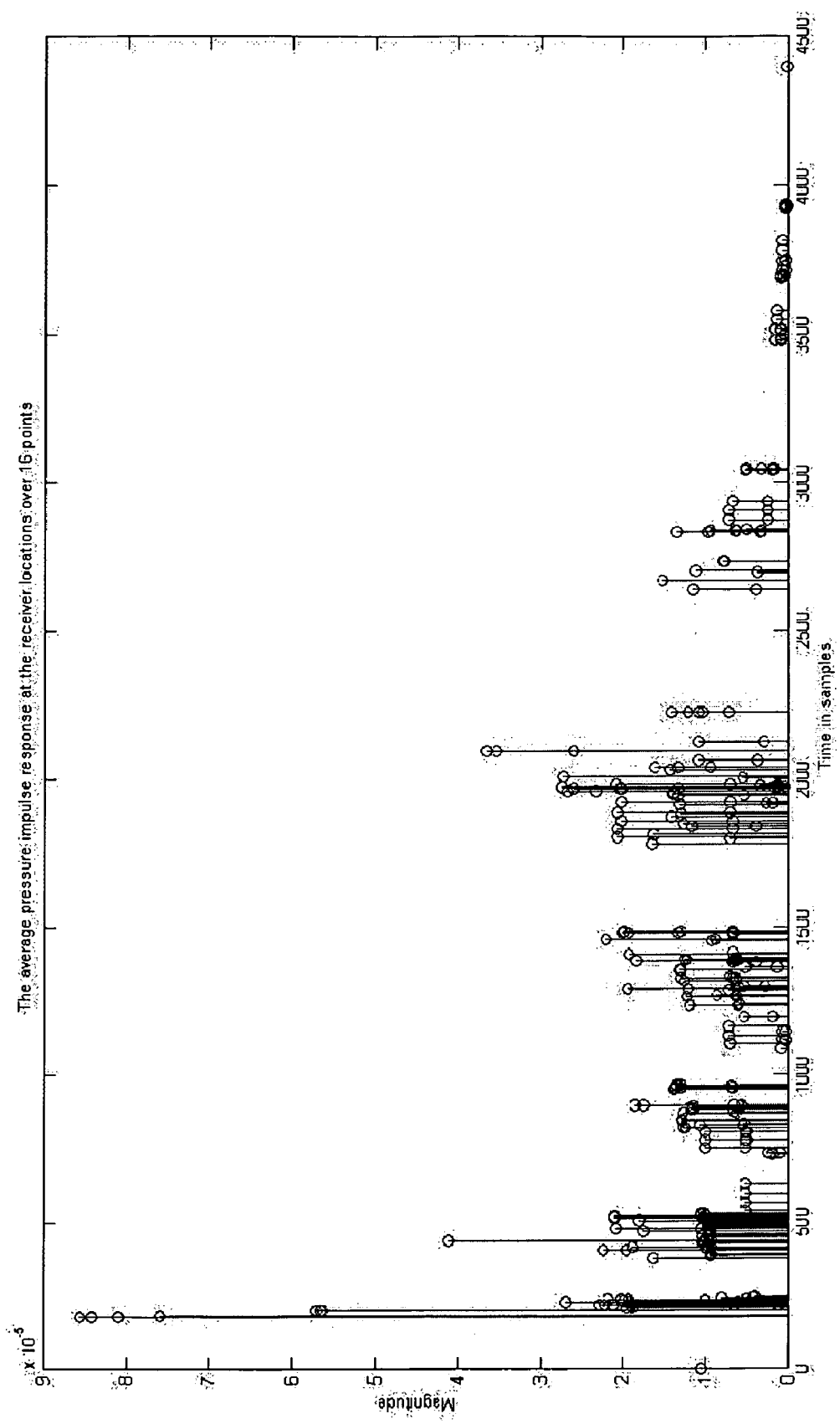
FIG. 35 is a graph of the average pressure impulse response over 16 receiver locations for an initial receiver range of 10 km and with a coarse silt bottom profile.
Figure 36:
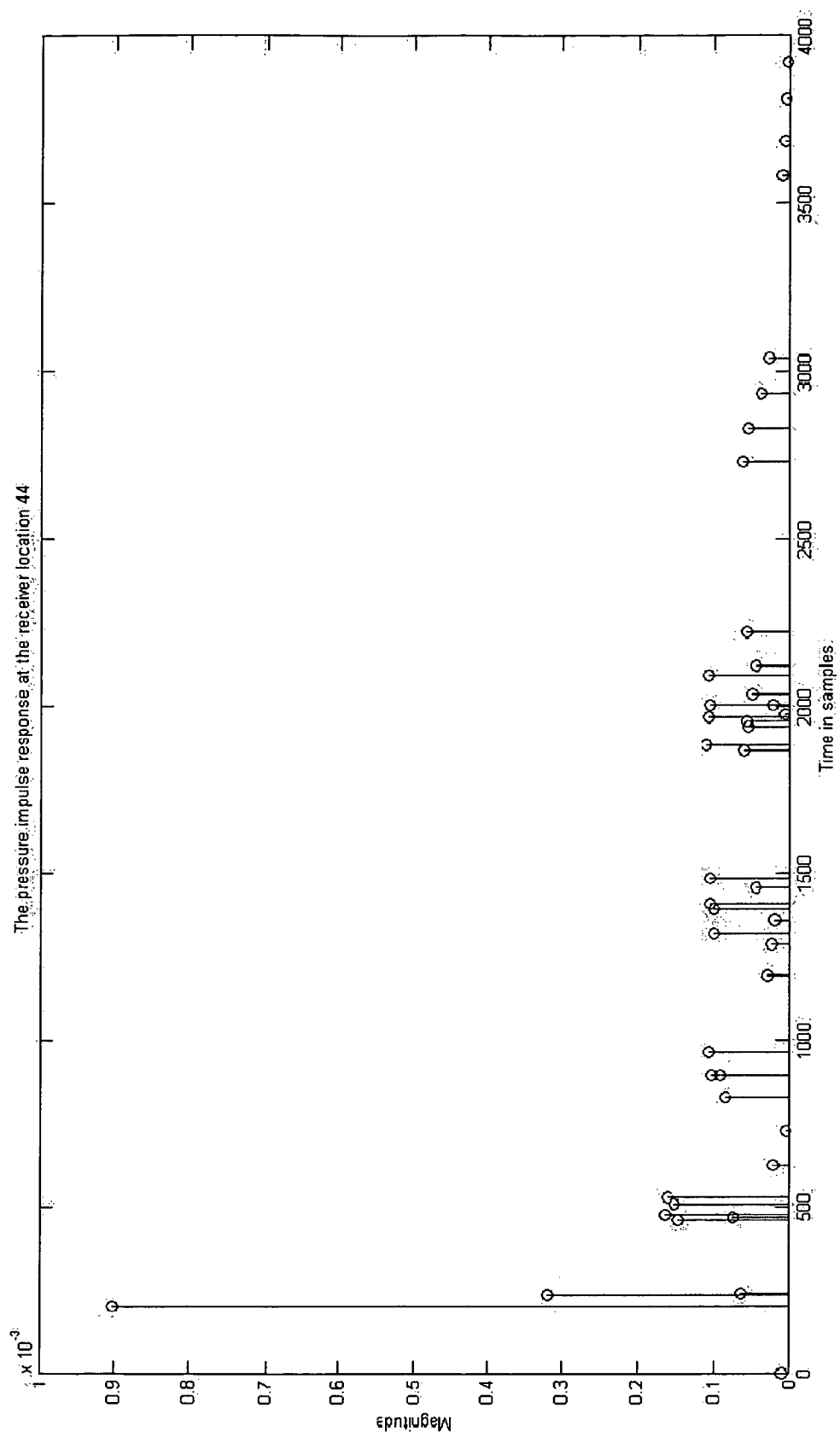
FIG. 36 is a graph of the pressure impulse response at receiver location 44 for an initial receiver range of 10 km and with a coarse silt bottom profile.
Figure 37:
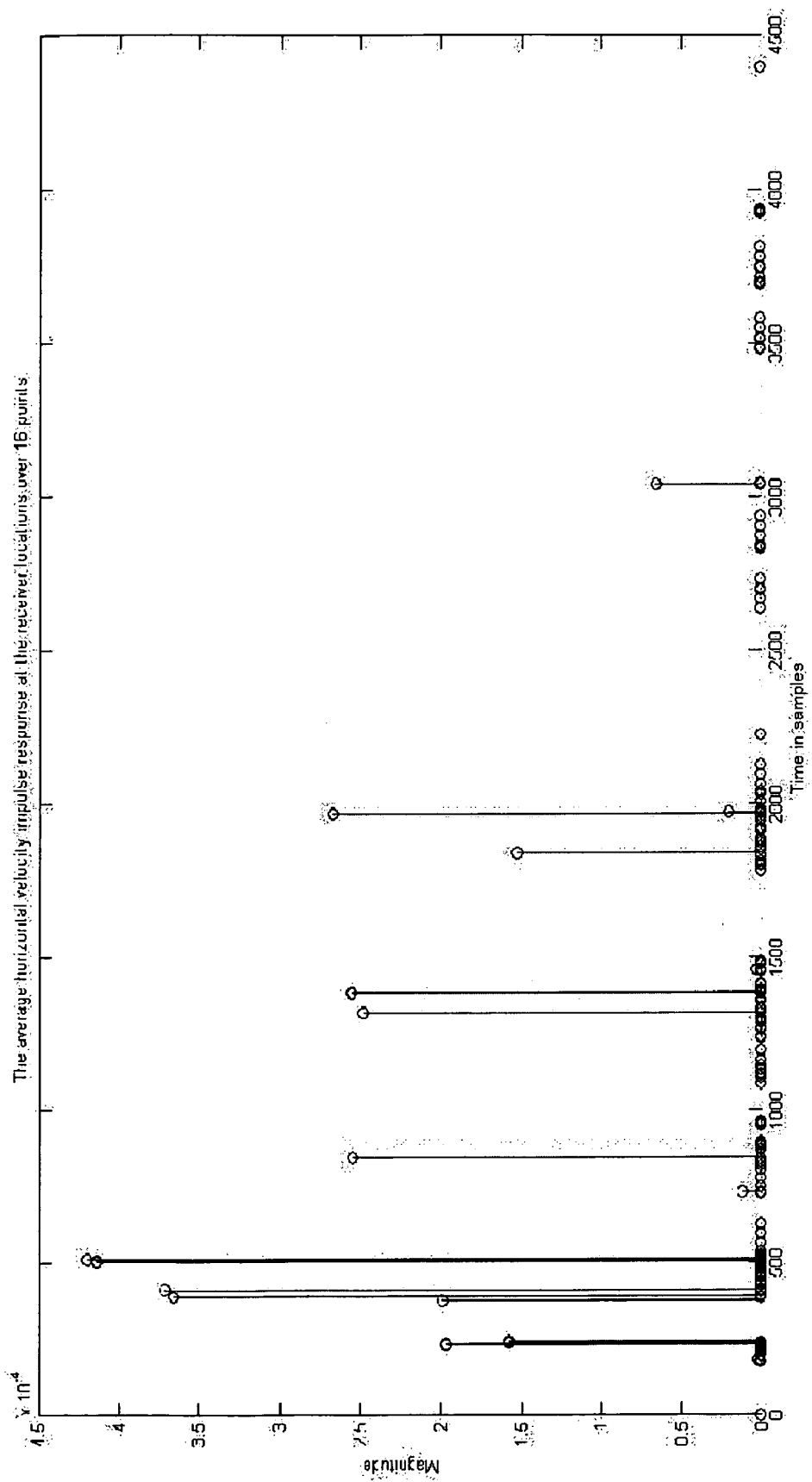
FIG. 37 is a graph of the average horizontal velocity impulse response over 16 receiver locations for the initial receiver range of 10 km and with a coarse silt bottom profile.
Figure 38:
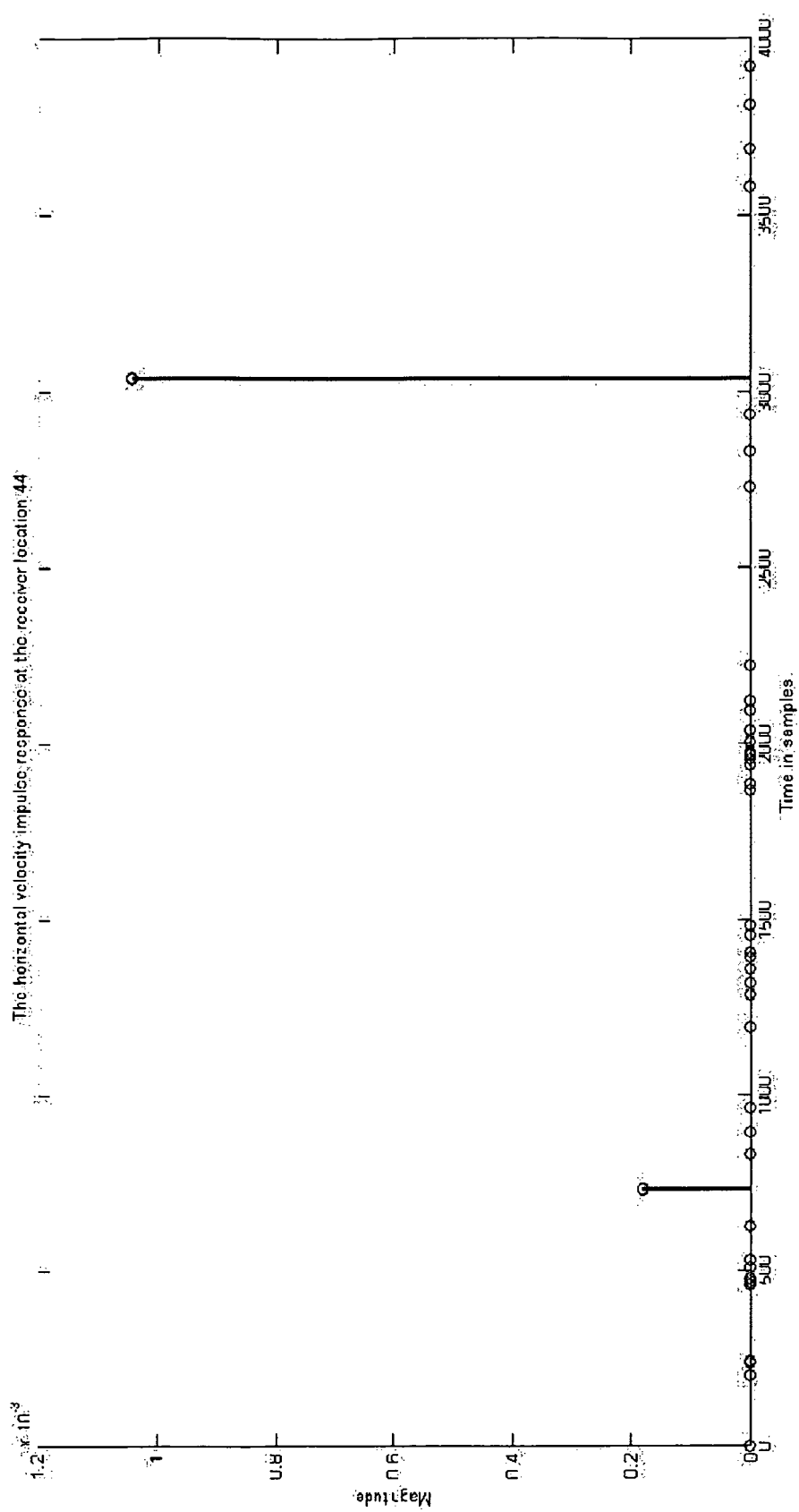
FIG. 38 is a graph of the horizontal velocity impulse response at the receiver location 44 for the initial receiver range of 10 km and with a coarse silt bottom profile.
Figure 39:
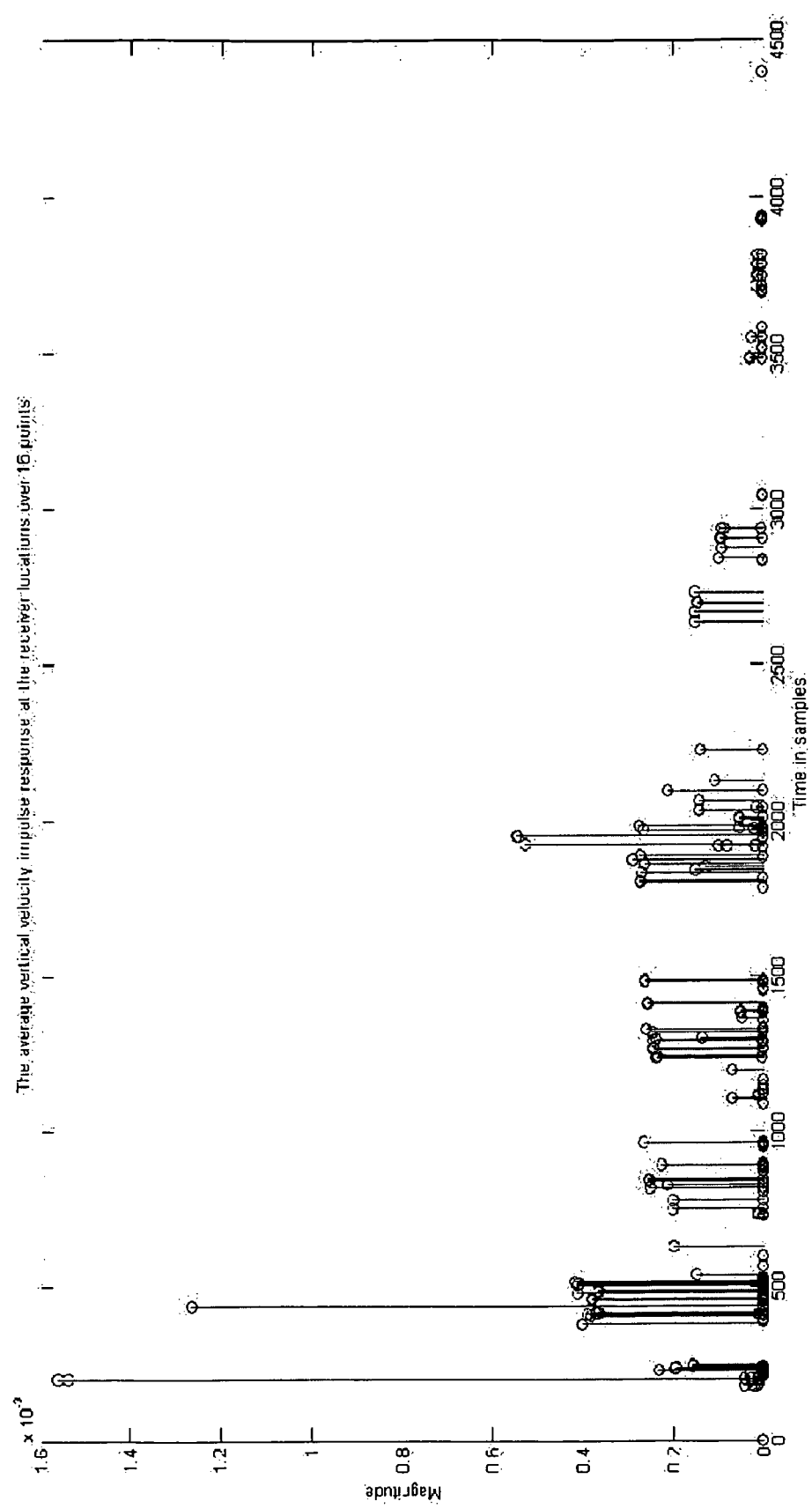
FIG. 39 is a graph of the average vertical velocity impulse response over 16 receiver locations for the initial receiver range of 10 km and with a coarse silt bottom profile.
Figure 40:
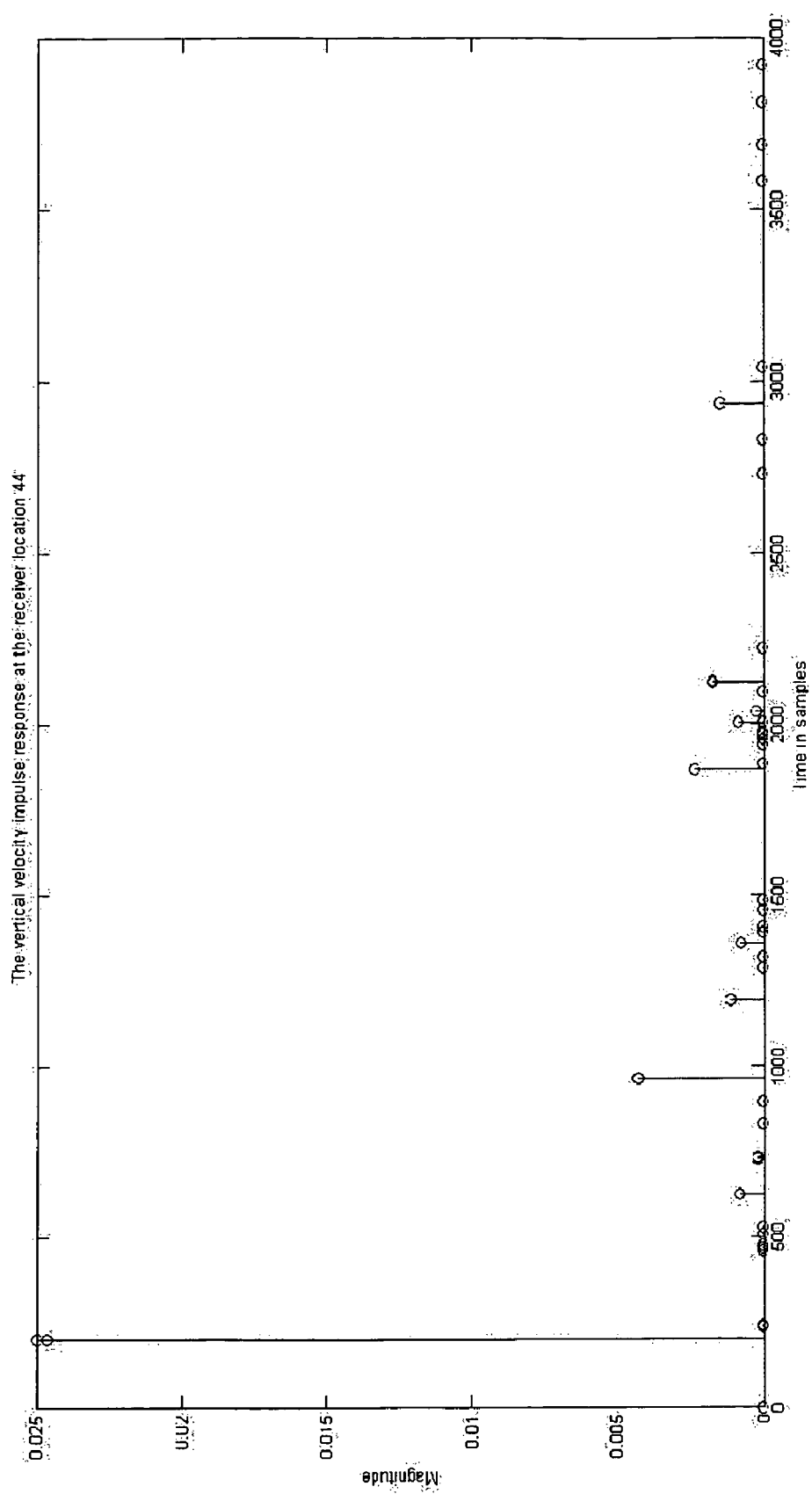
FIG. 40 is a graph of the vertical velocity impulse response at the receiver location 44 for the initial receiver range of 10 km and with a coarse silt bottom profile.
Figure 41:
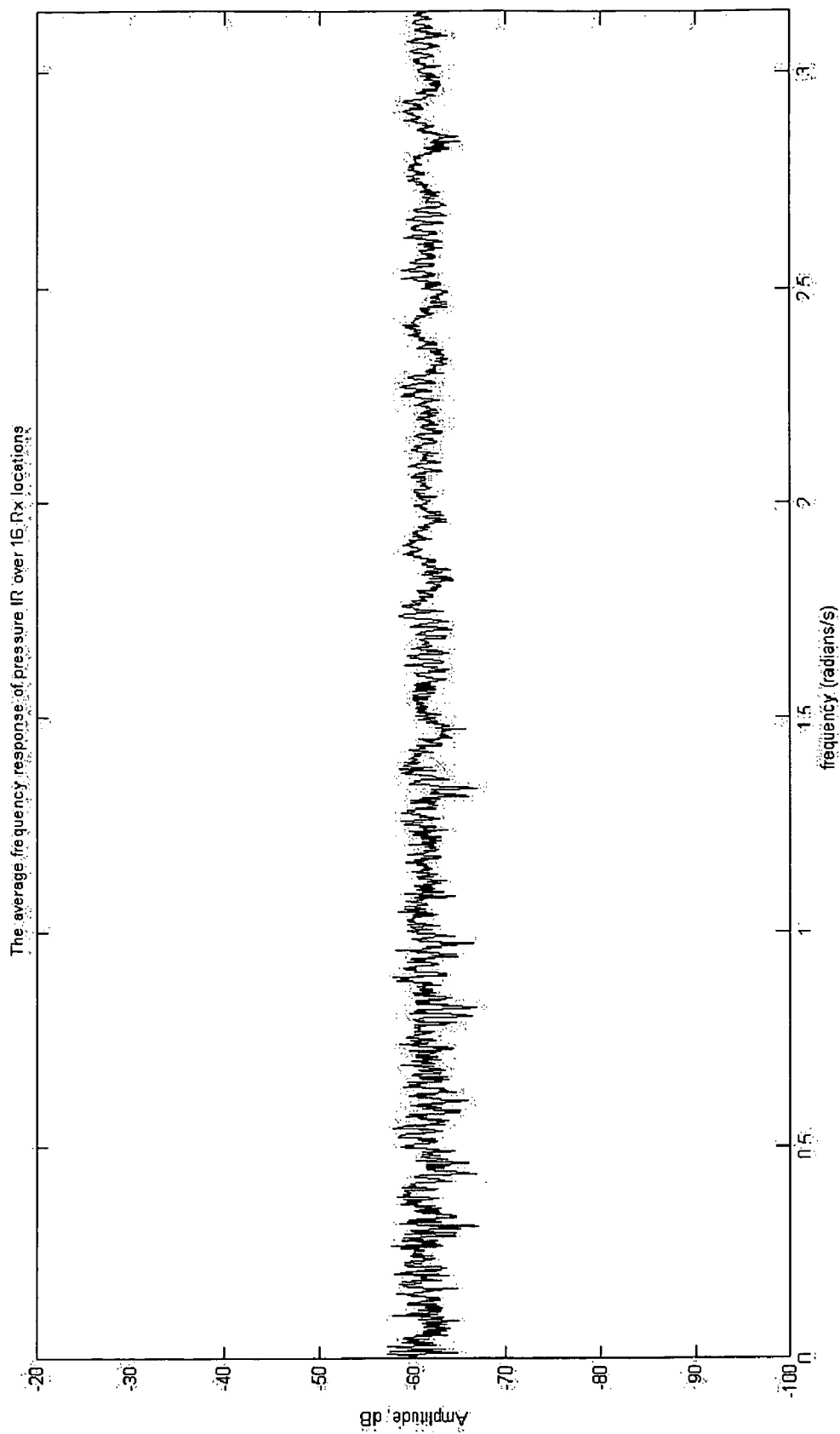
FIG. 41 is a graph of the average frequency response of the pressure impulse response over 16 receiver locations for the initial receiver range of 10 km and with a coarse silt bottom profile.
Figure 42:
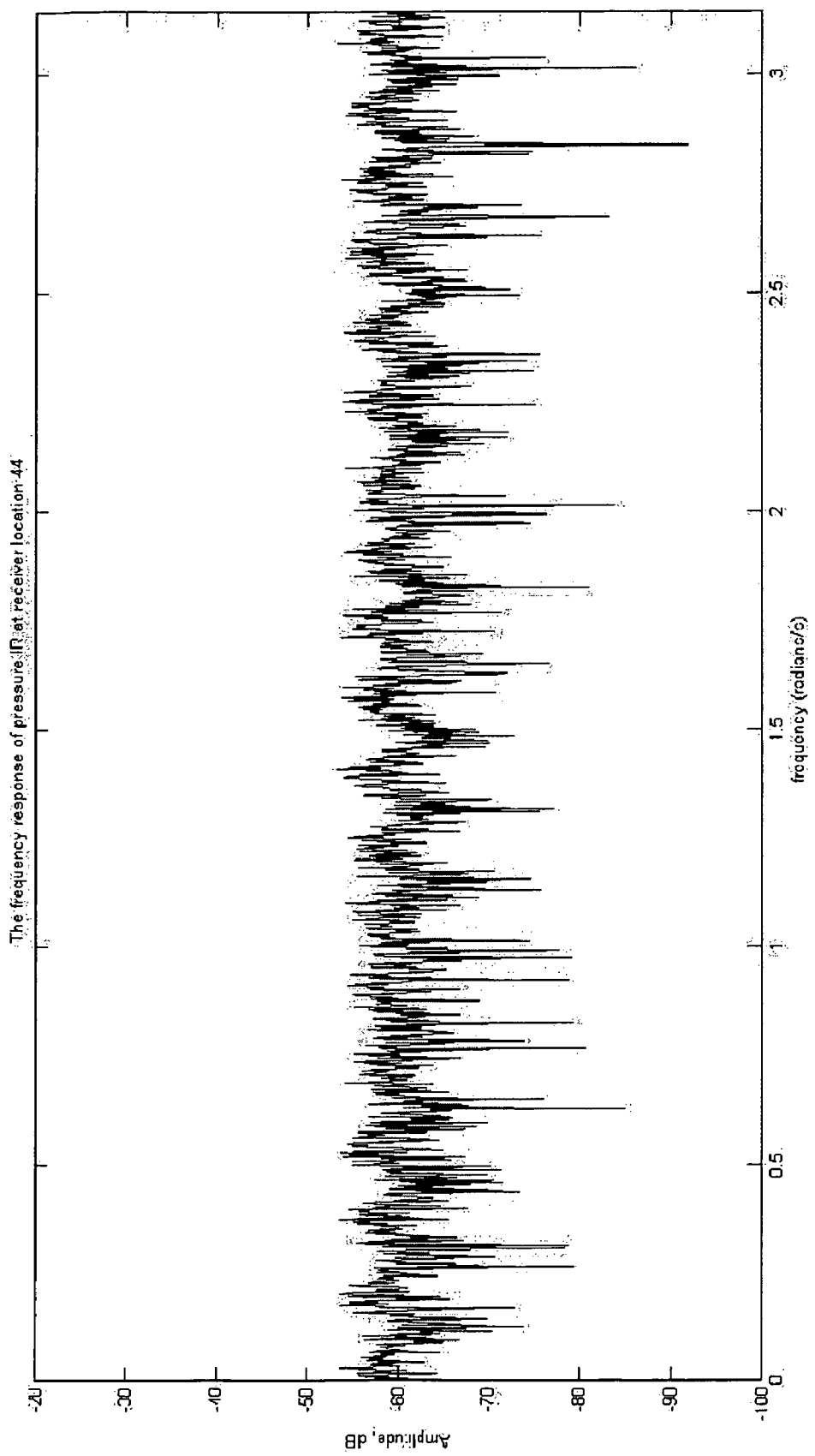
FIG. 42 is a graph of the frequency response of the pressure impulse response at the receiver location 44 for the initial receiver range of 10 km and with a coarse silt bottom profile.
Figure 43:
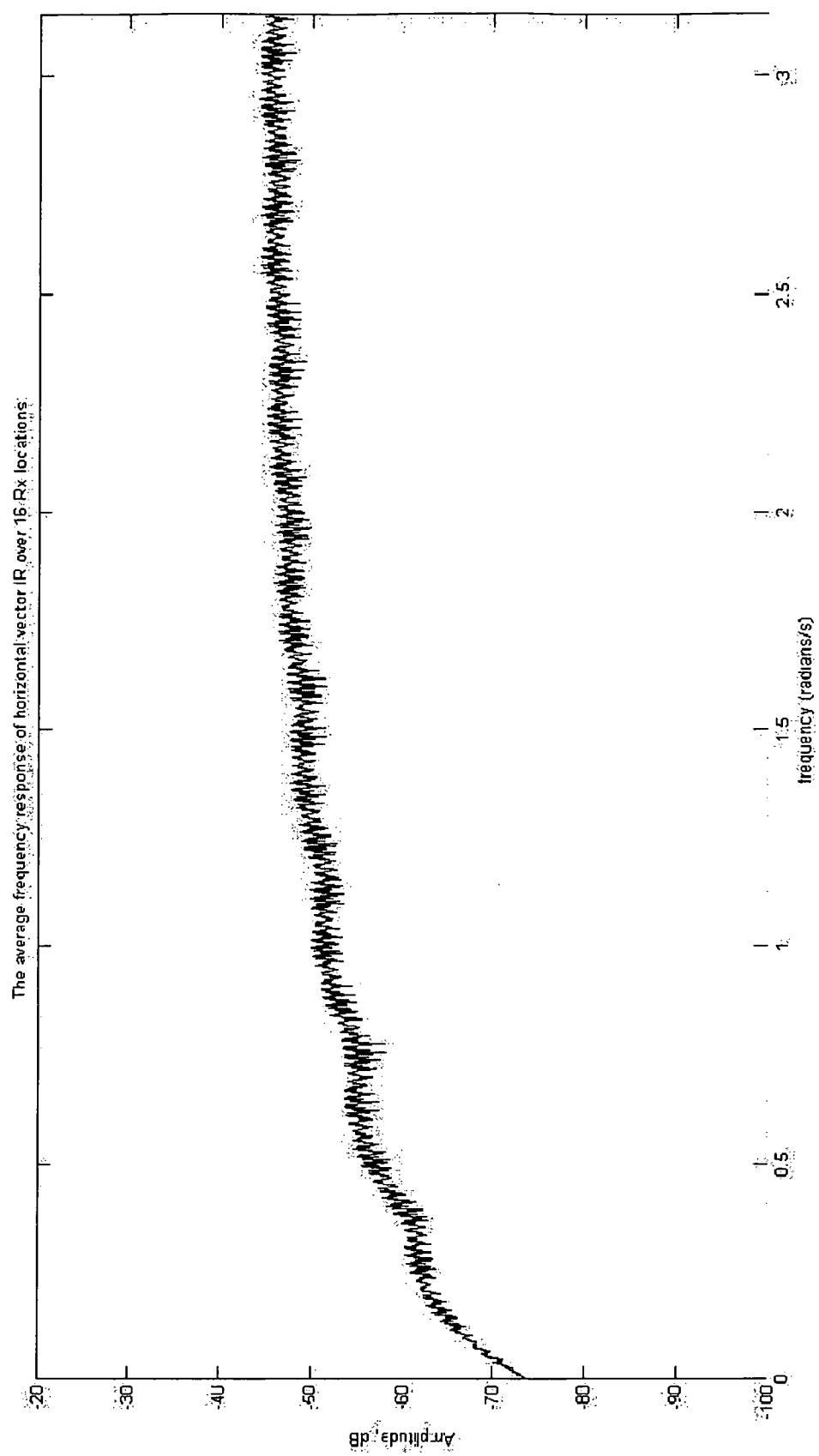
FIG. 43 is a graph of the average frequency response of the horizontal velocity impulse response over 16 receiver locations for the initial receiver range of 10 km and with a coarse silt bottom profile.
Figure 44:
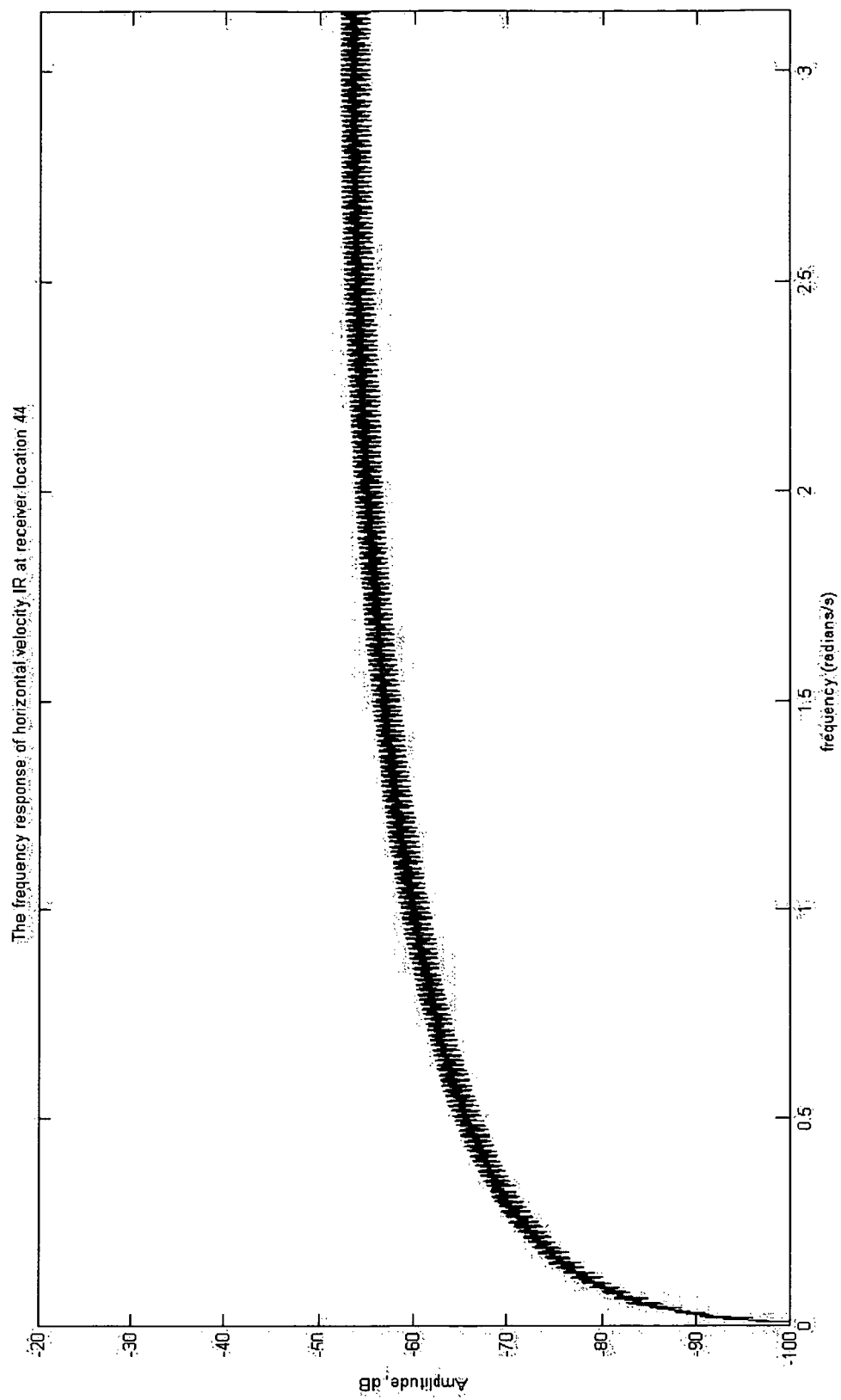
FIG. 44 is a graph of the frequency response of the horizontal velocity impulse response at receiver location 44 for the initial receiver range of 10 km and with a coarse silt bottom profile.
Figure 45:
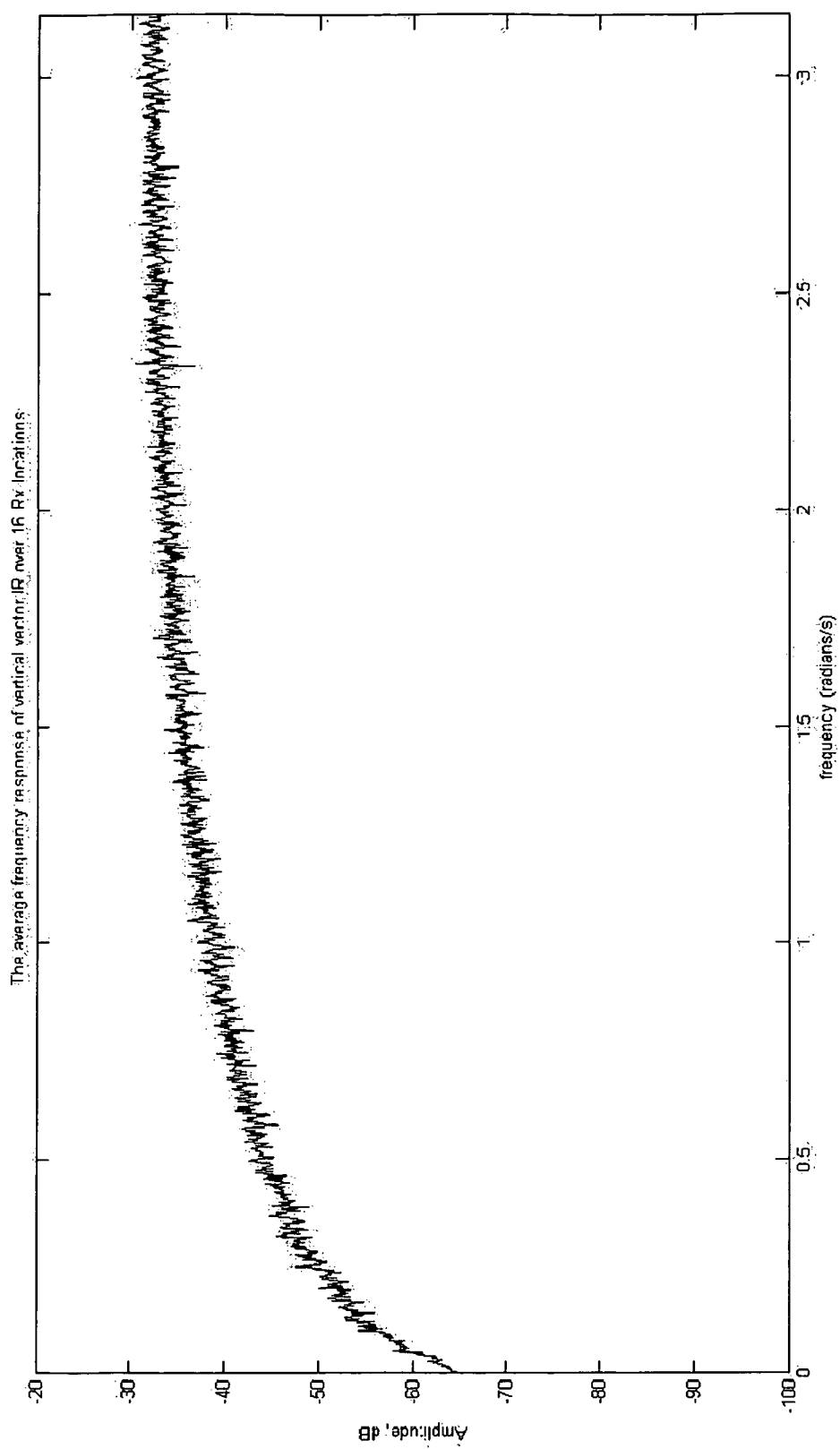
FIG. 45 is a graph of the average frequency response of the vertical velocity impulse response over 16 receiver locations for the initial receiver range of 10 km and with a coarse silt bottom profile.
Figure 46:
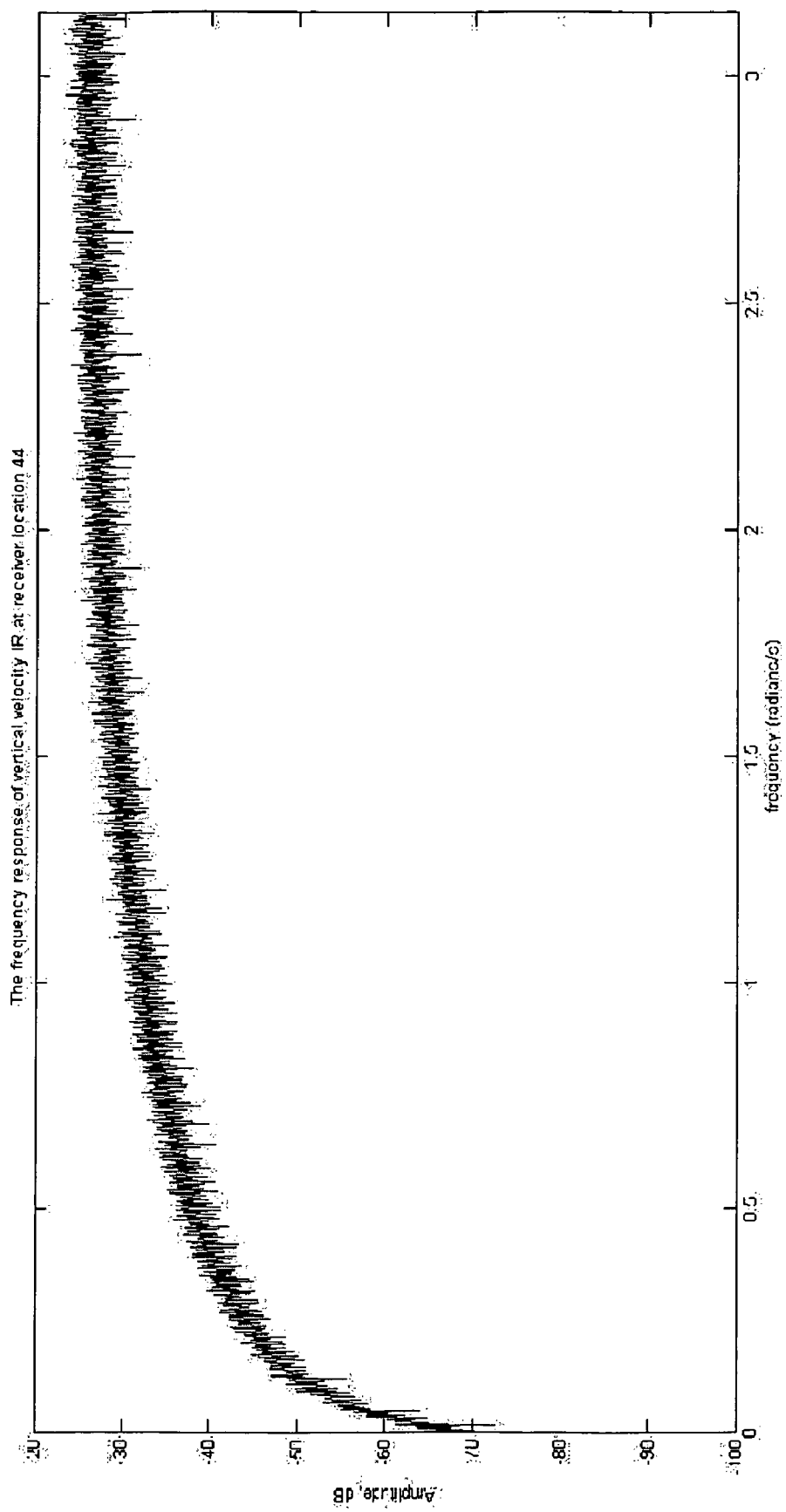
FIG. 46 is a graph of the frequency response of the vertical velocity impulse response at receiver location 44 for the initial receiver range of 10 km and with a coarse silt bottom profile.

Bit Error Rate Plots; Eigen Values Plots; and Plots of Inverted Diagonal Elements of $(H^H H)^{-1}$:

Bit error rate plots are shown in FIGS. 29-30, Eigen Value plots in FIGS. 31-32, and Inverted Diagonal Elements of $(H^H H)^{-1}$ in FIGS. 33-34 of this application, which FIGS. are described in the Brief Description of the Drawings section of this specification.

The Condition Number of $H^H H$

Table 17 tabulates the condition numbers of $H^H H$ of SISO ZF receivers of 16 receiver locations for the initial receiver range 5 km and coarse silt bottom profile, where the mean 350.3018, and the variance=6.8536e+004.

TABLE 17

| | | | |
|---|---|---|---|
| 174.7833 | 187.0340 | 134.2191 | 115.4964 |
| 391.6841 | 720.3961 | 201.0670 | 311.0691 |
| 135.0922 | 332.2272 | 500.4217 | 323.2856 |
| 193.7904 | 1159.7169 | 473.9687 | 250.5773 |

Table 18 tabulates the condition numbers of $H^H H$ of SIMO ZF receivers when using two pressure sensors separated at the distance of 0.2λ, of 16 receiver locations for the initial receiver range 5 km and coarse silt bottom profile, where the mean=310.0675, and the variance=2.5314e+004.

TABLE 18

| | | | |
|---|---|---|---|
| 145.8865 | 140.8707 | 141.0332 | 113.4328 |
| 508.9435 | 512.7829 | 186.8976 | 314.7225 |
| 115.0879 | 329.9400 | 457.0189 | 353.4148 |
| 329.4659 | 646.7395 | 402.2912 | 262.55209 |

Table 19 tabulates the condition numbers of $H^H H$ of SIMO ZF receivers, when using two pressure sensors separated at the distance of λ, for 16 receiver locations for the initial receiver range 5 km and coarse silt bottom profile, where the mean=263.0749, and the variance=1.3027e+004.

TABLE 19

| | | | |
|---|---|---|---|
| 148.6084 | 145.5011 | 116.0156 | 108.3062 |
| 339.6061 | 382.0975 | 262.5916 | 304.6593 |
| 89.9083 | 346.0485 | 486.2080 | 336.5019 |
| 341.0109 | 353.9139 | 272.9246 | 175.2962 |

Table 20 tabulates the condition numbers of $H^H H$ of SIMO ZF receivers, when using two pressure sensors separated at the distance of $2\lambda$, of 16 receiver locations for the initial receiver range 5 km and coarse silt bottom profile, where the mean=221.5968, and the variance=8.8299e+003.

TABLE 20

| | | | |
|---|---|---|---|
| 126.6287 | 123.4037 | 99.5444 | 100.7348 |
| 255.5237 | 323.0306 | 189.7123 | 241.8749 |
| 87.1833 | 329.4054 | 412.1298 | 332.8520 |
| 242.0127 | 229.0662 | 252.2919 | 200.1545 |

Table 21 tabulates the condition numbers of $H^H H$ of SIMO ZF receivers, when using a pressure sensor and a horizontal velocity vector sensor separated at the distance of $0.2\lambda$, of 16 receiver locations for the initial receiver range 5 km and coarse silt bottom profile, where the mean=63.4770, and the variance=1.0247e+003.

TABLE 21

| | | | |
|---|---|---|---|
| 73.5515 | 55.7770 | 47.8057 | 21.9173 |
| 101.4017 | 18.6332 | 82.7542 | 10.7095 |
| 62.3913 | 67.2962 | 35.5706 | 140.9055 |
| 69.3885 | 83.6158 | 83.8452 | 60.0682 |

Table 22 tabulates the condition numbers of $H^H H$ of SIMO ZF receivers, when using a pressure sensor and a vertical velocity vector sensor separated at the distance of $0.2\lambda$, of 16 receiver locations for the initial receiver range 5 km and coarse silt bottom profile, where the mean=113.7906, and the variance=6.3834e+003.

TABLE 22

| | | | |
|---|---|---|---|
| 110.1860 | 78.6171 | 66.9628 | 51.5509 |
| 101.5006 | 130.1256 | 151.4113 | 88.9153 |
| 85.7122 | 54.0372 | 49.2232 | 402.9036 |
| 104.4795 | 108.7628 | 125.2582. | 111.0025 |

Simulation Results for the Initial Receiver Range 10 km and Coarse Silt Bottom Profile Graphs for the impulse response are shown in FIGS. 35-40 of this application. Descriptions of FIGS. 35-40 are provided in the Brief Description of the Drawings section of this specification. For the sake of brevity, those descriptions are not repeated in this section.

Mean Excess Delay and RMS Delay Spread

Mean Excess Delays in Seconds of 16 Receiver Locations

Table 23 tabulates the mean excess delays in seconds of the pressure impulse responses of 16 receiver locations for the initial receiver range 10 km and coarse silt bottom profile where the mean=1.2811e−002 sec; and the variance=2.9050e−005 sec².

TABLE 23

| | | | |
|---|---|---|---|
| 1.7848e−002 | 1.8035e−002 | 1.8110e−002 | 1.8316e−002 |
| 1.7954e−002 | 1.8264e−002 | 1.8250e−002 | 1.8340e−002 |

TABLE 23-continued

| | | | |
|---|---|---|---|
| 6.1061e−003 | 6.2303e−003 | 6.4168e−003 | 6.6864e−003 |
| 8.4931e−003 | 8.6519e−003 | 8.6276e−003 | 8.6485e−003 |

Table 24 tabulates the mean excess delays in seconds of the horizontal velocity impulse responses of 16 receiver locations for the initial receiver range 10 km and coarse silt bottom profile, where the mean=1.7664e−002 sec; and the variance=1.8111e−004 sec².

TABLE 24

| | | | |
|---|---|---|---|
| 1.7341e−002 | 1.0573e−002 | 2.8802e−002 | 8.1146e−003 |
| 1.7421e−002 | 1.5838e−002 | 1.9661e−002 | 1.2624e−002 |
| 1.4873e−002 | 1.7509e−002 | 3.9782e−003 | 3.8546e−003 |
| 2.7448e−002 | 1.7590e−002 | 5.0729e−003 | 6.1928e−002 |

Table 25 the mean excess delays in seconds of the vertical velocity impulse responses of 16 receiver locations for the initial receiver range 10 km and coarse silt bottom profile, where the mean=1.8989e−002 sec; and the variance=1.0961e−004 sec².

TABLE 25

| | | | |
|---|---|---|---|
| 2.3476e−002 | 2.2424e−002 | 2.1942e−002 | 1.1029e−002 |
| 3.7363e−002 | 3.1467e−002 | 2.3912e−002 | 1.1373e−002 |
| 3.3654e−002 | 2.4413e−002 | 1.2336e−002 | 2.7665e−002 |
| 5.1568e−003 | 5.0407e−003 | 7.1155e−003 | 5.4512e−003 |

RMS Delays Spreads in Second of 16 Receiver Locations

Table 26 tabulates the RMS delays spreads in seconds of the pressure impulse responses of 16 receiver locations for the initial receiver range 10 km and coarse silt bottom profile, where the mean=1.2125e−002 sec; and the variance=7.7485e−006 sec².

TABLE 26

| | | | |
|---|---|---|---|
| 1.4759e−002 | 1.4753e−002 | 1.4796e−002 | 1.4841e−002 |
| 1.4810e−002 | 1.4819e−002 | 1.4797e−002 | 1.4762e−002 |
| 8.0718e−003 | 8.1354e−003 | 8.3736e−003 | 8.8218e−003 |
| 1.0482e−002 | 1.0628e−002 | 1.0576e−002 | 1.0578e−002 |

Table 27 tabulates the RMS delay spreads in seconds of the horizontal velocity impulse responses of 16 receiver locations for the initial receiver range 10 km and coarse silt bottom profile, where the mean=7.0931e−003 sec; and the variance=4.1892e−005 sec².

TABLE 27

| | | | |
|---|---|---|---|
| 1.2889e−002 | 1.2746e−005 | 1.6591e−005 | 1.0889e−004 |
| 1.0813e−002 | 1.1394e−002 | 1.5334e−002 | 3.2395e−003 |
| 1.4942e−002 | 1.6201e−002 | 2.8427e−003 | 1.6206e−003 |
| 1.4375e−005 | 1.5975e−002 | 1.8255e−005 | 8.0674e−003 |

Table 28 tabulates the RMS delays spreads in seconds of the vertical velocity impulse responses of 16 receiver locations for the initial receiver range 10 km and coarse silt bottom profile, where the mean=1.0364e−002 sec; and the variance=1.7297e−005 sec².

TABLE 28

| | | | |
|---|---|---|---|
| 1.1384e−002 | 1.6476e−002 | 1.3875e−002 | 5.4677e−003 |
| 9.9916e−003 | 1.1500e−002 | 1.3501e−002 | 7.8349e−003 |

TABLE 28-continued

| | | | |
|---|---|---|---|
| 1.2590e−002 | 1.4311e−002 | 8.9795e−003 | 1.7266e−002 |
| 4.7473e−003 | 2.3903e−003 | 9.4289e−003 | 6.0878e−003 |

Frequency Response

Graphs of frequency responses are shown in FIGS. 41-46 of this application. Descriptions of these figures are provided in the Brief Description of the Drawing section of this application. For the sake of brevity, those descriptions are not repeated in this section.

DC Average and Variance of Impulse Response

DC Average Over 16 Receiver Locations

Table 29 tabulates the DC average of pressure impulse responses of 16 receiver locations for the initial receiver range 10 km and coarse silt bottom profile, where the mean=1.0296e−007−4.1454e−007i volts, and the variance=2.4146e−014 volts$^2$.

TABLE 29

| | | | |
|---|---|---|---|
| 1.6053e−007 − 3.1483e−007i | 1.5789e−007 − 3.0622e−007i | 1.3777e−007 − 2.5337e−007i | 1.3830e−007 − 2.5280e−007i |
| 1.6756e−007 − 3.1038e−007i | 1.6457e−007 − 3.0663e−007i | 1.6362e−007 − 3.0513e−007i | 1.6416e−007 − 3.0200e−007i |
| 1.0387e−007 − 6.4537e−007i | 1.0860e−007 − 6.3538e−007i | 1.1322e−007 − 6.2454e−007i | 1.2045e−007 − 6.0801e−007i |
| −1.9289e−008 − 4.4175e−007i | −1.3893e−008 − 4.3797e−007i | −1.1539e−008 − 4.4203e−007i | −8.4808e−009 − 4.4627e−007i |

Table 30 tabulates the DC average of horizontal velocity impulse responses of 16 receiver locations for the initial receiver range 10 km and coarse silt bottom profile, where the mean=−1.4773e−008+4.1137e−008i volts, and the variance=3.0836e−014 volts$^2$.

TABLE 30

| | | | |
|---|---|---|---|
| 3.4953e−011 − 9.6946e−010i | 6.2762e−011 − 1.3569e−009i | 3.2752e−010 − 7.4911e−010i | −2.4382e−007 + 6.8139e−007i |
| −1.4338e−010 + 9.7411e−010i | −2.2035e−011 + 8.8993e−010i | 7.8750e−009 − 8.1507e−009i | 3.5564e−011 − 1.5423e−009i |
| −2.3541e−010 + 4.4331e−010i | −3.2223e−010 − 1.1097e−009i | −2.7745e−010 − 4.3138e−009i | −4.2970e−010 − 6.7617e−009i |
| −9.5761e−010 − 1.4676e−010i | 1.7210e−010 + 2.5419e−010i | 2.2260e−010 − 1.1097e−010i | 1.1167e−009 − 5.4604e−010i |

Table 31 tabulates the DC average of vertical velocity impulse responses of 16 receiver locations for the initial receiver range 10 km and coarse silt bottom profile, where the mean=−2.0701e−008+1.0384e−007i volts, and the variance=5.5415e−014 volts$^2$.

TABLE 31

| | | | |
|---|---|---|---|
| 1.9268e−009 − 6.1383e−009i | 4.0990e−009 + 1.2802e−009i | −1.3564e−007 + 6.8387e−007i | −2.5053e−007 + 6.7650e−007i |
| −7.6537e−009 + 1.6751e−009i | −4.5311e−009 + 7.8922e−009i | −4.0081e−009 − 7.7632e−010i | 2.8225e−009 − 4.4336e−009i |
| 2.1831e−008 + 8.7710e−008i | 1.4093e−007 + 8.2794e−008i | 1.2414e−008 + 5.4368e−008i | 1.3970e−008 + 1.0165e−007i |
| −7.7342e−009 + 2.6532e−009i | −1.2339e−008 − 4.7214e−009i | −1.0023e−007 − 1.9088e−009i | −6.5480e−009 − 2.0943e−008i |

Variance of 16 Receiver Locations

Table 32 tabulates the variance of pressure impulse responses of 16 receiver locations for the initial receiver range 10km and coarse silt bottom profile, where the mean=2.5216e−010 volts$^2$, and the variance=3.3720e−020 volts$^4$.

TABLE 32

| | | | |
|---|---|---|---|
| 9.2910e−011 | 9.0275e−011 | 7.9445e−011 | 7.9089e−011 |
| 9.3392e−011 | 9.2121e−011 | 9.2450e−011 | 9.1496e−011 |
| 5.7011e−010 | 5.5956e−010 | 5.2525e−010 | 4.6812e−010 |
| 3.0140e−010 | 2.9628e−010 | 3.0198e−010 | 3.0075e−010 |

Table 33 tabulates the variance of horizontal velocity impulse responses of 16 receiver locations for the initial receiver range 10 km and coarse silt bottom profile, where the mean=7.8866e−009 volts$^2$, and the variance=1.0899e−016 volts$^4$.

TABLE 33

| | | | |
|---|---|---|---|
| 1.5511e−015 | 2.2225e−008 | 7.5721e−009 | 1.7848e−008 |
| 2.9729e−015 | 1.9472e−015 | 2.7264e−008 | 3.1400e−008 |
| 1.9077e−015 | 8.0633e−009 | 6.9643e−014 | 1.7082e−013 |
| 8.0031e−009 | 3.0454e−015 | 3.2364e−009 | 5.7279e−010 |

Table 34 tabulates the variance of vertical velocity impulse responses of 16 receiver locations for the initial receiver range 10 km and coarse silt bottom profile, where the mean=1.1562e−007 volts$^2$, and the variance=1.7766e−014 volts$^4$.

TABLE 34

| | | | |
|---|---|---|---|
| 5.4819e−008 | 3.4920e−008 | 4.3409e−008 | 2.7744e−008 |
| 2.0388e−008 | 2.1744e−008 | 5.0475e−008 | 5.7068e−008 |

TABLE 34-continued

| | | | |
|---|---|---|---|
| 4.0203e−008 | 3.6692e−008 | 6.1404e−008 | 1.9643e−008 |
| 3.4681e−007 | 3.5720e−007 | 3.4728e−007 | 3.3012e−007 |

Bit Error Rate Plots

Figure 47:
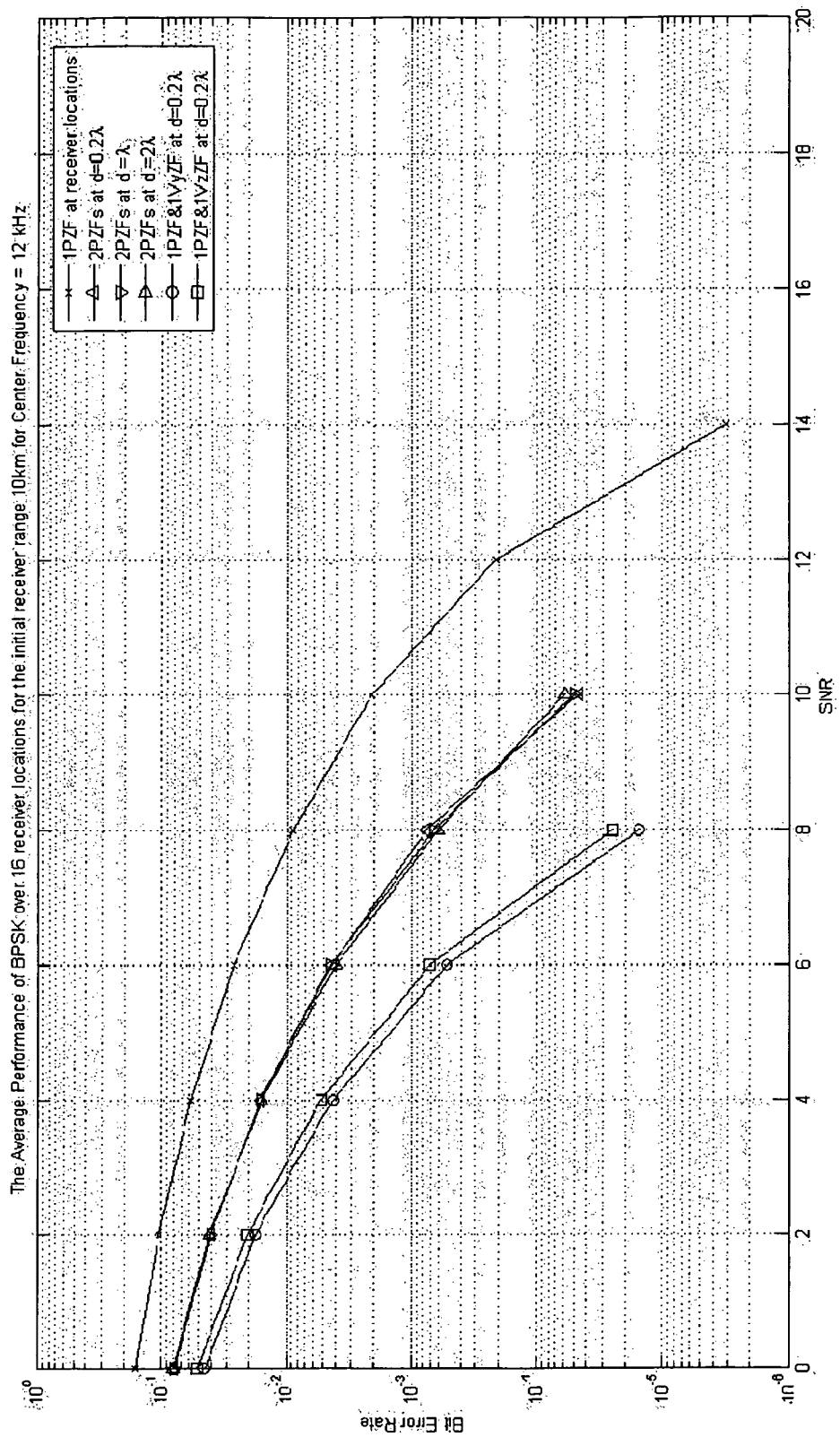
FIG. 47 is a graph of the average bit error rate over 16 receiver locations for the initial receiver range of 10 km and with a coarse silt profile.
Figure 48:
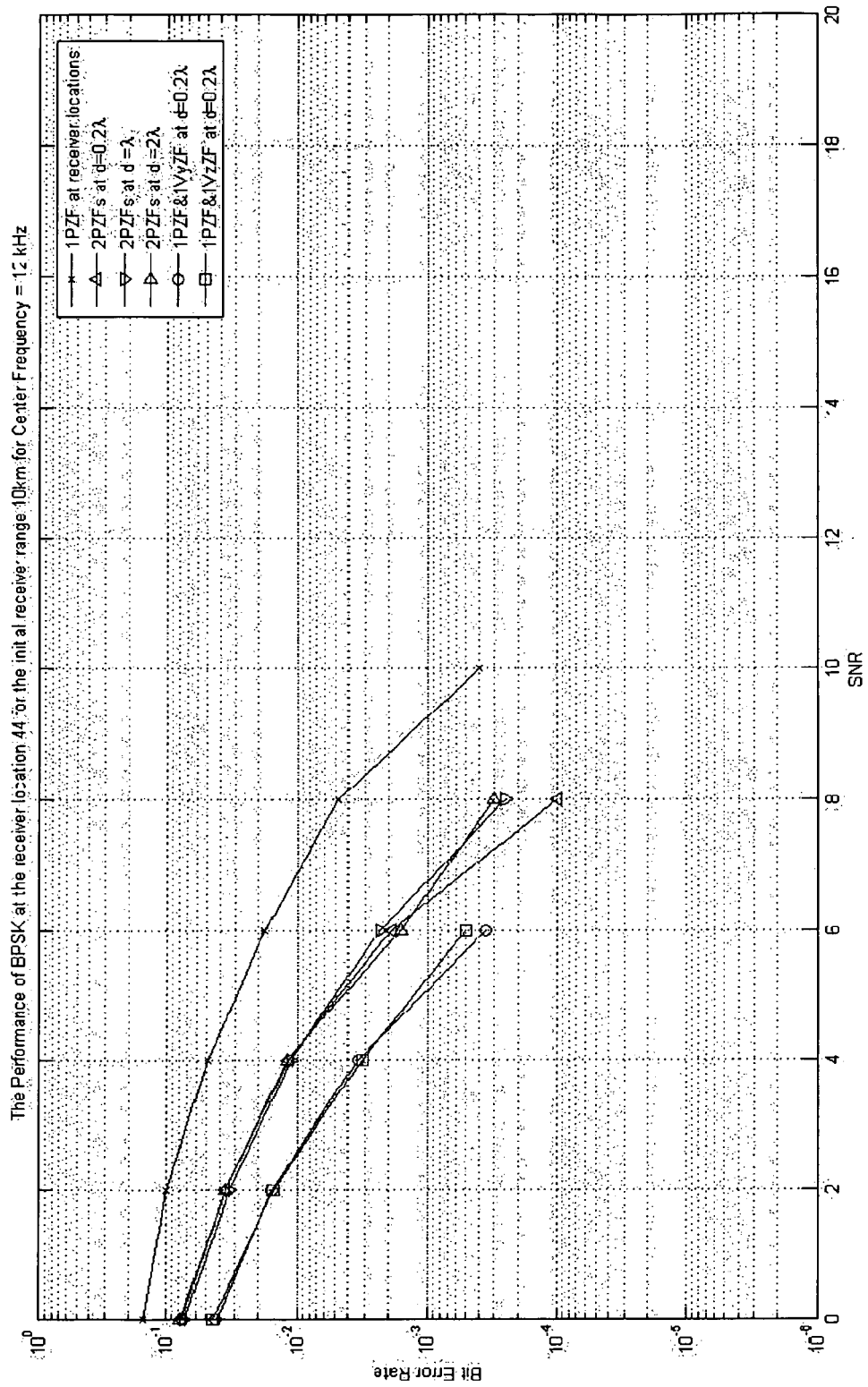
FIG. 48 is a graph of the bit error rate at receiver location 44 for the initial receiver range of 10 km and with a coarse silt profile.

Bit error rate plots are provided in FIGS. 47-48 of this application. Descriptions of these figures are provided in the Brief Description of the drawings of this specification.

Eigen Values Plots

Figure 49:
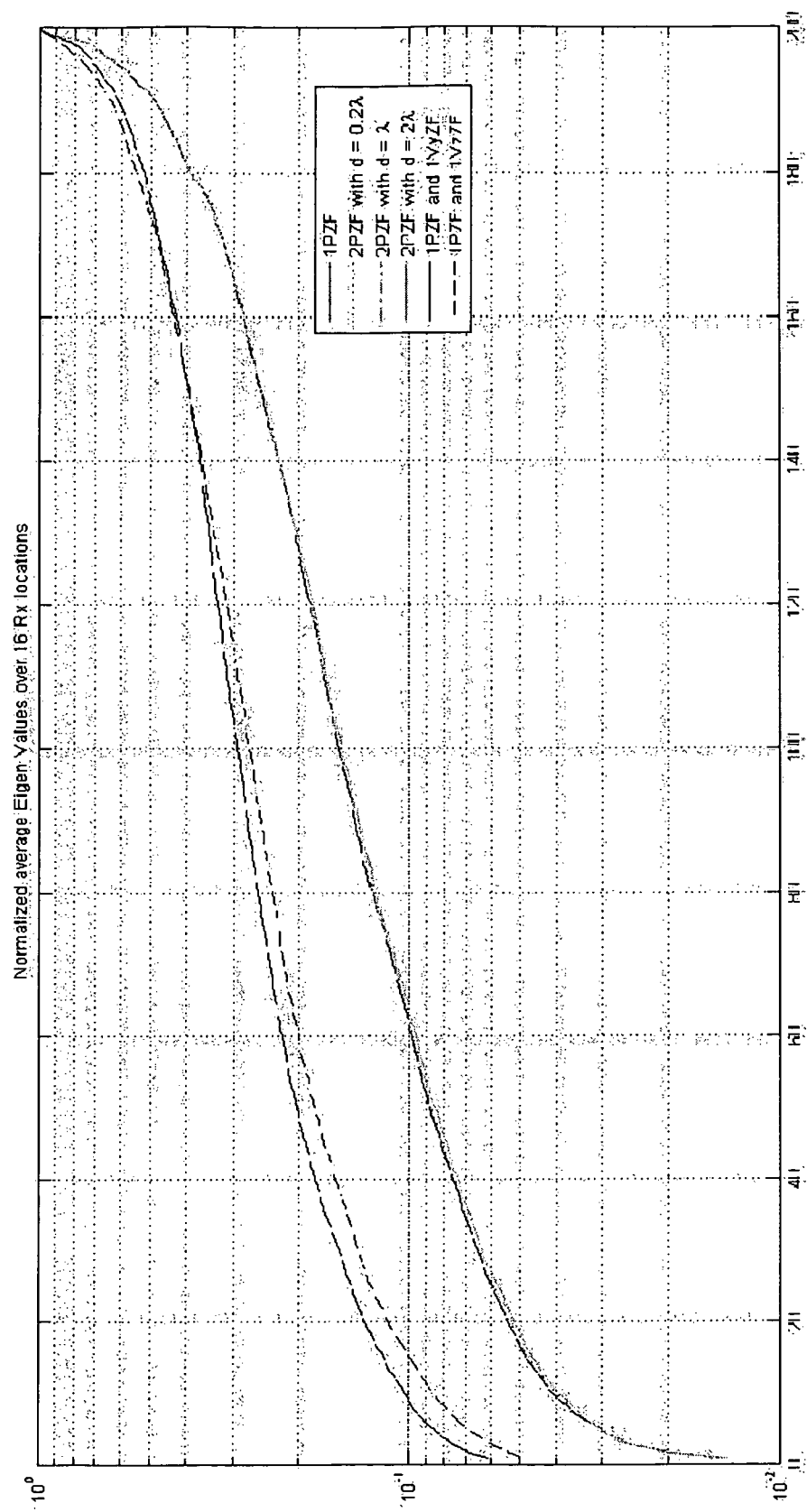
FIG. 49 is a graph of the normalized average eigenvalues over 16 receiver locations for the initial receiver range of 10 km and with a coarse silt profile.
Figure 50:
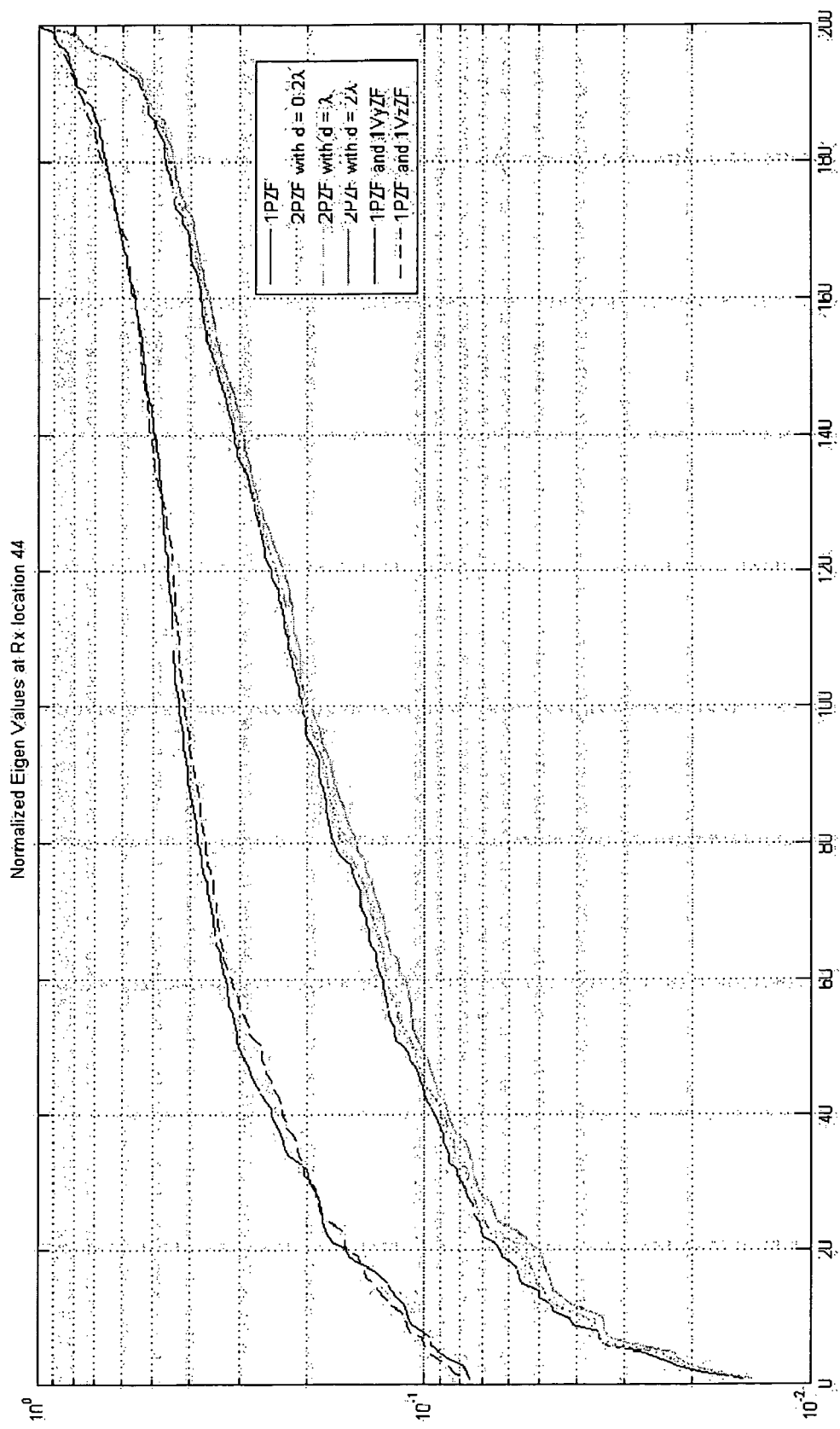
FIG. 50 is a graph of the normalized eigenvalues at the receiver location 44 for the initial receiver range of 10 km and with a coarse silt profile.

Eigen Values plots are provided in FIGS. 49-50 of this application. Descriptions of these figures are provided in the Brief Description of the drawings of this specification.

The Plots of Inverted Diagonal Elements of $(H^H H)^{-1}$

Figure 51:
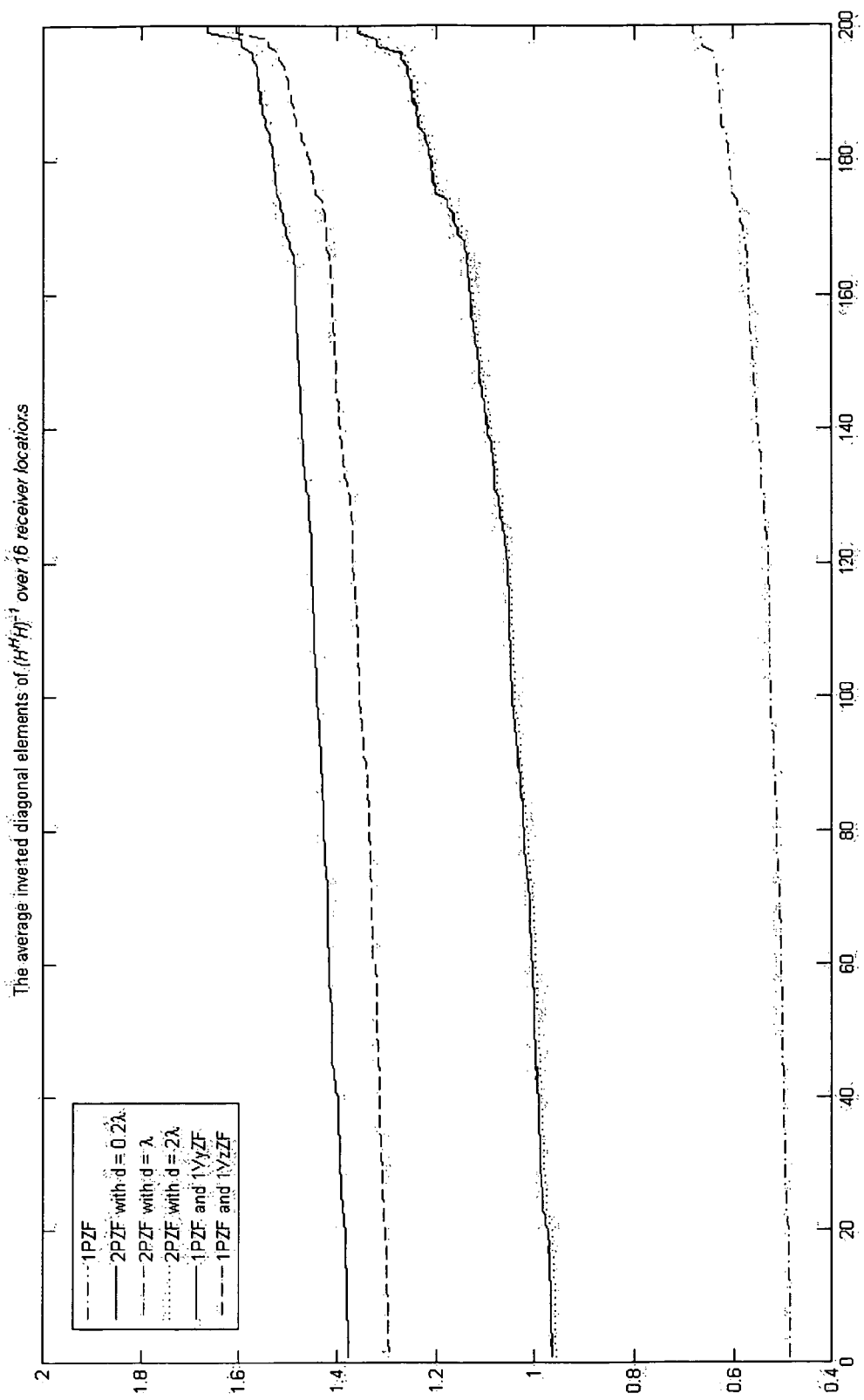
FIG. 51 is a graph of the average of the inverted diagonal elements of $(H^H H)^{-1}$ over 16 receiver locations for the initial receiver range of 10 km and with a coarse silt profile.
Figure 52:
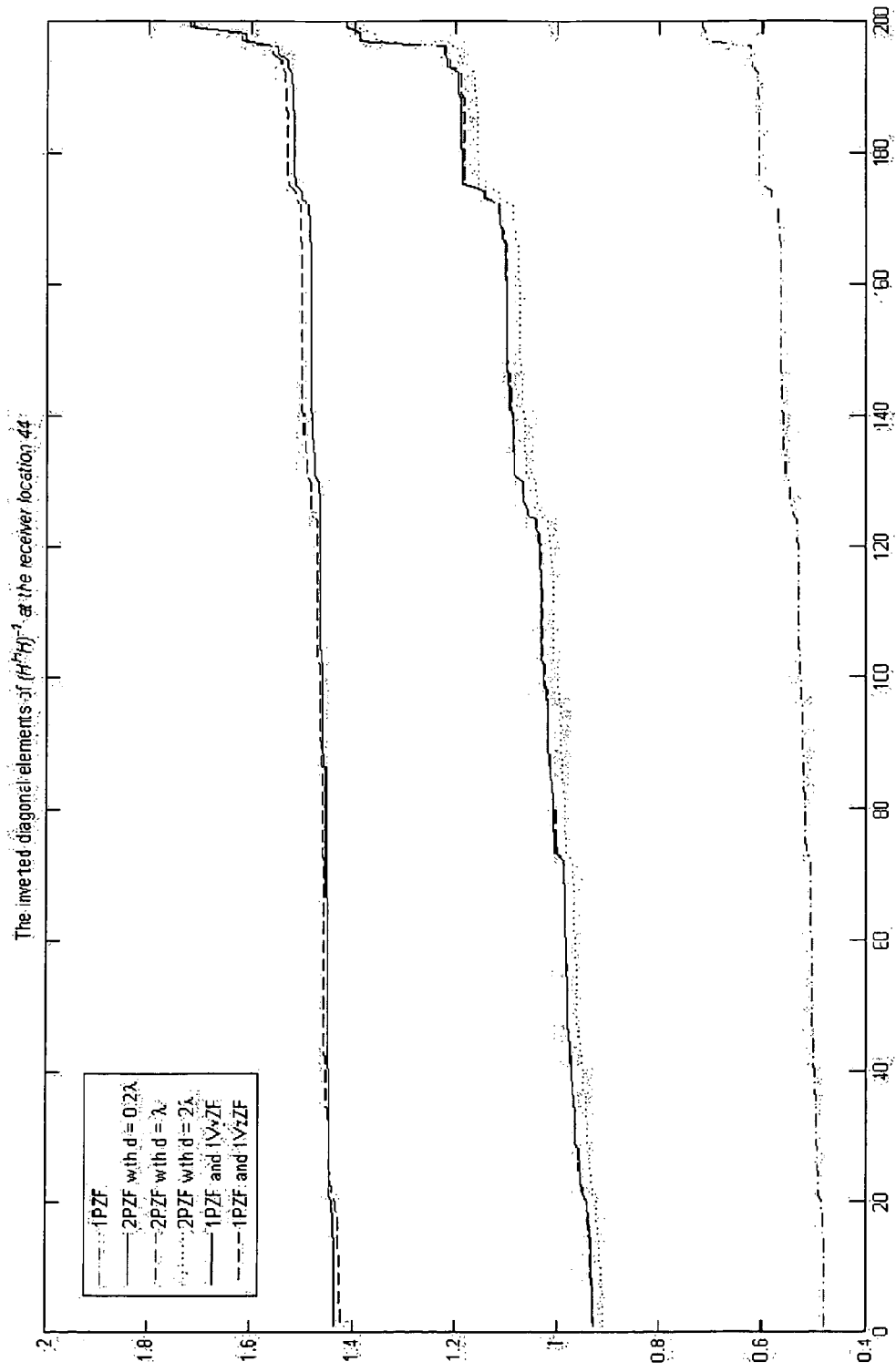
FIG. 52 is a graph of the inverted diagonal elements of $(H^H H)^{-1}$ at the receiver location 44 for the initial receiver range of 10 km and with a coarse silt profile.
Figure 53:
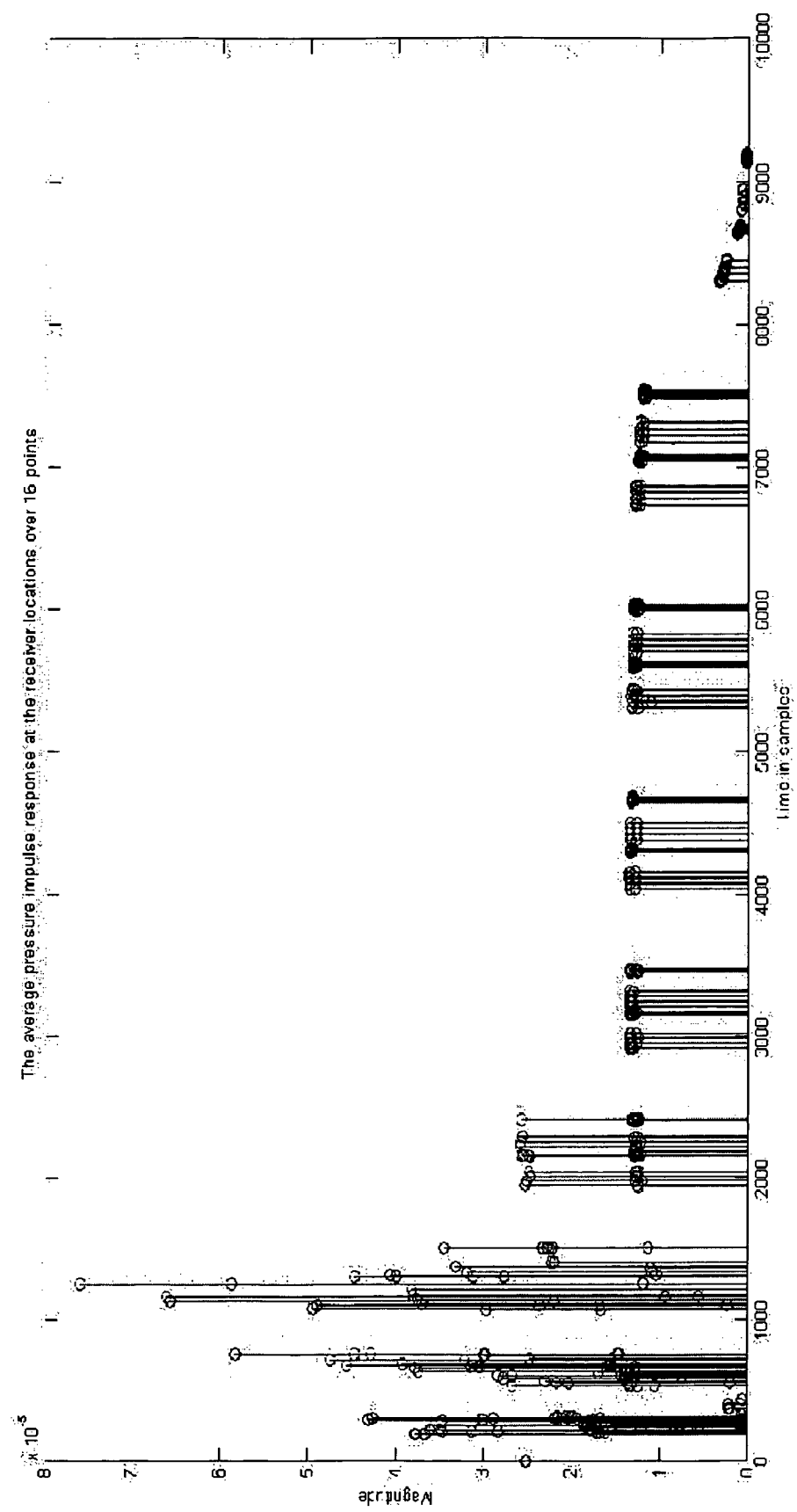
FIG. 53 is a graph of the average pressure impulse response over 16 receiver locations for the initial receiver range of 5 km and with very fine sand bottom profile.
Figure 54:
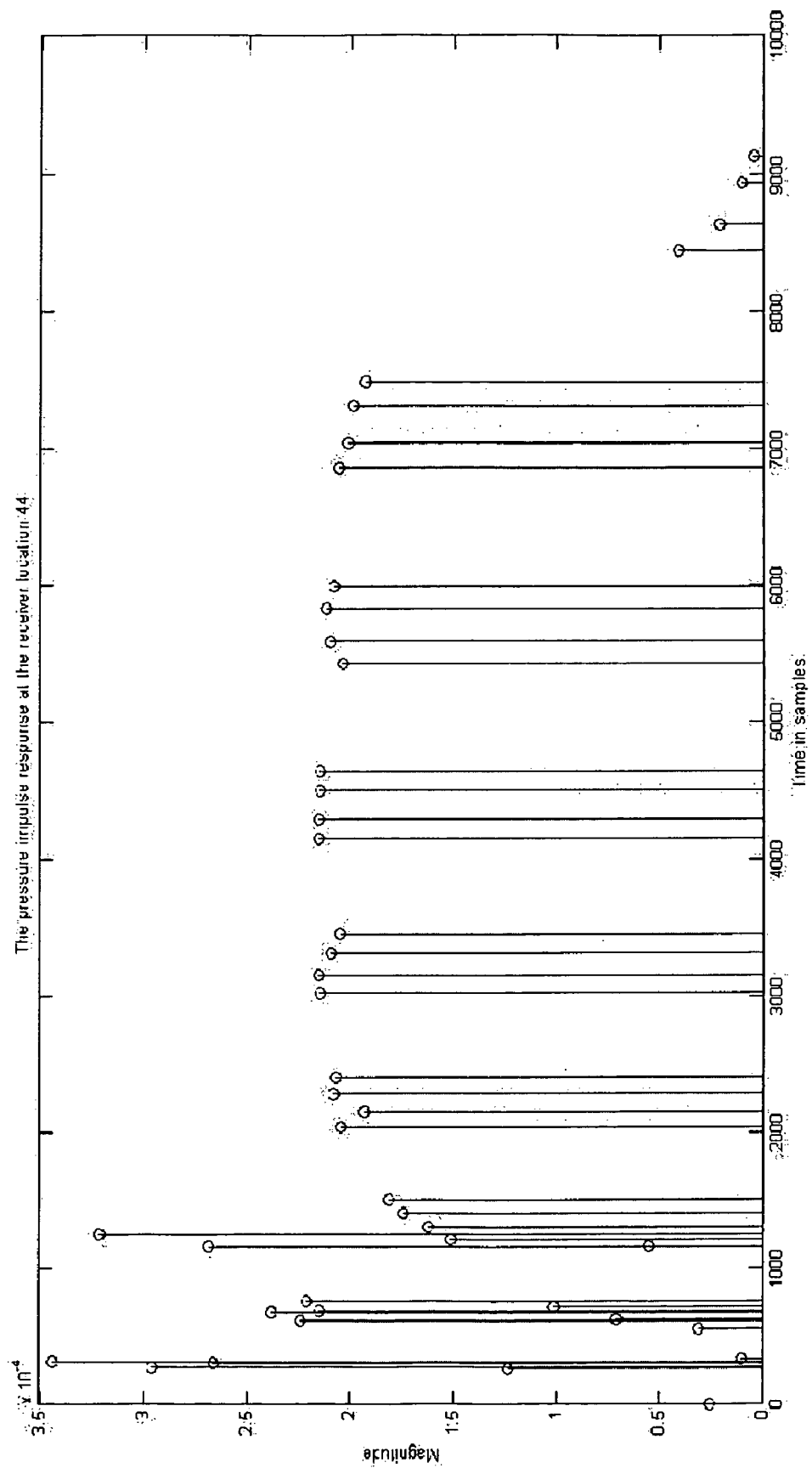
FIG. 54 is a graph of the pressure impulse response at the receiver location 44 for the initial receiver range of 5 km and with a very fine sand bottom profile.
Figure 55:
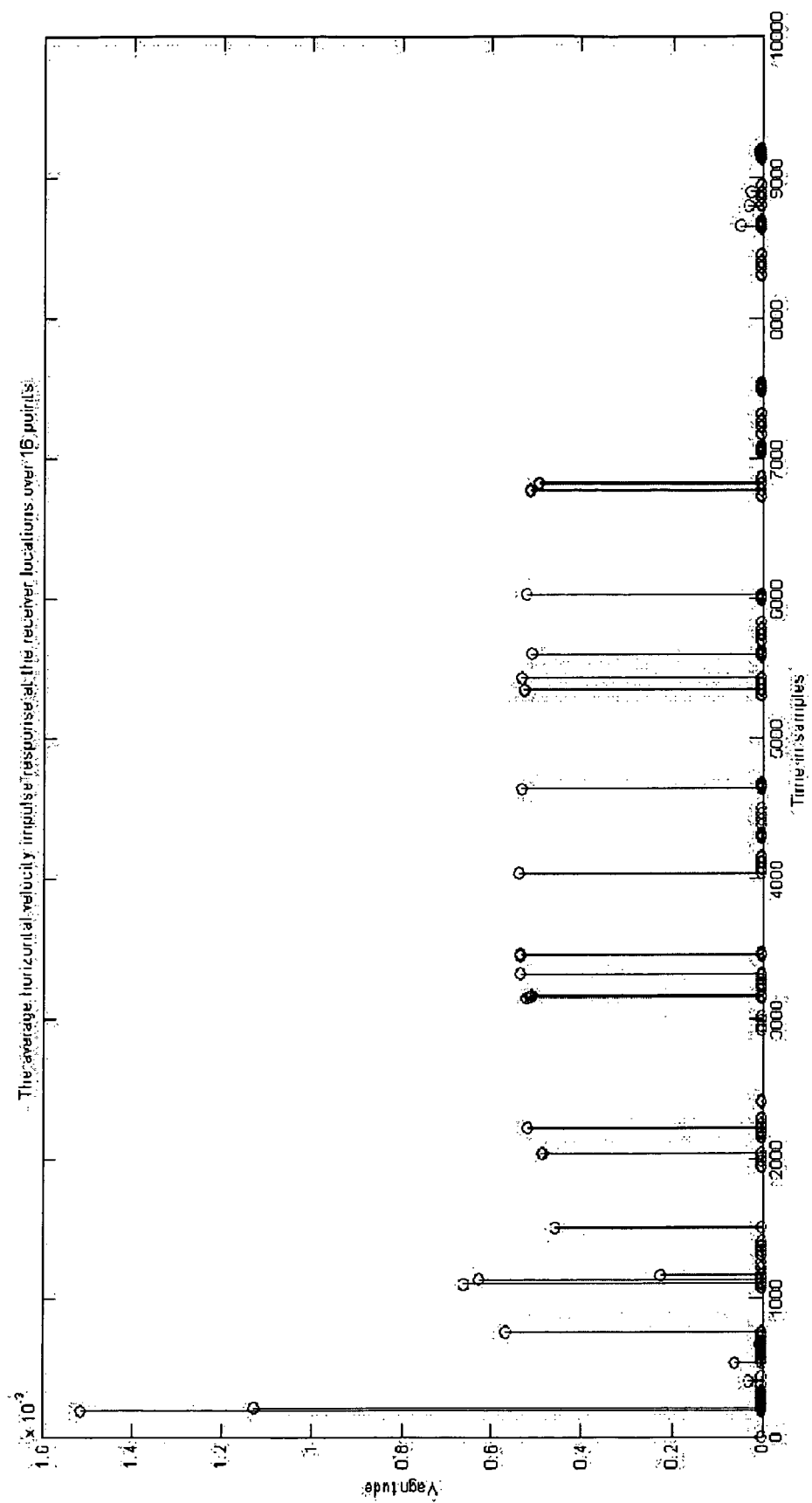
FIG. 55 is a graph of the average horizontal velocity impulse response over 16 receiver locations for the initial receiver range of 5 km and with a very fine sand bottom profile.
Figure 56:
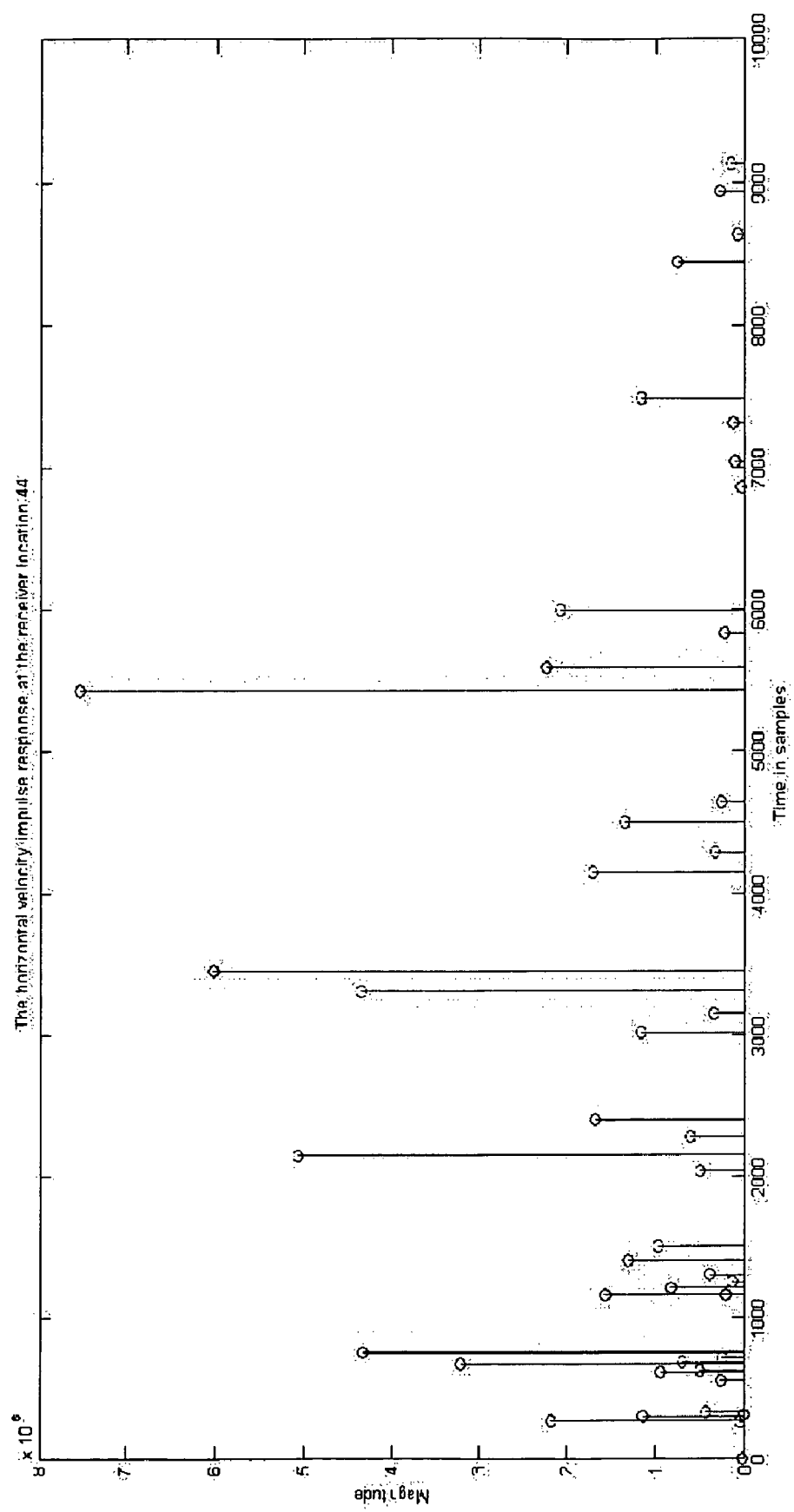
FIG. 56 is a graph of the horizontal velocity impulse response at the receiver location 44 for the initial receiver range of 5 km and with a very fine sand bottom profile.
Figure 57:
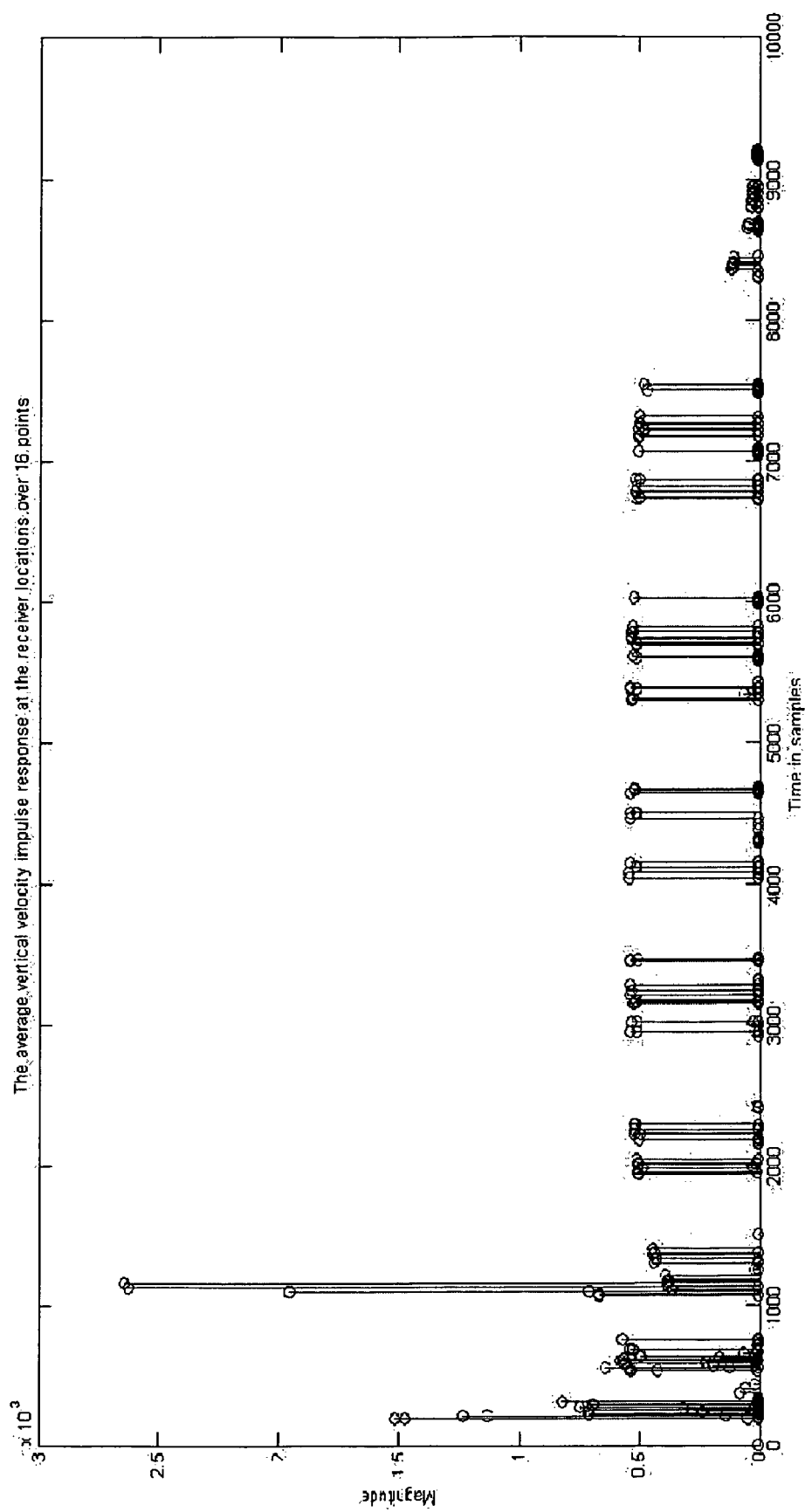
FIG. 57 is a graph of the average vertical velocity impulse response over 16 receiver locations for the initial receiver range of 5 km and with a very fine sand bottom profile.
Figure 58:
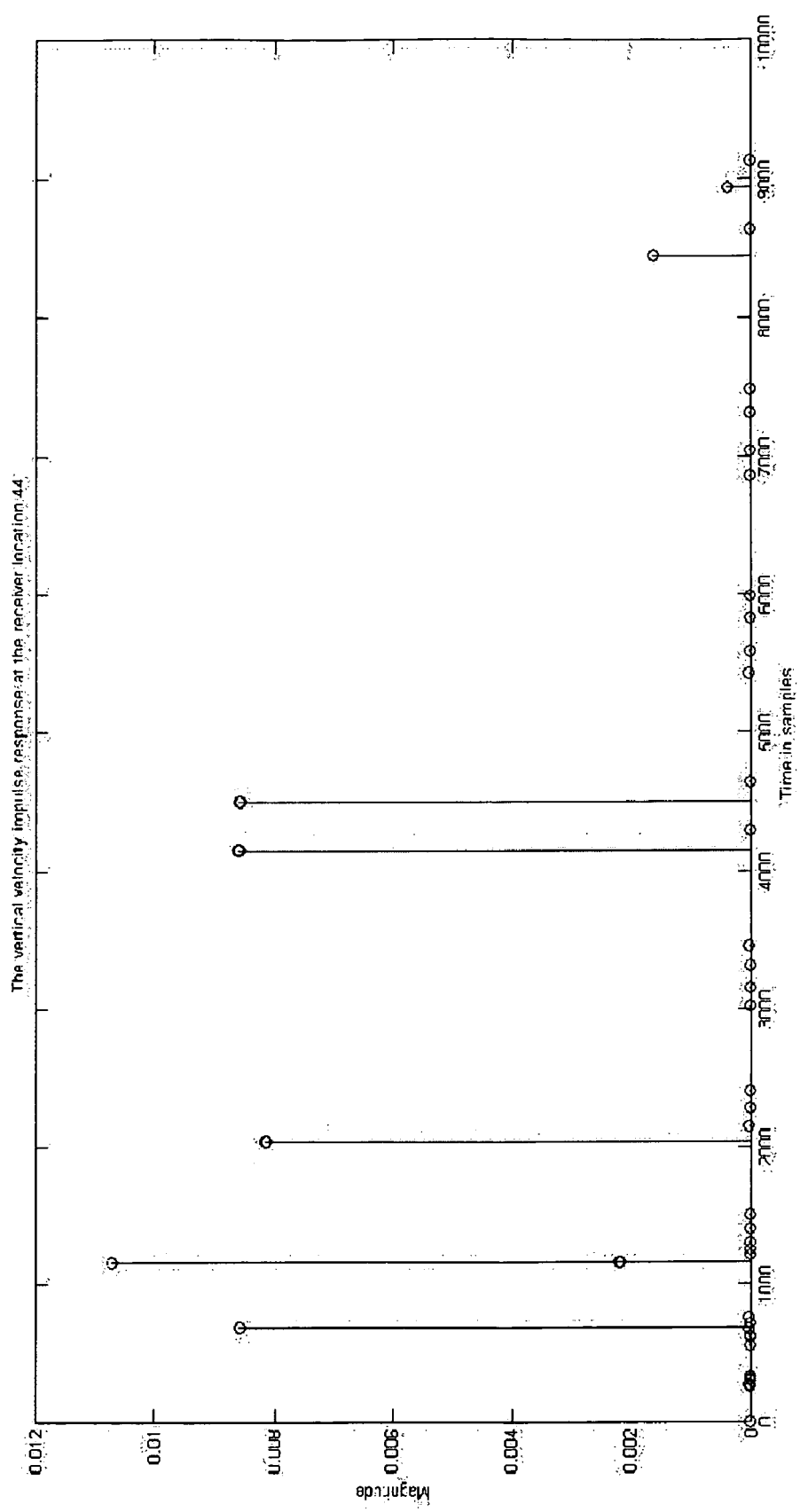
FIG. 58 is a graph of the horizontal velocity impulse response at receiver location 44 for the initial receiver range of 5 km and with a very fine sand bottom profile.
Figure 59:
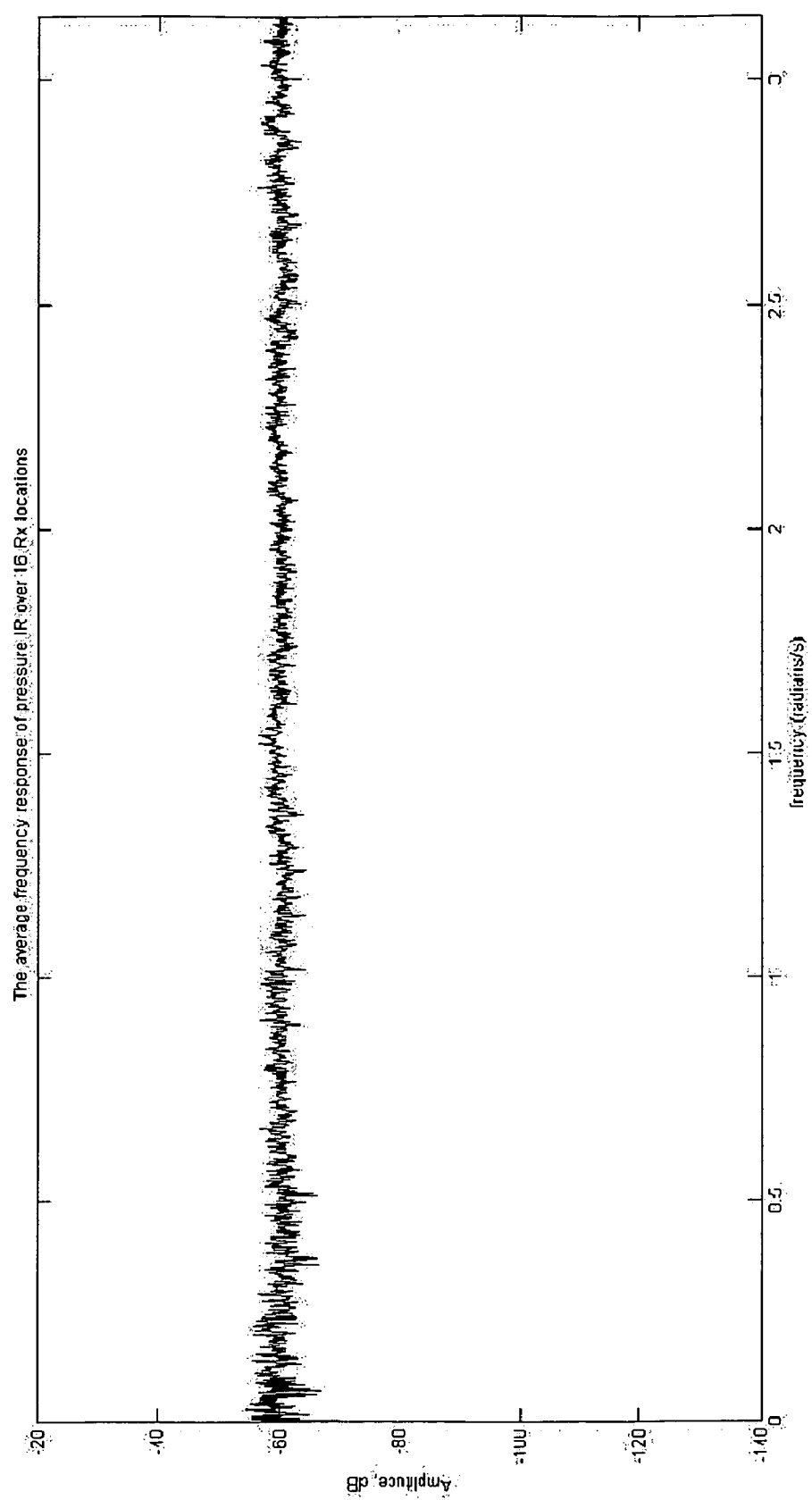
FIG. 59 is a graph of the average frequency response of the pressure impulse response over 16 receiver locations for the initial receiver range of 5 km and with a very fine sand bottom profile.
Figure 60:
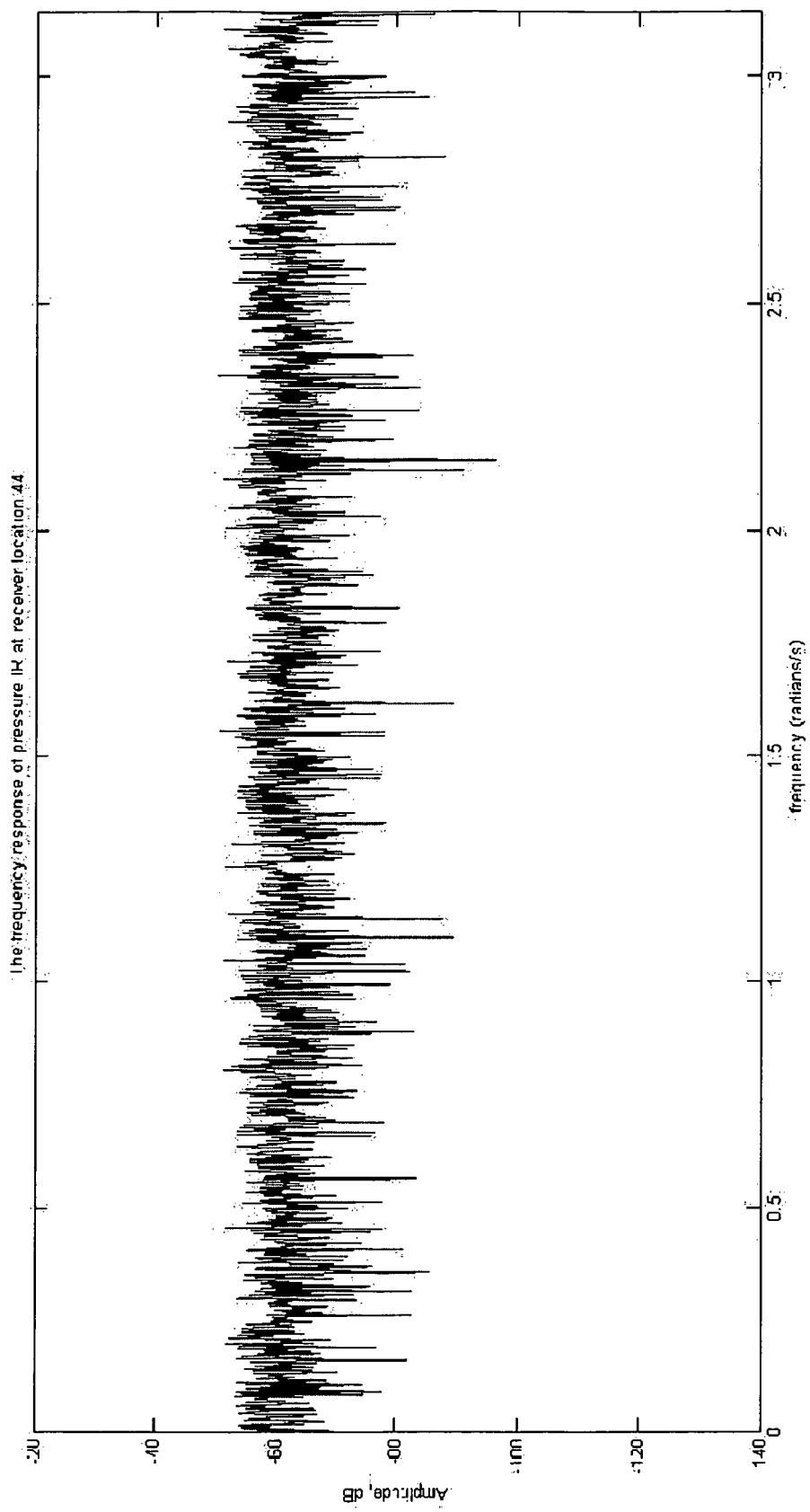
FIG. 60 is a graph of the frequency response of the pressure impulse response at receiver location 44 for the initial receiver range of 5 km and with a very fine sand bottom profile.
Figure 61:
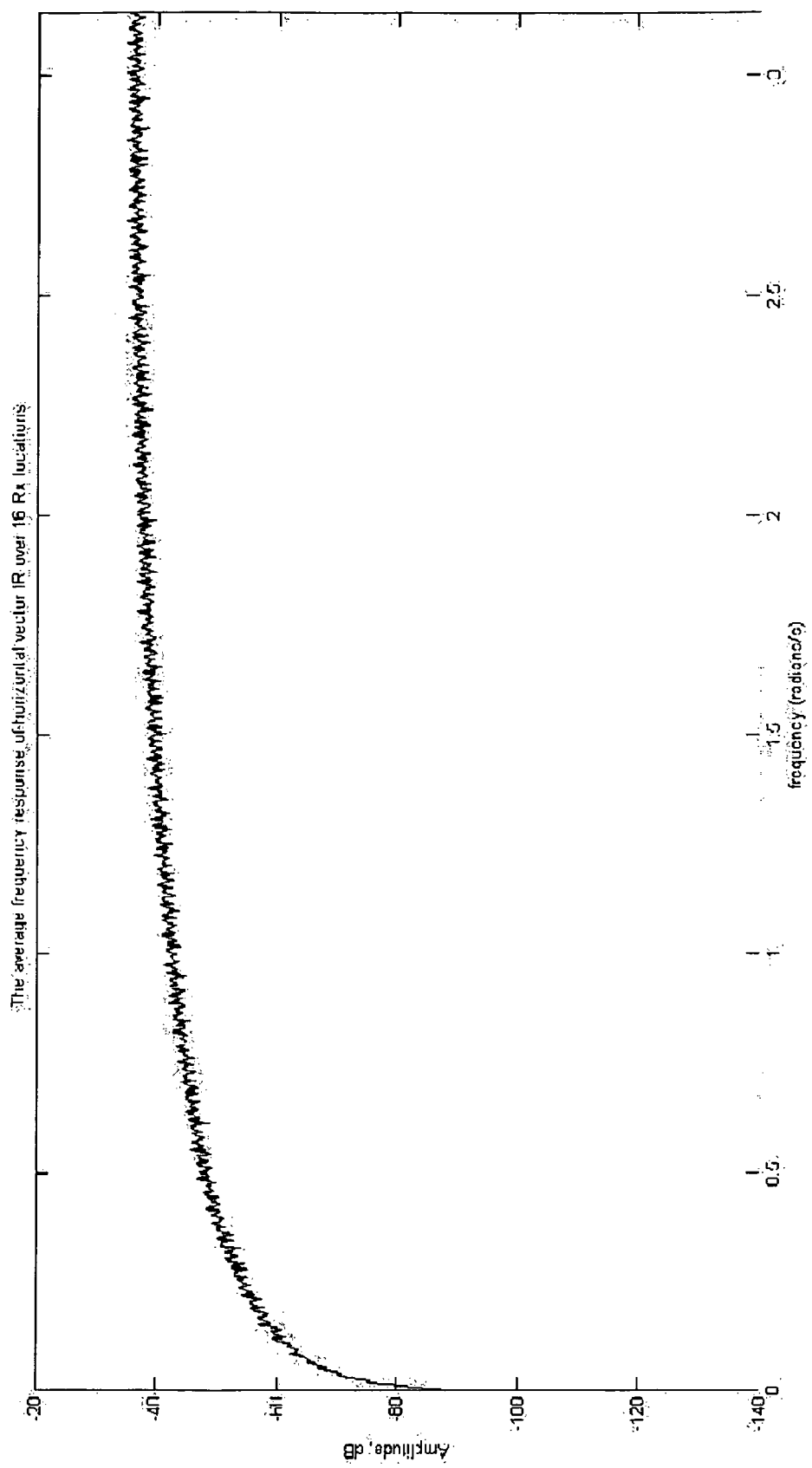
FIG. 61 is a graph of the average frequency response of the horizontal velocity impulse response over 16 receiver locations for the initial receiver range of 5 km and with a very fine sand bottom profile.
Figure 62:
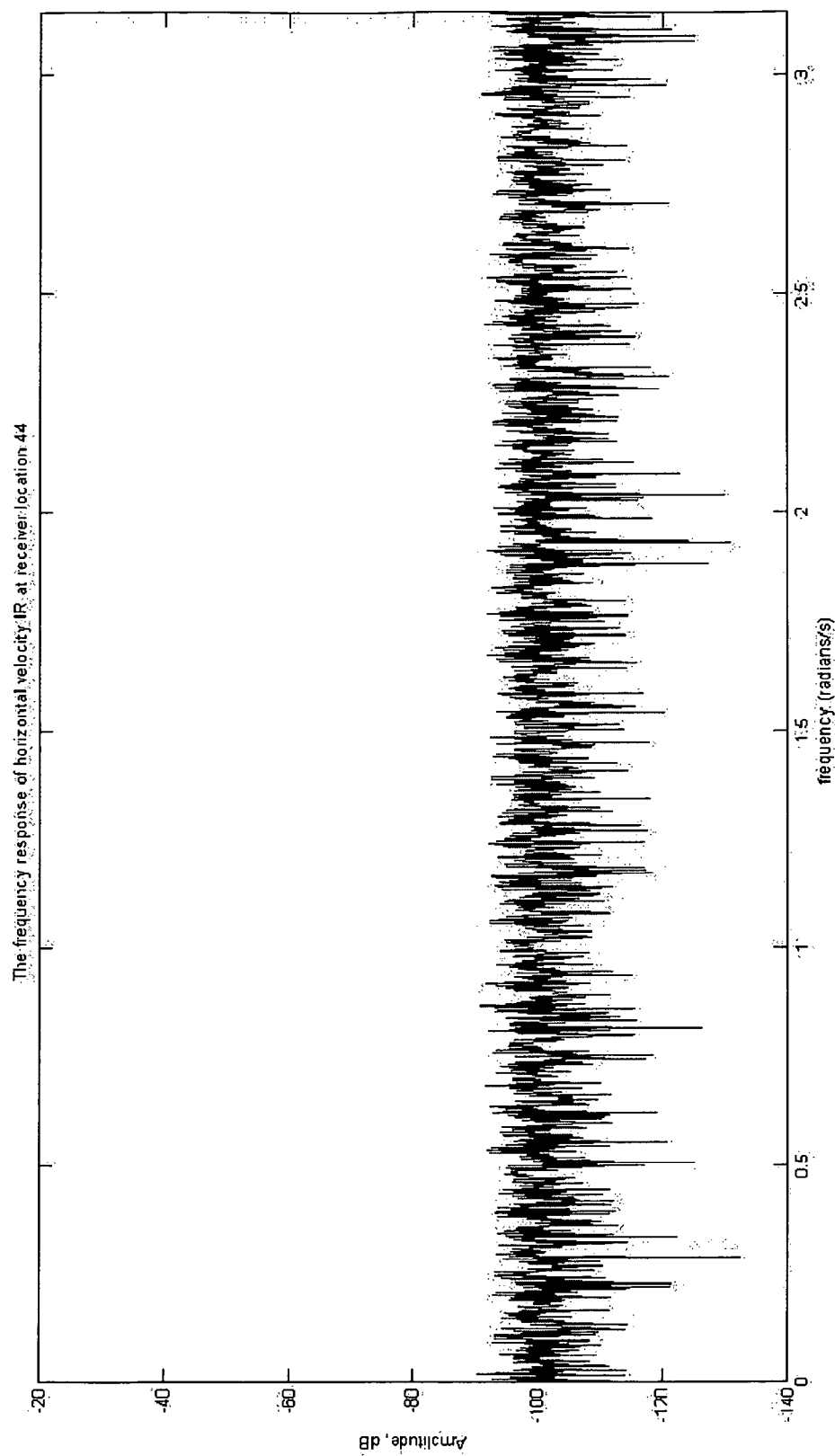
FIG. 62 is a graph of the frequency response of the horizontal velocity impulse response at receiver location 44 for the initial receiver range of 5 km and with a very fine sand bottom profile.
Figure 63:
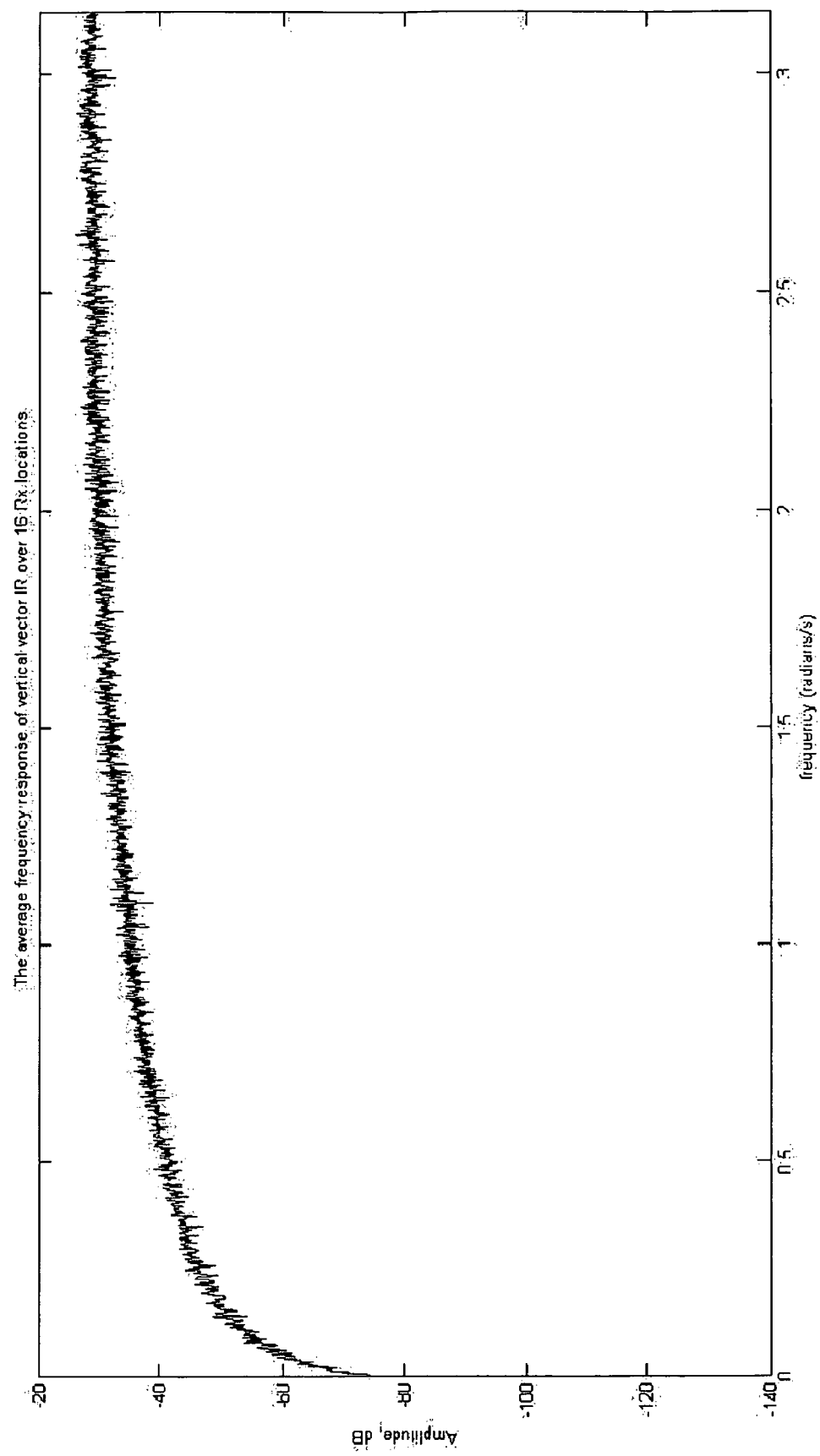
FIG. 63 is a graph of the average frequency response of the vertical velocity impulse response over 16 receiver locations for the initial receiver range of 5 km and with a very fine sand bottom profile.
Figure 64:
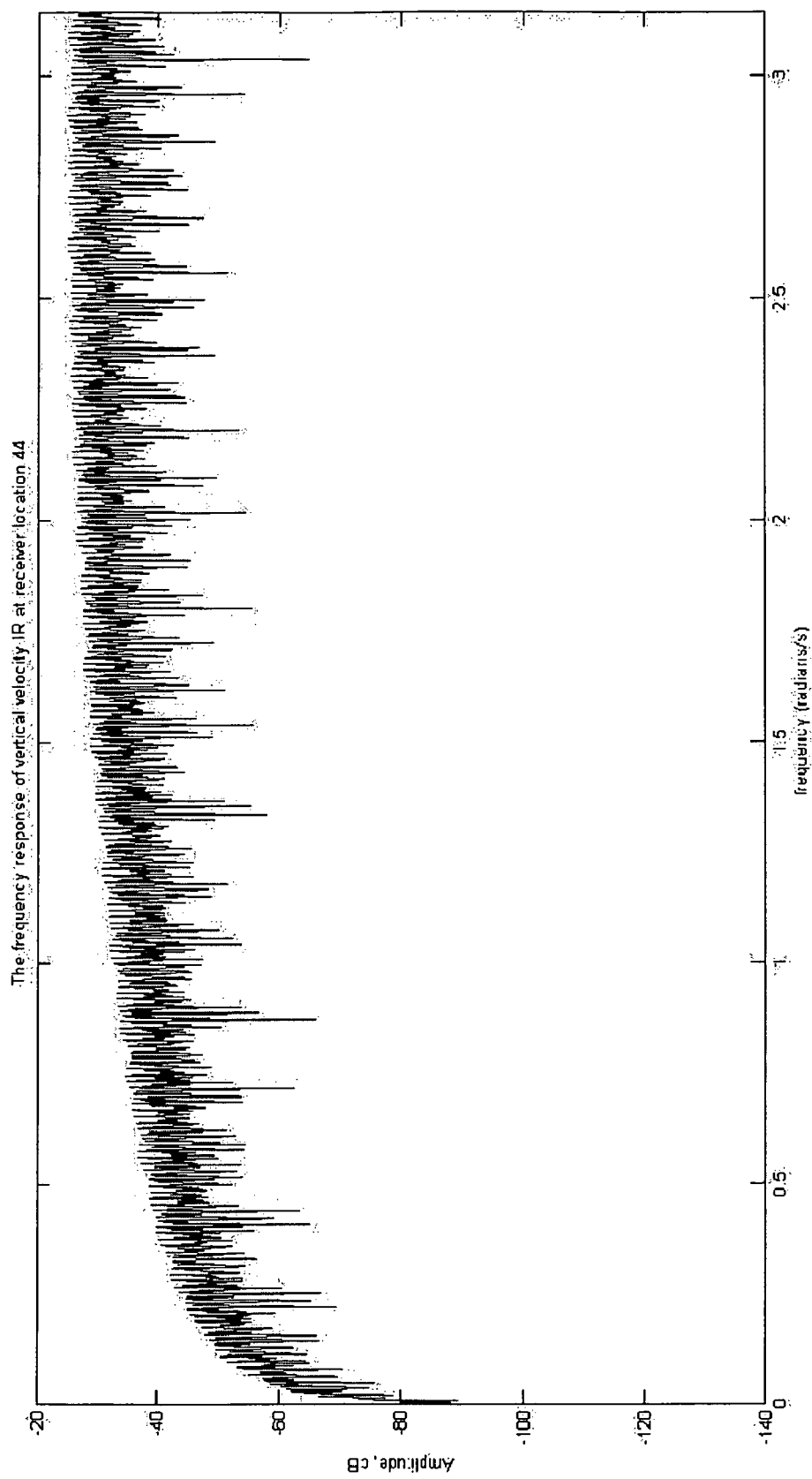
FIG. 64 is a graph of the frequency response of the vertical velocity impulse response at receiver location 44 for the initial receiver range of 5 km and with a very fine sand bottom profile.

The plots of inverted diagonal elements of $(H^H H)^{-1}$ are provided in FIGS. 51-52 of this application. Descriptions of these figures are provided in the Brief Description of the drawings of this specification.

The Condition Number of $H^H H$

Table 35 tabulates the condition numbers of $H^H H$ of SISO ZF receivers of 16 receiver locations for the initial receiver range 10 km and coarse silt bottom profile, where the mean=138.8664, and the variance=2.3184e+004.

TABLE 35

| | | | |
|---|---|---|---|
| 297.0414 | 588.6861 | 341.5566 | 241.6773 |
| 104.6591 | 103.9421 | 124.5669 | 146.5788 |
| 25.3375 | 23.0541 | 22.8879 | 26.6034 |
| 33.3680 | 32.4273 | 42.1593 | 67.3167 |

Table 36 tabulates the condition numbers of $H^H H$ of SIMO ZF receivers, when using two pressure sensors separated at the distance of 0.2λ, of 16 receiver locations for the initial receiver range 10 km and coarse silt bottom profile, where the mean=133.5162, and the variance=2.0231e+004.

TABLE 36

| | | | |
|---|---|---|---|
| 296.3712 | 550.0761 | 331.9887 | 189.7610 |
| 101.4886 | 105.9373 | 124.2052 | 152.7806 |
| 24.9210 | 22.8337 | 22.7025 | 26.5412 |
| 33.5086 | 35.2932 | 46.3270 | 71.5241 |

Table 37 tabulates the condition numbers of $H^H H$ of SIMO ZF receivers, when using two pressure sensors separated by a distance λ, for 16 receiver locations for the initial receiver range 10 km and coarse silt bottom profile, where the mean=130.3825, and the variance=1.6308e+004.

TABLE 37

| | | | |
|---|---|---|---|
| 285.1821 | 456.1119 | 346.5736 | 212.6609 |
| 91.6891 | 101.3229 | 132.9276 | 171.1929 |
| 23.7929 | 22.0255 | 22.9740 | 26.2196 |
| 33.8161 | 34.9536 | 53.1009 | 71.5769 |

Table 38 tabulates the condition numbers of $H^H H$ of SIMO ZF receivers, when using two pressure sensors separated at the distance of 2λ, of 16 receiver locations for the initial receiver range 10 km and coarse silt bottom profile, where the mean=136.1120, and the variance=1.7377e+004.

TABLE 38

| | | | |
|---|---|---|---|
| 303.7984 | 376.2733 | 444.6085 | 235.4121 |
| 87.9535 | 103.9348 | 154.7439 | 180.2689 |
| 22.7892 | 22.2635 | 23.5715 | 25.1667 |
| 35.6653 | 38.7253 | 58.2771 | 64.3393 |

Table 39 tabulates the condition numbers of $H^H H$ of SIMO ZF receivers, when using a pressure sensor and a horizontal velocity vector sensor separated at the distance of 0.2λ, for 16 receiver locations for the initial receiver range 10 km and coarse silt bottom profile, where the mean=24.4145, variance=233.0000.

TABLE 39

| | | | |
|---|---|---|---|
| 36.4636 | 31.1746 | 31.8259 | 11.5077 |
| 54.9314 | 30.7843 | 42.7358 | 49.5118 |
| 20.2064 | 13.9017 | 3.8015 | 3.8926 |
| 12.4166 | 20.9065 | 13.3417 | 13.2306 |

Table 40 tabulates the condition numbers of $H^H H$ of SIMO ZF receivers, when using a pressure sensor and a vertical velocity vector sensor separated at the distance of 0.2λ, of 16 receiver locations for the initial receiver range 10 km and coarse silt bottom profile, where the mean=25.7880, and the variance=180.2970.

TABLE 40

| | | | |
|---|---|---|---|
| 41.7088 | 35.7277 | 22.8810 | 16.0189 |
| 46.4015 | 39.1629 | 45.6659 | 45.5991 |
| 15.4617 | 12.1914 | 12.1755 | 12.3321 |
| 16.0316 | 23.0774 | 15.2936 | 12.8789 |

Simulation Results for the Initial Receiver Range 5 km and Very Fine Sand Bottom Profile Graphs of the impulse response under various conditions are shown in FIGS. 53-58 of this application, and descriptions of these figures are provided in the Brief Description of the Drawings section of this specification.

Mean Excess Delay and RMS Delay Spread

Mean Excess Delays in Seconds of 16 Receiver Locations

Table 41 tabulates the mean excess delays in seconds of the pressure impulse responses of 16 receiver locations for the initial receiver range 5 km and very fine sand bottom profile, where the mean=5.2933e−002 sec; and the variance=1.7585e−005 sec$^2$.

TABLE 41

| | | | |
|---|---|---|---|
| 4.7488e−002 | 4.7888e−002 | 4.7299e−002 | 4.8575e−002 |
| 5.2009e−002 | 5.0463e−002 | 4.9004e−002 | 4.8385e−002 |
| 5.7967e−002 | 5.7375e−002 | 5.6796e−002 | 5.7013e−002 |
| 5.6881e−002 | 5.6727e−002 | 5.6515e−002 | 5.6537e−002 |

Table 42 tabulates the mean excess delays in seconds of the horizontal velocity impulse responses of 16 receiver locations for the initial receiver range 5 km and very fine sand bottom profile, where the mean=7.3936e−002 sec; and the variance=2.2817e−003 sec$^2$.

TABLE 42

| | | | |
|---|---|---|---|
| 4.1049e−003 | 9.6450e−002 | 8.4366e−002 | 6.6009e−002 |
| 1.1828e−002 | 8.9200e−002 | 2.3025e−002 | 1.4113e−001 |
| 1.1680e−001 | 1.0412e−001 | 1.8140e−001 | 2.0149e−002 |
| 2.4219e−002 | 8.1086e−002 | 6.8221e−002 | 7.0878e−002 |

Table 43 tabulates the mean excess delays in seconds of the vertical velocity impulse responses of 16 receiver locations for the initial receiver range 5 km and very fine sand bottom profile, where the mean=5.5926e−002 sec; and the variance=2.8826e−004 sec$^2$.

TABLE 43

| | | | |
|---|---|---|---|
| 2.5182e−002 | 4.6141e−002 | 8.3008e−002 | 8.5145e−002 |
| 4.6038e−002 | 3.7440e−002 | 4.5116e−002 | 6.9106e−002 |
| 5.7247e−002 | 7.9196e−002 | 7.2491e−002 | 4.4284e−002 |
| 4.1261e−002 | 6.1595e−002 | 5.1356e−002 | 5.0208e−002 |

RMS Delays Spreads in Seconds of 16 Receiver Locations

Table 44 tabulates the RMS delays spreads in seconds of the pressure impulse responses of 16 receiver locations for the initial receiver range 5 km and very fine sand bottom profile, where the mean=4.7823e−002 sec; and the Variance=1.8346e−007 sec$^2$.

TABLE 44

| | | | |
|---|---|---|---|
| 4.8144e−002 | 4.8134e−002 | 4.7764e−002 | 4.8336e−002 |
| 4.8501e−002 | 4.8310e−002 | 4.7904e−002 | 4.8256e−002 |
| 4.7973e−002 | 4.7641e−002 | 4.7362e−002 | 4.7479e−002 |
| 4.7649e−002 | 4.7325e−002 | 4.6942e−002 | 4.7451e−002 |

Table 45 tabulates the RMS delays spreads in seconds of the horizontal velocity impulse responses of 16 receiver locations for the initial receiver range 5 km and very fine sand bottom profile, where the mean=1.5964e−002 sec; and the variance=2.3930e−004 sec$^2$.

TABLE 45

| | | | |
|---|---|---|---|
| 2.8334e−004 | 2.9868e−002 | 5.5825e−003 | 4.2097e−002 |
| 1.5827e−002 | 2.2848e−002 | 6.3971e−004 | 7.5236e−004 |
| 1.7509e−004 | 3.4947e−002 | 2.6938e−003 | 3.8767e−003 |
| 2.1147e−004 | 3.5158e−002 | 2.2172e−002 | 3.8288e−002 |

Table 46 tabulates the RMS delays spreads in seconds of the vertical velocity impulse responses of 16 receiver locations for the initial receiver range 5 km and very fine sand bottom profile, where the mean=4.5399e−002 sec; and the Variance=5.9946e−005 sec$^2$.

TABLE 46

| | | | |
|---|---|---|---|
| 4.4075e−002 | 5.2281e−002 | 5.2320e−002 | 4.8236e−002 |
| 5.2308e−002 | 4.2101e−002 | 4.7479e−002 | 2.9311e−002 |
| 4.2291e−002 | 4.2024e−002 | 5.8679e−002 | 4.8100e−002 |
| 5.0069e−002 | 5.0120e−002 | 3.3536e−002 | 3.3450e−002 |

5.3.3 Frequency Response

Graphs of frequency response under various conditions are shown in FIG. 59-64. Descriptions of these figures are provided in the Brief Description of the Drawings section of this specification.

DC Average and Variance of Impulse Response

DC Average Over 16 Receiver Locations

Table 47 tabulates the DC average of pressure impulse responses of 16 receiver locations for the initial receiver range 5 km and very fine sand bottom profile, where the mean=−8.5798e−008+4.4775e−008i volts, and the variance=7.3867e−016 volts$^2$.

TABLE 47

| | | | |
|---|---|---|---|
| −6.5669e−008 + 3.0393e−008i | −6.5453e−008 + 3.1177e−008i | −6.0344e−008 + 2.8912e−008i | −5.9477e−008 + 2.3028e−008i |
| −7.5478e−008 + 4.6315e−008i | −6.7415e−008 + 3.6042e−008i | −5.9520e−008 + 2.9791e−008i | −5.7315e−008 + 2.1036e−008i |
| −9.8959e−008 + 6.7090e−008i | −1.0657e−007 + 6.4243e−008i | −1.0960e−007 + 6.1987e−008i | −1.1244e−007 + 5.5532e−008i |
| −1.0767e−007 + 5.8943e−008i | −1.1059e−007 + 5.6064e−008i | −1.0683e−007 + 5.4411e−008i | −1.0944e−007 + 5.1443e−008i |

Table 48 tabulates the DC average of horizontal velocity impulse responses of 16 receiver locations for the initial receiver range 5 km and very fine sand bottom profile, where the mean=−1.0355e−009+1.2048e−009i volts, and the variance=2.2574e−017 volts$^2$.

TABLE 48

| | | | |
|---|---|---|---|
| −1.1684e−009 + 1.9258e−009i | −2.0914e−009 − 1.6902e−009i | 3.6112e−010 + 2.3752e−010i | 1.2471e−009 + 1.4760e−009i |
| −1.5923e−008 + 9.7461e−009i | −1.9529e−009 − 2.5375e−010i | 3.5848e−010 + 1.4709e−009i | −9.0811e−010 + 2.1533e−010i |
| 1.6684e−009 + 3.3142e−009i | 6.6841e−010 − 7.6324e−010i | 1.7283e−009 + 8.0309e−010i | 3.4371e−010 + 8.5482e−010i |
| −1.5762e−009 + 2.5323e−009i | −4.7936e−010 − 7.0076e−010i | 8.0556e−010 − 1.6068e−010i | 3.4980e−010 + 2.6990e−010i |

Table 49 tabulates the DC average of vertical velocity impulse responses of 16 receiver locations for the initial receiver range 5 km and very fine sand bottom profile, where the mean=−4.9693e−009−1.1694e−008i volts, and the variance=1.1141e−015 volts$^2$.

TABLE 49

| | | | |
|---|---|---|---|
| −2.4491e−010 + 3.1136e−009i | −4.0045e−009 − 5.7747e−010i | −1.8068e−009 − 1.2161e−008i | 5.0602e−010 − 8.6860e−009i |
| 7.8157e−009 − 1.6016e−008i | 1.1107e−008 − 1.0914e−008i | 9.7511e−009 − 2.7072e−008i | −2.5067e−009 − 8.4588e−008i |
| 1.9241e−008 + 1.0914e−008i | 9.5897e−009 − 1.7947e−009i | −9.5775e−008 − 3.0502e−008i | −2.6434e−008 + 4.5611e−009i |
| −4.3672e−009 − 9.8692e−009i | −7.1728e−009 − 1.2723e−009i | 1.7904e−009 + 1.5934e−009i | 3.0025e−009 − 3.8282e−009i |

Variance of 16 Receiver Locations

Table 50 tabulates the variance of pressure impulse responses of 16 receiver locations for the initial receiver range 5 km and very fine sand bottom profile, where the mean=1.9048e−010 volts$^2$, and the variance=1.8119e−022 volts$^4$.

TABLE 50

| | | | |
|---|---|---|---|
| 2.1002e−010 | 2.0781e−010 | 2.0839e−010 | 2.0442e−010 |
| 1.9100e−010 | 1.9761e−010 | 2.0136e−010 | 2.0411e−010 |
| 1.7214e−010 | 1.7594e−010 | 1.7513e−010 | 1.7835e−010 |
| 1.7885e−010 | 1.8129e−010 | 1.7947e−010 | 1.8180e−010 |

Table 51 tabulates the variance of horizontal impulse responses of 16 receiver locations for the initial receiver range 5 km and very fine sand bottom profile, where the mean=3.1669e−008 volts$^2$, and the variance=1.1129e−015 volts$^4$.

TABLE 51

| | | | |
|---|---|---|---|
| 1.2799e−007 | 2.9839e−008 | 1.6390e−008 | 2.5486e−014 |
| 8.6269e−008 | 3.0491e−008 | 2.4580e−008 | 1.4745e−008 |
| 1.4624e−008 | 2.9855e−008 | 1.4908e−010 | 4.0146e−008 |
| 2.8452e−009 | 2.9341e−008 | 5.9444e−008 | 2.2116e−014 |

Table 52 tabulates the variance of vertical impulse responses of 16 receiver locations for the initial receiver range 5 km and very fine sand bottom profile, where mean=1.3736e−007 volts$^2$, and the variance=3.2843e−015 volts$^4$.

TABLE 52

| | | | |
|---|---|---|---|
| 2.0406e−007 | 2.2457e−007 | 7.2426e−008 | 6.0277e−008 |
| 2.0071e−007 | 2.3797e−007 | 8.5217e−008 | 7.5530e−008 |
| 1.2211e−007 | 1.3677e−007 | 8.8108e−008 | 1.6697e−007 |
| 1.9400e−007 | 1.1602e−007 | 1.2321e−007 | 8.9835e−008 |

Figure 65:
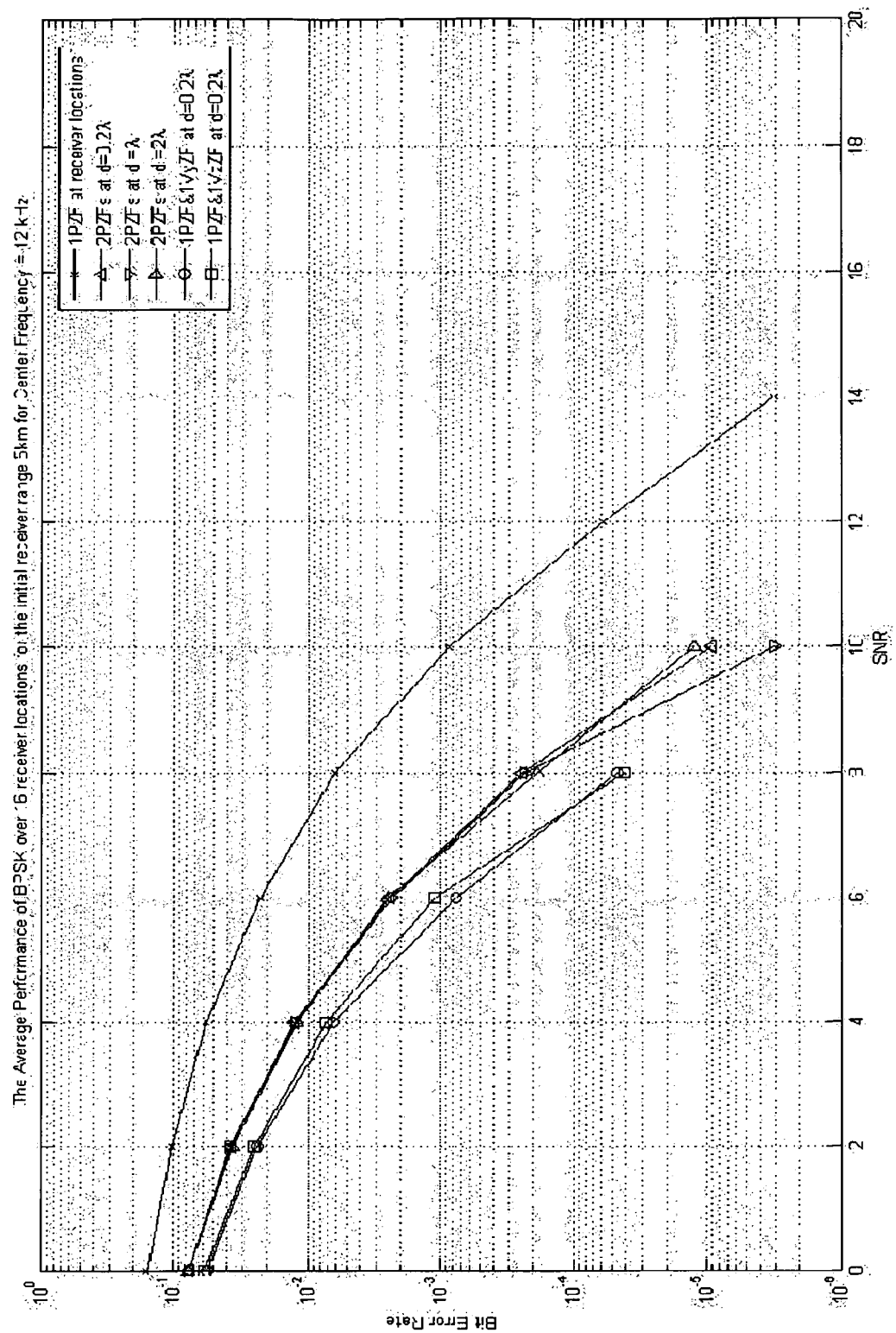
FIG. 65 is a graph of the average bit error rate over 16 receiver locations for the initial receiver range of 5 km and with a very fine sand bottom profile.
Figure 66:
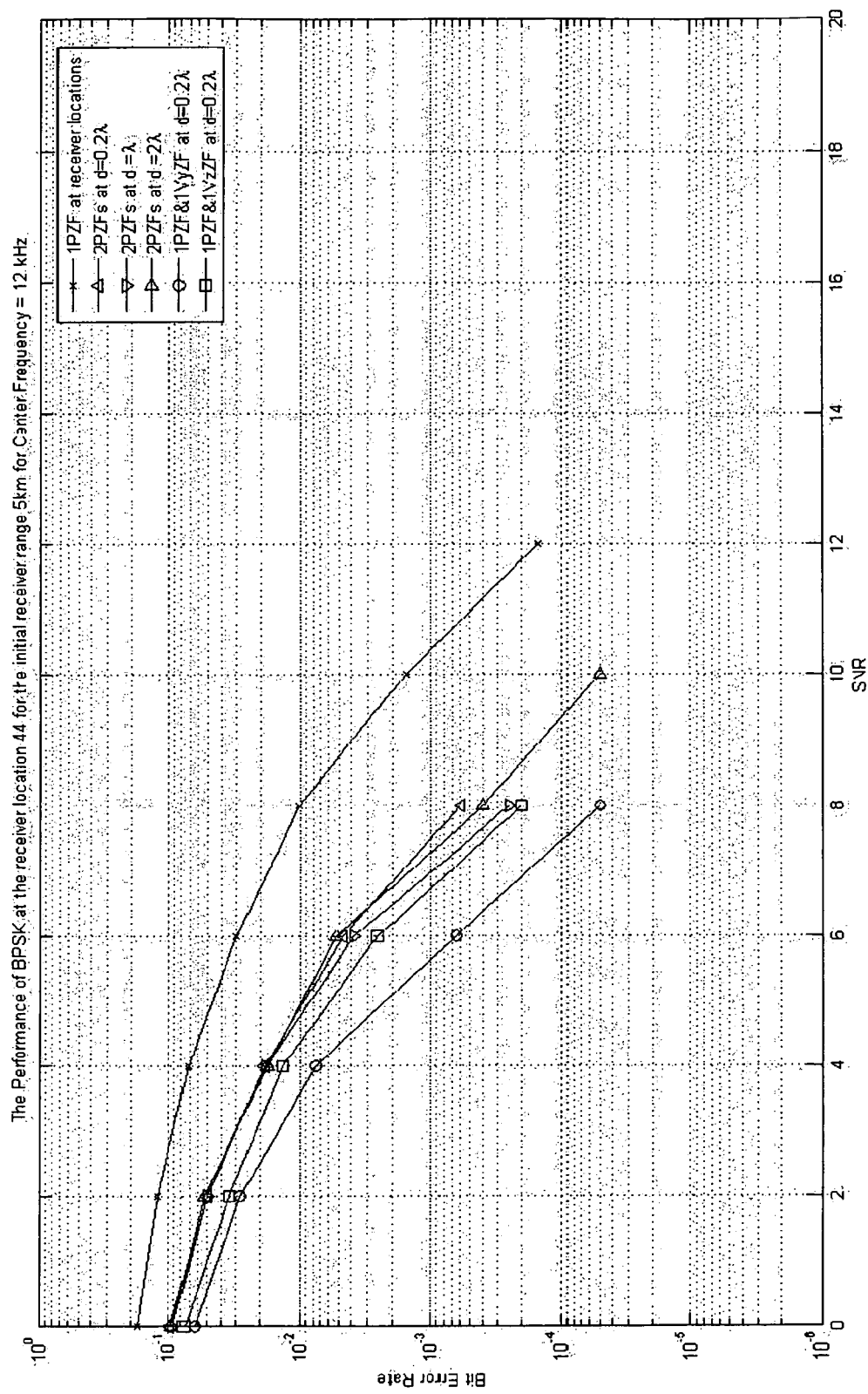
FIG. 66 is a graph of the bit error rate at receiver location 44 for the initial receiver range of 5 km and with a very fine sand bottom profile.
Figure 67:
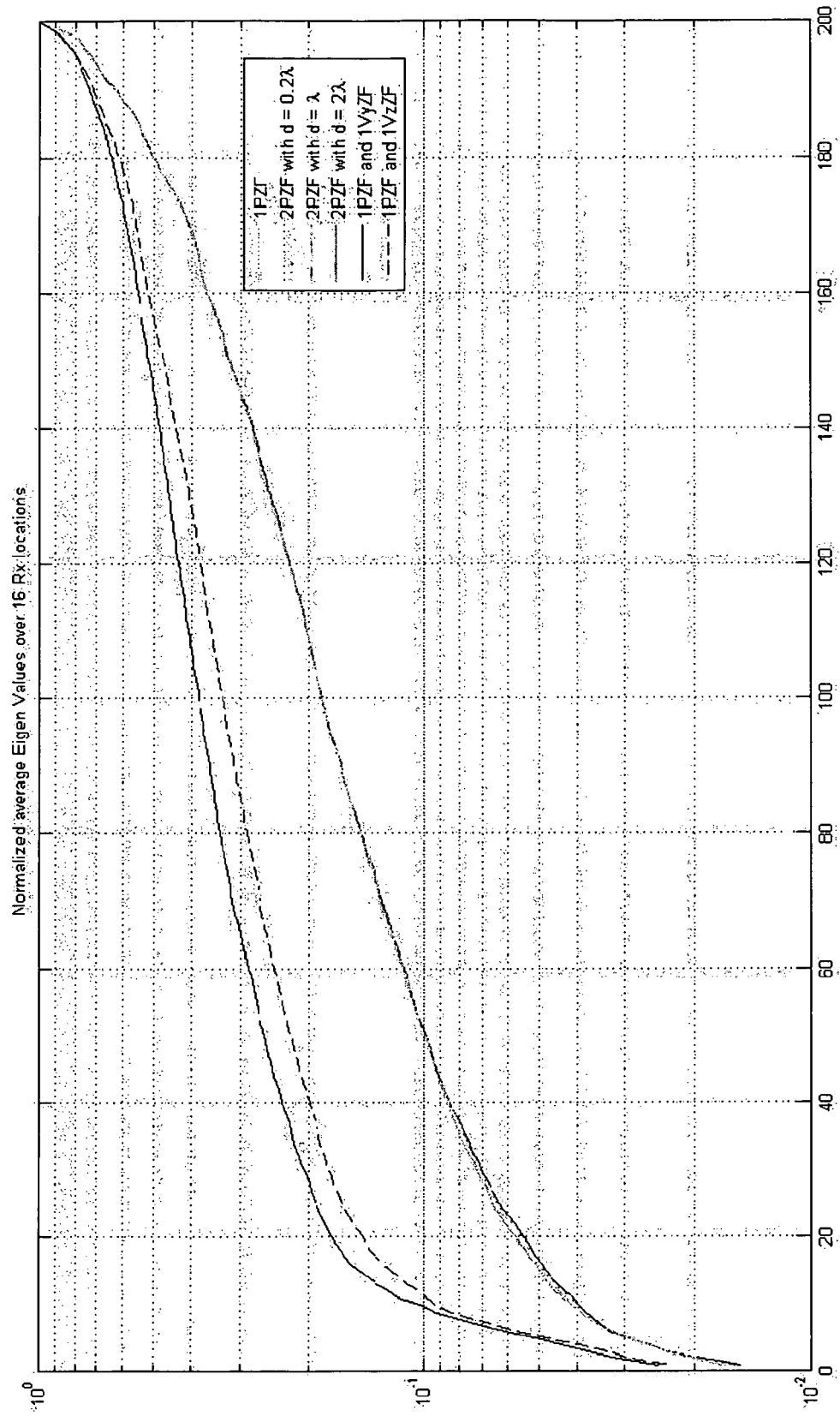
FIG. 67 is a graph of the normalized average eigenvalues over 16 receiver locations for the initial receiver range of 5 km and with a very fine sand bottom profile.
Figure 68:
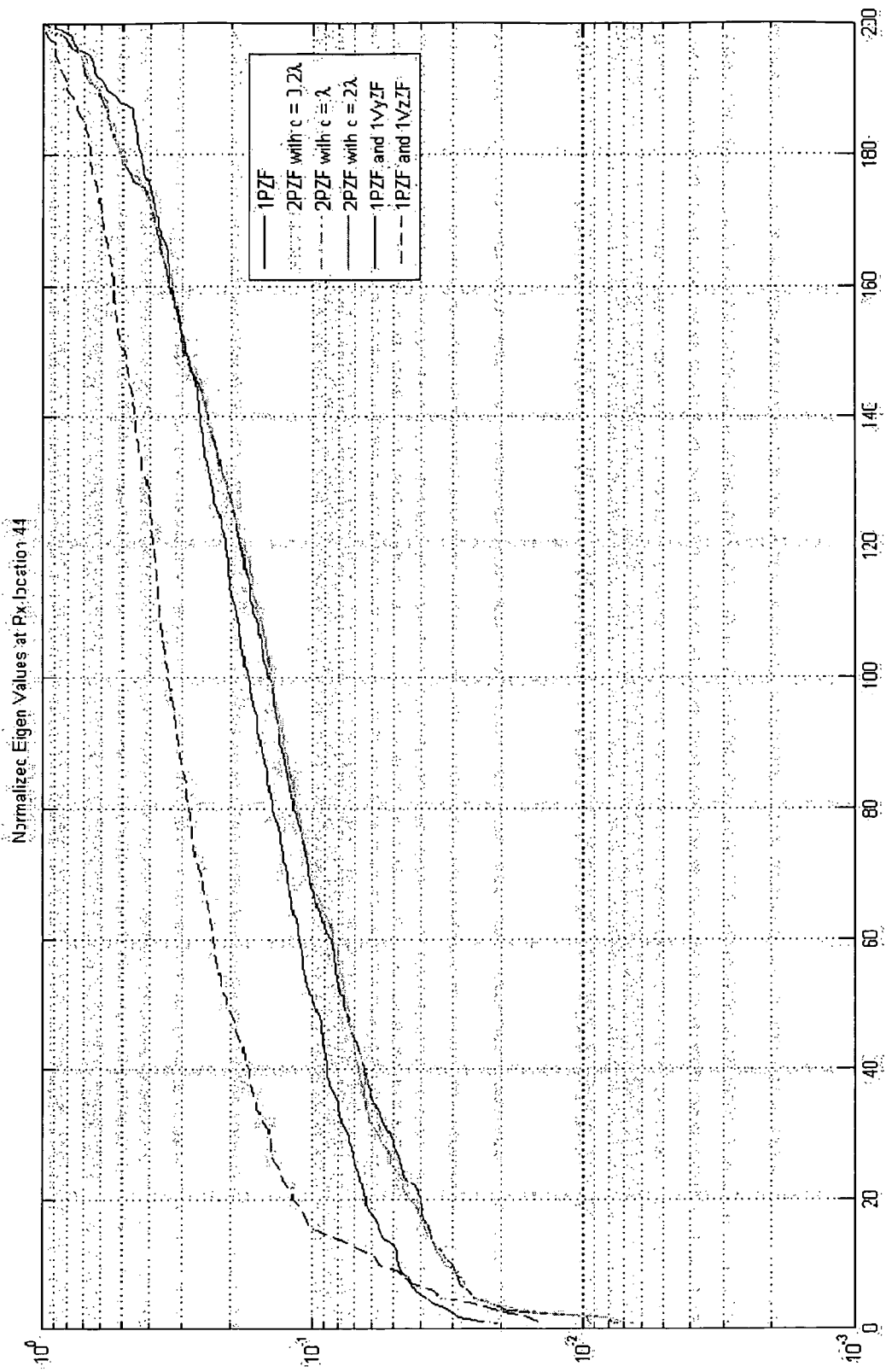
FIG. 68 is a graph of normalized eigenvalues at receiver location 44 for the initial receiver range of 5 km and with a very fine sand bottom profile.
Figure 69:
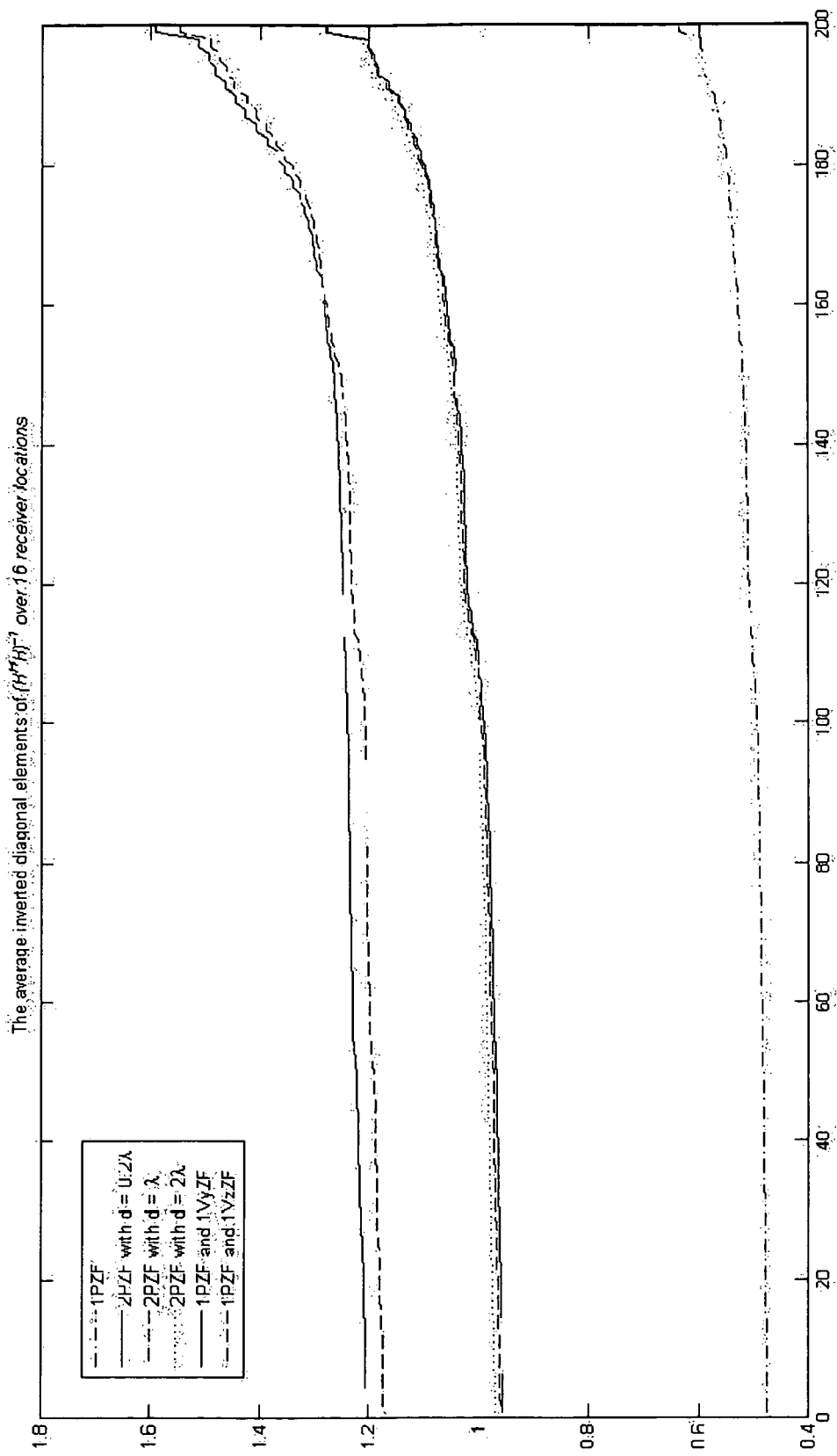
FIG. 69 is a graph of the average of inverted diagonal elements of $(H^H H)^{-1}$ over 16 receiver locations for the initial receiver range of 5 km and with a very fine sand bottom profile.
Figure 70:
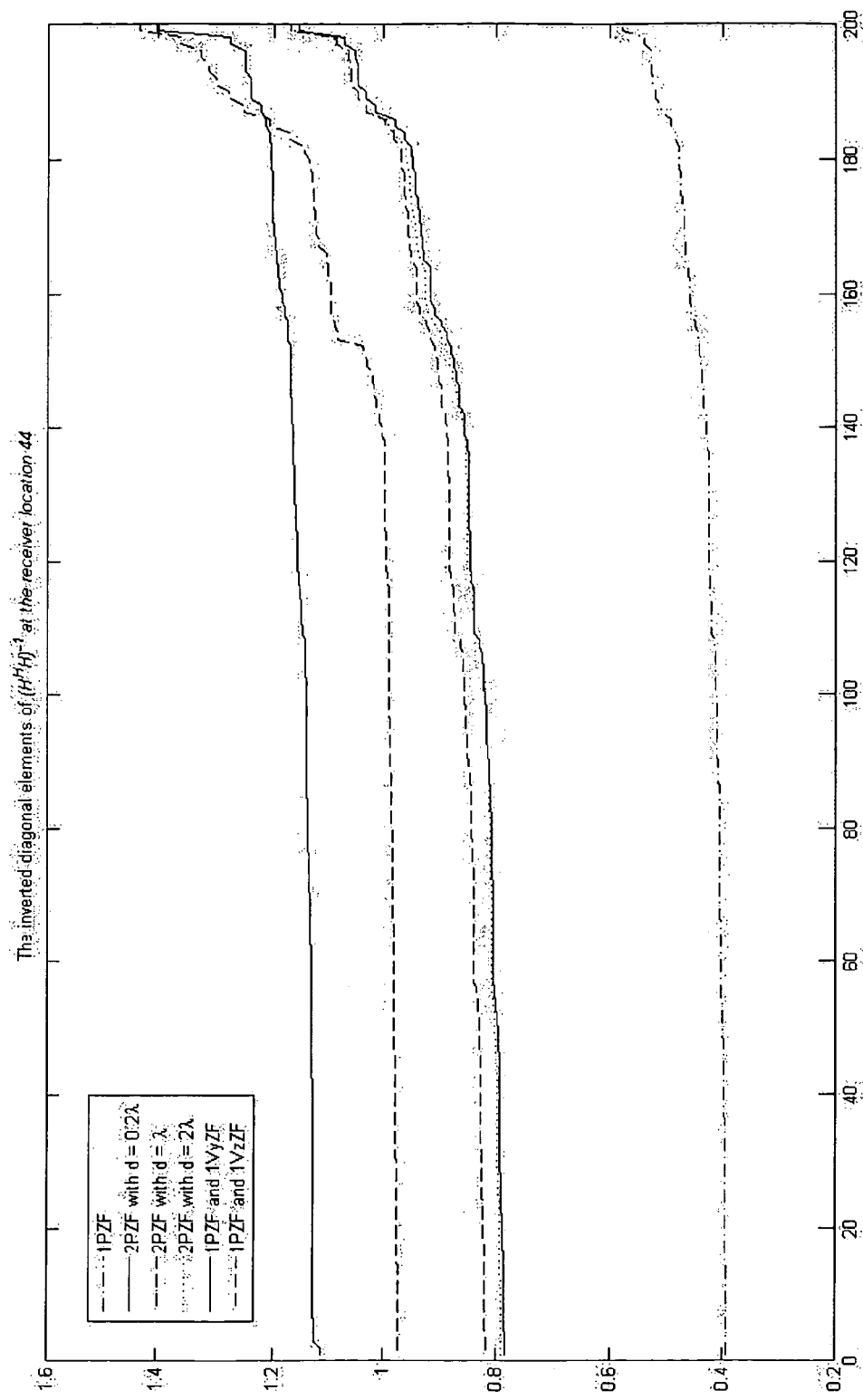
FIG. 70 is a graph of the inverted diagonal elements of $(H^H H)^{-1}$ at receiver location 44 for the initial receiver range of 5 km and with a very fine sand bottom profile.
Figure 71:
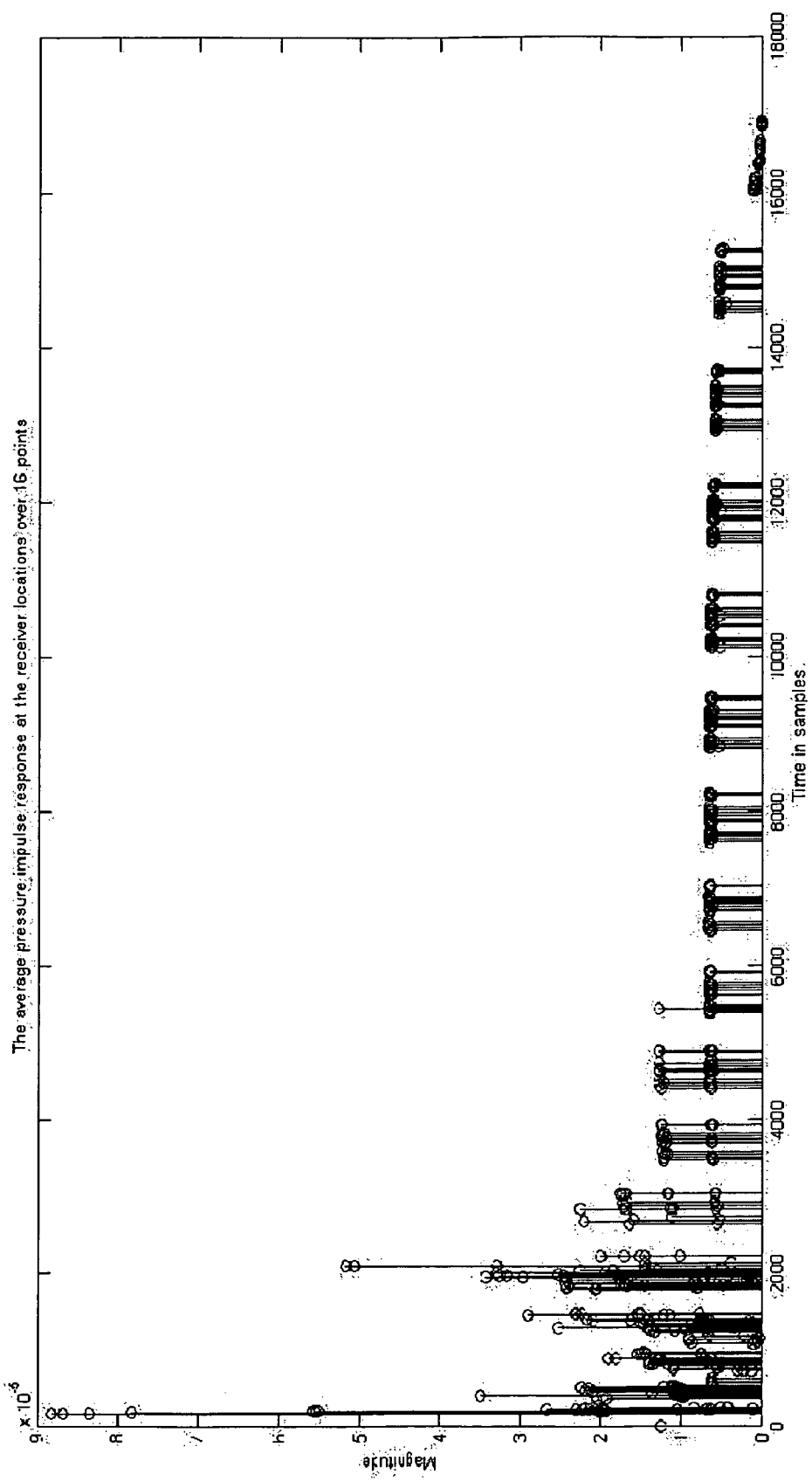
FIG. 71 is a graph of the average pressure impulse response over 16 receiver locations for the initial receiver range of 10 km and with a very fine sand bottom profile.
Figure 72:
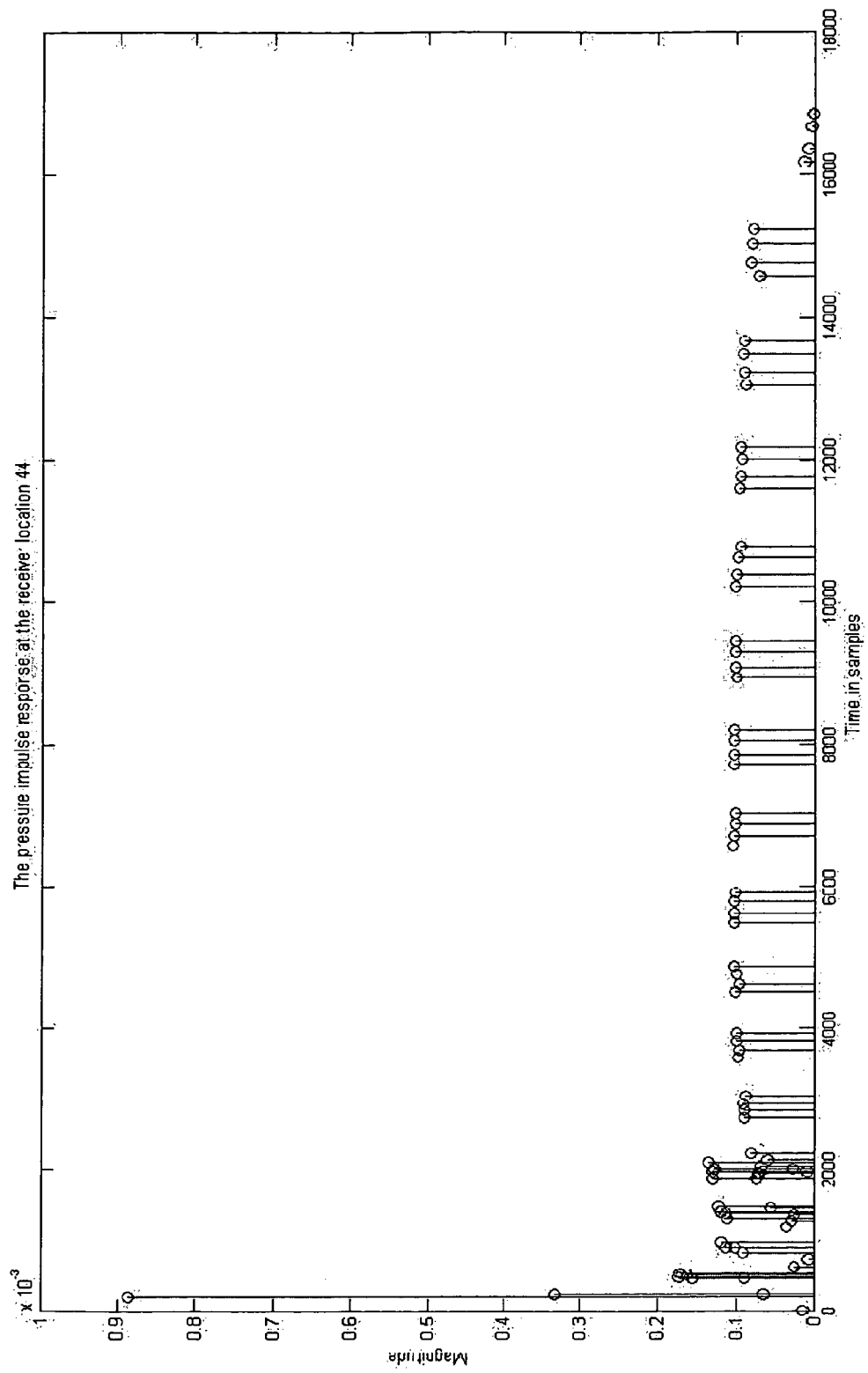
FIG. 72 is a graph of the pressure impulse response at receiver location 44 for the initial receiver range of 10 km and with a very fine sand bottom profile.
Figure 73:
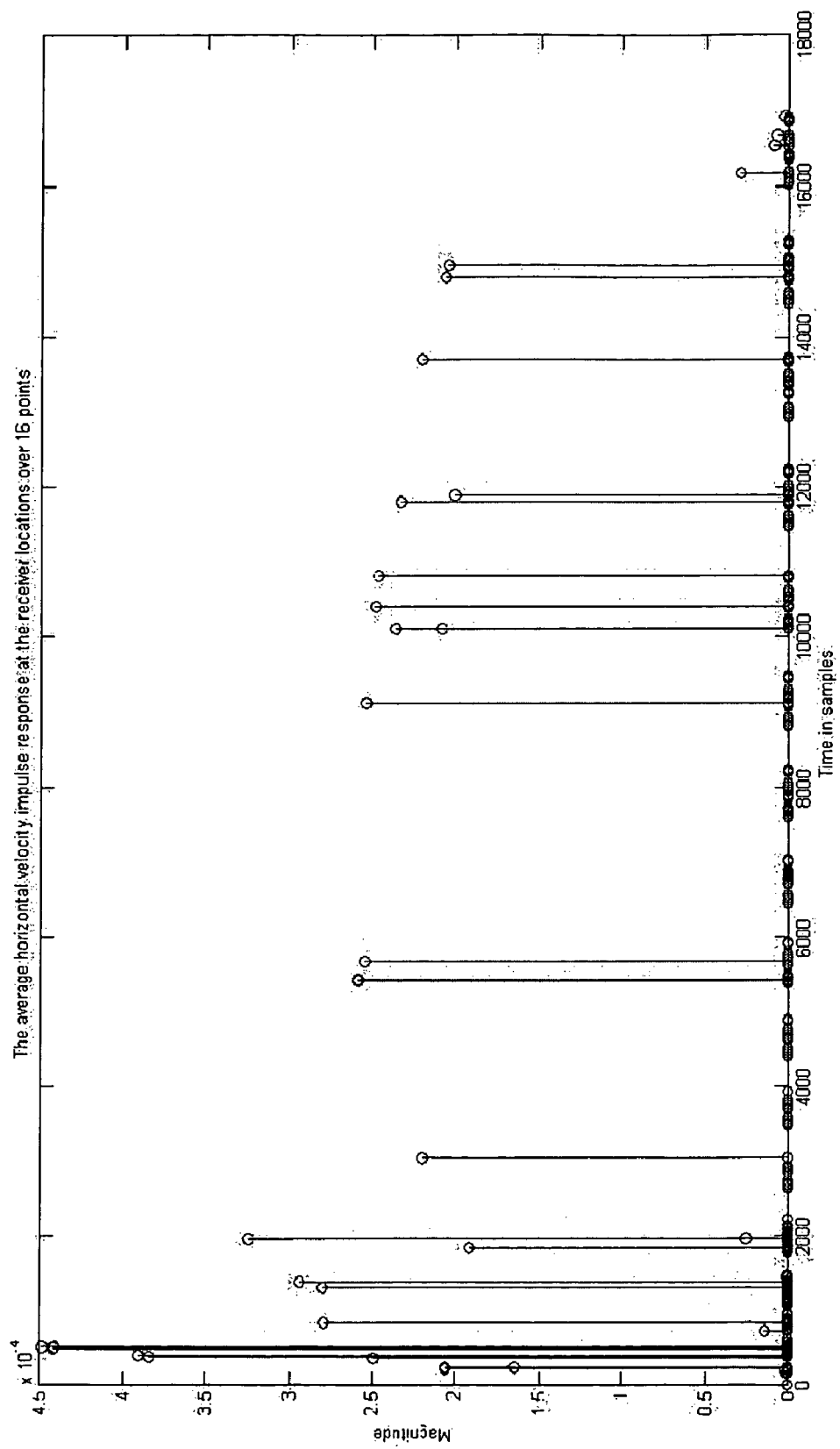
FIG. 73 is a graph of the average horizontal velocity impulse response over 16 receiver locations for the initial receiver range of 10 km and with a very fine sand bottom profile.
Figure 74:
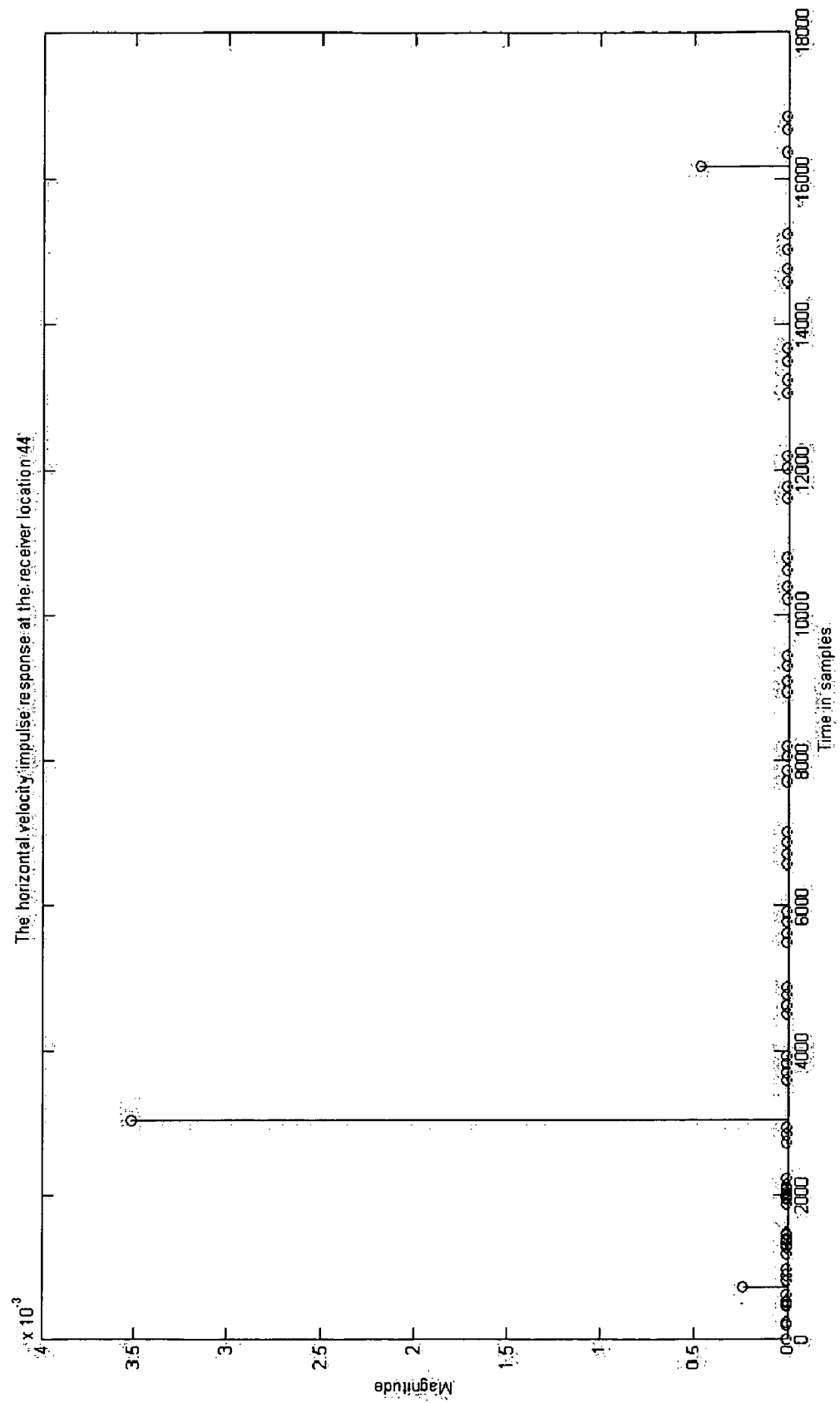
FIG. 74 is a graph of the horizontal velocity impulse response at receiver location 44 for the initial receiver range of 10 km and with very a fine sand bottom profile.
Figure 75:
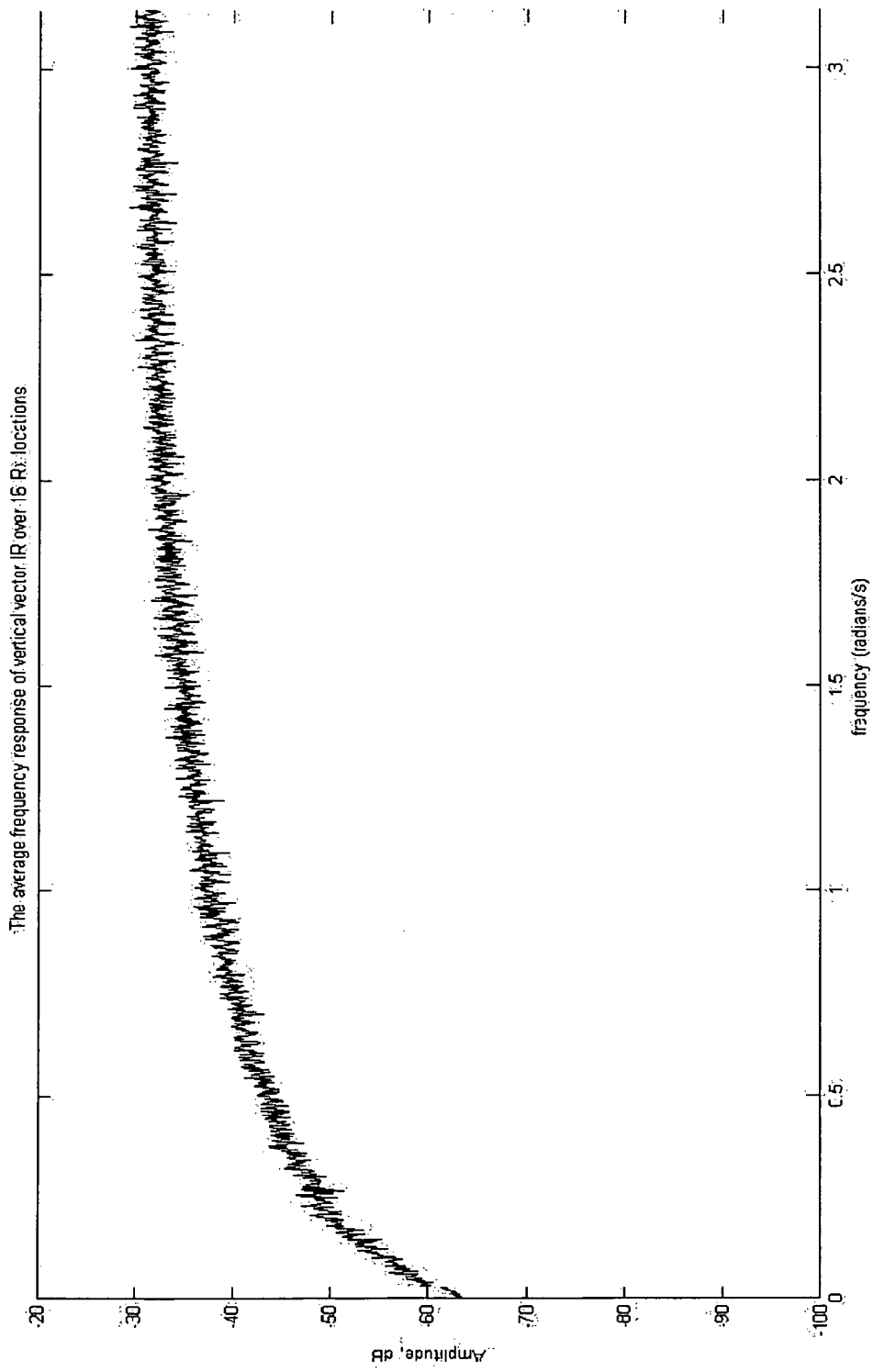
FIG. 75 is a graph of the average vertical velocity impulse response over 16 receiver locations for the initial receiver range of 10 km and with a very fine sand bottom profile.
Figure 76:
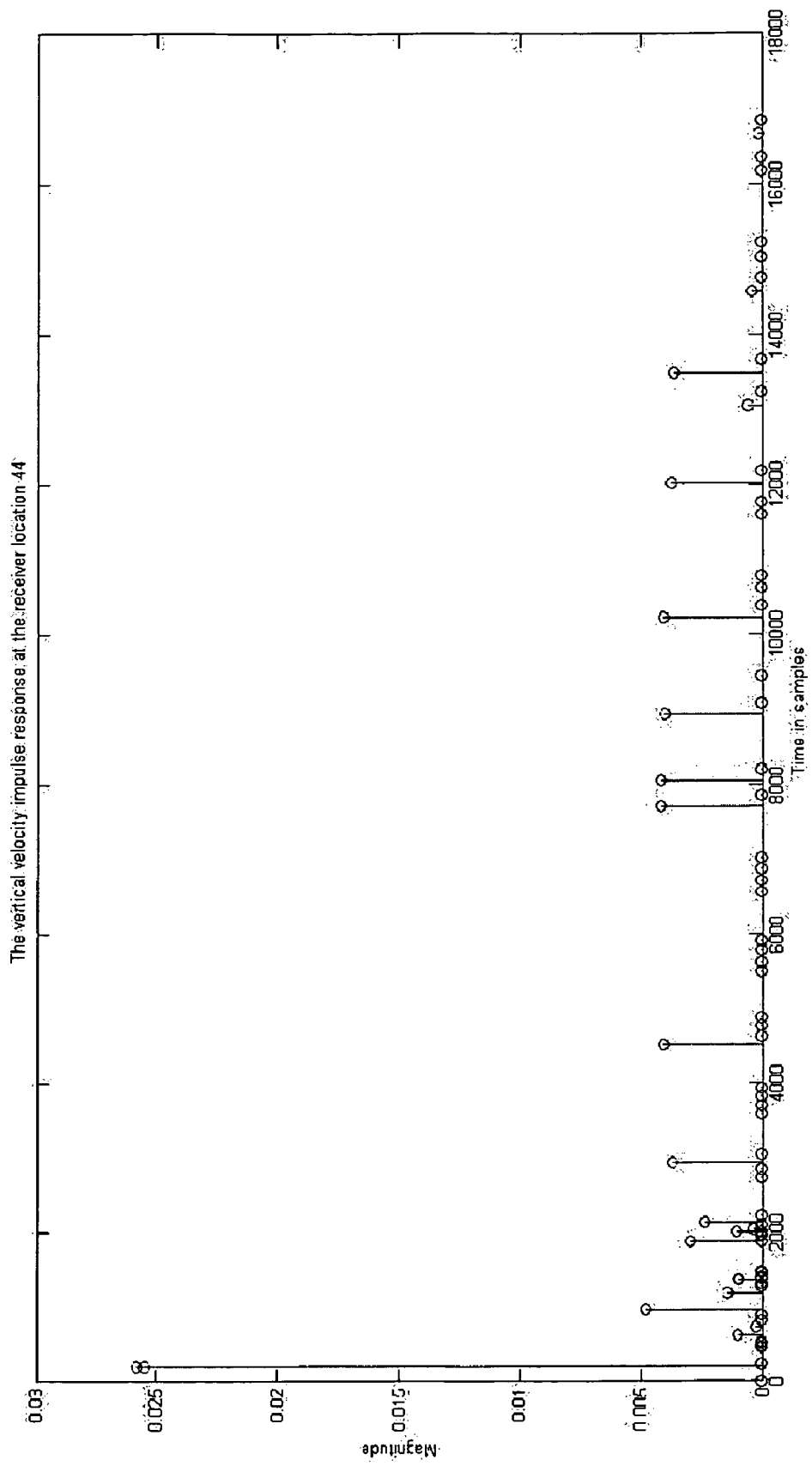
FIG. 76 is a graph of the vertical velocity impulse response at receiver location 44 for the initial receiver range of 10 km and with a very fine sand bottom profile.
Figure 77:
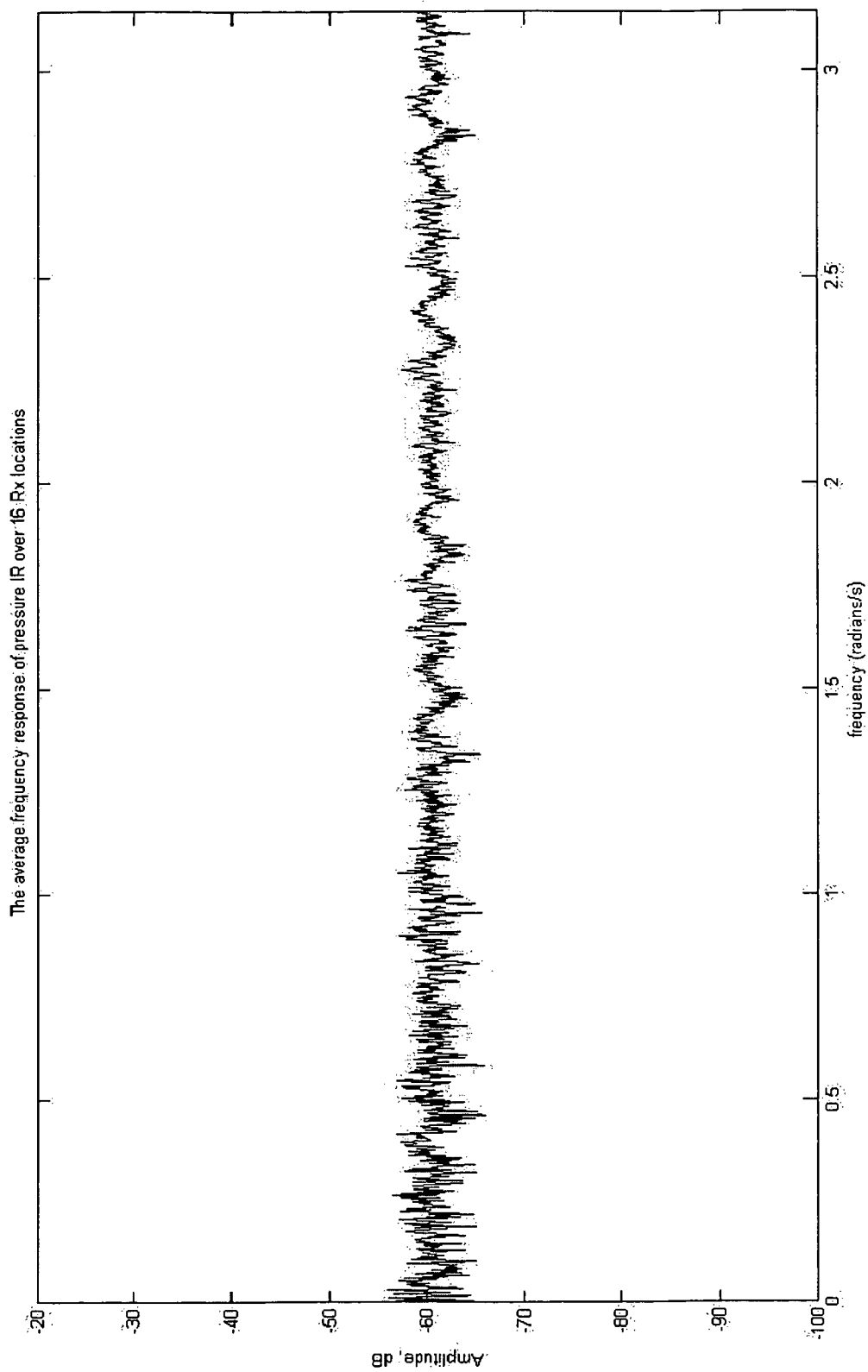
FIG. 77 is a graph of the average frequency response of the pressure impulse response over 16 receiver locations for the initial receiver range of 10 km and with a very fine sand bottom profile.
Figure 78:
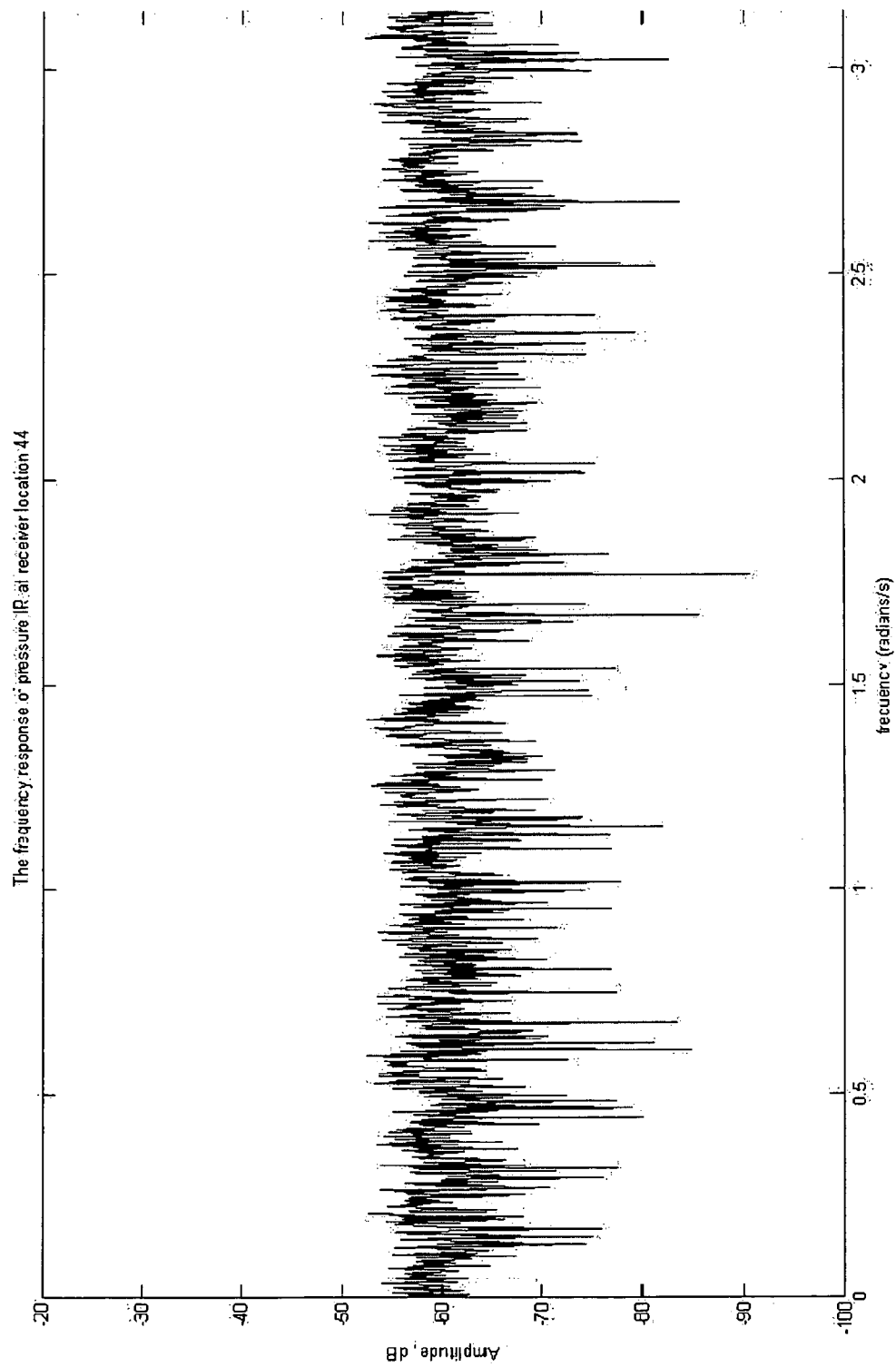
FIG. 78 is a graph of the frequency response of the pressure impulse response at receiver location 44 for the initial receiver range of 10 km and with a very fine sand bottom profile.
Figure 79:
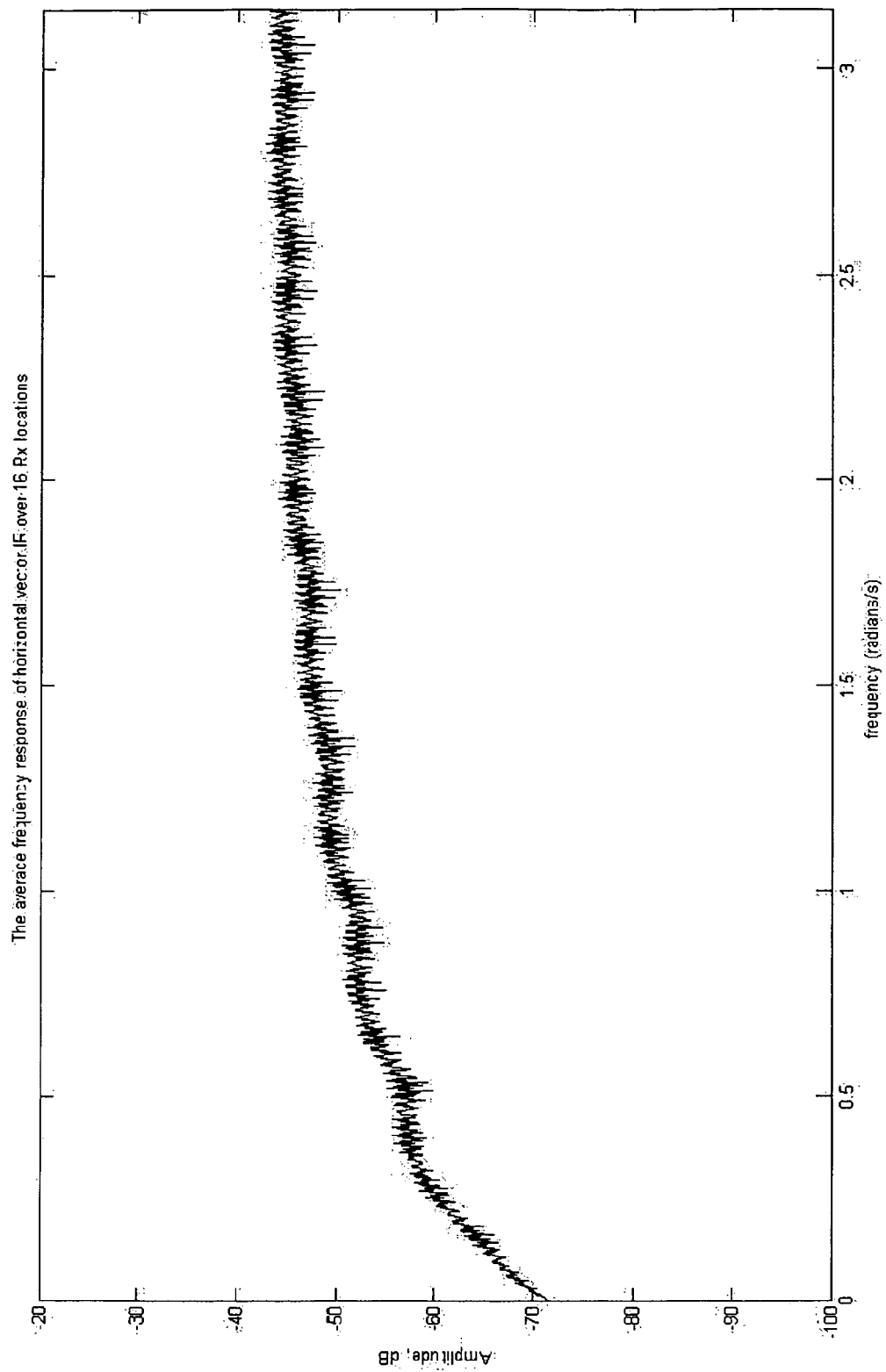
FIG. 79 is a graph of the average frequency response of the horizontal velocity impulse response over 16 receiver locations for the initial receiver range of 10 km and with a very fine sand bottom profile.
Figure 80:
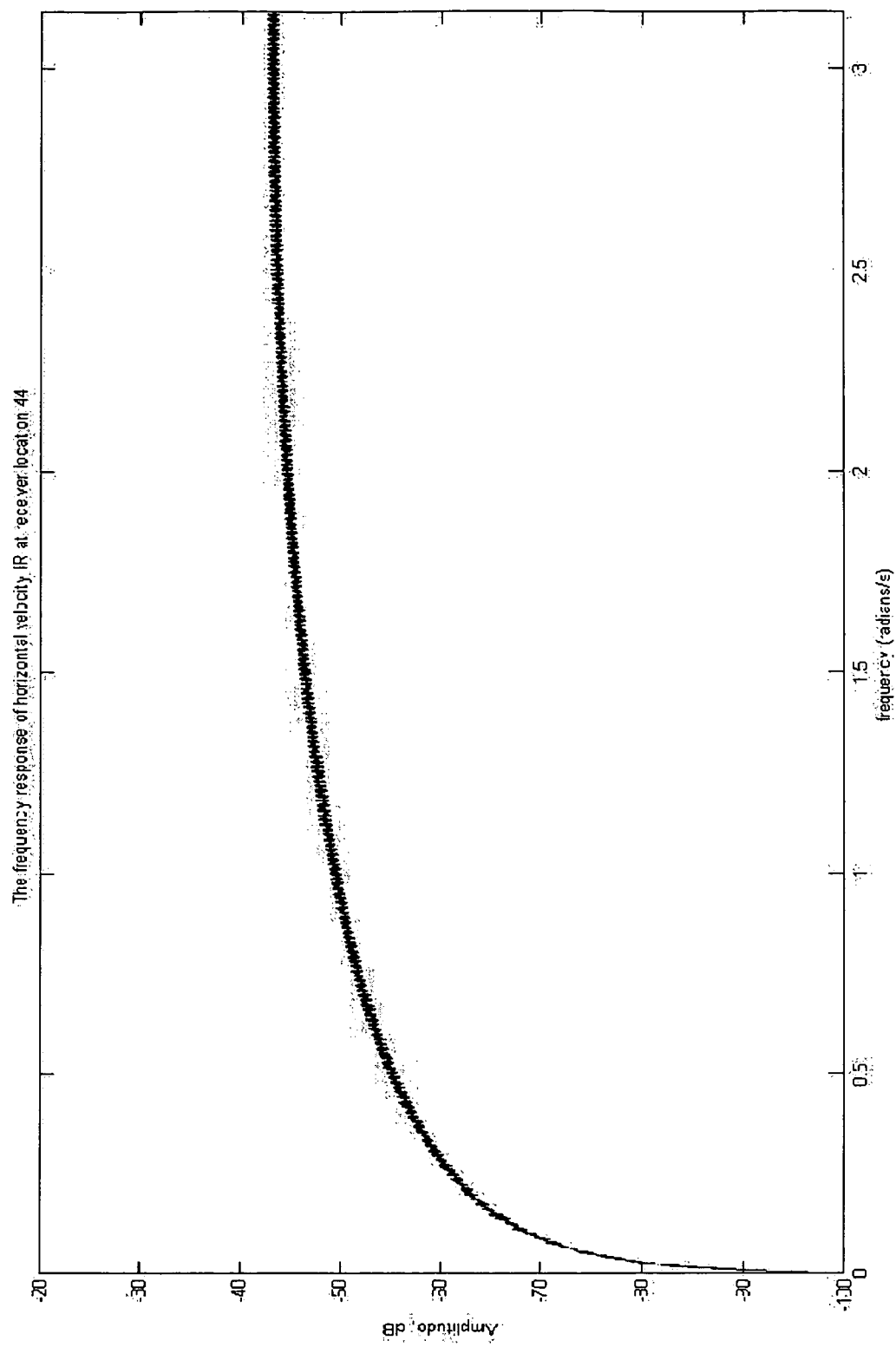
FIG. 80 is a graph of the frequency response of the horizontal velocity impulse response at receiver location 44 for the initial receiver range of 10 km and with a very fine sand bottom profile.
Figure 81:
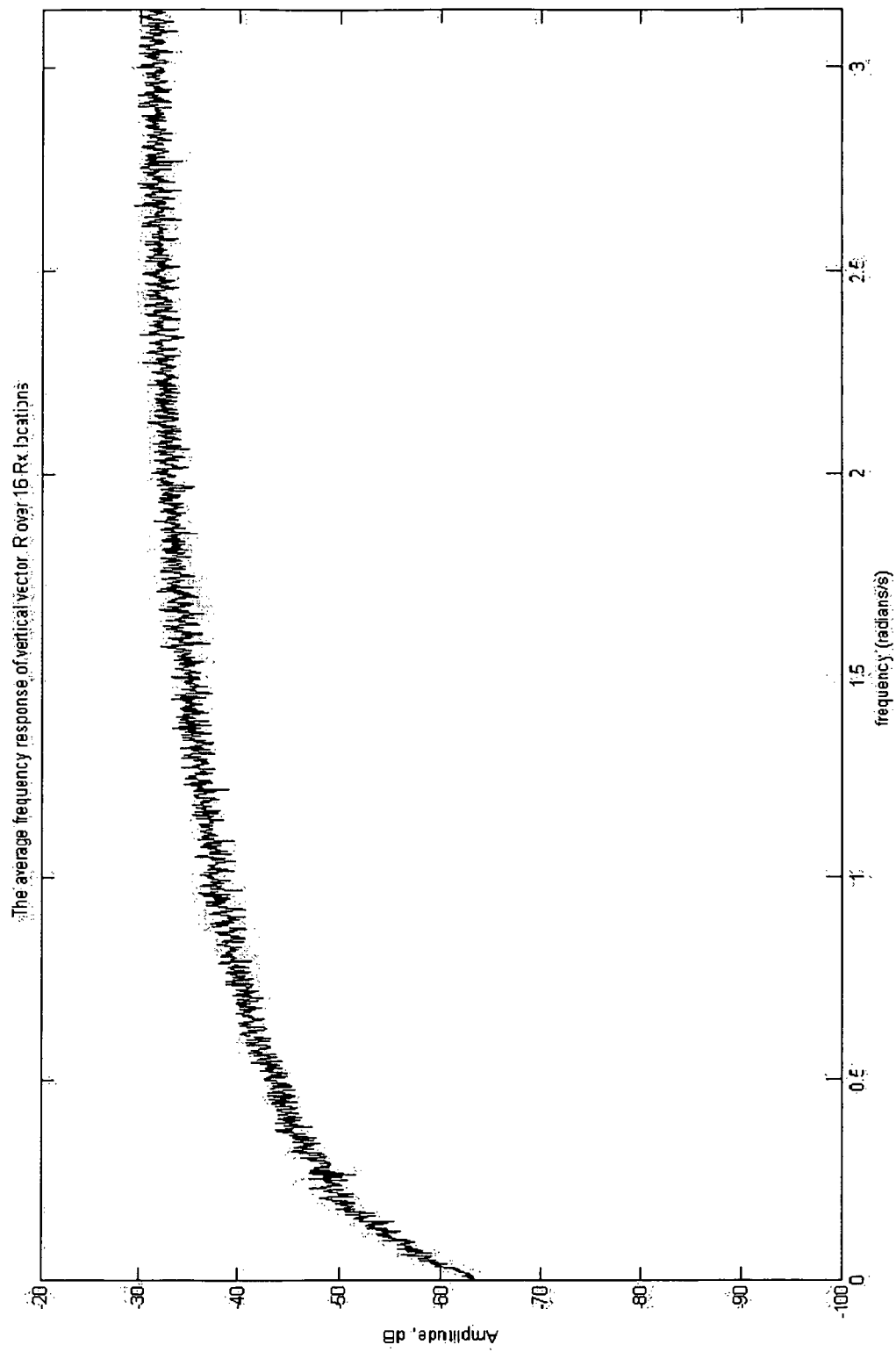
FIG. 81 is a graph of the average frequency response of the vertical velocity impulse response over 16 receiver locations for the initial receiver range of 10 km and with a very fine sand bottom profile.
Figure 82:
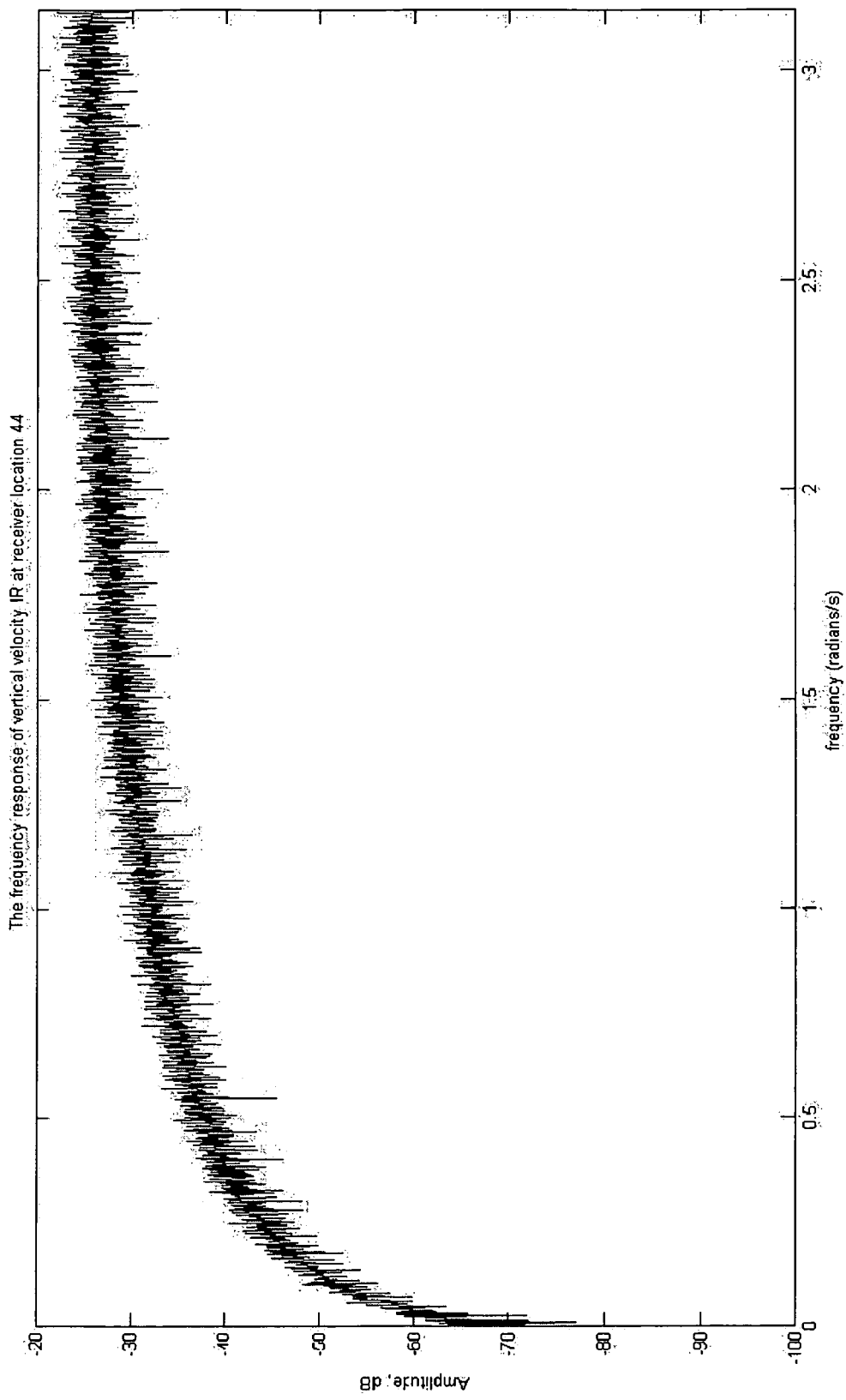
FIG. 82 is a graph of the frequency response of the vertical velocity impulse response at receiver location 44 for the initial receiver range of 10 km and with a very fine sand bottom profile.

Bit Error Rate Plots; Eigen Values Plots; and Inverted Diagonal Elements of $(H^H H)^{-1}$:

Plots for bit error rate under various conditions are shown in FIGS. 65-66. Eigen values plots are shown in FIGS. 67-68. Plots for the condition number of $(H^H H)^{-1}$ are shown in FIGS. 69-70. The foregoing figures are described in the Brief Description of the Drawings section of this specification.

5.3.8 The Condition Number of $H^H H$

Table 53 tabulates the condition numbers of $H^H H$ of SISO ZF receivers of 16 receiver locations for the initial receiver range 5 km and very fine sand bottom profile, where the mean=73.5595, and the variance=881.4456.

TABLE 53

| | | | |
|---|---|---|---|
| 58.0899 | 59.9120 | 57.5154 | 55.9528 |
| 61.3605 | 63.0827 | 41.3254 | 37.8037 |
| 67.0021 | 70.8309 | 54.3199 | 58.2149 |
| 117.2623 | 117.7961 | 124.3270 | 132.1584 |

Table 54 tabulates the condition numbers of $H^H H$ of SIMO ZF receivers, when using two pressure sensors separated at the distance of 0.2λ, of 16 receiver locations for the initial receiver range 5 km and very fine sand bottom profile, where the mean=71.9622, and the variance=965.2747.

TABLE 54

| | | | |
|---|---|---|---|
| 58.1352 | 59.5676 | 57.1231 | 55.9785 |
| 55.9797 | 54.0977 | 38.2669 | 37.3421 |
| 63.0792 | 70.8491 | 50.3956 | 55.6093 |
| 118.2229 | 117.9220 | 124.4578 | 134.3687 |

Table 55 tabulates the condition numbers of $H^H H$ of SIMO ZF receivers, when using two pressure sensors separated at the distance of λ, of 16 receiver locations for the initial receiver range 5 km and very fine sand bottom profile, where the mean=68.2852, and the variance=927.5209.

TABLE 55

| | | | |
|---|---|---|---|
| 56.7804 | 58.4834 | 57.0169 | 55.6128 |
| 46.6342 | 42.9635 | 38.3459 | 35.6845 |
| 64.2871 | 66.0017 | 50.3220 | 45.4436 |
| 123.7260 | 122.8242 | 122.0161 | 106.4217 |

Table 56 tabulates the condition numbers of $H^H H$ of SIMO ZF receivers, when using two pressure sensors separated at the distance of 2λ, for 16 receiver locations for the initial receiver range 5 km and very fine sand bottom profile, where the mean=70.8836, and the variance=1466.4923.

TABLE 56

| | | | |
|---|---|---|---|
| 58.2189 | 58.0964 | 54.7904 | 54.8374 |
| 43.5718 | 43.0050 | 38.4495 | 36.0789 |
| 56.4247 | 57.3554 | 47.5458 | 43.9802 |
| 134.7997 | 124.7922 | 128.3363 | 153.8552 |

Table 57 tabulates the condition numbers of $H^H H$ of SIMO ZF receivers, when using a pressure sensor and a horizontal velocity vector sensor separated at the distance of 0.2λ, for 16 receiver locations for the initial receiver range 10 km and coarse silt bottom profile, where the mean=48.7019, and the variance=359.8946.

TABLE 57

| | | | |
|---|---|---|---|
| 55.1802 | 57.9038 | 53.8265 | 15.8659 |
| 49.9635 | 49.0606 | 38.4618 | 39.6070 |
| 46.2861 | 40.2956 | 23.6981 | 42.7996 |
| 49.1374 | 61.3668 | 107.3595 | 48.4184 |

Table 58 tabulates the condition numbers of $H^H H$ of SIMO ZF receivers, when using a pressure sensor and a vertical velocity vector sensor separated at the distance of 0.2λ, for 16 receiver locations for the initial receiver range 10 km and coarse silt bottom profile, where the mean=58.04779, and the variance=499.6343.

TABLE 58

| | | | |
|---|---|---|---|
| 69.3148 | 57.0733 | 53.5608 | 57.9738 |
| 43.8962 | 58.2770 | 52.4564 | 11.6059 |
| 62.5690 | 46.3288 | 13.9516 | 59.1277 |
| 88.1662 | 95.1361 | 87.9441 | 71.3827 |

Simulation Results for the Initial Receiver Range 10 km and Very Fine Sand Bottom Profile Plots of the impulse response for the conditions stated the above heading are shown in FIGS. 71-76 of this application. These figures are described in the Brief Description of the Drawings section of this specification.

Mean Excess Delay and RMS Delay Spread

Mean Excess Delays in Seconds of 16 Receiver Locations

Table 59 tabulates the mean excess delays in seconds of the pressure impulse responses of 16 receiver locations for the initial receiver range 10 km and very fine sand bottom profile, where the mean=6.6085e−002 sec; and the variance=6.7673e−004 sec$^2$

TABLE 59

| | | | |
|---|---|---|---|
| 8.8991e−002 | 9.1272e−002 | 9.2820e−002 | 9.2785e−002 |
| 9.1096e−002 | 9.1670e−002 | 9.0870e−002 | 9.0762e−002 |
| 2.9583e−002 | 3.0750e−002 | 3.2590e−002 | 3.4822e−002 |
| 5.0052e−002 | 5.0581e−002 | 4.9700e−002 | 4.9017e−002 |

Table 60 tabulates the mean excess delays in seconds of the horizontal velocity impulse responses of 16 receiver locations for the initial receiver range 10 km and very fine sand bottom profile, where the mean=9.7303e−002 sec; and the variance=8.6938e−003 sec$^2$.

TABLE 60

| | | | |
|---|---|---|---|
| 2.4810e−001 | 6.1576e−002 | 1.2025e−001 | 1.1114e−001 |
| 1.0133e−001 | 1.1301e−001 | 1.0909e−001 | 1.2715e−002 |
| 1.9233e−001 | 2.0414e−002 | 1.2295e−002 | 7.4570e−003 |
| 2.7448e−002 | 3.4692e−001 | 5.0732e−003 | 6.7710e−002 |

Table 61 tabulates the mean excess delays in seconds of the vertical velocity impulse responses of 16 receiver locations for the initial receiver range 10 km and very fine sand bottom profile, where the mean=9.4922e−002 sec; and the variance=1.9379e−003 sec$^2$.

TABLE 61

| | | | |
|---|---|---|---|
| 6.8302e−002 | 1.1380e−001 | 1.1406e−001 | 1.2860e−001 |
| 1.3058e−001 | 1.5273e−001 | 1.3120e−001 | 9.4316e−002 |
| 1.1186e−001 | 1.1733e−001 | 1.4022e−001 | 1.1317e−001 |
| 3.0444e−002 | 2.4764e−002 | 1.6217e−002 | 3.1172e−002 |

TABLE 61-continued

RMS Delays Spreads in Second of 16 Receiver Locations

Table 62 tabulates the RMS delays spreads in seconds of the pressure impulse responses of 16 receiver locations for the initial receiver range 10 km and very fine sand bottom profile, where the mean=8.2024e−002 sec; and the variance=1.1088e−004 sec$^2$.

TABLE 62

| | | | |
|---|---|---|---|
| 9.0356e−002 | 9.1239e−002 | 9.2016e−002 | 9.1959e−002 |
| 9.1797e−002 | 9.1737e−002 | 9.1297e−002 | 9.0730e−002 |
| 6.3502e−002 | 6.4899e−002 | 6.6930e−002 | 6.8875e−002 |
| 7.9743e−002 | 7.9949e−002 | 7.9184e−002 | 7.8171e−002 |

Table 63 tabulates the RMS delays spreads in seconds of the horizontal velocity impulse responses of 16 receiver locations for the initial receiver range 10 km and very fine sand bottom profile, where the mean=4.6591e−002 sec; and the variance=2.0241e−003 sec$^2$.

TABLE 63

| | | | |
|---|---|---|---|
| 4.3518e−003 | 9.1393e−002 | 1.0138e−001 | 1.1509e−001 |
| 8.6179e−002 | 7.3381e−005 | 1.1468e−001 | 3.3538e−003 |
| 1.0499e−001 | 1.6668e−002 | 3.7157e−002 | 2.4716e−002 |
| 1.0309e−004 | 9.7813e−003 | 2.6310e−004 | 3.5276e−002 |

Table 64 tabulates the RMS delays spreads in seconds of the vertical velocity impulse responses of 16 receiver locations for the initial receiver range 10 km and very fine sand bottom profile, where the mean=8.4227e−002 sec; and the variance=3.7238e−004 sec$^2$.

TABLE 64

| | | | |
|---|---|---|---|
| 6.8321e−002 | 8.0189e−002 | 1.0290e−001 | 9.4799e−002 |
| 7.8392e−002 | 9.6510e−002 | 1.0604e−001 | 9.0548e−002 |
| 1.0246e−001 | 9.4475e−002 | 1.0916e−001 | 9.2812e−002 |
| 6.4584e−002 | 6.3599e−002 | 3.6735e−002 | 6.6112e−002 |

Frequency Response

Graphs of the frequency response under various conditions are shown in FIGS. 77-82. These figures are also described in the Brief Description of the Drawings section of this specification.

DC Average and Variance of Impulse Response

DC Average over 16 Receiver Locations

Table 65 tabulates the DC average of pressure impulse responses of 16 receiver locations for the initial receiver range 10 km and very fine sand bottom profile, where the mean=5.0168e−008+1.7987e−009i volts, and the variance=1.2961e−015 volts$^2$.

TABLE 65

| | | | |
|---|---|---|---|
| 3.0334e−008 + 1.8599e−008i | 2.4926e−008 + 1.8745e−008i | 2.4844e−008 + 2.4983e−008i | 2.5415e−008 + 2.5692e−008i |
| 2.8341e−008 + 2.1188e−008i | 2.5941e−008 + 2.0308e−008i | 2.5783e−008 + 2.1672e−008i | 2.6274e−008 + 2.1454e−008i |
| 1.0752e−007 − 1.4407e−008i | 1.0003e−007 − 1.4327e−008i | 9.5951e−008 − 1.2284e−008i | 9.2051e−008 − 8.4601e−009i |
| 4.9984e−008 − 2.4096e−008i | 4.7374e−008 − 2.4334e−008i | 4.8511e−008 − 2.3878e−008i | 4.9415e−008 − 2.2075e−008i |

Table 66 tabulates the DC average of horizontal velocity impulse responses of 16 receiver locations for the initial receiver range 10 km and very fine sand bottom profile, where the mean=4.3398e−009+1.6282e−008i volts, and the variance=4.1590e−015 volts$^2$.

TABLE 70-continued

| | | | |
|---|---|---|---|
| 2.9092e−008 | 2.6311e−008 | 1.7473e−008 | 1.6968e−008 |
| 1.0427e−007 | 9.9556e−008 | 9.4379e−008 | 9.7566e−008 |

TABLE 66

| | | | |
|---|---|---|---|
| −2.0005e−010 + 5.7442e−010i | 1.0875e−010 − 3.9208e−010i | 7.1435e−011 − 2.3932e−010i | 6.6162e−008 + 2.5826e−007i |
| 2.7729e−010 − 1.6164e−011i | 2.5330e−010 + 1.9316e−010i | 7.3718e−010 + 1.5237e−009i | −3.9418e−010 + 5.7742e−010i |
| −5.1220e−010 + 8.9027e−010i | 4.0556e−010 − 5.5868e−010i | 1.1542e−009 − 7.4401e−010i | 1.5096e−009 − 1.0185e−009i |
| 1.0980e−010 − 1.2767e−010i | 2.6761e−010 + 3.6652e−010i | 8.4861e−011 + 5.2346e−010i | −5.9823e−010 + 7.0392e−010i |

Table 67 tabulates the DC average of vertical velocity impulse responses of 16 receiver locations for the initial receiver range 10 km and very fine sand bottom profile, where the mean=5.2747e−010+3.2734e−008i volts, and the variance=7.3608e−015 volts$^2$.

TABLE 67

| | | | |
|---|---|---|---|
| −2.0645e−008 − 5.0333e−008i | −2.1052e−009 + 1.2753e−009i | 4.8435e−008 + 2.6159e−007i | 5.9632e−008 + 2.2791e−007i |
| 7.4431e−010 − 1.3424e−009i | −4.4292e−011 − 7.5505e−010i | −2.3431e−008 + 2.2111e−008i | 2.5754e−009 + 3.6370e−008i |
| −1.8393e−008 + 9.0359e−009i | −1.7856e−008 + 2.6645e−008i | 1.2035e−008 + 1.9426e−008i | −2.2355e−008 + 9.4220e−009i |
| −1.9906e−009 − 2.6158e−009i | −8.7421e−010 − 9.8561e−010i | −8.8423e−009 − 2.3197e−008i | 1.5547e−009 − 1.0823e−008i |

Variance of 16 Receiver Locations

Table 68 tabulates the variance of pressure impulse responses of 16 receiver locations for the initial receiver range 10 km and very fine sand bottom profile, where the mean=8.8535e−011 volts$^2$, and the variance=1.9566e−021 volts$^4$.

TABLE 68

| | | | |
|---|---|---|---|
| 5.0155e−011 | 4.9792e−011 | 4.9498e−011 | 4.9292e−011 |
| 5.0860e−011 | 5.0569e−011 | 5.0435e−011 | 5.0073e−011 |
| 1.6841e−010 | 1.6254e−010 | 1.5424e−010 | 1.4358e−010 |
| 9.6836e−011 | 9.6000e−011 | 9.7367e−011 | 9.6913e−011 |

Table 69 tabulates the variance of horizontal impulse responses of 16 receiver locations for the initial receiver range 10 km and very fine sand bottom profile, where the mean=3.4554e−009 volts$^2$, and the variance=1.6114e−017 volts$^4$.

TABLE 69

| | | | |
|---|---|---|---|
| 1.2222e−009 | 7.7348e−009 | 6.0494e−009 | 1.0138e−008 |
| 1.7727e−015 | 2.0253e−009 | 1.2584e−008 | 8.4544e−009 |
| 2.9748e−015 | 2.3839e−009 | 1.8237e−014 | 4.3258e−014 |
| 2.3726e−009 | 1.3300e−012 | 8.2324e−010 | 1.4974e−009 |

Table 70 tabulates the variance of vertical impulse responses of 16 receiver locations for the initial receiver range 10 km and very fine sand bottom profile, where the mean=4.5194e−008 volts$^2$, and the variance=9.8903e−016 volts

TABLE 70

| | | | |
|---|---|---|---|
| 2.4406e−008 | 3.2956e−008 | 3.1144e−008 | 3.1929e−008 |
| 2.4153e−008 | 2.6550e−008 | 3.2286e−008 | 3.4062e−008 |

Figure 83:
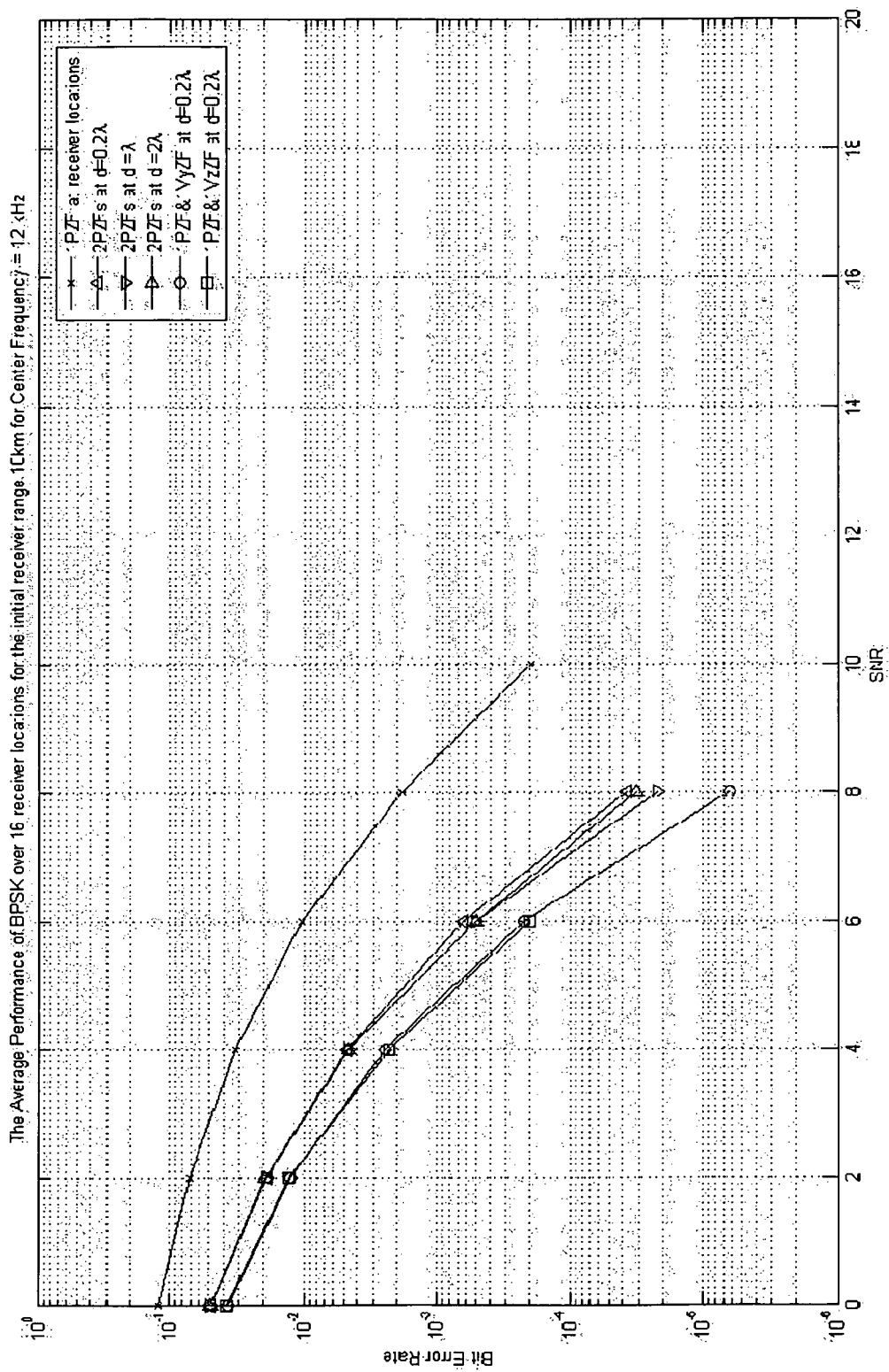
FIG. 83 is a graph of the average bit error rate over 16 receiver locations for the initial receiver range of 10 km and with a very fine sand bottom profile.
Figure 84:
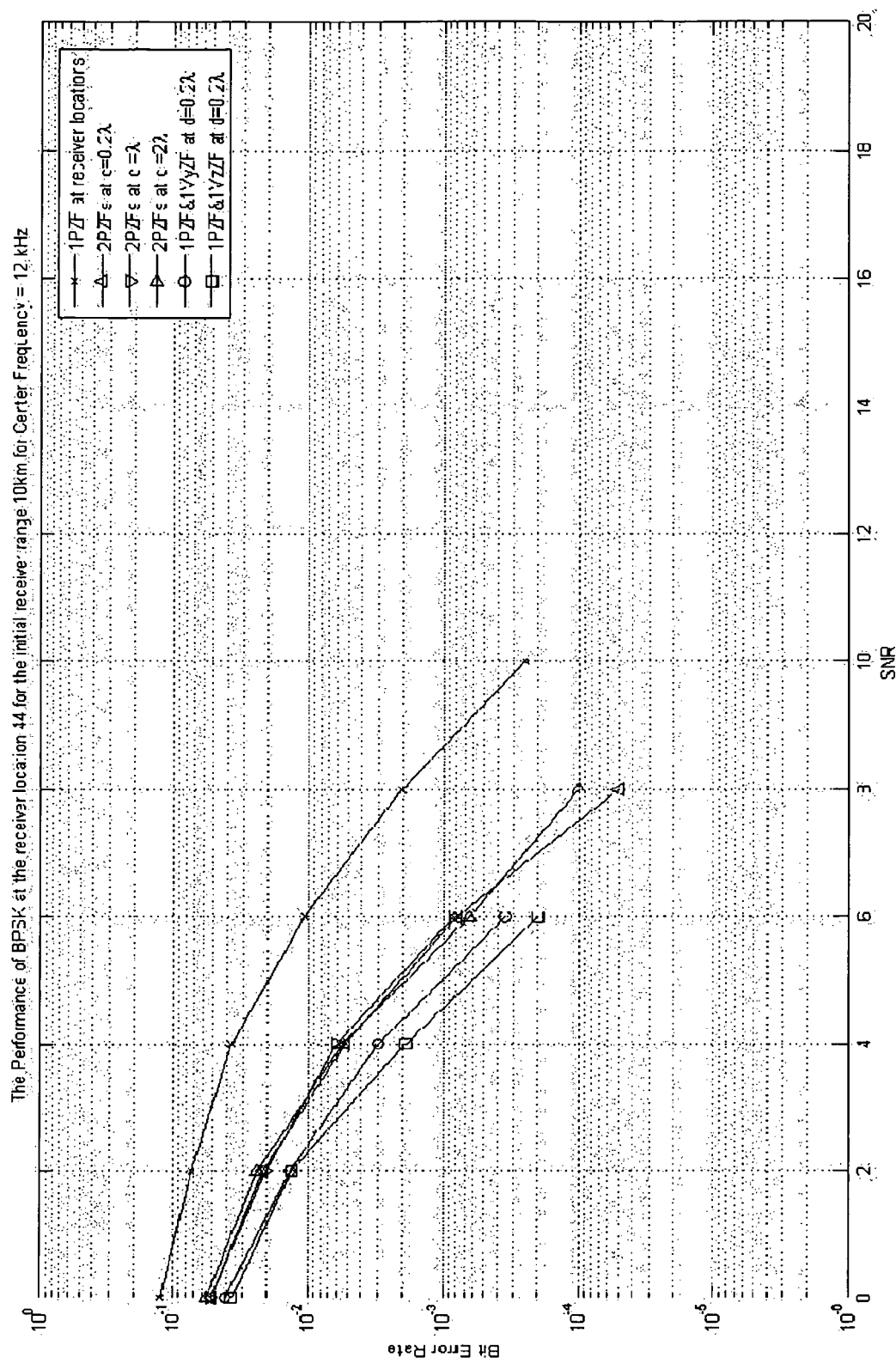
FIG. 84 is a graph of the bit error rate at receiver location 44 for the initial receiver range of 10 km and with a very fine sand bottom profile.
Figure 85:
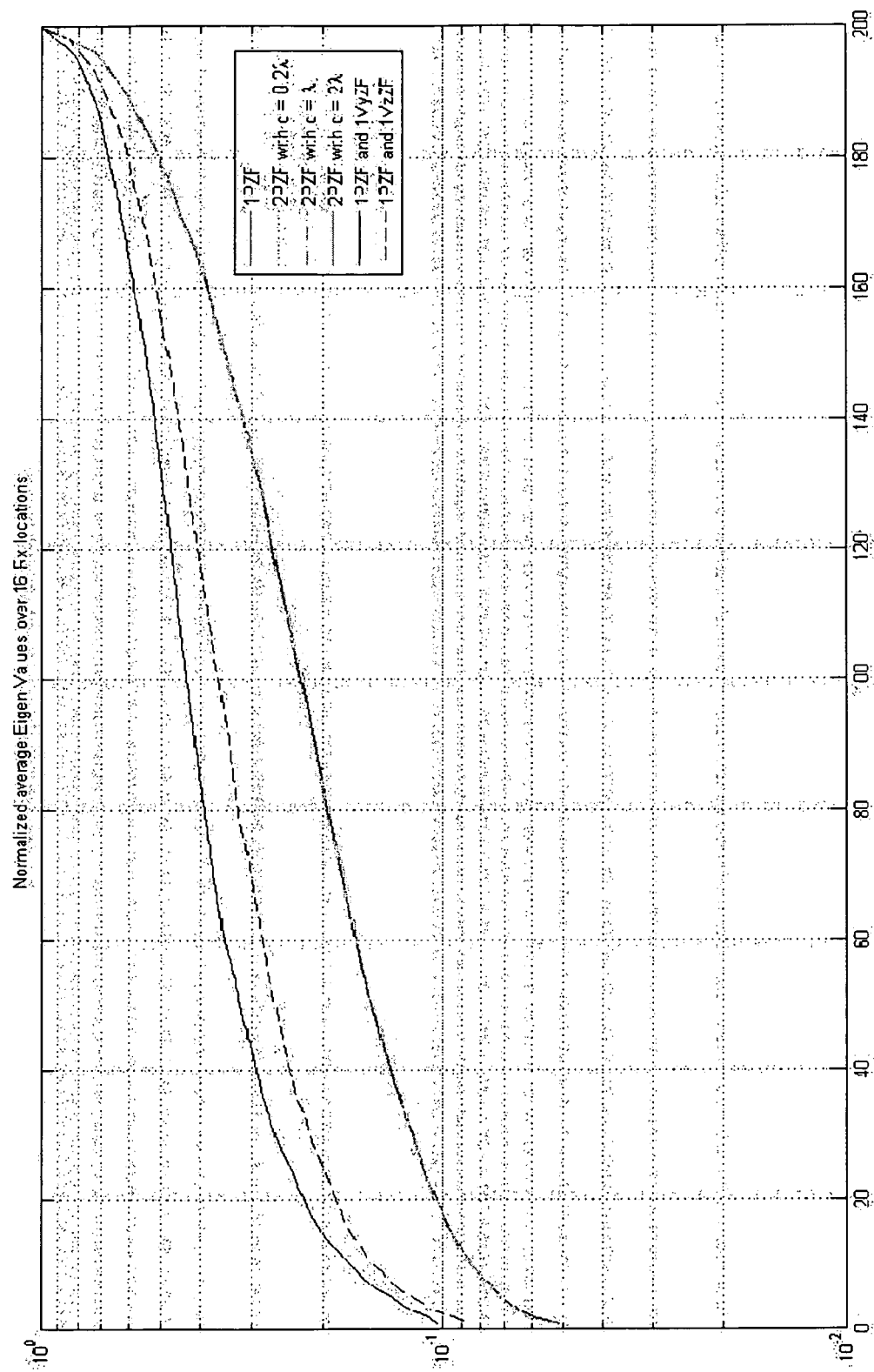
FIG. 85 is a graph of the normalized average eigen-values over 16 receiver locations for the initial receiver range of 10 km and with a very fine sand bottom profile.
Figure 86:
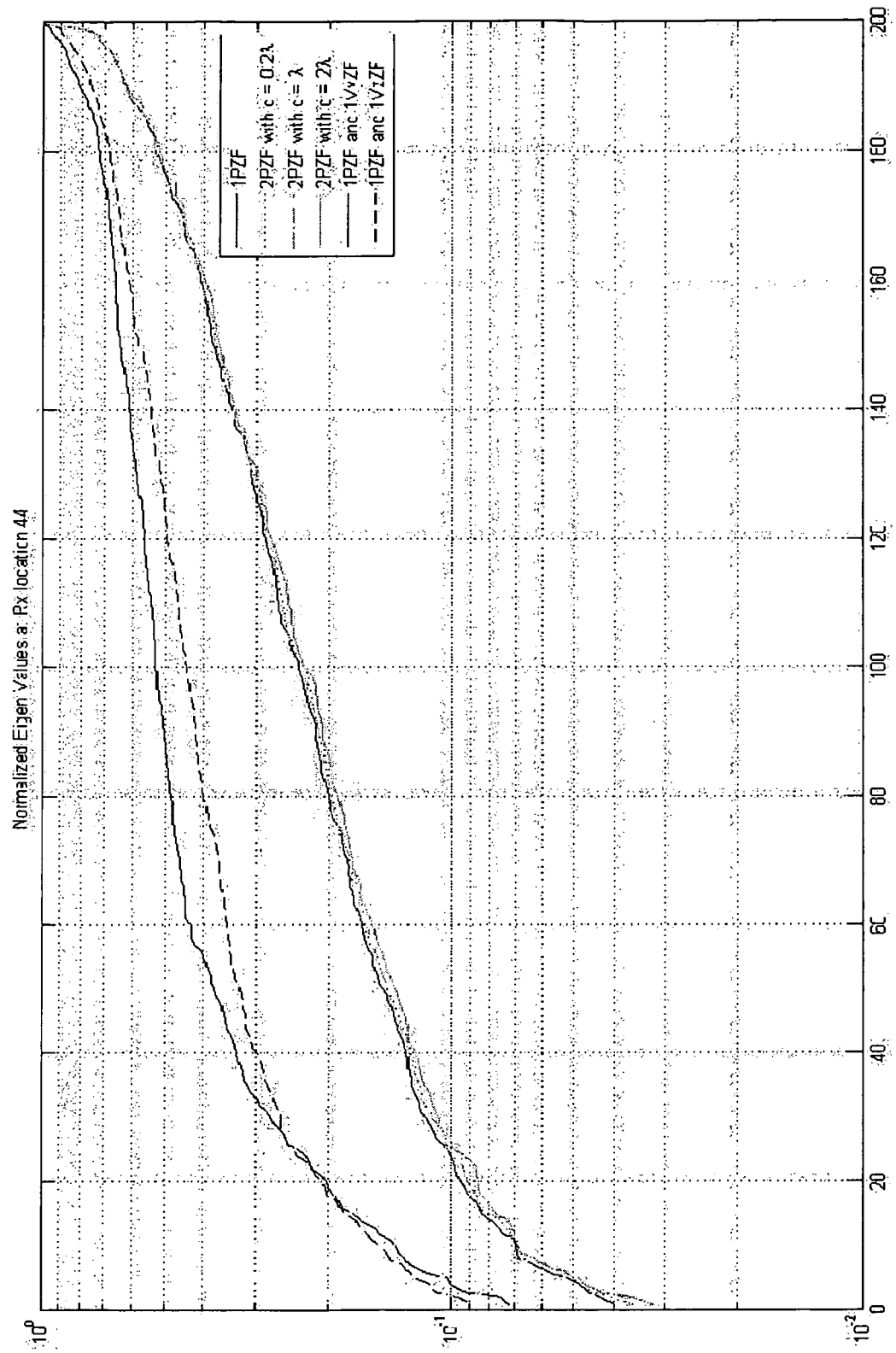
FIG. 86 is a graph of the normalized eigen-values at receiver location 44 for the initial receiver range of 10 km and with a very fine sand bottom profile.
Figure 87:
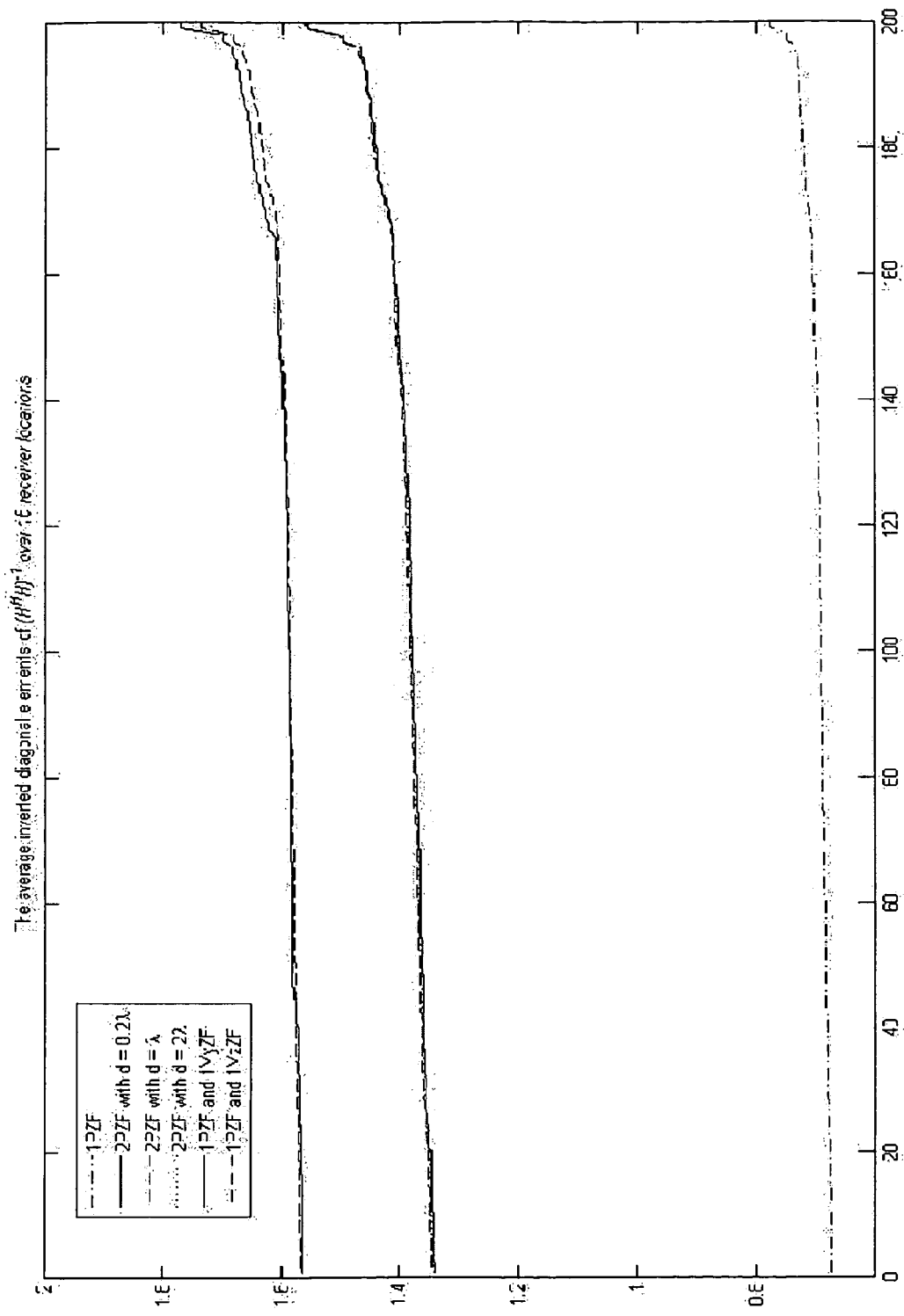
FIG. 87 is a graph of the average of inverted diagonal elements of $(H^H H)^{-1}$ over 16 receiver locations for the initial receiver range of 10 km and with a very fine sand bottom profile.
Figure 88:
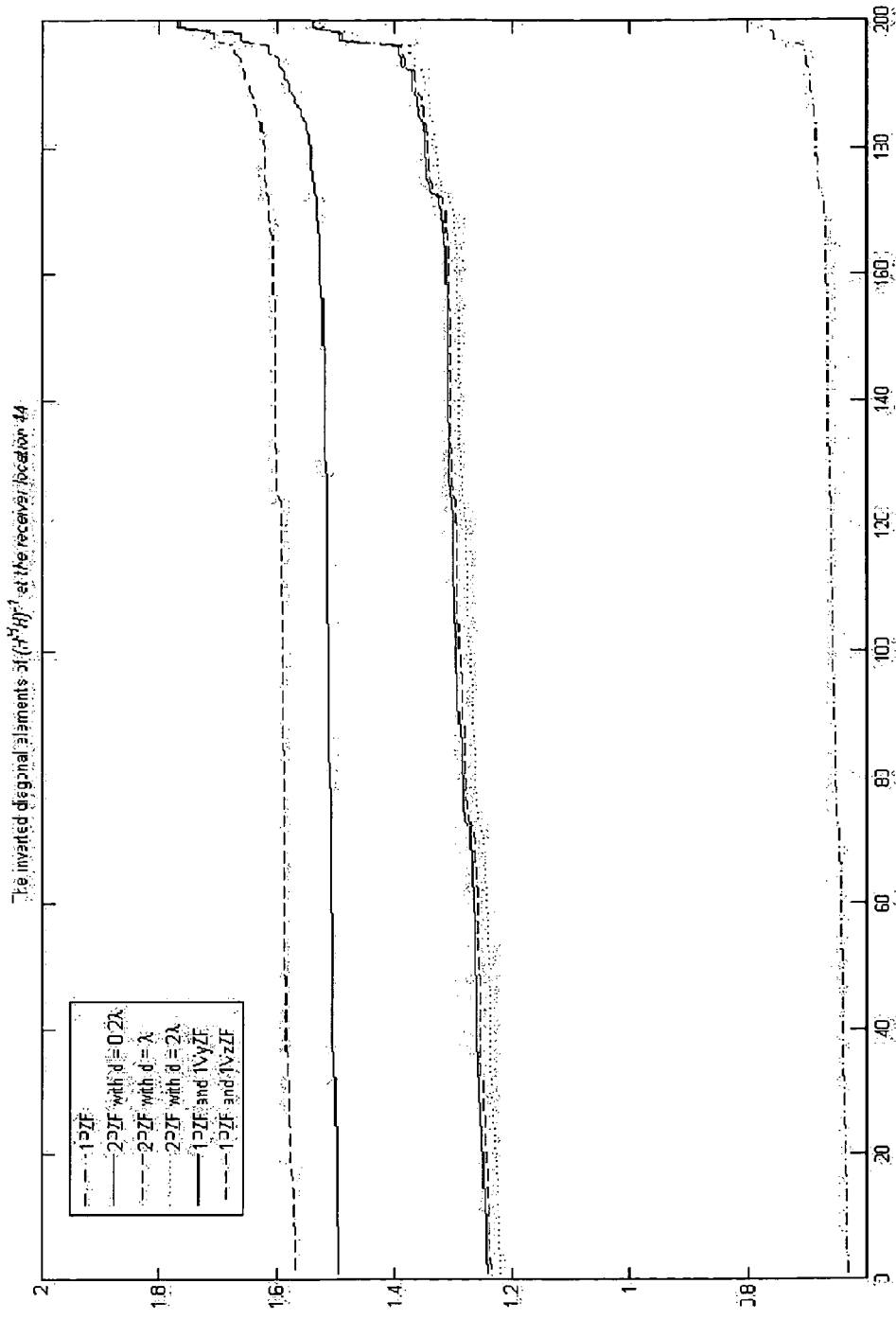
FIG. 88 is a graph of the inverted diagonal elements of $(H^H H)^{-1}$ at receiver location 44 for the initial receiver range of 10 km and with very fine sand bottom profile.

Plots for Bit Error Rate, Eigen Values, and Inverted Diagonal Elements of $(H^H H)^{-1}$ Plots for bit error rate under various conditions are shown in FIGS. 83-84. Eigen values plots are shown in FIGS. 85-86. Plots for the condition number of $(H^H H)^{-1}$ are shown in FIGS. 87-88. The foregoing figures are described in the Brief Description of the Drawings section of this specification.

5.4.8 The Condition Number of $H^H H$

Table 71 tabulates the condition numbers of $H^H H$ of SISO ZF receivers of 16 receiver locations for the initial receiver range 10 km and very fine sand bottom profile, where the mean=23.2061, and the variance=116.1863.

TABLE 71

| | | | |
|---|---|---|---|
| 25.8911 | 37.6510 | 40.8174 | 39.0461 |
| 30.6935 | 22.8490 | 28.1759 | 32.3872 |
| 9.4803 | 8.8691 | 8.8068 | 9.0886 |
| 16.3636 | 15.4379 | 20.7619 | 24.9786 |

Table 72 tabulates the condition numbers of $H^H H$ of SIMO ZF receivers, when using two pressure sensors separated by a distance of 0.2λ, for 16 receiver locations for the initial receiver range 10 km and very fine sand bottom profile, where the mean=23.0478, and the variance=110.5727.

TABLE 72

| | | | |
|---|---|---|---|
| 25.8355 | 37.1317 | 38.1207 | 40.4846 |
| 28.9985 | 22.3068 | 26.4294 | 31.0303 |
| 9.4088 | 8.8938 | 8.7073 | 9.1055 |
| 14.8659 | 16.4019 | 23.1830 | 27.8604 |

Table tabulates the condition numbers of $H^H H$ of SIMO ZF receivers when using two pressure sensors separated by a distance of λ, for 16 receiver locations for the initial receiver range 10 km and very fine sand bottom profile, where the mean=21.7560, and the variance=80.7291.

TABLE 73

| | | | |
|---|---|---|---|
| 25.1988 | 31.6324 | 34.8676 | 35.2473 |
| 25.4231 | 21.5230 | 25.3898 | 29.1285 |

TABLE 73-continued

| | | | |
|---|---|---|---|
| 9.3549 | 8.8458 | 8.9058 | 9.2165 |
| 14.4748 | 17.7366 | 23.8287 | 27.3228 |

Table 74 tabulates the condition numbers of $H^H H$ of SIMO ZF receivers, when using two pressure sensors separated by $2\lambda$, for 16 receiver locations for the initial receiver range 10 km and very fine sand bottom profile, where the mean=21.5075, and the variance=74.3992.

TABLE 74

| | | | |
|---|---|---|---|
| 23.3859 | 28.0298 | 35.6177 | 32.7701 |
| 21.2497 | 20.5061 | 24.7576 | 29.5468 |
| 9.3356 | 9.0848 | 9.1523 | 10.0913 |
| 15.4494 | 18.4097 | 25.5158 | 31.2176 |

Table 75 tabulates the condition numbers of $H^H H$ of SIMO ZF receivers, when using a pressure sensor and a horizontal velocity vector sensor separated by $0.2\lambda$, for 16 receiver locations for the initial receiver range 10 km and coarse silt bottom profile, where the mean=13.0732, and the variance=34.0670.

TABLE 75

| | | | |
|---|---|---|---|
| 16.0589 | 16.8248 | 17.6853 | 11.9131 |
| 14.1680 | 19.5177 | 19.1576 | 24.2530 |
| 6.4590 | 9.3468 | 3.0556 | 3.4694 |
| 12.5413 | 6.5833 | 14.3198 | 13.8178 |

Table 76 tabulates the condition numbers of $H^H H$ of SIMO ZF receivers, when using a pressure sensor and a vertical velocity vector sensor separated at the distance of $0.2\lambda$, for 16 receiver locations for the initial receiver range 10 km and coarse silt bottom profile, where the mean=13.4015, and the variance=30.6241.

TABLE 76

| | | | |
|---|---|---|---|
| 9.5741 | 25.0937 | 12.7939 | 11.2226 |
| 24.3794 | 21.4869 | 12.3889 | 11.9217 |
| 9.1971 | 8.4266 | 6.5445 | 6.8771 |
| 13.3219 | 16.2430 | 13.6177 | 11.3353 |

CONCLUSION

In this section, after examining the time dispersion properties of the underwater channels, it has been determined that the rms delay spreads vary within a range of about 1-10 milliseconds. This range corresponds roughly to a range of about 20-200 Hz for 50% of the coherent bandwidth of the channels. Since the signal needs to be transmitted at the rate of 2,400 bps, there is a need for equalization.

In this experiment, the performance of P-P SIMO ZF receivers exceeded that of the SISO ZF receiver. In general, the P-P SIMO ZF receivers with two pressure sensors separated by the distance $d=2\lambda$ had a slightly better performance than those at $d=0.2\lambda$ and $\lambda$. Further, pressure sensors separated at distance $d=\lambda$ performed somewhat better than those separated by $d=0.2\lambda$.

The simulation results showed that using vector sensors in the SIMO ZF receivers, separated from the pressure receiver by $d=0.2\lambda$, improved the performance of the SIMO ZF receivers. More importantly, the vector sensors reduced the volume of the receiver system. Further, the simulation suggested that in general, P-Vy performs better than P-Vz.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, DSP (digital signal processing) processors, or any combination of the above. One or more embodiments of the invention may also be embodied in a software program for storage in a suitable storage medium and execution by a processing unit.

The applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description. It is therefore to be understood that numerous modifications may be made to the illustrative embodiments and that other arrangements may be devised without departing from the spirit and scope of the present invention as defined by the appended claims.

The following references are hereby incorporated herein by reference:

[1] P.-P. J. Beaujcan and E. P. Bemault, "A new multi-channel spatial diversity technique for long range acoustic communications in shallow water," in *Proc. Oceans*, San Diego, Calif., 2003, pp. 1533-1538.

[2] J. Trubuil, G. Lapierre, T. Le Gall, and J. Labat, "Real-time high data rate acoustic link based on spatio-temporal blind equalization: The TRIDENT acoustic system," in *Proc. Oceans*, Biloxi, Miss., 2002, pp. 2438-2443.

[3] C. C. Tsimenidis, O. R. Hinton, A. E. Adams, and B. S. Sharif, "Underwater acoustic receiver employing direct-sequence spread spectrum and spatial diversity combining for shallow-water multi-access networking," *IEEE J. Oceanic Eng.*, vol. 26, pp. 594-603, 2001.

[4] D. Albonico, F. Fohanno, and J. Labat, "Test of an high data rate acoustic link in shallow water," in *Proc. Oceans*, Nice, France, 1998, pp. 1028-1032.

[5] V. Capellano, "Performance improvements of a 50 km acoustic transmission through adaptive equalization and spatial diversity," in *Proc. Oceans*, Halifax, NS, Canada, 1997, pp. 569-573.

[6] M. Stojanovic, "Recent advances in high-speed underwater acoustic communications," *IEEE J. Oceanic Eng.*, vol. 21, pp. 125-136, 1996.

[7] J. A. Neasham, D. Thompson, A. D. Tweedy, M. A. Lawlor, O. R. Hinton, A. E. Adams, and B. S. Sharif, "Combined equalization and beamforming to achieve 20 kbit/sec acoustic telemetry for ROVs," in *Proc. Oceans*, Ft. Lauderdale, Fla., 1996, pp. 988-993.

[8] D. Thompson, J. Neasham, B. S. Sharif, O. R. Hinton, A. E. Adams, A. D. Tweedy, and M. A. Lawlor, "Performance of coherent PSK receivers using adaptive combining, beamforming, and equalization in 50 km underwater acoustic channels," in *Proc. Oceans*, Ft. Lauderdale, Fla., 1996, pp. 845-850.

[9] M. Stojanovic, J. A. Catipovic, and J. G. Proakis, "Reduced-complexity spatial and temporal processing of underwater acoustic communication signals," *J. Acoust. Soc. Am.*, vol. 98, pp. 961-972, 1995.

[10] G. B. Henderson, A. Tweedy, G. S. Howe, O. Hinton, and A. E. Adams, "Investigation of adaptive beamformer performance and experimental verification of applications in high data rate digital underwater communications," in *Proc. Oceans*, Brest, France, 1994, pp. 296-301.

[11] G. S. Howe, P. S. D. Tarbit, O. R. Hinton, B. S. Sharif, and A. E. Adams, "Sub-sea acoustic remote communications utilizing an adaptive receiving beamformer for multipath suppression," in *Proc. Oceans*, Brest, France, 1994, pp. 313-316.

[12] M. Stojanovic, Z. Zvonar, J. A. Catipovic, and J. G. Proakis, "Spatial processing of broadband underwater acoustic communication signals in the presence of co-channel interference," in *Proc. Oceans*, Brest, France, 1994, pp. 286-291.

[13] Q. Wen and J. A. Ritcey, "Spatial diversity equalization applied to underwater communications," *IEEE J. Oceanic Eng.*, vol. 19, pp. 227-240, 1994.

[14] T. C. Yang, "Temporal resolutions of time-reversal and passive-phase conjugation for underwater acoustic communications," *IEEE J. Oceanic Eng.*, vol. 28, pp. 229-245, 2003.

[15] D. Rouseff, D. R. Jackson, W. L. J. Fox, C. D. Jones, J. A. Ritcey, and D. R. Dowling, "Underwater acoustic communication by passive-phase conjugation: Theory and experimental results," *IEEE J. Oceanic Eng.*, vol. 26, pp. 821-831, October 2001.

[16] L. E. Freitag, M. Grund, J. Partan, K. Ball, S. Singh, and P. Koski, "Multi-band acoustic modem for the communications and navigation aid AUV," in *Proc. Oceans*, Washington, D.C., 2005.

[17] M. Stojanovic and L. Freitag, "Wideband underwater acoustic CDMA: Adaptive multichannel receiver design," in *Proc. Oceans*, Washington, D.C., 2005.

[18] E. M. Sozer, M. Stojanovic, and J. G. Proakis, "Underwater acoustic networks," *IEEE J. Oceanic Eng.*, vol. 25, pp. 72-83, 2000.

[19] L. Freitag, M. Stojanovic, S. Singh, and M. Johnson, "Analysis of channel effects on direct-sequence and frequency-hopped spread-spectrum acoustic communication," *IEEE J. Oceanic Eng.*, vol. 26, pp. 586-593, 2001.

[20] C. C. Tsimenidis, O. R. Hinton, A. E. Adams, and B. S. Sharif, "Underwater acoustic receiver employing direct-sequence spread spectrum and spatial diversity combining for shallow-water multiaccess networking," *IEEE J. Oceanic Eng.*, vol. 26, pp. 594-603, 2001.

[21] H. K. Yeo, B. S. Sharif, A. E. Adams, and O. R. Hinton, "Implementation of multiuser detection strategies for coherent underwater acoustic communication," *IEEE J. Oceanic Eng.*, vol. 27, pp. 17-27, 2002.

[22] J. G. Proakis, *Digital Communications*, 4$^{th}$ ed., New York: McGraw-Hill, 2001. M. Zatman and B. Tracey, "Underwater acoustic MIMO channel capacity," in *Proc. Asilomar Conf. Signals, Systems, Computers*, Pacific Grove, Calif., 2002, pp. 1364-1368.

[23] D. B. Kilfoyle, J. C. Preisig, and A. B. Baggeroer, "Spatial modulation over partially coherent multiple-input/multiple-output channels," *IEEE Trans. Signal Processing*, vol. 51, pp. 794-804, 2003.

[24] E. G. Larsson and P. Stoica, *Space-Time Block Coding for Wireless Communications*. Cambridge, UK: Cambridge University Press, 2003.

[25] S. M. Alamouti, "A simple transmit diversity technique for wireless communications," *IEEE J. Select. Areas Commun.*, vol. 16, pp. 1451-1458, 1998.

[26] A. F. Naguib, N. Seshadri, and A. R. Calderbank, "Applications of space-time block codes and interference suppression for high capacity and high data rate wireless systems," in *Proc. Asilomar Conf. Signals, Systems, Computers*, Pacific Grove, Calif., 1998, pp. 1803-1810.

[27] P.-P. J. Beaujean and E. P. Bernault, "A new multi-channel spatial diversity technique for long range acoustic communications in shallow water" in *Proc. Oceans*, San Diego, Calif., 2003, pp. 1533-1538.

[28] A. Benson, J. Proakis, and M. Stojanovic, "Towards robust adaptive acoustic communications," in *Proc. Oceans*, Providence, R.I., 2000, pp. 1243-1248.

[29] A. D. Pierce, *Acoustics: An Introduction to Its Physical Principles and Applications*, 2$^{nd}$ ed., Acoustic Soc. Am., 1989.

[30] A. Falahati, B. Woodward, and S. C. Bateman, "Underwater acoustic channel models for 4800 b/s QSPK signals," *IEEE J. Oceanic Eng.*, vol. 16, pp. 12-20, 1991.

[31] A. G. Sazontov, A. L. Matveyev, and N. K. Vdovicheva, "Acoustic coherence in shallow water: Theory and observation," *IEEE J. Oceanic Eng.*, vol. 27, pp. 653-664, 2002.

[32] A. Goldsmith, S. A. Jafar, N. Jindal, and S. Vishwanath, "Capacity limits of MIMO channels," *IEEE J. Select. Areas Commun.*, vol. 21, pp. 684-702, 2003.

[33] A. Nehorai and E. Paldi, "Acoustic vector-sensor array processing," *IEEE Trans. Signal Processing*, vol. 42, pp. 2481-2491, 1994.

[34] A. Papoulis, *Probability, Random Variables, and Stochastic Processes*, 3$^{rd}$ ed., Singapore: McGraw-Hill, 1991.

[35] B. A. Cray and A. H. Nuttall, "Directivity factors for linear arrays of velocity sensors," *J. Acoust. Soc. Am.*, vol. 110, pp. 324-331, 2001.

[36] B. A. Cray, V. M. Evora, and A. H. Nuttall, "Highly directional acoustic receivers," *J. Acoust. Soc. Am.*, vol. 113, pp. 1526-1532, 2003.

[37] B. G. Katsnelson and V. G. Petnikov, *Shallow-Water Acoustics*. Springer-Praxis, 2002.

[38] B. J. Uscinski and D. E. Reeve, "The effect of ocean inhomogeneites on array output," *J. Acoust. Soc. Am.*, vol. 87, pp. 2527-2534, 1990.

[39] B. Vucetic and J. Yuan, *Space-Time Coding*. Wiley, 2003.

[40] C. Bjerrum-Niese and R. Lutzen, "Stochastic simulation of acoustic communication in turbulent shallow water," *IEEE J. Oceanic Eng.*, vol. 25, pp. 523-532, 2000.

[41] C. Bjerrum-Niese, L. Bjorno, M. A. Pinto, and B. Quellec, "A simulation tool for high data-rate acoustic communication in a shallow-water, time-varying channel," *IEEE J. Oceanic Eng.*, vol. 21, pp. 143-149, 1996.

[42] D. B. Creamer, "Scintillating shallow-water waveguides," *J. Acoust. Soc. Am.*, vol. 99, pp. 2825-2838, 1996.

[43] D. B. Kilfoyle and A. B. Baggeroer, "The state of the art in underwater acoustic telemetry," *IEEE J. Oceanic Eng.*, vol. 25, pp. 4-27, 2000.

[44] D. Falconer, S. L. Ariyavisitakul, A. Benyamin-Seeyar, and B. Edison, "Frequency domain equalization for single-carrier broadband wireless systems," *IEEE Commun. Mag.*, vol. 40, no. 4, pp. 58-66, 2002.

[45] D. Lee and M. H. Schultz, *Numerical Ocean Acoustic Propagation in Three Dimensions*. Singapore: World Scientific, 1995.

[46] D. Middleton, "Channel modeling and threshold signal processing in underwater acoustics: An analytical overview," *IEEE J. Oceanic Eng.*, vol. 12, pp. 4-28, 1987.

[47] D. Tielburger, S. Finette, and S. Wolf, "Acoustic propagation through an internal wave field in a shallow water waveguide," *J. Acoust. Soc. Am.*, vol. 101, pp. 789-808, 1997.

[48] D. Wax, "MFSK—The basis for robust acoustical communications," in *Proc. Oceans,* 1981, pp. 61-66.

[49] E. Biglieri, J. Proakis, and S. Shamai, "Fading channels: Information-theoretic and communication aspects," *IEEE Trans. Inform. Theory*, vol. 44, pp. 2619-2692, 1998.

[50] F. B. Jensen, W. A. Kuperman, M. B. Porter, and H. Schmidt, *Computational Ocean Acoustics*. New York: Springer, 2000.

[51] F. J. Beron-Vera et al., "Ray dynamics in a long-range acoustic propagation experiment," *J. Avoust. Soc. Am.*, vol. 114, pp. 1226-1242, 2003.

[52] G. D. Golden, C. J. Foschini, R. A. Valenzuela, and P. W. Wolniansky, "Detection algorithm and initial laboratory results using V-BLAST space-time communication architecture," *Electron. Lett.*, vol. 35, pp. 14-16, 1999.

[53] A. Goldsmith, *Wireless Communications*. New York: Cambridge University Press, 2005.

[54] G. J. Foschini and M. J. Gans, "On limits of wireless communications in a fading environment when using multiple antennas," *Wireless Pers. Commun.*, vol. 6, pp. 311-335, 1998.

[55] G. R. Sutton and J. J. McCoy, "Spatial coherence of acoustic signals in randomly inhomogeneous waveguides—A multiple scatter theory," *J. Math. Phys.*, vol. 18, pp. 1052-1057, 1977.

[56] G. V. Frisk, *Ocean and Seabed Acoustics: A Theory of Wave Propagation*. Englewood Cliffs, N.J.: PTR Prentice-Hall, 1994.

[57] H. F. Olson, "Mass controlled electrodynamic microphones: the ribbon microphone," *J. Acoust. Soc. Am.*, vol. 3, pp. 56-68, 1931.

[58] L. J. Ziomek, *Underwater Acoustics: A Linear Systems Theory Approach*. Orlando, Fla.: Academic, 1985.

[59] H. L. Van Trees, *Optimum Array Processing*. New York: Wiley, 2002.

[60] A. Abdi, J. A. Barger, and M. Kaveh, "A parametric model for the distribution of the angle of arrival and the associated correlation function and power spectrum at the mobile station," *IEEE Trans. Vehic. Technol.*, vol. 51, pp. 425-434, 2002.

[61] A. Abdi and M. Kaveh, "A space-time correlation model for multielement antenna systems in mobile fading channels," *IEEE J. Select. Areas Commun.*, vol. 20, pp. 550-560, 2002.

[62] I. S. Gradshteyn and I. M. Ryzhik, *Table of Integrals, Series, and Products*, $5^{th}$ ed., A. Jeffrey, Ed., San Diego, Calif.: Academic, 1994.

[63] H. Meyr, M. Moeneclaey, and S. A. Fechtel, *Digital Communication Receivers: Synchronization, Channel Estimation, and Signal Processing*. New York: Wiley, 1998.

[64] H. Sari and B. Woodward, "Digital underwater voice communications," in *Underwater Acoustic Digital Signal Processing and Communication Systems*. R. S. H. Istepanian and M. Stojanovic, Eds, Boston, Mass.: Kluwer, 2002, pp. 127-165.

[65] http://www.curtin.edu.au/curtin/centre/cmst/products/actoolbox/

[66] J. A. Catipovic, "Performance limitations in underwater acoustic telemetry," *IEEE J. Oceanic Eng.*, vol. 15, pp. 205-216, 1990.

[67] J. J. Shynk, "Frequency-domain and multirate adaptive filtering," *IEEE Signal Processing Mag.*, vol. 9, no. 1, pp. 14-37, 1992.

[68] J. Lynch et al., "Acoustic travel-time perturbations due to shallow water internal waves and internal tides in the Barents Sea Polar Front: Theory ad experiment," *J. Acoust. Soc. Am.*, vol. 99, pp. 803-821, 1996.

[69] J. McEachern, Welcoming Presentation Slides, in *Proc. Workshop Directional Acoustic Sensors (CD-ROM)*, New Port, R.I., 2001.

[70] K. Acolatse and A. Abdi, "Efficient simulation of space-time correlated MIMO mobile fading channels," in *Proc. IEEE Vehic. Technol. Conf.*, Orlando, Fla., 2003, pp. 652-656.

[71] S. N. Diggavi, N. Al-Dhahir, A. Stamoulis, and A. R. Calderbank, "Great Expectations: The value of spatial diversity in wireless networks," *Proc. IEEE*, vol. 92, pp. 219-270, 2004.

[72] D. Tse and P. Viswanath, *Fundamentals of Wireless Communication*. New York: Cambridge University Press, 2005.

[73] A. Paulraj, R. Nabar and D. Gore, *Introduction to Space-Time Wireless Communications*. New York: Cambridge University Press, 2003.

[74] W. S. Burdic, *Underwater Acoustic System Analysis*, $2^{nd}$ ed., Prentice-Hall, 1990.

[75] X Lurton, *An Introduction to Underwater Acoustics: Principles and Applications*. Springer-Praxis, 2002.

[76] M. Hawkes and A. Nehorai, "Acoustic vector-sensor correlations in ambient noise," *IEEE J. Oceanic Eng.*, vol. 26, pp. 337-347, 2001.

[77] L. B. Dozier and F. D. Tappert, "Statistics of normal mode amplitudes in a random ocean. I. Theory," *J. Acoust. Soc. Am.*, vol. 63, pp. 353-365, 1978.

[78] L. M. Brekhovskikh and Y. P. Lysanov, *Fundamentals of Ocean Acoustics*, $3^{rd}$ ed., New York: Springer, 2003.

[79] L. Zheng and D. N. C. Tse, "Diversity and multiplexing: A fundamental tradeoff in multiple-antenna channels," *IEEE Trans. Inform. Theory*, vol. 49, pp. 1073-1096, 2003.

[80] M. E. Higgins, "DIFAR system overview," in *Proc. Workshop Directional Acoustic Sensors (CD-ROM)*, New Port, R.I., 2001.

[81] M. Grigoriu, *Applied non-Gaussian Processes: Examples, Theory, Simulation, Linear Random Vibration, and MATLAB Solutions*. Englewood Cliffs, N.J.: Prentice-Hall PTR, 1995.

[82] M. Hawkes and A. Nehorai, "Acoustic vector-sensor beamforming and Capon direction estimation," *IEEE Trans. Signal Processing*, vol. 46, pp. 2291-2304, 1998.

[83] M. J. Beran and S. Frankenthal, "Combined volume and surface scattering in a channel using a modal formulation," *J. Acoust. Soc. Am.*, vol. 100, pp. 1463-1472, 1996.

[84] M. K. Varanasi, "Noncoherent equalization for multipulse modulation," in *Proc. IEEE Int. Symp. Personal Indoor Mobile Radio Commun.*, Boston, Mass., 1998, pp. 218-222.

[85] M. Kocic, D. Brady, and M. Stojanovic, "Sparse equalization for real-time digital underwater acoustic communications," in *Proc. Oceans*, San Diego, Calif., 1995, pp. 1417-1422.

[86] M. O. Damen, A. Abdi, and M. Kaveh, "On the effect of correlated fading on several space-time coding and detection schemes," in *Proc. IEEE Vehic. Technol. Conf.*, Atlantic City, N.J., 2001, pp. 13-16.

[87] M. Stojanovic, "High speed underwater acoustic communications," in *Underwater Acoustic Digital Signal Pro-* cessing and Communication Systems. R. S. H. Istepanian and M. Stojanovic, Eds, Boston, Mass.: Kluwer, 2002, pp. 1-35.

[88] M. T. Silvia and R. T. Richards, "A theoretical and experimental investigation of low-frequency acoustic vector sensors," in *Proc. Oceans*, Biloxi, Miss., 2002, pp. 1886-1897.

[89] M. T. Silvia, R. E. Franklin, and D. J. Schmidlin, "Signal processing considerations for a general class of directional acoustic sensors," in *Proc. Workshop Directional Acoustic Sensors (CD-ROM)*, New Port, R.I., 2001.

[90] M. V. Clark, "Adaptive frequency-domain equalization and diversity combining for broadband wireless communications," *IEEE J. Select. Areas Commun.*, vol. 16, pp. 1385-1395, 1998.

[91] P. C. Etter, *Underwater Acoustic Modeling and Simulation*, $3^{rd}$ ed., New York: Spon, 2003.

[92] P. D. Baird, "EDO directional acoustic sensor technology," in *Proc. Workshop Directional Acoustic Sensors (CD-ROM)*, New Port, R.I., 2001.

[93] *Proc. AIP Conf. Acoustic Particle Velocity Sensors: Design, Performance, and Applications*, Mystic, Conn., 1995.

[94] *Proc. Workshop Directional Acoustic Sensors (CD-ROM)*, New Port, R.I., 2001.

[95] R. Dashen, S. M. Flatte, and S. A. Reynolds, "Path-integral treatment of acoustic mutual coherence functions for rays in sound channel," *J. Acoust. Soc. Am.*, vol. 77, pp. 1716-1722, 1985.

[96] R. J. Urick: *Principles of Underwater Sound*, $3^{rd}$ ed., New York: McGraw-Hill, 1983.

[97] R. Mazar and B. Katz, "Ray-mode analysis of a random medium waveguide," *J. Acoust. Soc. Am.*, vol. 95, pp. 2495-2504, 1994.

[98] R. Mazar and L. B. Felsen, "Stochastic geometrical theory of diffraction," *J. Acoust. Soc. Am.*, vol. 86, pp. 2292-2308, 1989.

[99] R. Mazar, "Modeling of high-frequency propagation in inhomogeneous background random media," *J. Acoust. Soc. Am.*, vol. 111, pp. 809-822, 2002.

[100] S. Haykin, *Adaptive Filter Theory*, $3^{rd}$ ed., Upper Saddle River, N.J.: Prentice Hall, 1996.

[101] S. M. Flatte, "Wave propagation through random media: Contributions from Ocean Acoustics," *Proc. IEEE*, vol. 71, pp. 1267-1294, 1983.

[102] S. M. Flatte, Ed., *Sound Transmission Through a Fluctuating Ocean*. Cambridge Univ., 1979.

[103] S. M. Kay, *Fundamentals of Statistical Signal Processing: Estimation Theory*. Englewood Cliffs, N.J.: PTR Prentice-Hall, 1993.

[104] T. B. Gabrielson, "Design problems and limitations in vector sensors," in *Proc. Workshop Directional Acoustic Sensors (CD-ROM)*, New Port, R.I., 2001.

[105] T. C. Yang and M. Siderius, "Low frequency phase coherent communications in the Sicily Strait," in *Proc. Oceans*, Providence, R.I., 2000, pp. 1005-1009.

[106] T. M. Cover and J. A. Thomas, *Elements of Information Theory*. New York: Wiley, 1991.

[107] V. Tarokh, N. Seshadri, and A. R. Calderbank, "Space-time codes for high data rate wireless communication: Performance criterion and code construction," *IEEE Trans. Inform. Theory*, vol. 44, pp. 744-765, 1998.

[108] W. Chung, C. R. Johnson, Jr., and M. J. Ready, "Characterization of multipath distortion of FSK signals," *IEEE Signal Processing Lett.*, vol. 9, pp. 26-28, 2002.

[109] W. Munk and F. Zachariasen, "Sound propagation through a fluctuating stratified ocean: Theory and observation," *J. Acoust. Soc. Am.*, vol. 59, pp. 818-838, 1976.

[110] X. Geng and A. Zielinski, "An eigenpath underwater acoustic communication channel model," in *Proc. Oceans*, San Diego, Calif., 1995, pp. 1189-1196.

[111] J. Clay Shipps and K. Deng, "A miniature vector sensor for line array applications," in *Proc. Oceans*, San Diego, Calif., 2003, pp. 2367-2370.

[112] J. Clay Shipps and B. M. Abraham, "The use of vector sensors for underwater port and waterway security," in *Proc. ISA/IEEE Sensors for Industry Conf.*, New Orleans, La., 2004, pp. 41-44.

[113] D. A. Brown, B. Aronov, L. Reinhart, and T. Oishi, "Acoustic pressure gradient sensors: Piezoelectric motion and fixed types," in *Proc. Workshop Directional Acoustic Sensors (CD-ROM)*, New Port, R.I., 2001.

[114] P. A. Wlodkowski and F. Schloss, "Advances in acoustic particle velocity sensors," in *Proc. Workshop Directional Acoustic Sensors (CD-ROM)*, New Port, R.I., 2001.

[115] C. C. Tsimenidis, O. R. Hinton, A. E. Adams, and B. S. Sharif, "Underwater acoustic receiver employing direct-sequence spread spectrum and spatial diversity combining for shallow-water multi-access networking," *IEEE J. Oceanic Eng.*, vol. 26, pp. 594-603, 2001.

[116] W. Magnus, F. Oberhettinger, and R. P. Soni, *Formulas and Theorems for the Special Functions of Mathematical Physics*, 3rd ed., New York: Springer, 1966.

[117] Acoustics Toolbox http://www.cmst.curtin.edu.au/products/actoolbox/

[118] P. Sutthiwan, "Multichannel underwater communication receivers," M.S. project report, Dept. Elec. Comp. Eng., New Jersey Institute of Technology, Newark, N.J., 2006.

[119] Peter S. Duke, *Direct-Sequence Spread-Spectrum Modulation for Utility Packet Transmission in Underwater Acoustic Communication Networks*, Naval Postgraduate School, September 2002.

[120] Theodore S. Rappaport, *Wireless Communications: Principles and Practice*, second edition Prentice Hall, 2002.

[121] Stuber, Gordon L., *Principles of Mobile Communication*, second edition Kluwer Academic, c2001.

[122] Paulraj, Arogyaswami, *Introduction to space-time wireless communications*, Cambridge University Press, 2003.

The invention claimed is:

1. A method, comprising:
providing a communication system having a plurality of pressure transducers and operating in a fluid medium;
transmitting data through the fluid medium using the plurality of pressure transducers; and
receiving the data using at least one vector sensor of the communication system.

2. The method of claim 1 wherein the fluid medium includes water.

3. The method of claim 1 further comprising:
the at least one vector sensor receiving the data on a plurality of respective channels thereof.

4. The method of claim 1 further comprising the at least one vector sensor receiving the data on one scalar pressure channel, and a plurality of velocity measurement channels.

5. The method of claim 1 further comprising:
using only one vector sensor to receive the data.

6. The method of claim 1 further comprising:
using a given number of pressure transducers to transmit the data; and using a number of vector sensors, that is less than the given number of pressure transducers, to receive the data.

7. The method of claim 1, wherein the plurality of pressure transducers transmit their respective data simultaneously.

8. The method of claim 4 further comprising:
the at least one vector sensor measuring a plurality of orthogonal particle velocity components using a respective plurality of channels.

9. The method of claim 4 further comprising:
the at least one vector sensor measuring particle velocity components along the X, Y, and Z directions at three respective channels of the at least one vector sensor.

10. The method of claim 1 wherein the at least one vector sensor is operable to measure thirteen separate measurements on thirteen respective channels.

11. The method of claim 10 wherein the thirteen measurements include: one scalar pressure measurement; three particle velocity measurements along three respective directions; and the variations of velocity as a function of position along three axes, for each of the three velocity directions.

12. A communication system comprising:
a plurality of pressure transducers operating in a fluid medium and operable to transmit data through the medium; and
at least one vector sensor operable to receive the data.

13. The system of claim 12 wherein the fluid medium includes water.

14. The method of claim 12 wherein the at least one vector sensor is operable to receive the data on a plurality of respective channels thereof.

15. The system of claim 12 wherein the at least one vector sensor is operable to receive data on one scalar pressure channel, and a plurality of velocity measurement channels.

16. The system of claim 12 wherein the plurality of pressure transducers further comprise:
the at least one vector sensor comprises only one vector sensor.

17. The system of claim 12 wherein the plurality of pressure transducers comprise a given number of pressure transducers; and
the at least one vector sensor comprises a number of vector sensors that is smaller than the given number of pressure transducers.

18. The system of claim 12 wherein the plurality of pressure transducers transmit their respective data simultaneously.

19. The system of claim 15 wherein the at least one vector sensor is operable to measure a plurality of orthogonal particle velocity components using a respective plurality of channels.

20. The system of claim 16 wherein the vector sensor is operable to measure particle velocity components along the X, Y, and Z directions at three respective channels of the vector sensor.

21. The system of claim 12 wherein the at least one vector sensor is operable to measure thirteen separate measurements on thirteen respective channels thereof.

22. The system of claim 21 wherein the thirteen measurements include: one scalar pressure measurement; three particle velocity measurements along three respective directions; and the variations of velocity as a function of position along three axes, for each of the three velocity directions.

* * * * *